United States Patent
Shimoda et al.

(10) Patent No.: US 11,871,268 B2
(45) Date of Patent: Jan. 9, 2024

(54) COMMUNICATION SYSTEM

(71) Applicant: Mitsubishi Electric Corporation, Tokyo (JP)

(72) Inventors: Tadahiro Shimoda, Tokyo (JP); Mitsuru Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/060,398

(22) Filed: Nov. 30, 2022

(65) Prior Publication Data

US 2023/0119586 A1    Apr. 20, 2023

Related U.S. Application Data

(63) Continuation of application No. 17/544,089, filed on Dec. 7, 2021, now abandoned, which is a continuation
(Continued)

(30) Foreign Application Priority Data

Apr. 27, 2017   (JP) .................................. 2017-088666

(51) Int. Cl.
*H04W 4/00* (2018.01)
*H04W 28/06* (2009.01)
(Continued)

(52) U.S. Cl.
CPC ........... *H04W 28/06* (2013.01); *H04L 1/1819* (2013.01); *H04L 5/0055* (2013.01); *H04W 80/02* (2013.01); *H04W 80/08* (2013.01); *H04W 84/20* (2013.01)

(58) Field of Classification Search
CPC ..... H04W 28/06; H04W 80/02; H04W 80/08; H04W 84/20; H04L 1/1819; H04L 5/0055
(Continued)

(56) References Cited

U.S. PATENT DOCUMENTS 11,588,594 B2 *   2/2023   Park ..................... H04W 76/32
2005/0096054 A1   5/2005   Zhang et al.
(Continued)

FOREIGN PATENT DOCUMENTS

WO   WO 2009/021359 A1   2/2009
WO   WO 2013/112008 A1   8/2013
(Continued)

OTHER PUBLICATIONS

International Search Report dated Jul. 10, 2018 in PCT/JP2018/016287 filed on Apr. 20, 2018.
(Continued)

*Primary Examiner* — Chuong T Ho
(74) *Attorney, Agent, or Firm* — Oblon, McClelland, Maier & Neustadt, L.L.P.

(57) ABSTRACT

Provided is a high-speed communication system with the high reliability and the low latency under New Radio (NR). A base station device includes a plurality of distributed units (DUs, 802) that transmit and receive radio signals, and a central unit (CU, 801) that controls the plurality of DUs (802). The CU (801) duplicates a downlink packet addressed to a communication terminal device (804), and forwards the duplicated downlink packet to each of at least two DUs (802) among the plurality of DUs (802). Each of the at least two of the DUs (802) transmits, to the communication terminal device (804) by the radio signal, the downlink packet obtained from the CU (801). Upon redundant receipt of the downlink packets, the communication terminal device (804) removes a redundant downlink packet in accordance with a predefined downlink packet removal criterion.

19 Claims, 57 Drawing Sheets

Related U.S. Application Data of application No. 16/500,006, filed as application No. PCT/JP2018/016287 on Apr. 20, 2018, now Pat. No. 11,228,940.

(51) Int. Cl.

| | | |
|---|---|---|
| *H04L 1/1812* | (2023.01) | |
| *H04L 5/00* | (2006.01) | |
| *H04W 80/02* | (2009.01) | |
| *H04W 80/08* | (2009.01) | |
| *H04W 84/20* | (2009.01) | |

(58) Field of Classification Search
USPC .................................................. 370/329, 330
See application file for complete search history.

(56) References Cited

U.S. PATENT DOCUMENTS

| | | | |
|---|---|---|---|
| 2013/0195042 | A1 | 8/2013 | Taori et al. |
| 2014/0064201 | A1 | 3/2014 | Zhu et al. |
| 2016/0164793 | A1 | 6/2016 | Basu Mallick et al. |
| 2017/0156142 | A1 | 6/2017 | Sato et al. |
| 2018/0098250 | A1 | 4/2018 | Vrzic et al. |
| 2018/0249375 | A1* | 8/2018 | Goldhamer ........... H04W 36/22 |
| 2018/0270718 | A1 | 9/2018 | Wang et al. |
| 2018/0279182 | A1* | 9/2018 | Sang ................. H04W 74/0833 |
| 2019/0059039 | A1* | 2/2019 | Centonza .............. H04W 76/25 |
| 2019/0075577 | A1* | 3/2019 | Ode ...................... H04W 16/26 |
| 2019/0098682 | A1* | 3/2019 | Park .................. H04W 28/0257 |
| 2019/0215055 | A1* | 7/2019 | Majmundar .......... H04W 40/04 |
| 2019/0261457 | A1* | 8/2019 | Jiang ..................... H04W 76/27 |
| 2019/0327133 | A1* | 10/2019 | Gao ...................... H04L 41/082 |
| 2020/0045583 | A1* | 2/2020 | Kim .................. H04W 28/0815 |

FOREIGN PATENT DOCUMENTS

| | | |
|---|---|---|
| WO | 2014-171266 A | 9/2014 |
| WO | 2015-508626 A | 3/2015 |
| WO | WO 2016/002166 A1 | 1/2016 |
| WO | WO 2016/095584 A1 | 6/2016 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP, TS 36.300 V14.0.0, Sep. 2016.

"LS on HNB/HeNB Open Access Mode," 3GPP, SA WG1, SI-083461, Oct. 2008.

"3rd Generation Partnership Project; Technical Specification Group Radio Access Network; Evolved Universal Terrestrial Radio Access (E-UTRA); Further advancements for E-UTRA physical layer aspects (Release 9)," 3GPP, TR 36.814 V9.0.0, Mar. 2010.

"3rd Generation Partnership Project; Technical Specification Group Radio Access Network; Feasibility study for Further Advancements for E-UTRA (LTE-Advanced) (Release 13)," 3GPP, TR 36.912 V13.0.0, Dec. 2015.

"Scenarios, requirements and KPIs for 5G mobile and wireless system", ICT-317669-METIS/D1.1, Apr. 2013.

"3rd Generation Partnership Project; Technical Specification Group Services and System Aspects; Study on Architecture for Next Generation System (Release 14)," 3GPP, TR 23.799 V1.1.0, Oct. 2016.

"3rd Generation Partnership Project; Technical Specification Group Radio Access Network; Study on new radio access technology: Radio access architecture and interfaces (Release 14)," 3GPP, TR 38.801 V14.0.0, Mar. 2017.

"3rd Generation Partnership Project; Technical Specification Group Radio Access Network; Study on New Radio (NR) Access Technology Physical Layer Aspects (Release 14)," 3GPP, TR 38.802 V1.0.0, Nov. 2016.

"3rd Generation Partnership Project; Technical Specification Group Radio Access Network; Study on New Radio Access Technology; Radio Interface Protocol Aspects (Release 14)," 3GPP, TR 38.804 V1.0.0, Mar. 2017.

Extended European Search Report dated Apr. 8, 2021 in European Patent Application No. 18791060.9, citing documents 29-32 therein.

CATT, "Consideration on RAN function split between CU and DU," 3GPP TSG RAN WG3 Meeting #93, R3-161695, XP051141051, Aug. 2016.

Samsung, "Packet Duplication for URLLC," 3GPP TSG-RAN WG2 Meeting #96, R2-168845, XP051178410, Nov. 2016.

CATT, et al., "Clarification on function split option 3-1," 3GPP TSG RAN WG3 Meeting #94, R3-162862, XP051178961, Nov. 2016.

CATT, "Performance analysis of packet duplication," 3GPP TSG-RAN WG2 NR Ad Hoc, R2-1700193, XP051210777, Jan. 2017.

"3rd Generation Partnership Project; Technical Specification Group Radio Access Network; Study on New Radio Access Technology (Release 14)," 3GPP, TR 38.912 V0.0.2, Sep. 2016.

"Report of 3GPP TSG RAN WG2 AdHoc on NR," ETSI MCC, 3GPP, R2-1700672, Feb. 2017.

"Evaluation on packet duplication in multi-connectivity," Huawei, HiSilicon, 3GPP, R2-1700172, Jan. 2017.

"Intra-NR Dual-Connectivity Options," CATT, 3GPP, R2-1700982, Feb. 2017.

"Forward compatible robust features in NR," Samsung, 3GPP, R2-1701472, Feb. 2017.

"3rd Generation Partnership Project; Technical Specification Group Radio Access Network; Evolved Universal Terrestrial Radio Access Network (E-UTRAN); X2 application protocol (X2AP) (Release 14)," 3GPP, TS 36.423 V14.2.0, Mar. 2017.

"3rd Generation Partnership Project; Technical Specification Group Radio Access Network; Evolved Universal Terrestrial Radio Access (E-UTRA); Radio Resource Control (RRC); Protocol specification (Release 14)," 3GPP, TS 36.331 V14.2.0, Mar. 2017.

"Common Public Radio Interface (CPRI); Interface Specification," CPRI Specification V7.0, Oct. 2015.

"PDCP ARQ," LG Electronics Inc., 3GPP, R2-1701461, Feb. 2017.

"RLC mode operation for URLLC," Huawei, HiSilicon, 3GPP, R2-170177, Jan. 2017.

"3rd Generation Partnership Project; Technical Specification Group Radio Access Network; Evolved Universal Terrestrial Radio Access (E-UTRA); Packet Data Convergence Protocol (PDCP) specification (Release 14)," 3GPP, TS 36.323 V14.2.0, Mar. 2017.

"3rd Generation Partnership Project; Technical Specification Group Radio Access Network; Evolved Universal Terrestrial Radio Access (E-UTRA); Radio Link Control (RLC) protocol specification (Release 14)," 3GPP, TS 36.322 V14.0.0, Mar. 2017.

"Summary of RAN3 status on CU-DU split Option 2 and Option 3, and questions/issues for RAN2," 3GPP, R3-170266, Jan. 2017.

"3rd Generation Partnership Project; Technical Specification Group Radio Access Network; Evolved Universal Terrestrial Radio Access Network (E-UTRAN); X2 interface user plane protocol (Release 13)," 3GPP, TS 36.425 V13.1.1, Sep. 2016.

Indian Office Action dated Feb. 4, 2022 in Indian Patent Application No. 201947041457.

Office Action dated May 17, 2022, in corresponding Japanese Patent Application No. 2019-514461 (with English Translation).

Combined Chinese Office Action and Search Report dated Jun. 13, 2022, in corresponding Chinese Patent Application No. 201880026539.0 (with English Translation).

Chinese Office Action dated Dec. 26, 2022 in Chinese Patent Application No. 201880026539.0 (with English Translation), 6 pages.

Indian Office Action dated Jan. 17, 2023 in Indian Patent Application No. 202248062283, 7 pages.

European Office Action dated Jan. 16, 2023 in European Patent Application No. 18 791 060.9, 5 pages.

Office Action dated Nov. 22, 2022, in corresponding Japanese Patent Application No. 2019-514461 (with English Translation), 6 pages.

Office Action dated Jan. 12, 2023, in corresponding Indian Patent Application No. 202248062278 (with English Translation), 7 pages.

(56) References Cited

OTHER PUBLICATIONS

Office Action dated Mar. 30, 2023, in corresponding Chinese Patent Application No. 201880026539.0 (with English Translation), 7 pages.
Partial European Search Report dated Aug. 11, 2023 in European Application No. 23175159.5, 8 pgs.
Partial European Search Report dated Aug. 11, 2023 in European Application No. 23175158.7, 19 pgs.
CATT, 3GPP TSG-RAN WG2 Meeting #97 "NR UP Stack Options of Intra-gNB Multi-Connectivity", R2-1700973, Feb. 12, 2017, 5 pgs.
European Patent Office, Extended European Search Report, Application No. EP 23175158.7, dated Nov. 14, 2023, in 18 pages.
European Patent Office, Extended European Search Report, Application No. EP 23175159.5, dated Nov. 14, 2023, in 17 pages.

* cited by examiner

F I G . 1
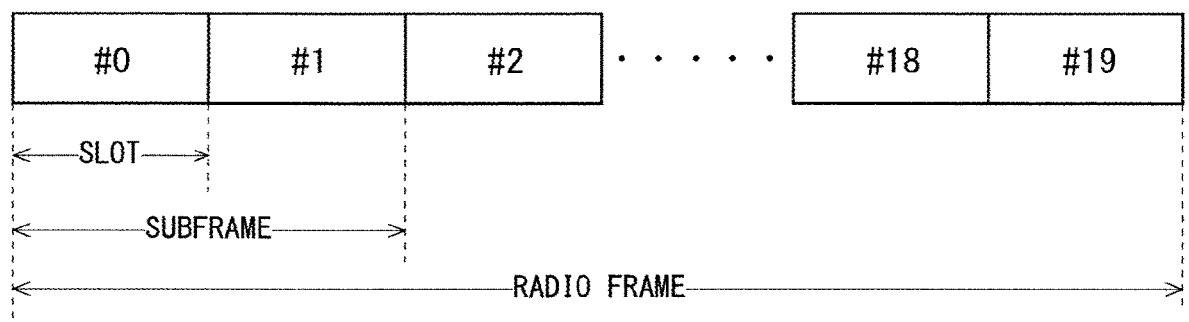

F I G. 5
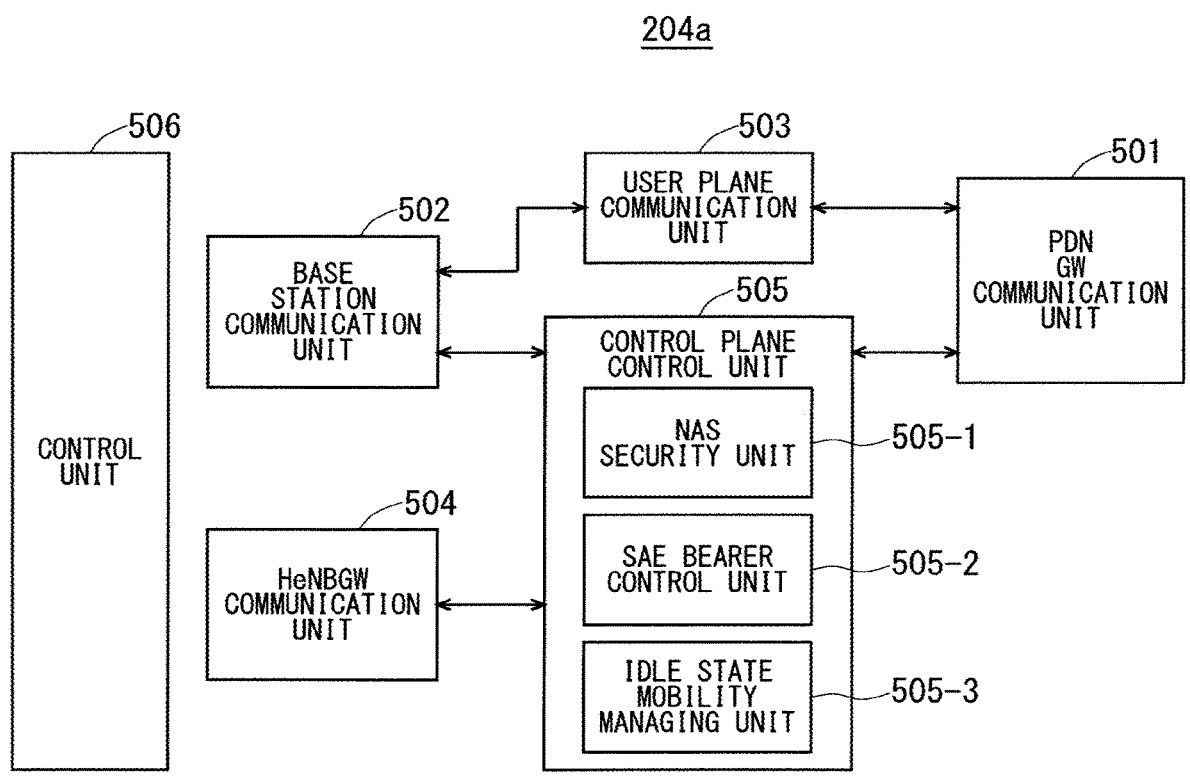

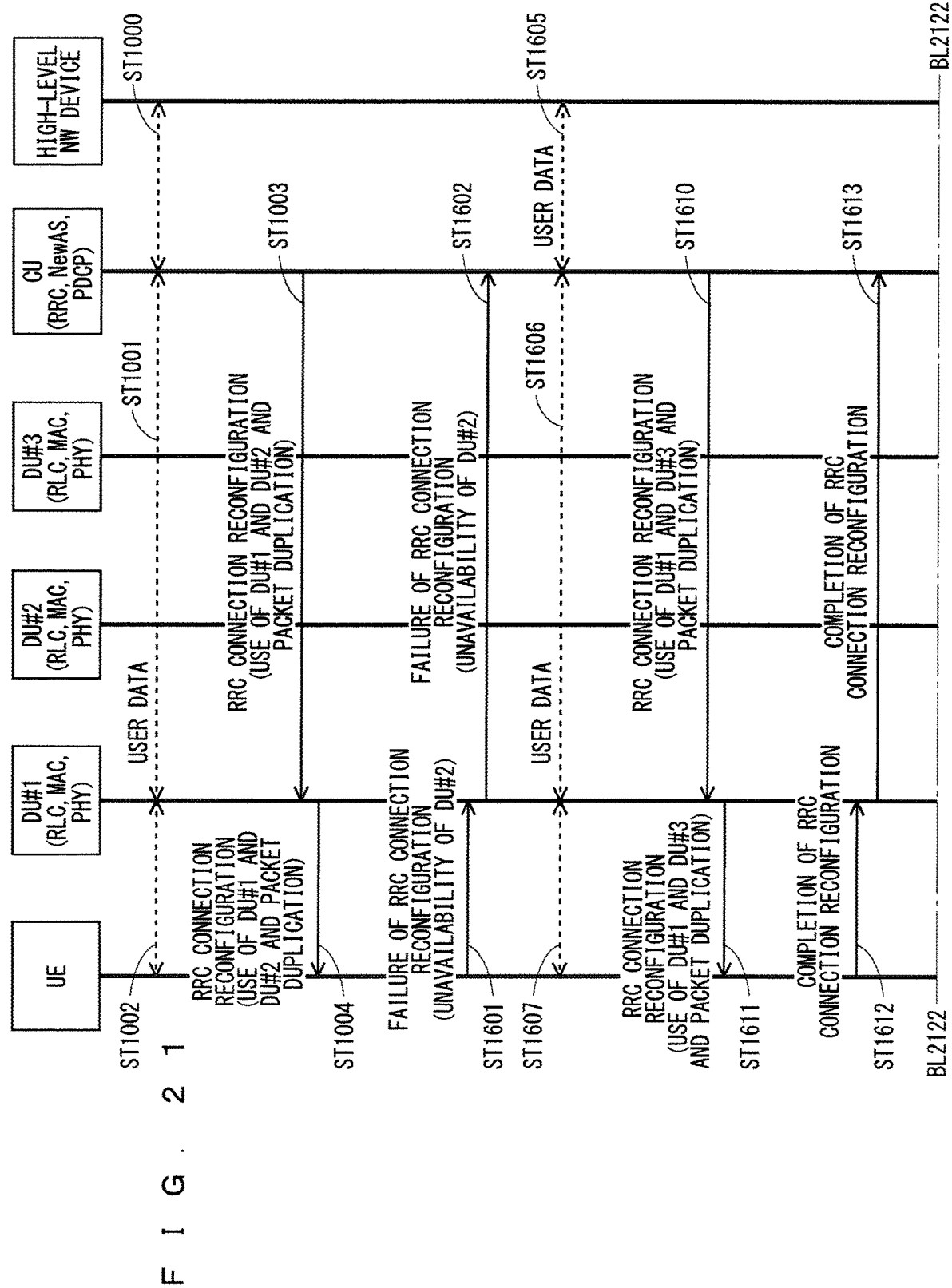
F I G. 21

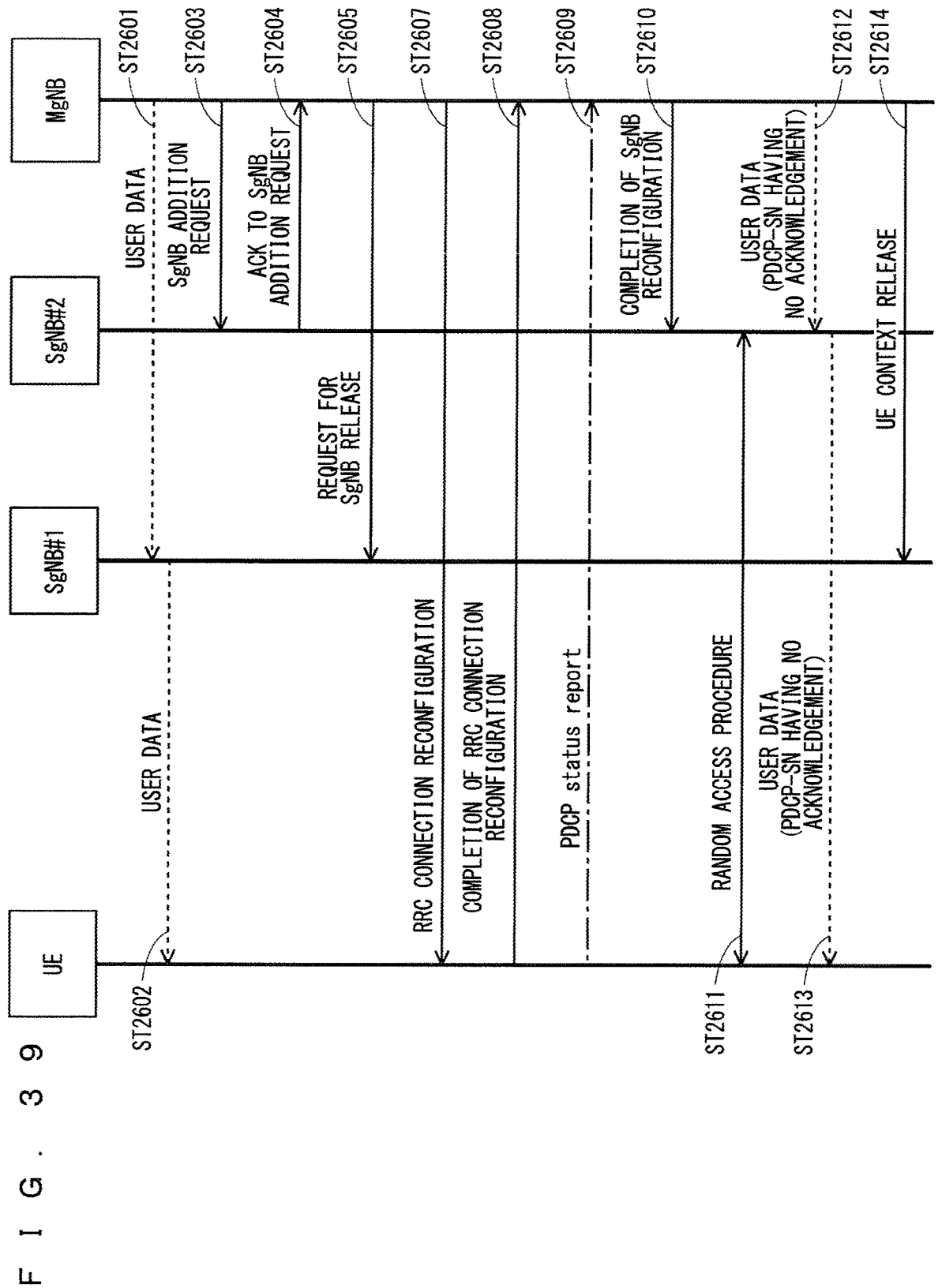
F I G. 39

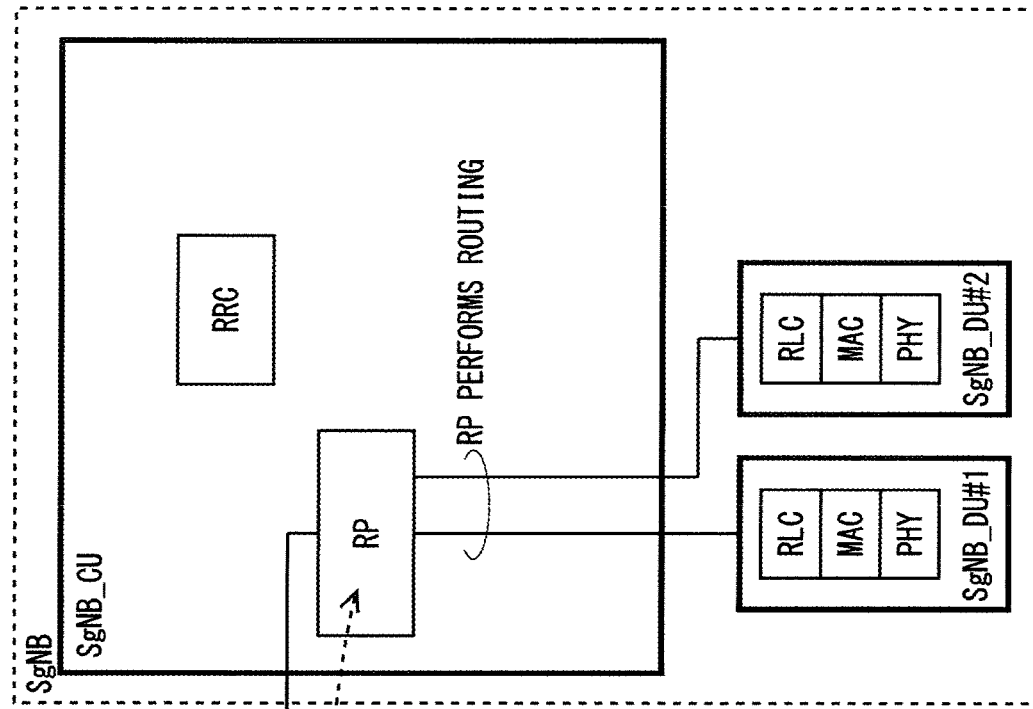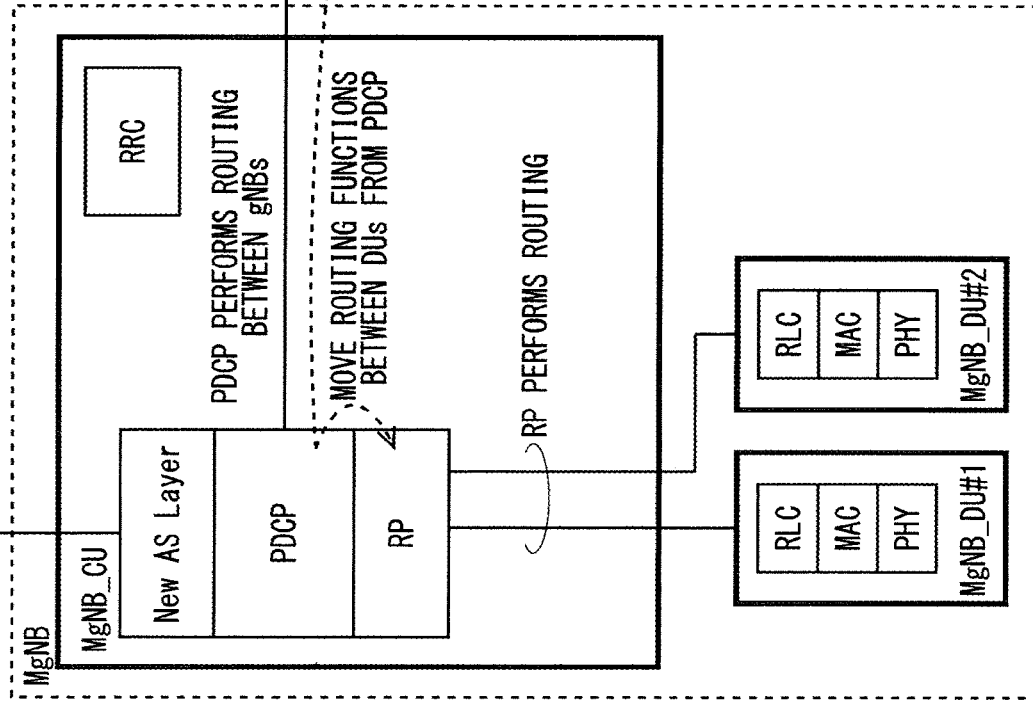
FIG. 44

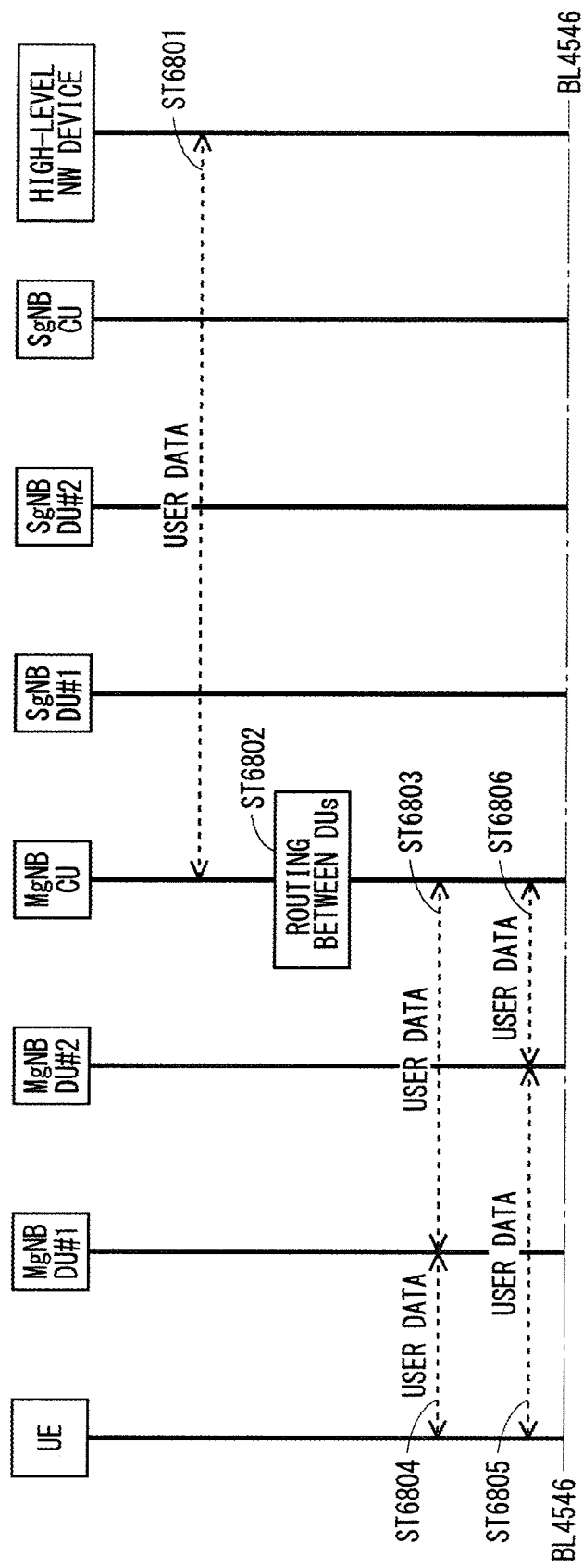
F I G. 45

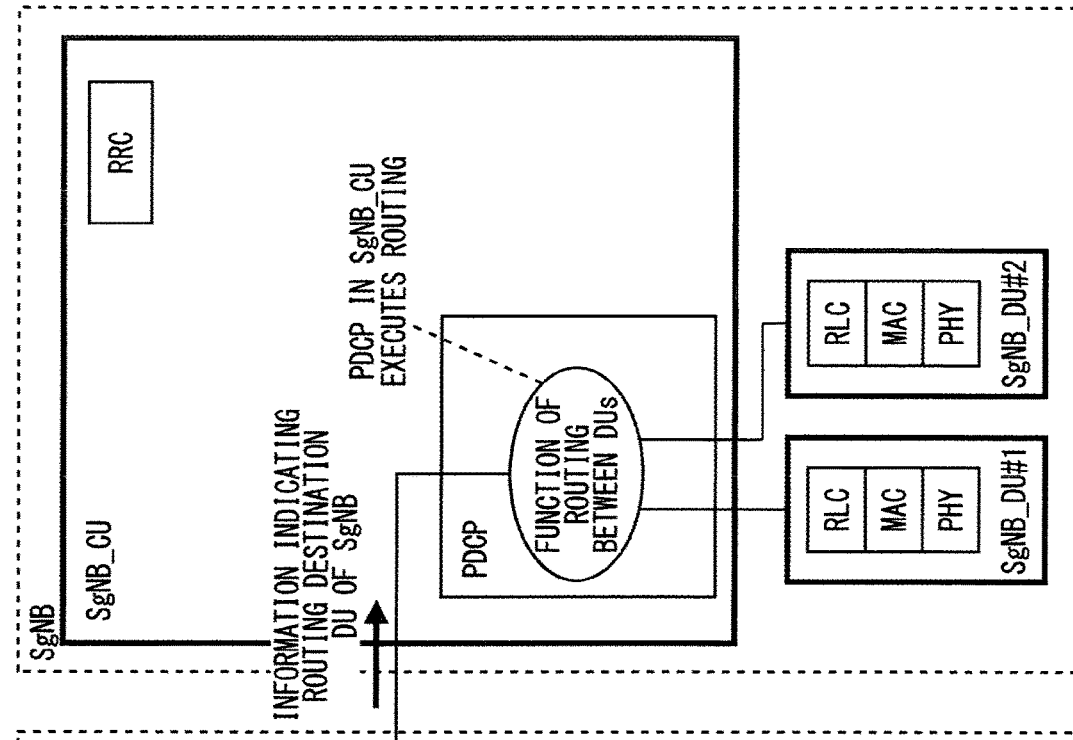
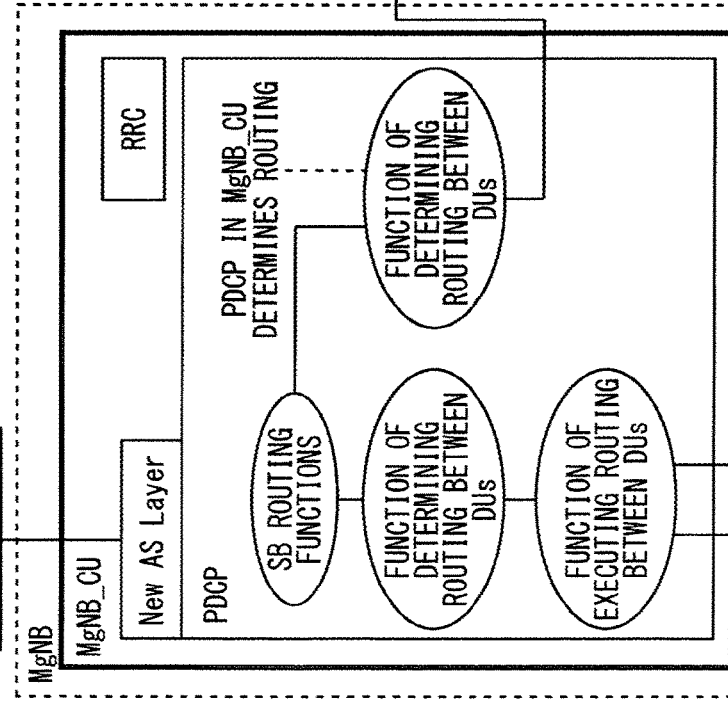
FIG. 48

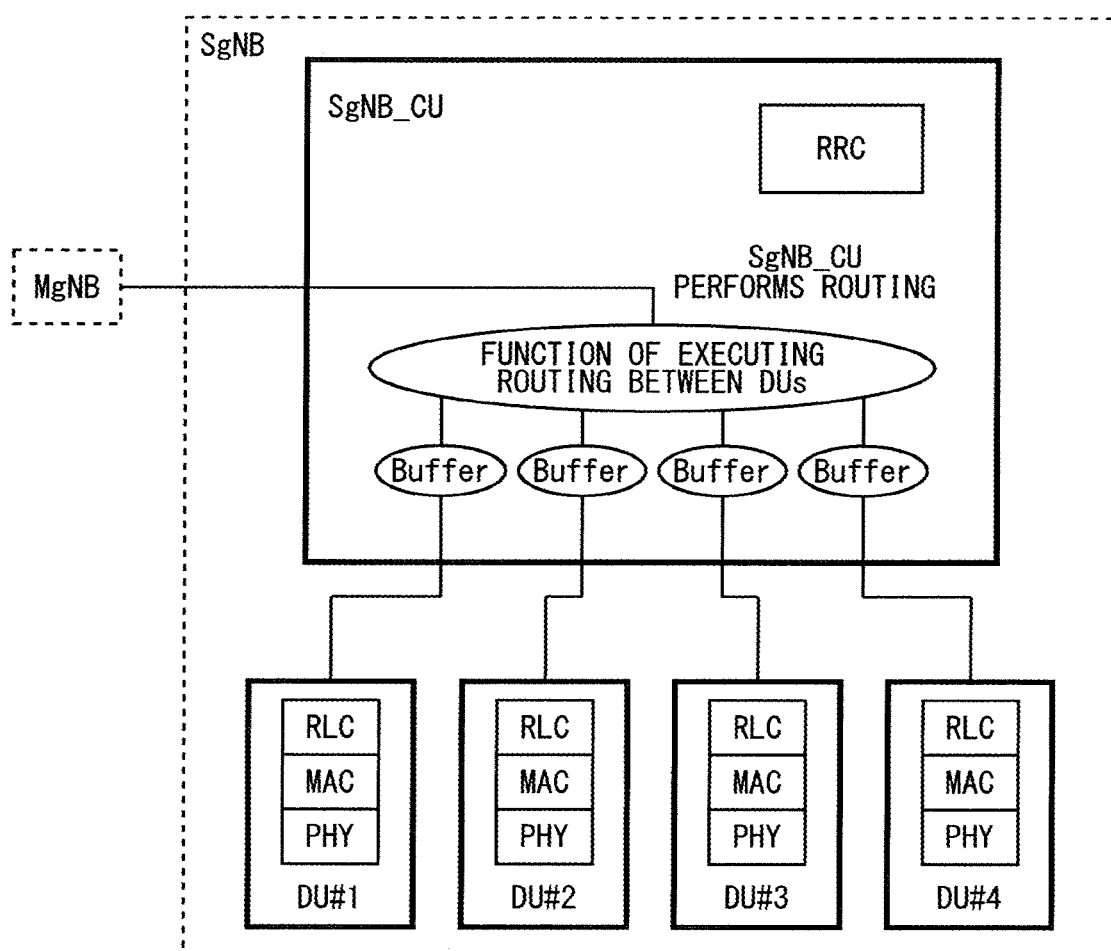
F I G . 5 0

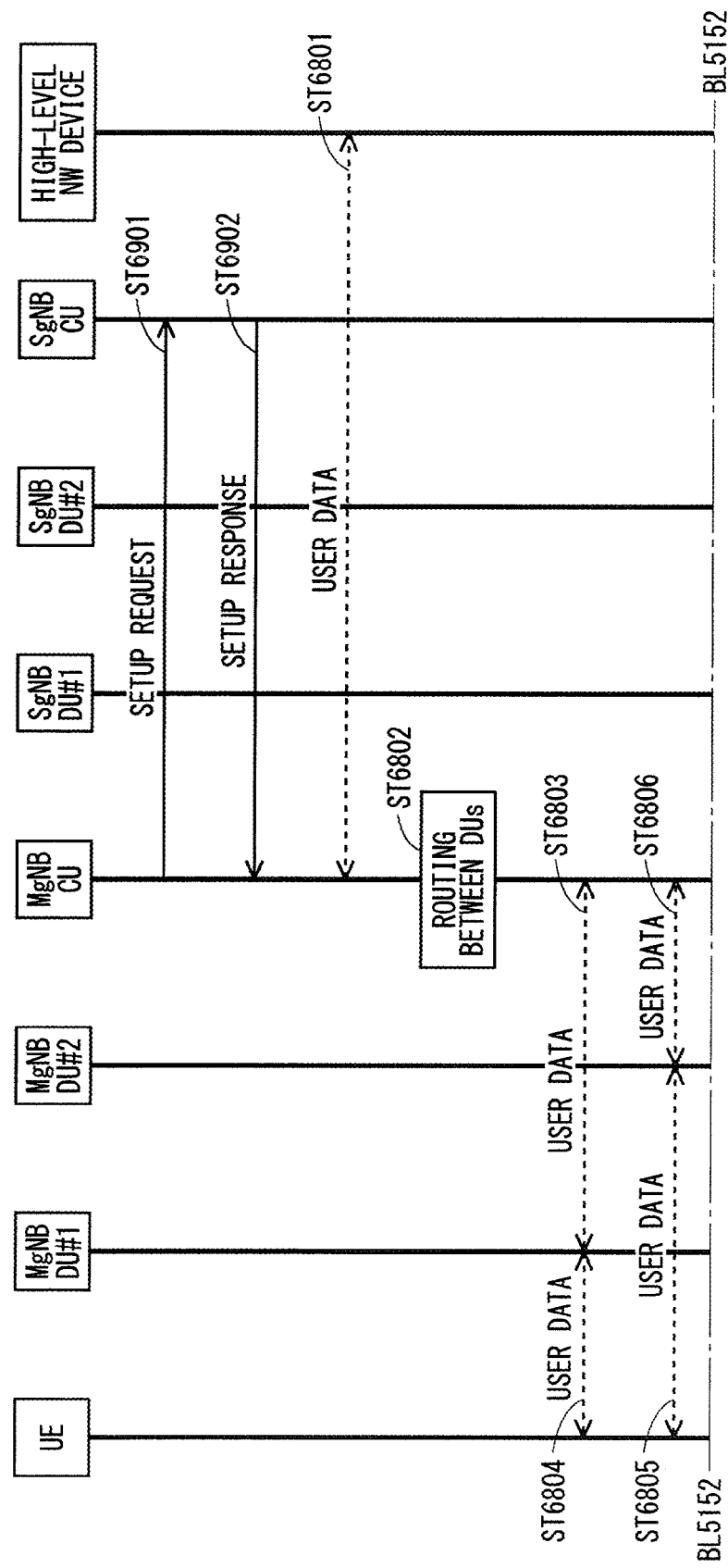

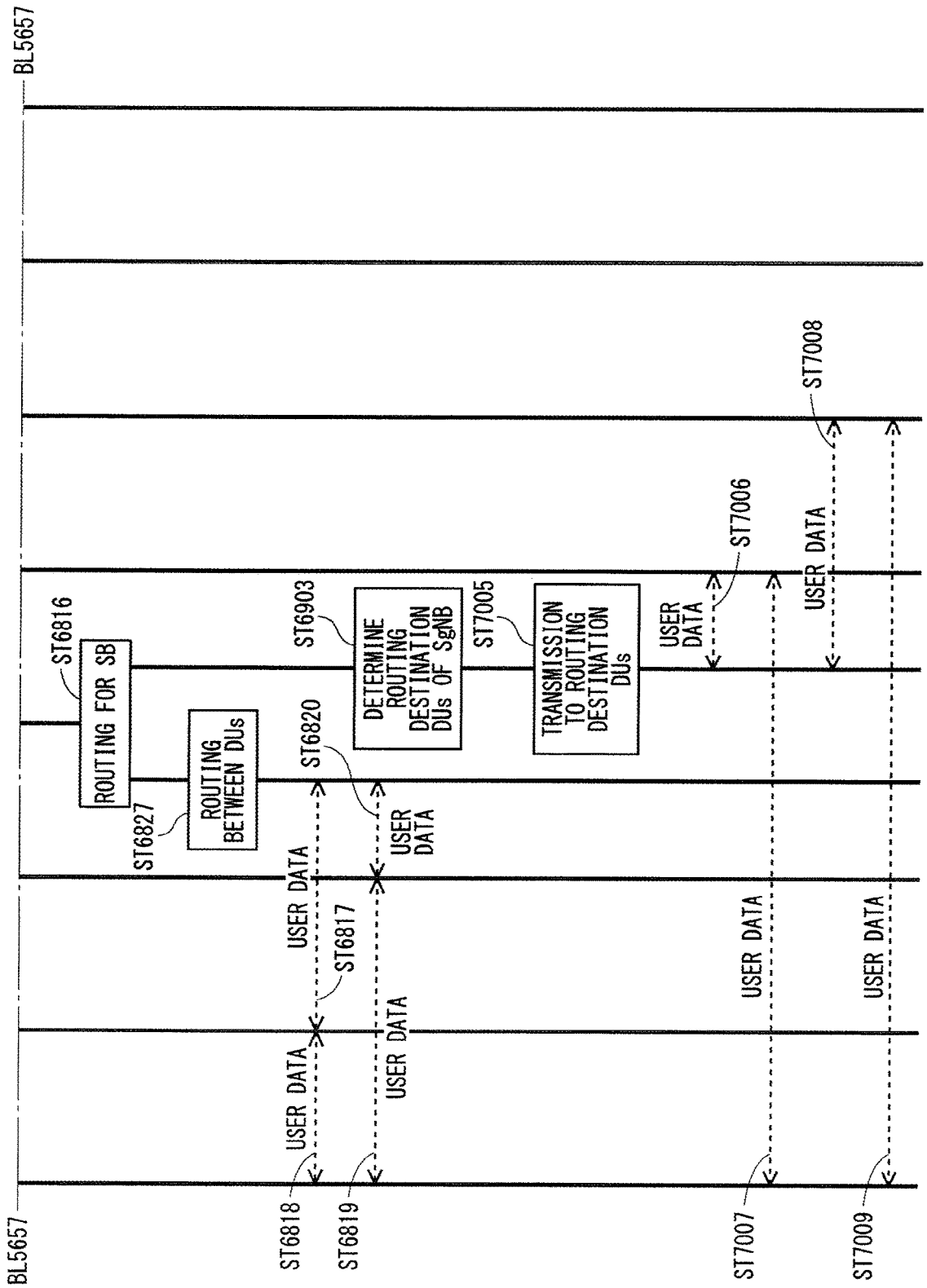

COMMUNICATION SYSTEM

CROSS-REFERENCE TO RELATED APPLICATIONS

This application is a continuation application of U.S. application Ser. No. 17/544,089, filed Dec. 7, 2021, which is a continuation application of U.S. application Ser. No. 16/500,006, filed Oct. 1, 2019, now U.S. Pat. No. 11,228,940, issued Jan. 18, 2022, which is a National Stage Application of International Application No. PCT/JP2018/016287, filed Apr. 20, 2018, which is based upon and claims the benefit of priority from Japanese Patent Application No. 2017-088666, filed on Apr. 27, 2017, the entire contents of each of which are incorporated herein by reference.

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARM) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

In 3GPP, base stations referred to as Home-NodeB (Home-NB; HNB) and Home-eNodeB (Home-eNB; HeNB) are studied. HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, specifications of long term evolution advanced (LTE-A) are pursed as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth (1/10) as low as, and simultaneously connected communication terminals 100 times as many as those of the LTE system, to further reduce the power consumption and device cost.

To satisfy such requirements, the study of 5G standards is pursued as Release 14 in 3GPP (see Non-Patent Documents 6 to 10). The techniques on 5G radio sections are referred to as "New Radio Access Technology" ("New Radio" is abbreviated as NR), and the several new techniques are being studied (see Non-Patent Documents 11 to 14). Examples of such studies include packet duplication using the DC or multi-connectivity (abbreviated as MC), and split of a gNB into a central unit (CU) and a distributed unit (DU).

Prior-Art Documents

Non-Patent Documents

Non-Patent Document 1: 3GPP TS36.300 V14.0.0
Non-Patent Document 2: 3GPP S1-083461
Non-Patent Document 3: 3GPP TR 36.814 V9.0.0
Non-Patent Document 4: 3GPP TR 36.912 V13.0.0
Non-Patent Document 5: "Scenarios, requirements and KPIs for 5G mobile and wireless system", ICT-317669-METIS/D1.1
Non-Patent Document 6: 3GPP TR 23.799 V1.1.0
Non-Patent Document 7: 3GPP TR 38.801 V14.0.0
Non-Patent Document 8: 3GPP TR 38.802 V1.0.0
Non-Patent Document 9: 3GPP TR 38.804 V1.0.0
Non-Patent Document 10: 3GPP TR 38.912 V0.0.2
Non-Patent Document 11: 3GPP R2-1700672
Non-Patent Document 12: 3GPP R2-1700172
Non-Patent Document 13: 3GPP R2-1700982
Non-Patent Document 14: 3GPP R2-1701472
Non-Patent Document 15: 3GPP TS 36.423 v14.2.0
Non-Patent Document 16: 3GPP TS 36.311 v14.2.1
Non-Patent Document 17: CPRI Specification V7.0
Non-Patent Document 18: 3GPP R2-1701461
Non-Patent Document 19: 3GPP R2-1700177
Non-Patent Document 20: 3GPP TS 36.323 v14.2.0
Non-Patent Document 21: 3GPP TS 36.322 v14.0.0
Non-Patent Document 22: 3GPP R3-170266
Non-Patent Document 23: 3GPP TS36.425 V13.1.1

SUMMARY

Problems to be Solved by the Invention

Under NR, splitting a gNB into two units, that is, a central unit (CU) and a distributed unit (DU) and enabling the CU to be connected to a plurality of DUs is proposed to increase the number of accommodated UEs per gNB. Moreover, application of the packet duplication with which each gNB transmits and receives the same packet using the configuration of the DC or the MC is also proposed to provide communication that satisfies the high reliability and the low latency under NR.

Duplicating a packet using a plurality of DUs is proposed under NR. However, the configuration of the DC or the MC is not applicable between or among DUs as it is, so that the communication through the packet duplication using the plurality of DUs cannot be provided. Thus, the communication that satisfies the high reliability and the low latency cannot be provided.

Moreover, with application of a routing method using a plurality of DUs, particularly, with the concurrent use of the DC and the CU-DU split under NR, the MgNB does not know which DU of the SgNB data should be forwarded to. Since the MgNB cannot transmit data to the DUs being served by the SgNB, a UE and a base station have a problem of failing to establish a communication using the DUs of the SgNB. Consequently, the DC and the CU-DU split are not concurrently available in the 5G, and the use efficiency of radio resources substantially decreases.

In view of the problems, one of the objects of the present invention is to provide a high-speed communication system with the high reliability and the low latency under NR.

Means to Solve the Problems

The present invention provides, for example, a communication system including a communication terminal device, and a base station device configured to perform radio communication with the communication terminal device, wherein the base station device includes: a plurality of distributed units (DUs) that transmit and receive radio signals; and a central unit (CU) that controls the plurality of DUs, the CU duplicates a downlink packet addressed to the communication terminal device, and forwards the duplicated downlink packet to each of at least two DUs among the plurality of DUs, each of the at least two DUs transmits, to the communication terminal device by the radio signal, the downlink packet obtained from the CU, and upon redundant receipt of the downlink packets, the communication terminal device removes a redundant downlink packet in accordance with a predefined downlink packet removal criterion.

Effects of the Invention

The present invention can provide a high-speed communication system with the high reliability and the low latency under NR.

The objects, features, aspects and advantages of the present invention become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 5 is a block diagram showing the configuration of an MME according to the present invention.

FIG. 21 is a sequence diagram illustrating operations upon failure of the RRC connection reconfiguration according to the first embodiment.

FIG. 39 is a sequence diagram illustrating the mobility between secondary base stations using a PDCP status report from the UE according to the fourth embodiment.

FIG. 44 illustrates an example architecture when a protocol stack having the routing functions between DUs are provided outside the PDCP in the CU of the SgNB according to the sixth embodiment.

FIG. 45 illustrates an example sequence on the DC with the SB using the SgNB with the CU-DU split configuration according to the sixth embodiment.

FIG. 48 illustrates an example architecture when the MgNB is provided with a function of determining a routing destination DU of the SgNB and the PDCP in the CU of the SgNB is provided with the routing functions between DUs according to the first modification of the sixth embodiment.

FIG. 50 illustrates an example architecture when the buffer for routing is provided in the CU of the SgNB for each DU according to the first modification of the sixth embodiment.

FIG. 51 illustrates an example sequence on the DC with the SB using the SgNB with the CU-DU split configuration according to the first modification of the sixth embodiment.

FIG. 57 illustrates the example sequence on the DC with the SB using the SgNB with the CU-DU split configuration according to the second modification of the sixth embodiment.

DESCRIPTION OF EMBODIMENTS

First Embodiment

Figure 2:
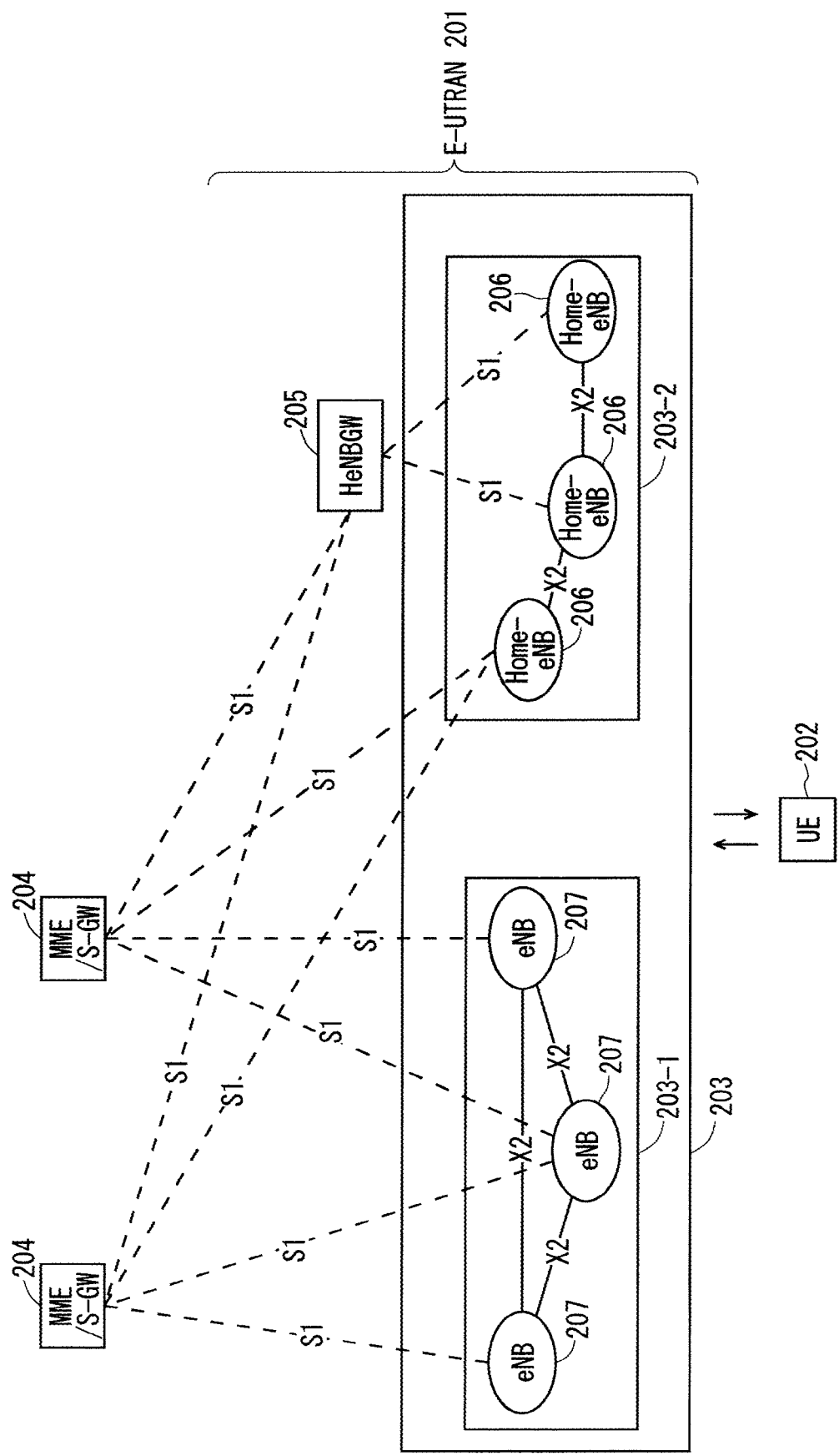
FIG. 2 is a block diagram showing the overall configuration of an LTE communication system 200 under discussion of 3GPP.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, the configuration below is studied in 3GPP. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In a case where one base station device 203 configures a plurality of cells, every cell is configured so as to communicate with the user equipment 202.

Figure 3:
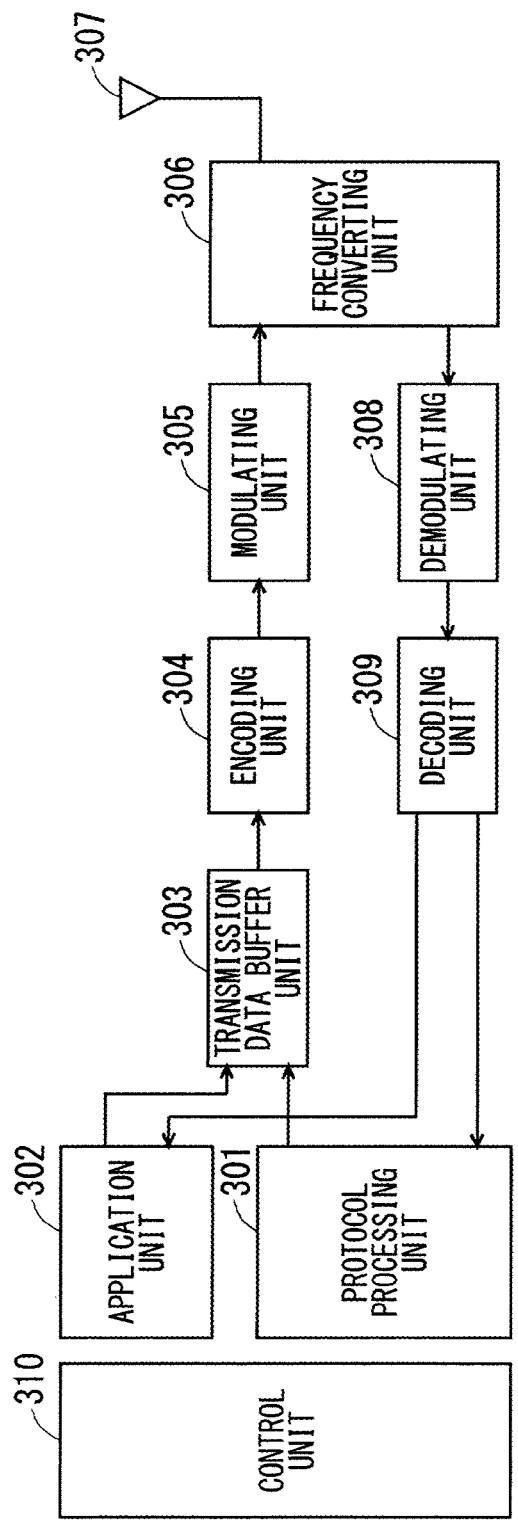
FIG. 3 is a block diagram showing the configuration of a user equipment 202 shown in FIG. 2, which is a communication terminal according to the present invention.

FIG. 3 is a block diagram showing the configuration of the user equipment 202 of FIG. 2 that is a communication terminal according to the present invention. The transmission process of the user equipment 202 shown in FIG. 3 is described. First, a transmission data buffer unit 303 stores the control data from a protocol processing unit 301 and the user data from an application unit 302. The data stored in the transmission data buffer unit 303 is passed to an encoding unit 304, and is subject to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309, and is subject to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

Figure 4:
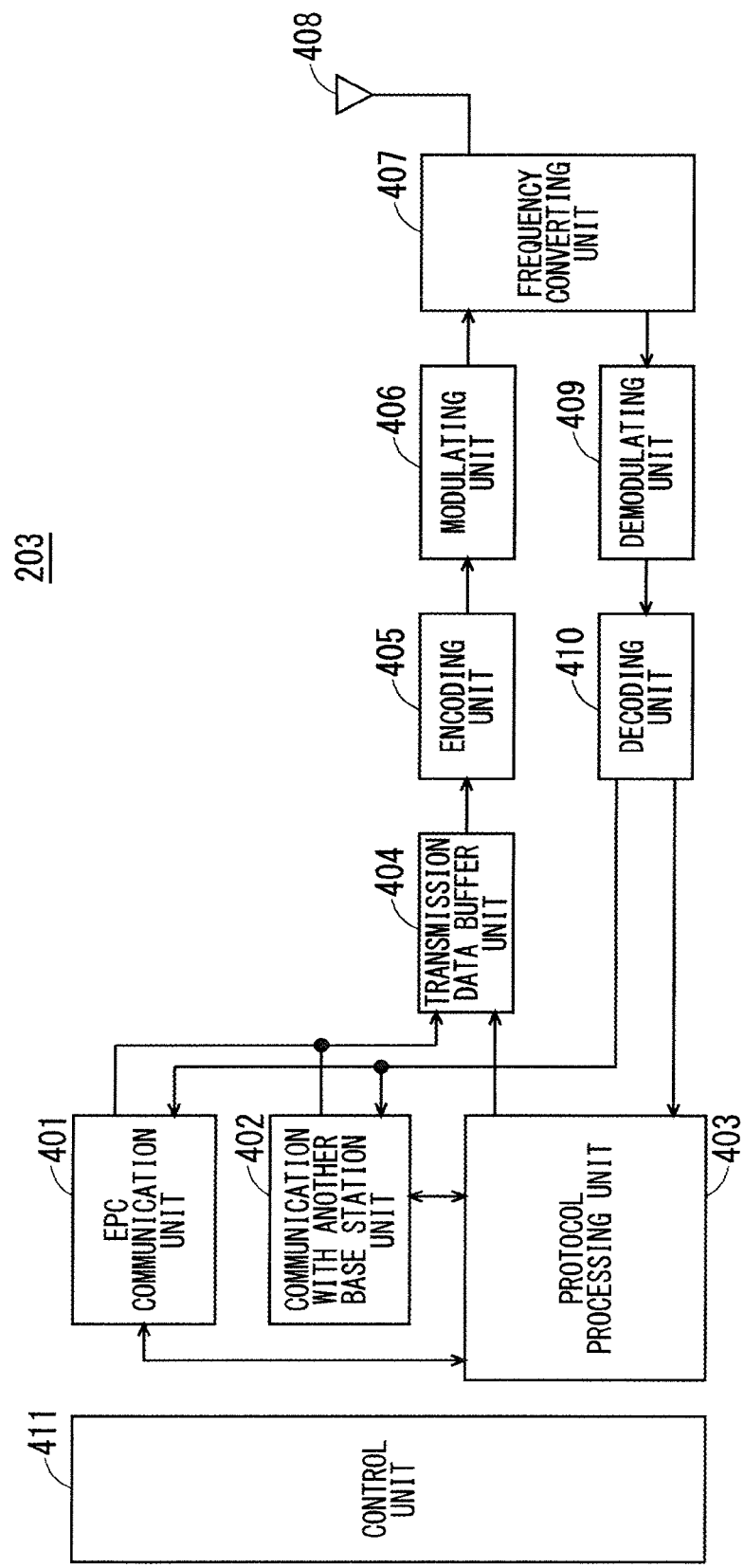
FIG. 4 is a block diagram showing the configuration of a base station 203 shown in FIG. 2, which is a base station according to the present invention.

FIG. 4 is a block diagram showing the configuration of the base station 203 of FIG. 2 that is a base station according to the present invention. The transmission process of the base station 203 shown in FIG. 4 is described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

A HeNBGW communication unit 504 is provided in a case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

Figure 6:
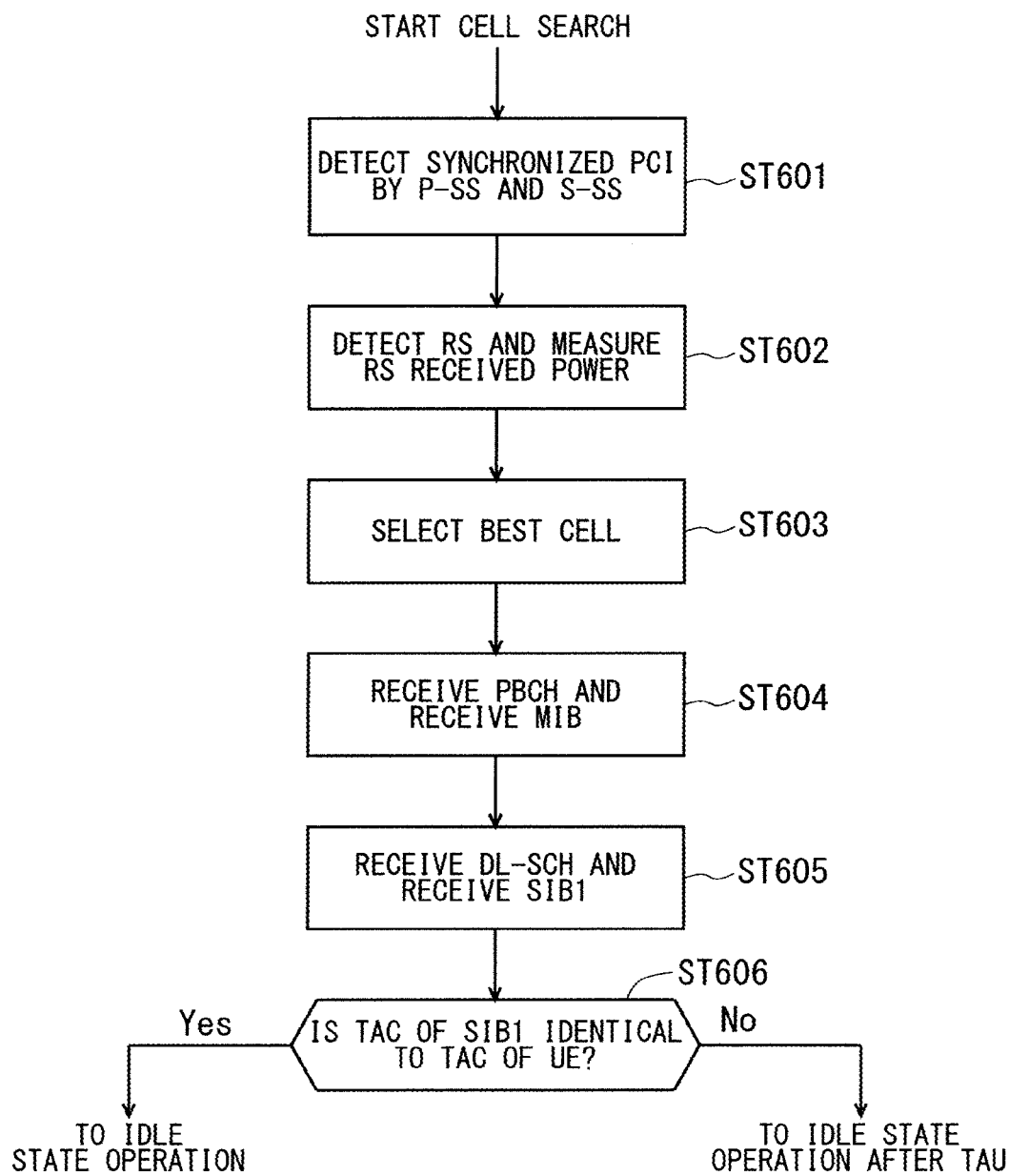
FIG. 6 is a flowchart showing an outline from a cell search to an idle state operation performed by a communication terminal (UE) in the LTE communication system.

An example of a cell search method in a mobile communication system is described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
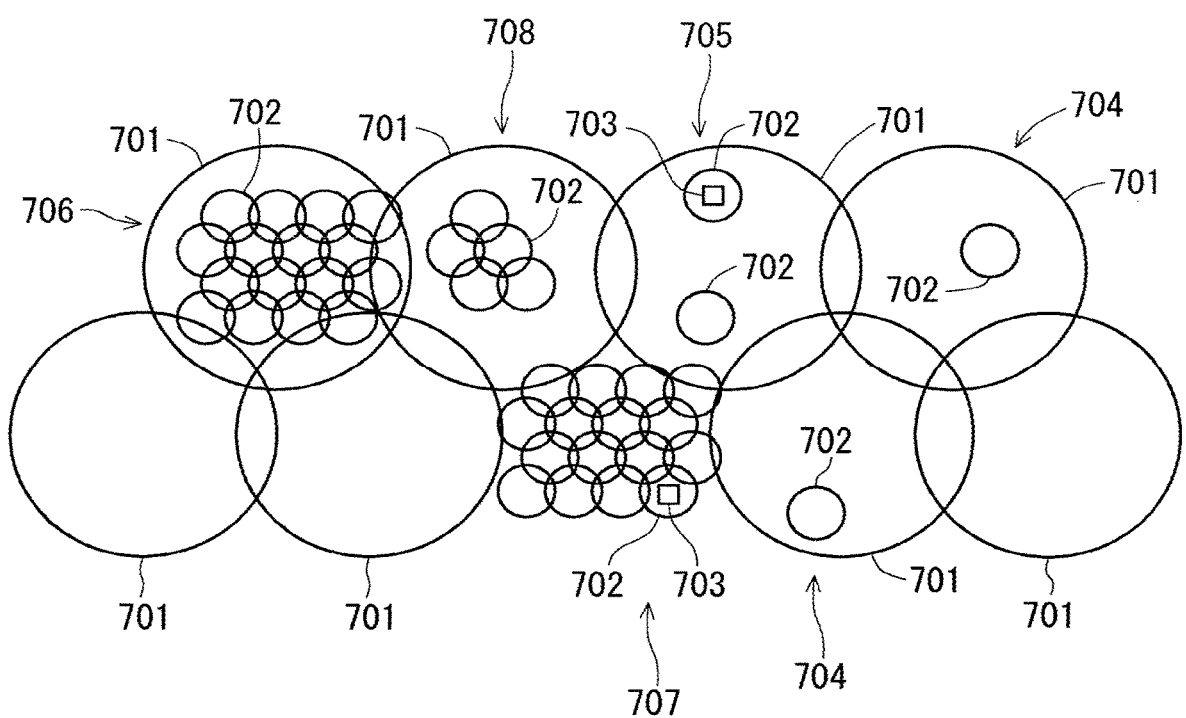
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNB s in a complicated manner.

As indicated by a reference "707", the coverage 701 of the macro cell configured by a macro eNB need not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

One of the services in NR is Ultra Reliability, Low Latency Communication (URLLC) requiring the communication with the low latency and the high reliability. In the 3GPP standardization meeting, no application of Acknowledged Mode (AM) in the RLC layer for the URLLC has been agreed for satisfying both the low latency and the high reliability. Another agreement reached in the 3GPP standardization meeting is to support the packet duplication in the PDCP layer for ensuring the reliability using Unacknowledged Mode (UM) in the RLC layer (see Non-Patent Document 11 (3GPP R2-1700672)). A proposal is made on applying the packet duplication to the configurations of the DC and the MC in NR (see Non-Patent Document 12 (3GPP R2-1700172)).

Moreover, splitting a gNB into two units is proposed in 3GPP (see Non-Patent Document 7). The two units are referred to as the central unit (CU) and the distributed unit (DU). A plurality of DUs are connected to the CU. Several options on sharing functions between the CU and the DU in the CU-DU split are proposed. For example, Option 2 is proposed in which the CU has the PDCP and the DU has the RLC, the MAC, and the PHY. Moreover, Option 3 is proposed in which the CU has the PDCP and the H-RLC and the DU has the L-RLC, the MAC, and the PHY. Option 3 includes Option 3-1. Option 3-1 is proposed in which the L-RLC in Option 3 has a function of RLC-PDU split and the H-RLC in Option 3 has an acknowledgement function and the other functions of the RLC.

A proposal is made on applying the DC or the MC to communication using a plurality of DUs in NR (see Non-Patent Document 13 (3GPP R2-1700982) and Non-Patent Document 14 (3GPP R2-1701472)).

Since the DU has no distinction between a master base station and a secondary base station in the DC and the MC, the configuration and the sequence for the DC or the MC are not applicable to the communication between the DUs as they are. Thus, a problem of failing to establish communication using a plurality of DUs, and a problem of a communication failure between a base station and a UE occur.

Since a mobility sequence between the DUs is not disclosed, the UE cannot switch the corresponding DU to another even when the UE moves. Thus, upon movement of the UE, a problem of failing to provide a stable communication occurs.

Moreover, since the configuration and the sequence for the DC or the MC are not applicable to the communication between DUs as they are, the CU cannot provide communication through the packet duplication using a plurality of DUs. Thus, a problem of failing to provide the communication that satisfies the high reliability and the low latency occurs.

The first embodiment discloses a method for solving such problems.

The CU duplicates a packet forwarded from a high-level network device. The CU forwards the duplicated packet to each DU. Each of the DUs transmits the packet to the UE. The UE detects redundant packets. The UE removes the redundant packets. The UE may, for example, validate only one of the identical redundant packets received and remove the rest of the packets in the detection and the removal of redundant packets.

The CU may duplicate the packet in the PDCP layer. The UE may detect and remove the redundant packets in the PDCP layer.

The operations of the CU, the DUs, and the UE may be performed in the downlink communication.

The UE duplicates a packet, and transmits the duplicated packet to each of the DUs through a lower-layer entity that corresponds to the DU. Each of the DUs forwards the received packet to the CU. The CU detects redundant packets received from the DUs. The CU removes the redundant packets. The CU may, for example, validate only one of the identical redundant packets received and remove the rest of the packets in the detection and the removal of redundant packets. The CU forwards the packet that is not removed to the high-level network device.

The operations of the CU, the DUs, and the UE may be performed in the uplink communication.

The CU may forward the duplicated packets to all the DUs being served thereby. Similarly, the UE may forward the duplicated packets to all the DUs being served by the corresponding CU. This can increase the redundancy and the reliability of the communication.

Alternatively, the CU may forward the duplicated packets to a part of the DUs being served thereby. Similarly, the UE may transmit the duplicated packets to a part of the DUs being served by the CU. This can efficiently enhance the reliability of the communication.

A DU that forwards the duplicated packet through the CU (hereinafter may be referred to as a "use DU in the downlink communication") may be different from a DU that transmits the duplicated packet through the UE (hereinafter may be referred to as a "use DU in the uplink communication"). The number of use DUs in the downlink communication may be different from the number of use DUs in the uplink communication. Consequently, a communication path can be flexibly set.

The number of use DUs in the downlink communication may be one, two, or more than or equal to three. The number of use DUs in the uplink communication may be the same as that in the downlink communication. This can efficiently enhance the reliability.

The use DUs in the downlink communication and the use DUs in the uplink communication (hereinafter may be referred to as "use DUs") may be set to each CU. For example in communication with a UE, the CU #1 may apply the DUs #1 and #2 among the DUs #1 to #3 being served thereby, and the CU #2 may apply the DUs #5 and #6 among the DUs #4 to #6 being served thereby. Consequently, the optimal communication system can be built according to the communication paths between each CU and the DUs.

The use DUs may be set to each UE. For example, when a CU has the DUs #1 to #3 being served thereby, the CU may apply the DUs #1 and #2 in the communication with the UE #1. The CU may apply the DUs #2 and #3 in the communication with the UE #2. Consequently, the optimal communication system can be built according to the position of the UE.

The use DUs may be set according to each combination of CUs and UEs. For example in the communication with the UE #1, the CU #1 may apply the DUs #1 and #2 among the DUs #1 to #3 being served thereby, and the CU #2 may apply the DUs #4 and #6 among the DUs #4 to #6 being served thereby. In the communication with the UE #2, the CU #1 may apply the DUs #2 and #3, and the CU #2 may apply the DUs #4 to #6. Consequently, the optimal communication system can be built according to the position relationship and the communication paths between the CUs and the DUs.

The CU may determine the use DUs.

Examples of (1) to (5) below are disclosed as information to be used when the CU makes the determination:
(1) measurement results obtained by the DUs being served thereby, for example, measurement results of uplink signals;
(2) a measurement result obtained by the UE, for example, a measurement result of a downlink signal;
(3) load states of the DUs being served thereby;
(4) a load state of the CU; and
(5) combinations of (1) and (4) above.

Since (1) eliminates the need for the UE to notify the CU of the measurement results, the amount of signaling in the radio section can be reduced.

The DUs may measure the uplink reference signal (uplink RS) in (1). Consequently, the DUs can measure the uplink signal irrespective of the presence or absence of the user data. Alternatively, the DUs may measure an error rate of the uplink data. Consequently, the DUs can reduce the processing time for measuring the uplink signal. The DUs may measure, as the error rate, a bit error rate (BER) before an error correction procedure. Consequently, the DUs can obtain the measurement results that properly reflect radio channel states. The DUs may measure a block error rate (BLER) after the error correction procedure. Consequently, the DUs can shorten the processing time for obtaining the measurement results.

Since (2) enables the use of the same process as that for obtaining the measurement result in the existing LTE communication system, the complexity in designing a communication system can be avoided.

The UE may measure the downlink reference signal (downlink RS) in (2). Consequently, the UE can obtain a measurement result of the downlink signal irrespective of the presence or absence of the user data. Alternatively, the UE may measure an error rate of the downlink data. Consequently, the UE can reduce the processing time for measuring the uplink signal. The UE may measure, as the error rate, a bit error rate (BER) before an error correction process. Consequently, the UE can obtain a measurement result that properly reflects a radio channel state. The UE may measure a block error rate (BLER) after the error correction procedure. Consequently, the UE can shorten the processing time for obtaining the measurement result.

The UE may notify the CU of information of (2). The UE may notify the information through the DUs. The UE may notify the DUs of the information via the L1/L2 signaling. This enables a prompt notification according to change in a channel state. Alternatively, the MAC signaling may be used for the notification. Since the multi-level modulations are applicable to the MAC signaling, the number of symbols can be reduced. Alternatively, the RRC signaling may be used for the notification. The use of the RRC signaling facilitates the process of forwarding the information from the DUs to the CU.

When the UE notifies the information to the CU, the DU on which the UE has been camping may be the use DU. Consequently, it is possible to shorten the time required for the UE to be connected to the DU.

Alternatively, the DU whose connection with the UE has been established may be the use DU. The DU whose connection with the UE has been established may be, for example, a DU that has completed a random access procedure. Alternatively, for example, a DU with which the RRC connection has been established may be used. Consequently, for example, even if the DU on which the UE has been camping is different from the DU with which the connection has been currently established due to the occurrence of mobility, the UE can give the notification to the CU.

Alternatively, when the UE notifies the information to the CU, a plurality of DUs may be the use DUs. The plurality of DUs may be, for example, a combination of the DU on which the UE has been camping and the DU whose connection with the UE has been established, or a plurality of DUs whose connection with the UE has been established. This enhances the reliability of the notification.

Examples of the load states in (3) may include a resource state and a free resource state. The resource state may be indicated by a radio resource. Consequently, the CU can communicate with the UE using the DU that can reserve a wide frequency band in a radio channel. Alternatively, a buffer volume may be used. The buffer volume may be, for example, (a) a buffer volume in the RLC layer, (b) a buffer volume in HARQ, or a sum volume of (a) and (b). Consequently, the CU can select a DU while avoiding congestion of the user data.

Alternatively, another example of the load state in (3) may be the number of connected UEs. Since the CU can, for example, allocate high-volume communication to a DU with less number of connected UEs, DUs can be efficiently allocated.

With application of (3), the CU can select a DU in consideration of communication states with the other UEs.

Examples of the load state of (4) may include a buffer volume. The buffer volume may be, for example, (a) a buffer volume in a new layer higher than the PDCP in a U-Plane under NR, (b) a buffer volume in the PDCP layer, or a sum volume of (a) and (b). The buffer volume may be a value for each corresponding UE or a sum value of the corresponding UEs. This enables flexible control including, for example, application of a plurality of use DUs when a buffer volume is larger or application of a single use DU when the buffer volume is smaller.

The CU may request information of (1) to (3) and (5) from each DU. The DUs may notify the CU of the information of (1) to (3) and (5). The DUs may give the notifications periodically or in response to the requests from the CU. Alternatively, the DUs may give the notifications when satisfying a predefined condition. The condition may be determined in a standard or notified from the CU to the DUs.

When a use DU for communication between the CU and the UE (hereinafter may be referred to as a "use DU") is determined using (1) to (5) above, a threshold may be set. The CU may determine the use DU using the threshold. For example, when the received intensity of the uplink reference signal received from the UE is higher than or equal to a certain value, the CU may determine that the DU is available for communication between the CU and the UE. Alternatively, for example, when the buffer volume in the DU is larger than or equal to a certain value, the CU may determine that the DU is available for communication between the CU and the UE. This enables the CU to easily determine the use DU.

An interface between the CU and the DU may be used for communication between the CU and the DU. The interface between the CU and the DU may be, for example, the Fs interface (see Non-Patent Document 7). The Fs interface may be used when the CU requests the information of (1) to (3) and (5) from the DU or when the DU notifies the CU of the information of (1) to (3) and (5). The CU may request the information of (1) to (3) and (5) from the DU by piggybacking the request onto the user data or independently. The DU may notify the CU of the information of (1) to (3) and (5) by piggybacking the notification onto the user data or independently. The request or the notification may be piggybacked onto the user data by, for example, inserting the request or the notification into a free space (a padding area) of the user data. Consequently, the overhead such as a header can be reduced in the forwarding. Making the request and the notification independently of the user data can expedite the request and the notification.

According to the first embodiment, DUs to be candidates for the use DU (hereinafter may be referred to as "candidate DUs") may be provided. The candidate DUs may be, for example, DUs whose PDCCHs are to be monitored by the UE. The candidate DUs and the use DU may be determined in stages. For example, a use DU may be selected from among the candidate DUs. Consequently, the use DU can be flexibly set.

The candidate DUs may be all the DUs being served by the CU. This increases the flexibility of communication. The candidate DUs may be part of the DUs being served by the CU. Since the number of the DUs whose PDCCHs are to be monitored by the UE can be reduced, the power consumption of the UE can be reduced.

The CU may notify the UE of information indicating which DU should be the use DU. The L1/L2 signaling may be used for the notification. The L1/L2 signaling may be, for example, scheduling information, that is, downlink allocation information and uplink grant information. The CU may transmit the L1/L2 signaling to the UE through all or one of the candidate DUs. The CU may transmit the L1/L2 signaling to the UE through the use DU in the downlink communication. The CU may include, in the L1/L2 signaling, the downlink allocation information of the use DU, the uplink grant information, or both the downlink allocation information and the uplink grant information. The UE may determine the use DU, using the presence or absence of the scheduling information. Consequently, the CU can flexibly change the use DU, and promptly notify the UE of information on the use DU.

The CU may determine the candidate DUs. When the CU determines the candidate DUs, the CU may use information identical to the information of (1) to (5) to be used for determining the use DU. The information to be used by the CU for determining the candidate DUs may be identical to or different from that to be used by the CU for determining the use DU. Consequently, the complexity incurred when the CU determines the candidate DUs and the use DU can be avoided.

A DU itself may determine a DU (a use DU) to be used for communication between the CU and the UE, and the candidate DUs. The DU may request the CU to use its own DU for the communication between the CU and the UE. The CU may accept or reject the request. Making such a determination by the DU itself can reduce the amount of processing for determining the use DU by the CU. Since the DU need not notify the CU of a measurement result, the amount of signaling through the interface between the CU and the DU, for example, the Fs interface can be reduced.

Examples of (1) to (5) below are disclosed as information to be used when the DU makes the determination:

(1) a measurement result obtained by its own DU, for example, a measurement result of an uplink signal;
(2) a measurement result obtained by the UE, for example, a measurement result of a downlink signal;
(3) a load state of its own DU;
(4) a load state of the CU; and
(5) combinations of (1) and (4) above.

In (1), the DU may use information identical to the aforementioned information of (1) and (2) to be used by the CU for determining the use DU. This can produce the same advantages as those when the CU uses the information of (1) or (2) for determining the use DU.

In (3), the DU may use information identical to the aforementioned information of (3) to be used by the CU for determining the use DU. Since this eliminates the need for the DU to notify the CU of a load state of its own DU, the amount of signaling through the interface between the CU and the DU, for example, the Fs interface can be reduced.

In (4), the DU may use information identical to the aforementioned information of (4) to be used by the CU for determining the use DU. Consequently, the DU can flexibly change the use DU according to the communication volume necessary between the CU and the UE.

The DU may request the information of (4) from the CU. The CU may notify the DU of information of (4). The CU may give the notification periodically or in response to the request from the DU. Alternatively, the CU may give the notification when satisfying a predefined condition. The condition may be determined in a standard or notified from the CU to the DU. Consequently, the amount of signaling required for making the notification from the CU to the DU can be optimized.

A threshold for determining the use DU using (1) to (4) above may be set. The DU may determine the use DU using the threshold. For example, when the received intensity of the uplink reference signal received from the UE is higher than or equal to a certain value, the DU may determine that its own DU is available for communication between the CU and the UE. Alternatively, for example, when the buffer volume in its own DU is larger than or equal to a certain value, the DU may determine that its own DU is available for communication between the CU and the UE. This enables the DU to easily determine the use DU.

The UE may determine the use DU and the candidate DUs. The UE may request the CU to regard the DU determined by itself as a use DU or a candidate DU. A scheduling request from the UE to the CU may include the request. The CU may accept or reject the request. The determination on the use DU by the UE enables, for example, prompt switching of the use DU following the movement of the UE.

When the UE determines the use DU, the UE may use the measurement result obtained by its own UE. The measurement result may be identical to the aforementioned information of (2) to be used by the CU for determining the use DU. This can produce the same advantages as those when the CU uses the information of (2) for determining the use DU. Moreover, the amount of signaling through the interfaces between the CU and the DU, for example, the Fs interface and a radio interface can be reduced.

The use DU in the uplink communication may be identical to or different from that in the downlink communication. The candidate DUs in the uplink communication may be identical to or different from those in the downlink communication. The use of the same DU makes the control in the CU and the UE easy. Since the use of the different DUs enables selection of appropriate DUs according to a channel state in each of the uplink communication and the downlink communication, the communication capacity can be increased and the low latency and the high reliability can be ensured. The entities that determine the candidate DUs and the use DU may be different between the uplink communication and the downlink communication. For example, the CU may determine the candidate DUs and the use DU in the uplink communication, and the UE may determine the candidate DUs and the use DU in the downlink communication. Since the use DU can be controlled according to a channel state that can be actually measured by the receiver, the reliability of communication can be enhanced. Alternatively, for example, the UE may determine the candidate DUs and the use DU in the uplink communication, and the CU may determine the candidate DUs and the use DU in the downlink communication. Since the measurement result need not be fed back through a radio interface, the amount of signaling through the radio interface can be reduced. Alternatively, for example, the CU may determine the candidate DUs both in the uplink communication and the downlink communication, the UE may determine the use DU in the downlink communication, and the CU may determine the use DU in the uplink communication. Since the use DU can be controlled according to a channel state that can be actually measured by the receiver, the reliability of communication can be enhanced. Moreover, the collective determination of the candidate DUs by the CU enables prompt determination of the use DUs.

A method for making the use DUs different between the uplink communication and the downlink communication is disclosed.

In the downlink communication, the CU may include, in the L1/L2 signaling for the use DU, the scheduling information of the use DU, that is, the downlink allocation information. The UE may determine, as the use DU, the DU including the downlink allocation information in the L1/L2 signaling. Consequently, the UE can promptly determine the use DU in the downlink communication.

In the uplink communication, the CU may combine, with the L1/L2 signaling from the DU to the UE, the uplink grant information and information on the use DU in the uplink communication, and notify the resulting information. The CU may give the notification using one of the candidate DUs in the downlink communication. The UE may determine the use DU in the uplink communication, using the L1/L2 signaling. Consequently, the UE can promptly determine the use DU in the uplink communication.

In the uplink communication, the UE may transmit data to a plurality of DUs simultaneously or with different timings. The CU may notify the UE of whether the data should be transmitted simultaneously or with different timings. The CU may give the notification via the L1/L2 signaling, via the MAC signaling, or semi-statically via the RRC signaling. This can increase the flexibility in the uplink communication.

A primary DU and a secondary DU may be provided according to the present invention. Since this facilitates the selection of the use DU in the CU and the UE, the amount of processing in the CU and the UE and the amount of signaling can be reduced. The DUs other than the primary DU may be secondary DUs. The number of the primary DUs may be one or more. All or a part of the DUs being served by the CU may be primary DUs.

The primary DU may be, for example, a use DU or a candidate DU in transmission of C-Plane data. This facilitates the processing for forwarding the C-Plane data. Alternatively, the primary DU may be a DU to which data is conducted more preferentially than to the secondary DU in both the C-Plane and the U-Plane. Consequently, the amount of processing for determining the use DU can be reduced in both the C-Plane and the U-Plane.

The CU may determine which one of the DUs being served by the CU should be the primary DU. This facilitates the control over the DUs in the whole communication system.

The UE may determine which one of the DUs being served by the CU should be the primary DU. Due to this, the UE need not notify the CU of a measurement result, so that the amount of signaling can be reduced. Among the DUs being served by the CU, a DU to be the primary DU may be different for each UE. Since the optimal conductive path can be built for each UE, the reliability and the flexibility in a communication system can be increased. The CU and the UE may determine different DUs as the primary DUs in each of the uplink communication and the downlink communication. Consequently, a conductive path can be flexibly built according to differences in channel state between the uplink communication and the downlink communication, and the reliability of communication can be enhanced.

The CU may determine the primary DU using information on the performance of the DUs being served thereby. The performance may be indicated by a communication range, a use frequency bandwidth, a buffer volume, or a communication capacity between the CU and the DU. This enables efficient communication in a communication system. For example, since the CU can perform C-Plane communication with many UEs, using a DU with a wide communication range as the primary DU, the C-Plane communication can be efficiently performed.

When the CU determines the primary DU using information on the performance of the DUs, the DU may notify the CU of information on the performance of its own DU. The DU may give the notification when the DU starts the connection with the CU. The CU may request, from the DU, the information on the performance of the DU. The CU may make the request when the DU starts the connection with the CU. Soon after the DU starts the connection with the CU, the CU can properly determine the primary DU.

The request and the notification may be made upon setting up the interface between the CU and the DU, for example, the Fs interface. The request and the notification may be included in signaling for setting up the Fs interface. Consequently, the amount of signaling between the CU and the DU can be reduced.

The request and the notification may be made when the performance of the DU is updated. Consequently, the CU and the UE can properly determine the primary DU with reflection of the updated performance of the DU.

The request and the notification may be made upon start of communication with the UE. Consequently, the primary DU can be flexibly determined for each UE.

The CU and/or the UE may determine a DU with superior communication quality with the UE as the primary DU. Consequently, the reliability of communication can be enhanced. The communication quality may be indicated by a received intensity (for example, an RSRP) or a signal-to-interference-plus-noise ratio. Another indicator, for example, an RSRQ may be used. A certain threshold may be set to the communication quality, and a DU with superior communication quality relative to the threshold or a DU with communication quality higher than or equal to the threshold may be determined as the primary DU. Alternatively, the primary DUs may be a predetermined number of DUs from the DU with the highest communication quality.

The threshold and/or the predetermined number may be determined in a standard, or determined by the CU. The CU may notify the UE of the threshold and/or the predetermined number. The CU may give the notification via the RRC signaling, the MAC signaling, or the L1/L2 signaling.

The CU and/or the UE may determine the DU on which the UE has been camping as the primary DU. This facilitates the control over the DU.

Alternatively, the CU and/or the UE may determine, as the primary DU, a DU to which the UE is RRC-connected. This facilitates the control over the DU.

Alternatively, when determining the primary DU, the CU and/or the UE may use the information of (1) to (4) for the CU to determine which one of the DUs being served thereby is used for performing communication. Since this can integrate the determination on the use DU with the determination on the primary DU, the communication system can be easily designed, and the amount of processing can be reduced.

The CU and/or the UE may fixedly determine the primary DU. In other words, the CU and/or the UE may continuously use, as the primary DU, the primary DU determined once. Consequently, the CU easily controls the DU.

Alternatively, the CU and/or the UE may variably determine the primary DU. In other words, the CU and/or the UE may change the primary DU determined once. This can increase the flexibility in the communication system.

The CU may forward the duplicated packet to each DU through the interface between the CU and the DU, for example, the Fs interface. Similarly, each of the DUs may forward the received duplicated packet to the CU through the interface between the CU and the DU, for example, the Fs interface.

The CU may forward the different numbers of duplicated packets to the different DUs. For example, when the DUs #1 and #2 exist under the CU, the CU may duplicate a packet into three, and forward two of the packets to the DU #1 and the remaining one packet to the DU #2. Consequently, the reliability in the downlink communication can be enhanced. For example, when a channel state between the DU #1 and the UE is inferior, which may cause excess of the maximum number of retransmissions in HARQ, the CU forwards the two packets to the DU #1 as previously described. Even when packet loss on one of the packets occurs due to the excess of the maximum number of retransmissions in HARQ, the DU #1 can transmit the other packet to the UE.

The UE may forward the different numbers of duplicated packets to lower-layer entities that correspond to the different DUs. For example, when the UE communicates with a CU having two DUs being served thereby (the DUs #1 and #2), the PDCP layer of the UE may duplicate a packet into three, and forward two of the packets to an RLC entity corresponding to the DU #1 and the remaining one packet to an RLC entity corresponding to the DU #2. Consequently, the reliability in the uplink communication can be enhanced.

When the CU determines the number of duplicated packets to be forwarded to the DUs, the CU may use information identical to the information for determining the use DU by its own CU. When the UE determines the number of duplicated packets to be forwarded to lower layers in the corresponding DUs, the UE may use information identical to the information for determining the use DU by its own UE. Consequently, the complexity in building a communication system can be avoided.

The CU and/or the UE may give the duplicated packets the same PDCP sequence number. Consequently, the UE and/or the CU to be a receiver easily detects redundant packets.

Alternatively, the CU and/or the UE may give the duplicated packets different PDCP sequence numbers. This can avoid the complexity in designing, in the CU and/or the UE to be a transmitter, a PDCP header assigner and a corresponding RLC forwarding unit.

The CU and/or the UE may give the duplicated packets different serial numbers. For example, when the PDCP sequence numbers range from #1 to #7, the CU and/or the UE may give the PDCP sequence numbers #4 and #5 to two packets that are duplicates of a packet, and give the PDCP sequence numbers #6 and #7 to two different packets that are duplicates of another packet. This can avoid the complexity in designing the PDCP header assigner.

The CU and/or the UE may provide an identifier indicating a duplicated packet, and transmit the identifier to the receiver. The identifier may be included in, for example, a PDCP header. Consequently, the receiver can easily identify the identical packets.

Alternatively, the CU and/or the UE may give the respective duplicated packets PDCP sequence numbers with branch numbers. For example, the CU and/or the UE may give the PDCP sequence numbers #3-1 and #3-2 to two duplicated packets. Consequently, the receiver can easily identify the identical packets without adding the PDCP headers.

Alternatively, even if branch numbers are adopted, there may be a packet to which no branch number is given. For example, the PDCP sequence numbers #3 and #3-1 may be given to two duplicated packets. Consequently, the number of bits of the PDCP sequence numbers can be reduced.

The UE and/or the CU may discard PDCP-PDUs redundantly received. The UE and/or the CU may receive the PDCP-PDU on a first-come, first-served basis. In other words, the UE and/or the CU may discard the PDCP-PDU received later. Consequently, the latency can be reduced. The UE and/or the CU may immediately forward the received PDCP-PDU to an upper layer. Consequently, the latency can be reduced.

A priority may be assigned to each DU to be a conductive path between the CU and the UE. The UE and/or the CU may preferentially receive the PDCP-PDU with the higher priority. For example, the UE and/or the CU may preferentially receive the PDCP-PDU received through a DU with a low latency in a link between the CU and the DU.

When a difference in latency in the links between the CU and the DU is significant and when the reliability in one of the links is low, this facilitates the process of receiving the PDCP-PDU.

The CU or the UE may give the priority of each DU. Examples of (1) to (7) below are disclosed as information to be used when the CU and/or the UE determines the priority:
(1) the latency in the link between the CU and the DU;
(2) the reliability of the link between the CU and the DU;
(3) the propagation latency between the DU and the UE;
(4) the performance of the DU;
(5) a load state of the DU;
(6) information indicating the primary DU; and
(7) combinations of (1) and (6) above.

In (1), for example, assignment of a higher priority to a DU with a lower latency in the link between the CU and the DU enables the CU and/or the DU to easily perform the process of receiving the PDCP-PDU.

In (2), for example, a packet loss rate in the link may be used. Consequently, for example, assignment of a higher priority to a DU in a link with a lower packet loss rate can enhance the reliability of communication between the CU and the UE.

In (3), for example, assignment of a higher priority to a DU with a lower propagation latency enables the CU and/or the DU to easily perform the process of receiving the PDCP-PDU.

In (4), for example, a time from receipt of a PDCP-PDU from an upper layer to transmission of the PDCP-PDU to a radio interface may be used. Alternatively, a time from receipt of data from a radio interface to transmission of the data to the CU as the PDCP-PDU may be used. Consequently, for example, assignment of a higher priority to a DU with higher performance enables the CU and/or the DU to easily perform the process of receiving the PDCP-PDU.

In (5), for example, a free resource state may be used. The free resource state may be indicated by, for example, a buffer volume in the DU or the radio resource in the DU. Consequently, for example, assignment of a higher priority to a DU with a large free resource can increase a transmission rate as well as facilitating the process of receiving the PDCP-PDU in the CU and/or the DU.

Alternatively, the number of UEs communicating using the DU may be used in (5). For example, a higher priority may be assigned to a DU with less number of the UEs. Since this can shorten the time for waiting for scheduling the user data, the latency involved in the communication can be reduced.

In (6), the amount of processing for determining a priority by the CU can be reduced.

The CU and the UE may measure the latency in the link between the CU and the UE, Here, the CU and the UE may measure a relative value of the latencies in different links passing through different DUs. Since measurement of the relative value eliminates the need for the transmitter to give a time stamp, the measurement process is facilitated.

The measurement may be performed through the interface between the CU and the DU, for example, each of the Fs interface and a radio interface between the DU and the UE. This facilitates the measurement process.

The CU and the UE may use data for measurement to perform the measurement. The data for measurement may be, for example, the RRC signaling or a PDCP Status PDU. The data for measurement may include a time stamp. The UE may find the latency in the link, using an arrival time of the data for measurement and the time stamp. Consequently, the absolute value of the latency in the link can be measured. Furthermore, the amount of processing in the DU for measuring the latency in the link between the CU and the UE can be reduced.

Alternatively, the CU and the UE may use the user data. Consequently, the overhead involved in the measurement can be reduced. When the CU and the UE perform the measurement using the user data, the transmitter may use information indicating that the user data is to be measured. The CU may notify the UE of the information in advance, or an identifier indicating the information may be added to the user data.

When the CU and the UE perform the measurement, different signals may be used in the measurement through the interfaces between the CU and the DU, for example, the Fs interface and the radio interface. For example, pilot data with a time stamp may be used through the Fs interface, whereas an uplink reference signal or a downlink reference signal may be used through the radio interface. Consequently, the overhead involved in the measurement can be reduced.

The UE may notify the CU of a measurement result of the latency in a link passing through each DU. The CU may determine a priority of the link passing through each DU, using the measurement result. The UE may use the RRC signaling for the notification. Consequently, the processing time in the DU, for example, the time for decoding data can be reduced. Alternatively, the UE may use the PDCP Status PDU. This allows the notification with a smaller overhead. Alternatively, different signalings may be used between a notification from the UE to the DU and a notification from the DU to the CU. For example, the UE may notify the DU via the L1/L2 signaling or the MAC signaling. The L1/L2 signaling allows a prompt notification. The MAC signaling allows a notification with less number of symbols through application of the multi-level modulations. Further, the DU may notify the CU through the interface between the CU and the DU, for example, using a control signal of the Fs interface. The control signal may be piggybacked onto the user data or transmitted independently of the user data. The use of different signalings between the notification from the UE to the DU and the notification from the DU to the CU reduces the overhead involved in the feedback.

The UE may notify the CU of a result of the averaging procedure or the filtering procedure on measurement values of the latency. The UE may notify the result of the averaging procedure or the filtering procedure, in the same method for notifying the measurement result of the latency from the UE to the CU. This can suppress the influence of fluctuations in the measurement value, and reduce the amount of signaling in the notification.

A parameter to be used for the averaging procedure or the filtering procedure may be determined in a standard or by the CU. The CU may notify the UE of the parameter. This enables flexible measurement according to a state of the communication system.

The CU may notify the UE of a measurement result of the latency in a link passing through each DU. The UE may determine a priority of the link passing through each DU, using the measurement result. The CU may use the RRC signaling for the notification. Consequently, the processing time in the DU, for example, the time for decoding data can be reduced. Alternatively, the CU may use the PDCP Status PDU. This allows the notification with a smaller overhead. Alternatively, different signalings may be used between a notification from the CU to the DU and a notification from the DU to the UE. For example, the CU may notify the DU through the interface between the CU and the DU, for example, using a control signal of the Fs interface. The control signal may be piggybacked onto the user data or transmitted independently of the user data. The control signal may be piggybacked onto the user data by, for example, inserting the control signal into a free space (a padding area) of the user data. The DU may notify the UE via the L1/L2 signaling or the MAC signaling. The L1/L2 signaling allows a prompt notification. The MAC signaling allows a notification with less number of symbols through application of the multi-level modulations. The use of different signalings between the notification from the CU to the DU and the notification from the DU to the UE reduces the overhead involved in the feedback.

The CU may notify the UE of the result of the averaging procedure or the filtering procedure on measurement values of the latency. The CU may notify the result of the averaging procedure or the filtering procedure, in the same method for notifying the measurement result of the latency from the CU to the UE. This can suppress the influence of fluctuations in the measurement value, and reduce the amount of signaling in the notification.

The parameter to be used for the averaging procedure or the filtering procedure may be determined in a standard or by the CU. The CU may notify the UE of the parameter. This enables flexible measurement according to a state of the communication system.

The CU may determine the priority. The CU may notify the UE of the priority. Consequently, the CU can optimize the communication rate in view of communication states of the other UEs. The notification may include an identifier indicating a priority and an identifier indicating a DU. The notification may indicate a priority of each DU. Consequently, the CU can notify the UE with less amount of signaling. Alternatively, the notification may indicate a ratio of amounts of forwarded duplicated packets for each DU. Since this enables flexible specification of a method for forwarding duplicated packets, the reliability of communication can be efficiently increased.

The CU may use the PDCP control PDU for the notification. This allows the notification with a smaller overhead. Alternatively, the RRC signaling may be used for the notification. Consequently, a large amount of information can be notified.

The UE may determine the priority. The UE may use the measurement result obtained by its own UE for the determination. The UE may notify the CU of the priority. Since this eliminates the need for feeding back the measurement result, the amount of signaling can be reduced.

In the communication between the CU and the UE, the priority of the use DU may be changed between the uplink and the downlink. The priority can be flexibly controlled according to a channel state in each of the uplink communication and the downlink communication. Different entities may determine the priorities of the use DUs in the uplink and the downlink. For example, the CU may determine the priority in the uplink, whereas the UE may determine the priority in the downlink. Consequently, the amount of signaling can be reduced in the measurement and in the feedback of the measurement result.

In the communication between the CU and the UE, the PDCP layer in the receiver may generate PDCP-SDUs using the duplicated PDCP-PDUs, and forward the PDCP-SDUs to the upper layer. The upper layer may be, for example, an application layer or the RRC. The number of the PDCP-SDUs to be forwarded may be one or more. In other words, the receiver need not necessarily generate the PDCP-SDUs to correspond to all the duplicated PDCP-PDUs. This can reduce the latency in the receiver. The receiver may receive the duplicated PDCP-PDUs using a reordering timer. This enables smooth operations in the system.

In the communication between the CU and the UE, the PDCP layer in the receiver may determine through which DU the PDCP-PDU has been received. Each RLC entity in the receiver may forward an identifier indicating its own entity to the PDCP layer, together with the PDCP-PDU. Alternatively, an identifier indicating a DU used in the communication may be used. This enables the receiver to easily determine the priority of the DU. Since this eliminates the need for notifying the identifier of the DU through a radio interface, the amount of signaling through the radio interface can be reduced.

The PDCP layer in the receiver may remove the identifier in generating the PDCP-service data unit (PDCP-SDU) from the PDCP-PDU. Consequently, the amount of data processing in the upper layer, for example, the application layer can be reduced. Alternatively, the PDCP layer in the receiver may maintain the identifier in generating the PDCP-SDU and then forward the PDCP-SDU to the upper layer, for example, the RRC. This facilitates the control over the use DU in the upper layer, for example, the RRC. The PDCP layer in the receiver may forward, to the upper layer, for example, to the application layer, the PDCP-SDUs from which the identifier has been removed, and forward information on the removed identifier to another upper layer, for example, to the RRC. Consequently, the amount of processing in, for example, the application layer and the RRC can be reduced.

The transmitter may assign an identifier in the communication between the CU and the UE. The RLC layer in the receiver may forward the identifier to the PDCP layer in the receiver. Consequently, the amount of processing in the RLC layer in the receiver can be reduced. The PDCP layer in the receiver may forward, to the upper layer, for example, to the application layer, data from which the identifier has been removed. Thus, the amount of processing in the application layer can be reduced. The PDCP layer in the receiver may forward information on the identifier to another upper layer, for example, to the RRC. This facilitates the control over the use DU in the RRC.

The CU may obtain information on the packet that has been received from each DU. The information may be, for example, a packet loss rate or the latency in the packet. Consequently, the CU can easily control the use DU.

Alternatively, the UE may obtain information on the packet that has been received from each RLC entity. The information may be, for example, a packet loss rate or the latency in the packet. Consequently, the UE can easily control the use DU.

The identifier indicating the DU may be an IP address of the DU. Since this enables use of a configuration of an interface between base stations as it is, the complexity in designing the CU and the DU can be avoided. The overhead of the processing in the RLC layer can be reduced.

The identifier indicating the DU (hereinafter may be referred to as a "DU-ID") may be given a unique identification among the DUs being served by the CU. This enables identification of the DU with less number of bits.

Alternatively, the DU-ID may be given a unique identification among surrounding gNBs. Since the CU in the master base station can identify the DU in the secondary base station in the combination of the DC or the MC with the CU-DU split, the flexibility of the configuration between the CU and the DU can be increased. The surrounding gNBs may be gNBs in the same tracking area. This can prevent dual management of the surrounding gNBs for identification of the DU and the gNBs in the tracking area, and avoid the complexity in the device. Alternatively, the surrounding gNBs may be gNBs to be connected to the same mobility management entity (MME). This facilitates the identification of the DU in the mobility between the gNBs.

Alternatively, the DU-ID may be given a unique identification between the master base station and the secondary base station. Even when the master base station and the secondary base station straddle a boundary of the surrounding gNBs, the master base station and the secondary base stations being served thereby can easily identify the DU.

Alternatively, the identifier given a unique identification among the DUs being served by the CU of the gNB may be combined with the gNB identifier for use. Consequently, the DU can be easily identified from the other gNBs. A Physical Cell Identity (abbreviated as PCI) may be used instead of the gNB identifier. Since this facilitates the identification of the cell and the DU, the system is easily controlled.

Alternatively, unique identifiers may be given to all the DUs in the communication system. This facilitates identification of the DUs in the communication system.

The identifiers of the DUs may be renumbered. This enables reduction in the number of bits for identifying the DUs through, for example, signaling. For example, a table may be used for the renumbering. The table should include the original identifier of the DU and the renumbered identifier. This facilitates the association between the original identifier of the DU and the renumbered identifier.

The high-level network device may renumber the identifiers. This enables management of the DUs across a plurality of gNBs with less number of bits.

Alternatively, the master base station may renumber the identifiers. This enables management of the DUs in the configuration of the DC or the MC with less number of bits.

The master base station may request the secondary base station to notify identifiers of the DUs being served by the secondary base station. The secondary base station may notify the master base station of the identifiers of the DUs being served by its own secondary base station. Since the secondary base station has only to notify the identifiers of the DUs with the timing necessary for the master base station, the amount of signaling can be reduced. Alternatively, the secondary base station may notify the master base station of the identifiers of the DUs being served by its own base station when the configuration of the DUs being served by its own base station is changed. Consequently, the master base station can perform control promptly reflecting the change in the configuration of the DUs being served by the secondary base station.

Each base station may renumber the identifiers. This can reduce operations of inquiring the mapping of the identifiers between base stations or between a base station and the high-level network device. Consequently, the amount of signaling can be reduced.

The CU and the UE may share information on the renumbering. The information may be information obtained by combining an identifier of the DU to be renumbered and the renumbered identifier of the DU. The amount of signaling on the information of the DU can be reduced in the communication between the CU and the UE.

The CU may notify the UE of the information. The notification may be given via the RRC signaling. Consequently, the amount of signaling processing in the use DU can be reduced.

Alternatively, the notification between the CU and the DU may be performed through the interface between the CU and the DU, for example, using a control signal of the Fs interface. The control signal may be piggybacked onto the user data or transmitted independently of the user data. The control signal may be piggybacked onto the user data by, for example, inserting the control signal into a free space (a padding area) of the user data. Consequently, the overhead involved in transmission of the control signal can be reduced. The notification between the DU and the UE may be performed via the L1/L2 signaling. This enables a prompt notification from the DU to the UE. Alternatively, the MAC signaling may be used for the notification. This allows the notification with less number of symbols through application of the multi-level modulations, and increase in the reliability with the HARQ retransmission control. Alternatively, the same signaling method as that for carrier aggregation may be used. Since this can integrate the signaling methods, the complexity in system design can be avoided.

The CU and the DU may share the information on the renumbering. The CU and the DU may mutually notify information necessary for the renumbering to share the information. The notification may be given through the interface between the CU and the DU, for example, the Fs interface. The DU may notify the CU of, for example, an identifier of its own DU as the information necessary for the renumbering. The CU may notify the DU of the renumbered identifier of the DU. This enables reduction in the number of bits required for notifying the identifier of the DU through the interface between the CU and the DU, for example, the Fs interface.

The high-level network device and the CU may share the information on the renumbering. The high-level network device and the CU may mutually notify information necessary for the renumbering to share the information. An interface between the high-level network device and the CU may be used for the notification. The CU may notify the high-level network device of, for example, the identifiers of the DUs being served thereby as the information necessary for the renumbering. The identifiers of the DUs may be identifiers combined with the identifiers of the gNBs. The high-level network device may notify information obtained by combining an identifier of the DU to be renumbered and the renumbered identifier of the DU. Consequently, the interface between the high-level network device and the CU can reduce the amount of signaling for the information on the DUs.

The CU and/or the UE may share a buffer in the PDCP layer between the DUs. Consequently, the buffer volume can be saved. Alternatively, the buffer in the PDCP layer may be reserved for each DU. Consequently, even in the presence of the DU with communication delay, the latency can be reduced because another DU can continue the communication.

Figure 8:
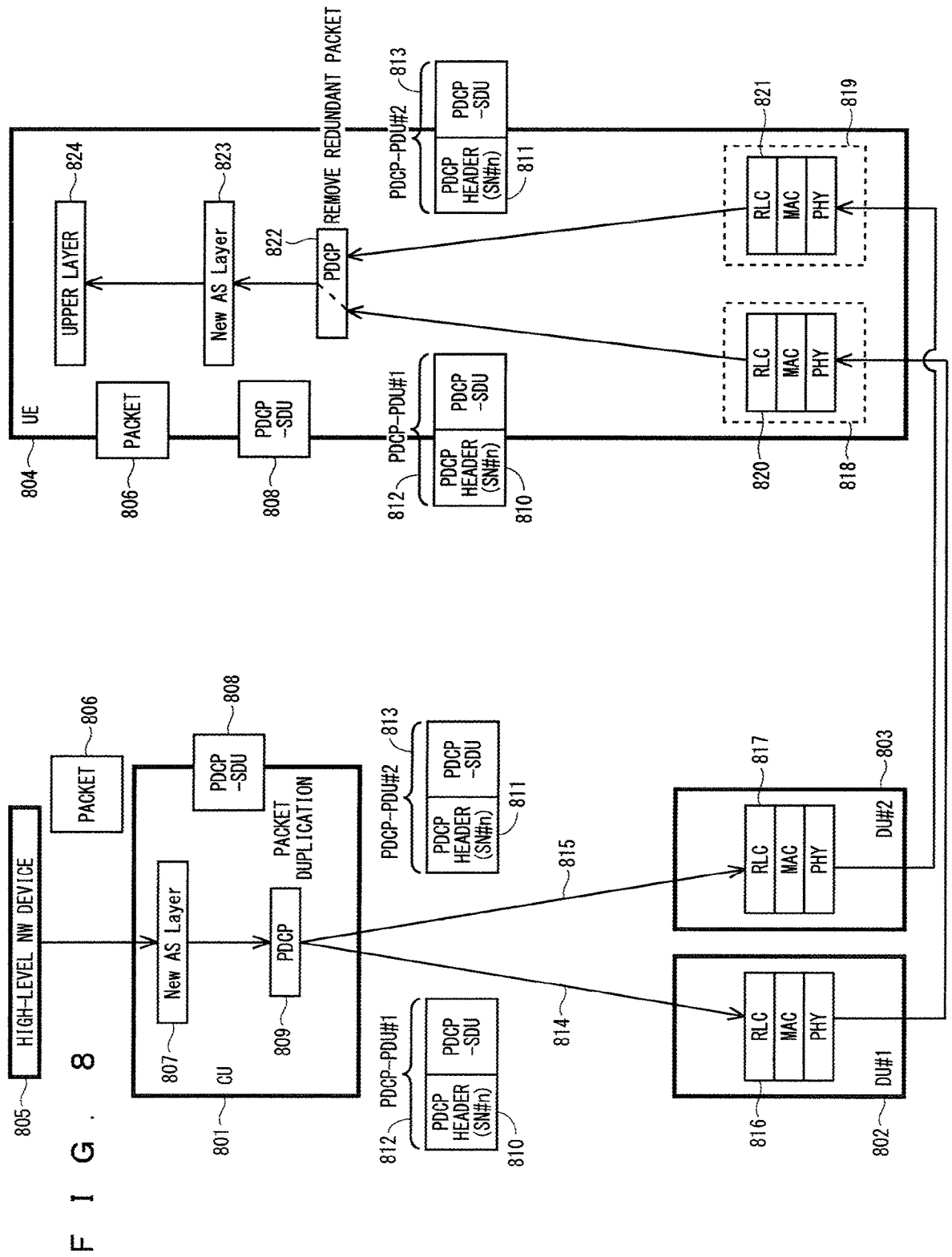
FIG. 8 illustrates, in the downlink communication, a configuration of the CU that duplicates a packet in a PDCP layer and forwards the duplicated packets to a plurality of DUs, the DUs, and the UE that detects redundant packets according to the first embodiment.

FIG. 8 illustrates, in the downlink communication, a configuration of the CU that duplicates a packet in the PDCP layer and forwards the duplicated packets to a plurality of DUs, the DUs, and the UE that detects redundant packets. In FIG. 8, a CU 801 communicates with a UE 804 using a DU #1 (may be referred to as a "DU 802") and a DU #2 (may be referred to as a "DU 803").

In FIG. 8, a high-level network device 805 forwards a packet 806 to a New AS layer 807 in the CU 801. The New AS layer is a layer having a function of mapping a QoS flow to a Data Radio Bearer (abbreviated as DRB) in the U-Plane under NR (see Non-Patent Document 11). The New AS layer 807 generates a PDCP-Service Data Unit (PDCP-SDU) 808 using the packet 806, and forwards the PDCP-SDU to a PDCP layer 809.

In FIG. 8, the PDCP layer 809 duplicates the PDCP-SDU 808 into two, assigns a PDCP header 810 to one of the duplicated SDUs to generate a PDCP-PDU #1 (may be referred to as a PDCP-PDU 812), and assigns a PDCP header 811 to the other duplicated SDU to generate a PDCP-PDU #2 (may be referred to as a PDCP-PDU 813). Although the PDCP headers 810 and 811 include information on the same sequence number #n in FIG. 8, they may include information on different sequence numbers. For example, assignment of serial sequence numbers to the PDCP headers 810 and 811 facilitates design of the sequence number assigner in the PDCP layer.

In FIG. 8, the PDCP layer 809 forwards the PDCP-PDU #1 to an RLC layer 816 of the DU #1 through an Fs interface 814. Furthermore, the PDCP layer 809 forwards the PDCP-PDU #2 to an RLC layer 817 of the DU #2 through an Fs interface 815.

In FIG. 8, the DU #1 transmits the PDCP-PDU #1 received in the RLC layer 816 to a DU #1-corresponding entity 818 in the UE 804. The DU #2 transmits the PDCP-PDU #2 received in the RLC layer 817 to a DU #2-corresponding entity 819 in the UE 804. An RLC layer 820 forwards the received PDCP-PDU #1 to a PDCP layer 822. An RLC layer 821 forwards the received PDCP-PDU #2 to the PDCP layer 822.

In FIG. 8, the PDCP layer 822 detects a redundant packet. In the example of FIG. 8, the PDCP layer 822 detects that the PDCP-PDU #1 and the PDCP-PDU #2 are identical, and removes the PDCP-PDU #2. The PDCP layer 822 removes the PDCP header 810 from the PDCP-PDU #1 to obtain the PDCP-SDU 808, and forwards the PDCP-SDU 808 to a New AS layer 823. Although the PDCP layer 822 removes the PDCP-PDU #2 in the example of FIG. 8, it may remove the PDCP-PDU #1. In such a case, the PDCP layer 822 removes the PDCP header 811 from the PDCP-PDU #2 to obtain the PDCP-SDU 808, and forwards the PDCP-SDU 808 to the New AS layer 823.

In FIG. 8, the New AS layer 823 restores the packet 806 using the PDCP-SDU 808, and forwards the packet 806 to an upper layer 824.

In the communication between the CU and the UE, a bearer that passes through all the DUs being served by the CU may be established. The CU may notify the UE of change in the setting on the communication with each of the DUs, in the mobility of the UE between the DUs. Since this eliminates the need for changing the bearer even when the UE moves between the DUs, the amount of signaling can be reduced.

The CU may reserve radio resources of all the DUs being served thereby. The CU may reserve the buffer volumes of all the DUs being served thereby. The radio resources and/or the buffer volumes may be reserved when the CU newly sets a bearer. The radio resources and/or the buffer volumes may be reserved when the CU changes the setting of the bearer. Consequently, even when the UE performs mobility between the DUs, the UE can continue the communication while the QoS (for example, bandwidth guarantees) requested for the bearer is satisfied.

The CU may reserve the radio resources of part of the DUs being served thereby. The number of the DUs whose radio resources are reserved may be one or more. Since the radio resources to be reserved in establishing the bearer can be saved, the efficient communication is possible.

The part of the DUs may be a predetermined number of DUs from the DU with the highest measurement result. Consequently, the radio resources can be saved while the reliability of the communication is increased.

Alternatively, the part of the DUs may be DUs adjacent to the use DU in the communication between the CU and the UE. Consequently, the radio resources to be reserved by the CU for the DUs can be further saved.

Alternatively, the part of the DUs may be DUs surrounding the use DU in the communication between the CU and the UE. The surrounding DUs may include the DUs adjacent to the use DU. This enables smooth mobility between the DUs even upon sudden change in a radio channel state, and saving of the radio resources.

Figure 9:
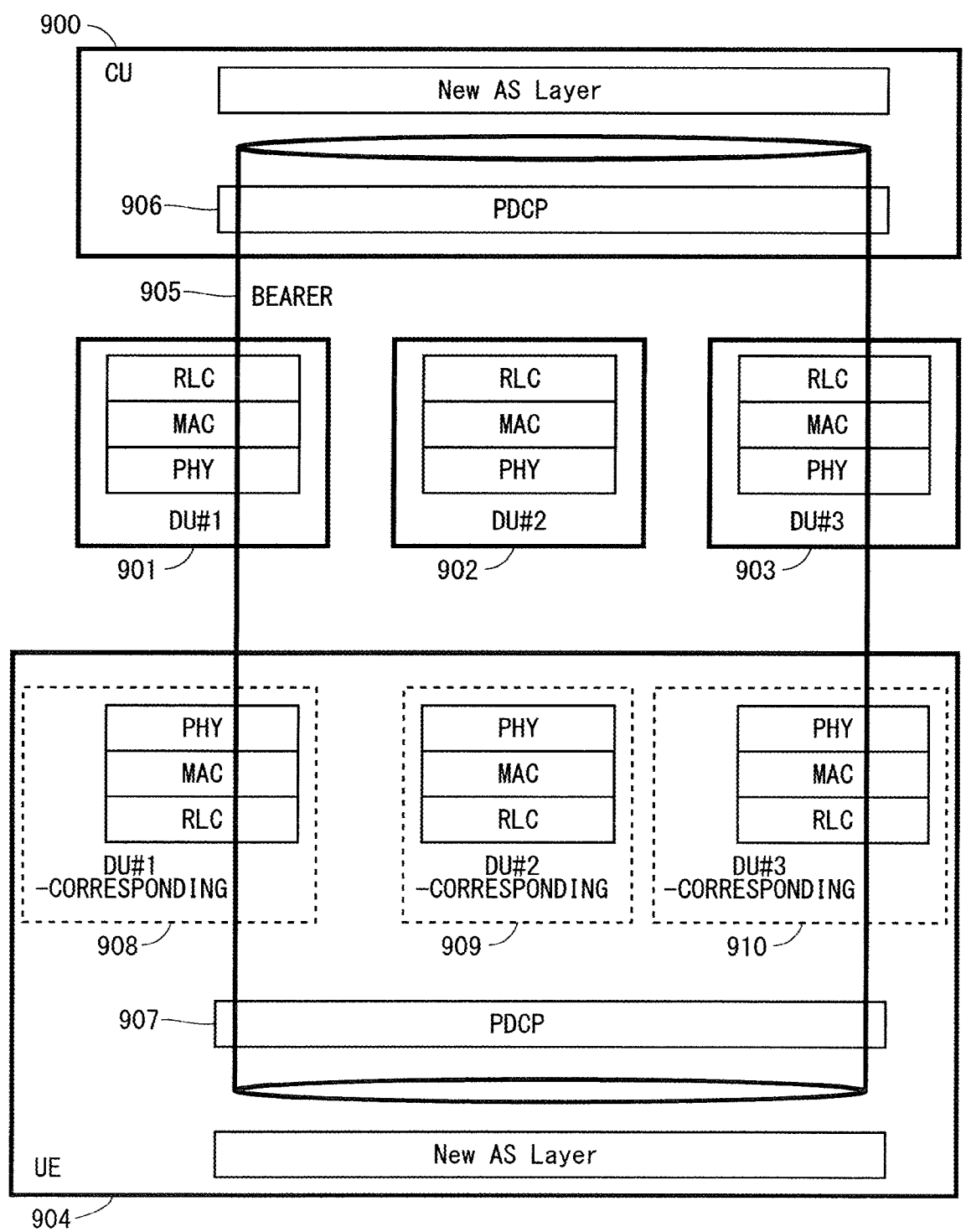
FIG. 9 illustrates a configuration of a bearer that passes through all the DUs being served by the CU according to the first embodiment.

FIG. 9 illustrates a configuration of a bearer that passes through all the DUs being served by the CU. FIG. 9 illustrates an example where a CU 900 has a DU #1, a DU #2, and a DU #3 (may be referred to as a DU 901, a DU 902, and a DU 903, respectively) being served thereby and where the CU 900 communicates with a UE 904.

In FIG. 9, a bearer 905 is established as the bearer that passes through all the DUs being served by the CU. The bearer 905 terminates in a PDCP layer 906 of the CU 901 and a PDCP layer 907 of the UE 904. The bearer 905 passes through the RLC layer, the MAC layer and the PHY layer included in each of the DU #1, the DU #2 and the DU #3. The bearer 905 also passes through a DU #1-corresponding entity 908, a DU #2-corresponding entity 909, and a DU #3-corresponding entity 910 of the UE 904.

Although FIG. 9 illustrates an example of the bearer that passes through all the DUs being served by the CU, the bearer may be a bearer that passes through part of the DUs. The bearer may be configured by, for example, candidate DUs in the communication with the UE. Alternatively, the bearer may be configured by the use DUs in the communication with the UE. This can reduce reservation of the unnecessary resources.

The CU may request, from the DUs being served thereby, information on the performance of the DUs. The CU may request the DUs being newly served by the CU, for example, the DUs being connected to the CU. The information on the performance of the DUs may be, for example, a time from receipt of a PDCP-PDU from the upper layer to transmission of the PDCP-PDU to a radio interface. Alternatively, the information on the performance of the DUs may be a time from receipt of data from a radio interface to transmission of the data to the CU as the PDCP-PDU. Alternatively, the information on the performance of the DUs may be the buffer volume or radio resources of the DUs. Consequently, the CU can appropriately change the setting of the bearer using the information on the performance of the DUs, when adding a DU.

The DU may notify the CU of the information on the performance of its own DU. The DU may give the notification when the DU is newly served by the CU, for example, when the DU is connected to the CU. The information may be the same as that on the performance of the DUs. Consequently, the same advantages can be produced.

The DU may request, from the CU, information on a communication state. The DU may make the request when the DU is newly served by the CU, for example, when the DU is connected to the CU. The information on the communication state may be, for example, information on the UE with which the CU is communicating, information on a bearer used by the UE, or information on the setting of the bearer. Consequently, for example, start-up operations when the DU is connected can be expedited.

The CU may notify the DU of the information on the communication state. The CU may notify the DUs being newly served by the CU, for example, the DUs being connected to the CU. The information on the communication state may be the same as the aforementioned information. Consequently, the same advantages can be produced.

The request and the notification may be made upon setting up the interface between the CU and the DU, for example, the Fs interface. The request and the notification may be included in the signaling for setting up the Fs interface. Consequently, the amount of signaling between the CU and the DU can be reduced.

The request and the notification may be made when the performance of the DU is updated. Consequently, the CU and the UE can properly determine the primary DU with reflection of the updated performance of the DU.

The request and the notification may be made upon start of communication with the UE. Consequently, the primary DU can be flexibly determined for each UE.

In the communication between the CU and the UE, a split bearer may be established for the DUs to which the duplicated packets are to be forwarded (hereinafter may be referred to as a "split bearer between the DUs"). This enables saving of the resources of the DUs that are not used for conducting duplicated packets. The split bearer between the DUs need not be released to the DU that has established the split bearer between the DUs once. Examples of the case where the split bearer between the DUs need not be released include an occurrence of the mobility between the DUs. The split bearer between the DUs may be released to the DU. Examples of the case where the split bearer between the DUs may be released include a connection release between the UE and the CU. Alternatively, the split bearer between the DUs may be released when the DU is in an overloaded state. Even when the DU previously used is reused in the communication between the CU and the UE, the amount of signaling on the setting of the split bearer between the DUs can be reduced.

Figure 10:
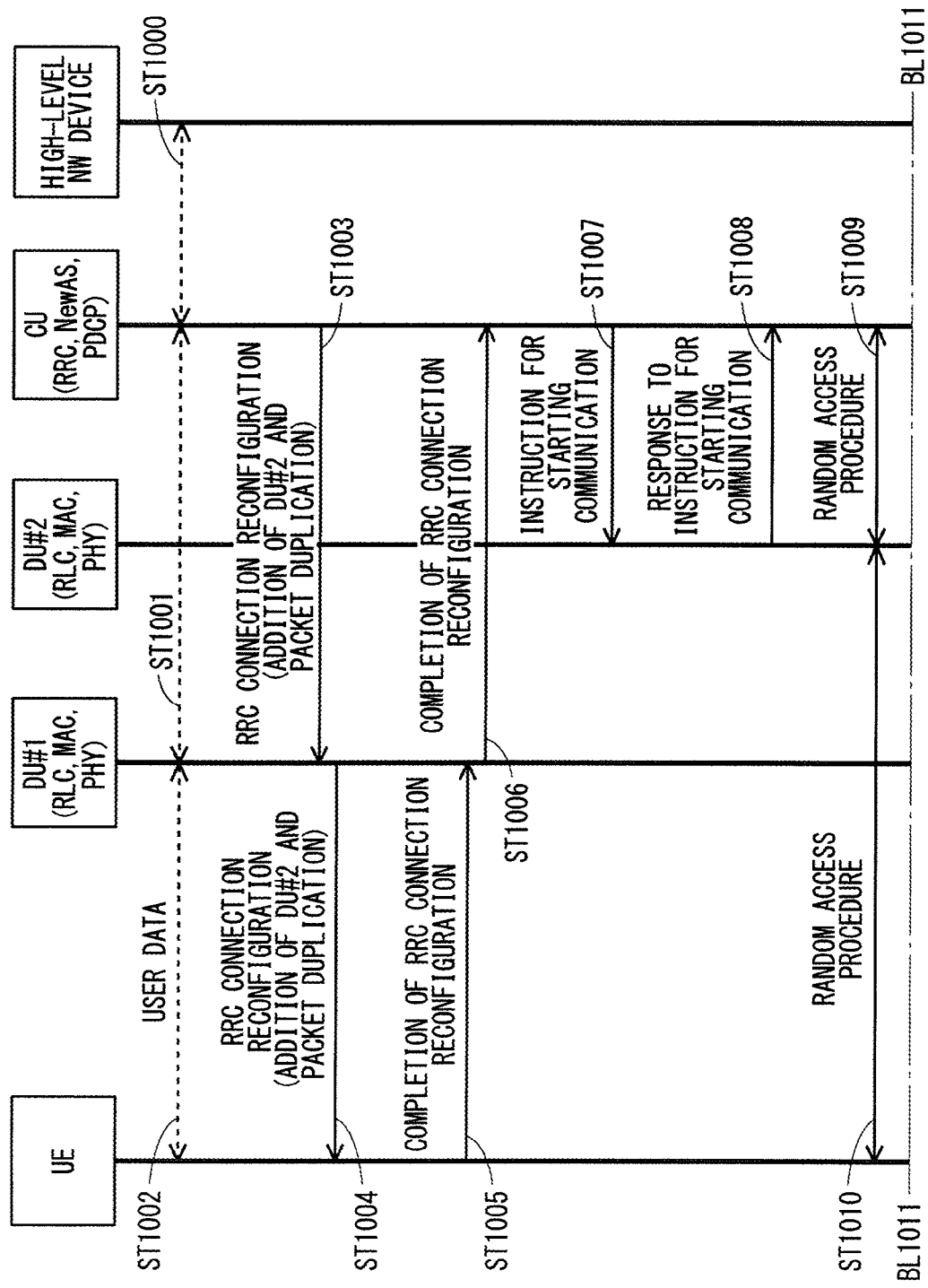
FIG. 10 illustrates a sequence for starting transmission and reception of duplicated packets in the communication between the CU and the UE according to the first embodiment.
Figure 11:
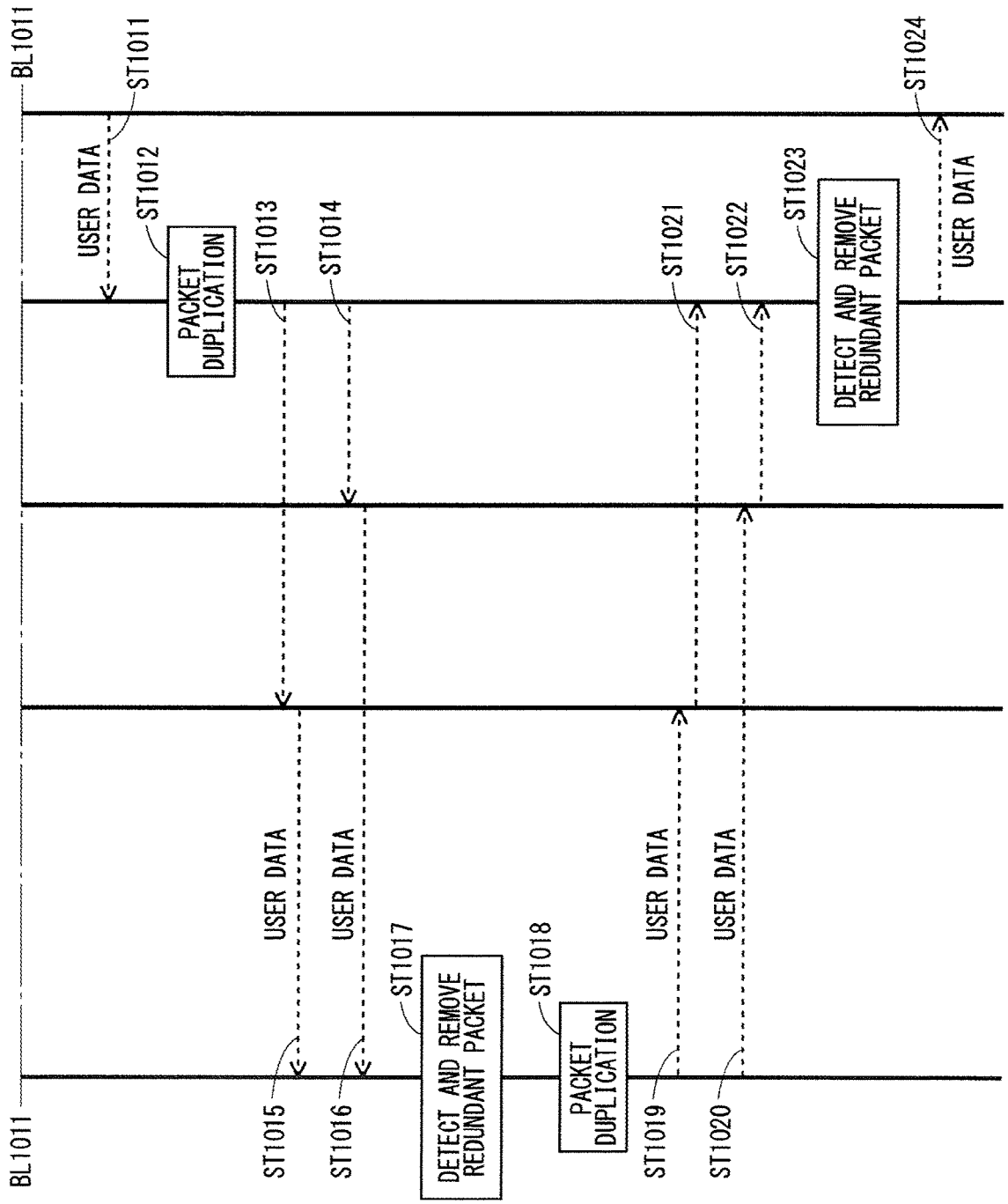
FIG. 11 illustrates the sequence for starting transmission and reception of duplicated packets in the communication between the CU and the UE according to the first embodiment.

FIGS. 10 and 11 illustrate a sequence for starting transmission and reception of duplicated packets in the communication between the CU and the UE. FIGS. 10 and 11 are connected across a location of a border BL1011. FIGS. 10 and 11 illustrate an example of switching from the communication using the DU #1 to the communication with application of duplicated packets using the DU #1 and the DU #2.

Steps ST1000, ST1001, and ST1002 of FIG. 10 indicate transmission and reception of the user data between a high-level NW device and the UE. In Step ST1000, the user data is transmitted and received between the high-level NW device and the CU. In Step ST1001, the user data is transmitted and received between the CU and the DU #1. In Step ST1002, the user data is transmitted and received between the DU #1 and the UE.

In Steps ST1003 and ST1004 of FIG. 10, the CU notifies the UE of the signaling for RRC connection reconfiguration. The CU transmits the notification to the DU #1 in Step ST1003, and the DU #1 transmits the notification to the UE in Step ST1004. The notification includes information indicating addition of the DU #2, and information indicating start of packet duplication. The notification also includes information on the RRC parameter for the DU #2-corresponding entity. The notification may include information on the RRC parameter for the DU #1-corresponding entity. The UE sets the RRC parameter for packet duplication and communication with the DU #2, using the information received in Step ST1004.

In Steps ST1005 and ST1006 of FIG. 10, the UE transmits an RRC connection reconfiguration complete notification to the CU. The UE transmits the notification to the DU #1 in Step ST1005, and the DU #1 transmits the notification to the CU in Step ST1006.

In Step ST1007 of FIG. 10, the CU notifies the DU #2 of an instruction for starting communication. The instruction may include the RRC parameter. The instruction may also include information indicating that a packet is to be duplicated. In response to the instruction, the DU #2 sets the RRC parameter for transmitting and receiving data to and from the UE.

In Step ST1008 of FIG. 10, the DU #2 notifies the CU of a response to the instruction for starting communication. The response may include information indicating completion of the setting in the DU #2.

In Steps ST1009 and ST1010 of FIG. 10, a random access procedure is performed for communication between the UE and the CU through the DU #2. Signaling is performed between the DU #2 and the CU in Step ST1009, and a radio signal is transmitted and received between the UE and the DU #2 in ST1010. Step ST1009 may represent a random access Msg3 from the DU #2 to the CU, or information, from the DU #2 to the CU, indicating the completion of the random access procedure. Step ST1009 may also represent an acknowledgement or a negative acknowledgement from the CU to the DU #2 in response to the information indicating the completion of the random access Msg3 or the random access procedure. Consequently, the reliability of the notification of the information indicating the completion of the random access Msg3 or the random access procedure can be enhanced.

In ST1010 of FIG. 10, signaling necessary for starting transmission and reception of the duplicated packets using the DU #1 and the DU #2 is completed.

Steps ST1011 to ST1017 of FIG. 11 indicate transmission and reception of the downlink user data.

In Step ST1011 of FIG. 11, the high-level network device forwards the user data to the CU. In Step ST1012, the CU duplicates the PDCP-PDU including the user data.

As illustrated in FIG. 11, the CU forwards the duplicated user data to the DU #1 and the DU #2 in Steps ST1013 and ST1014, respectively. In Step ST1015, the DU #1 transmits the user data to the UE. In Step ST1016, the DU #2 transmits the user data to the UE.

In Step ST1017 of FIG. 11, the UE detects redundancy in the user data received in Steps ST1015 and ST1016. The UE removes the user data received as redundant user data.

Steps ST1018 to ST1024 of FIG. 11 indicate transmission and reception of the uplink user data.

In Step ST1018 of FIG. 11, the UE duplicates the PDCP-PDU including the user data.

As illustrated in FIG. 11, the UE transmits the duplicated user data to the DU #1 and the DU #2 in Steps ST1019 and ST1020, respectively. In Step ST1021, the DU #1 forwards the user data to the CU. In Step ST1022, the DU #2 forwards the user data to the CU.

In Step ST1023 of FIG. 11, the CU detects redundancy in the user data received in Steps ST1021 and ST1022. The CU removes the user data received as redundant user data.

In Step ST1024 of FIG. 11, the CU forwards the received user data to the high-level network device.

Steps ST1018 to ST1024 indicating the transmission and reception of the uplink user data may be performed after or simultaneously with Steps ST1011 to ST1017 indicating the transmission and reception of the downlink user data. This increases the flexibility in transmission and reception of the user data.

The sequence for starting transmission and reception of duplicated packets between the CU and the UE in the example of FIGS. 10 and 11 does not require signaling for the high-level network device, for example, the path update procedure described in 10.1.2.8.1 of Non-Patent Document 1.

In the sequence for starting transmission and reception of duplicated packets between the CU and the UE, for example, the CU may notify the DU that is communicating with the UE of an instruction for changing communication. The DU may notify the CU of a response to the instruction for changing communication. This enables flexible change in the RRC parameter when the DU is added.

In the instruction for changing communication, the CU may also transmit, to the DU, an identifier indicating no initialization of each of the RLC layer, the MAC layer, and the PHY layer during communication. This can prevent interruption of communication due to discard of data caused by the initialization.

Figure 12:
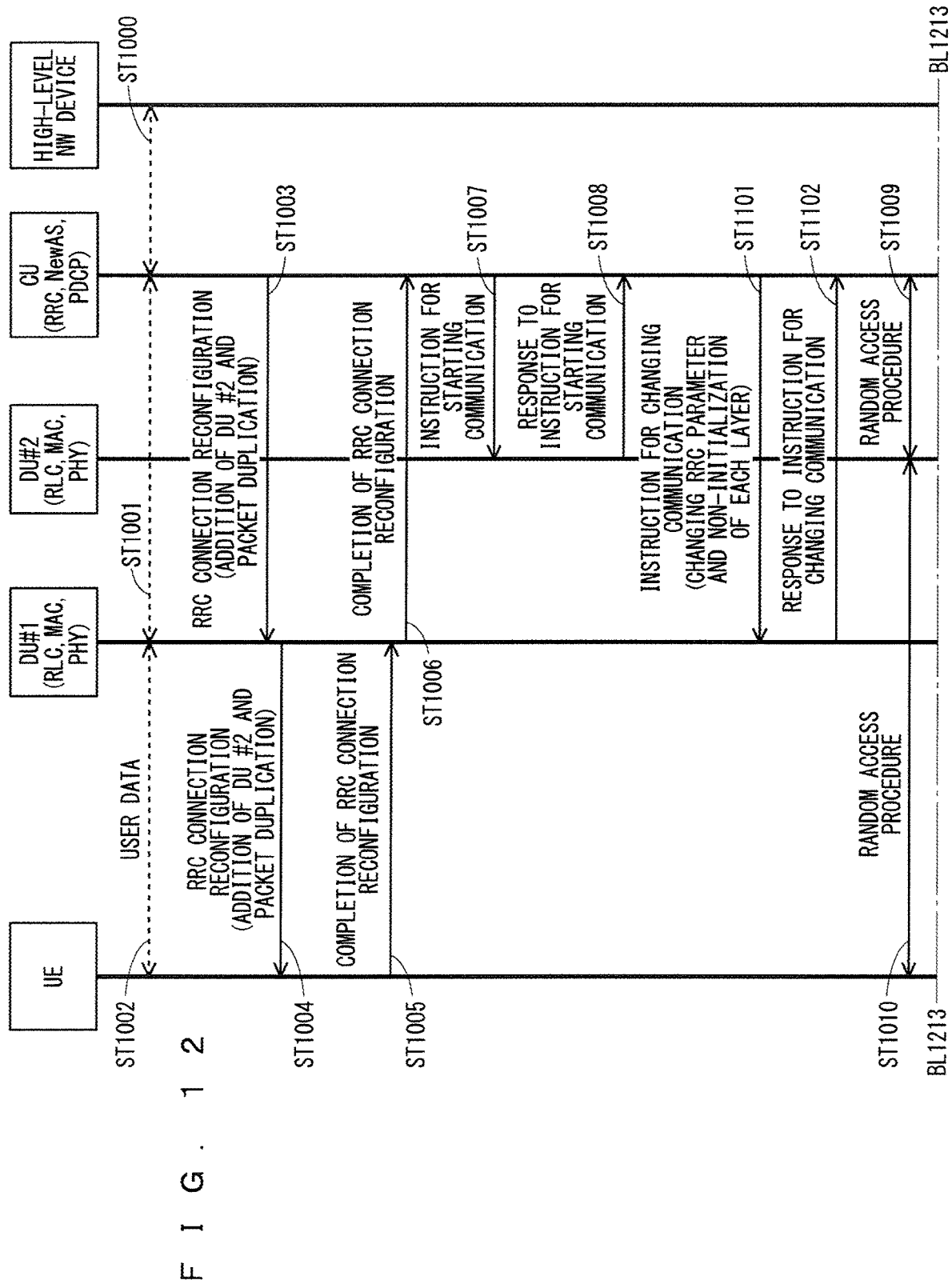
FIG. 12 illustrates another sequence for starting transmission and reception of duplicated packets in the communication between the CU and the UE according to the first embodiment.
Figure 13:
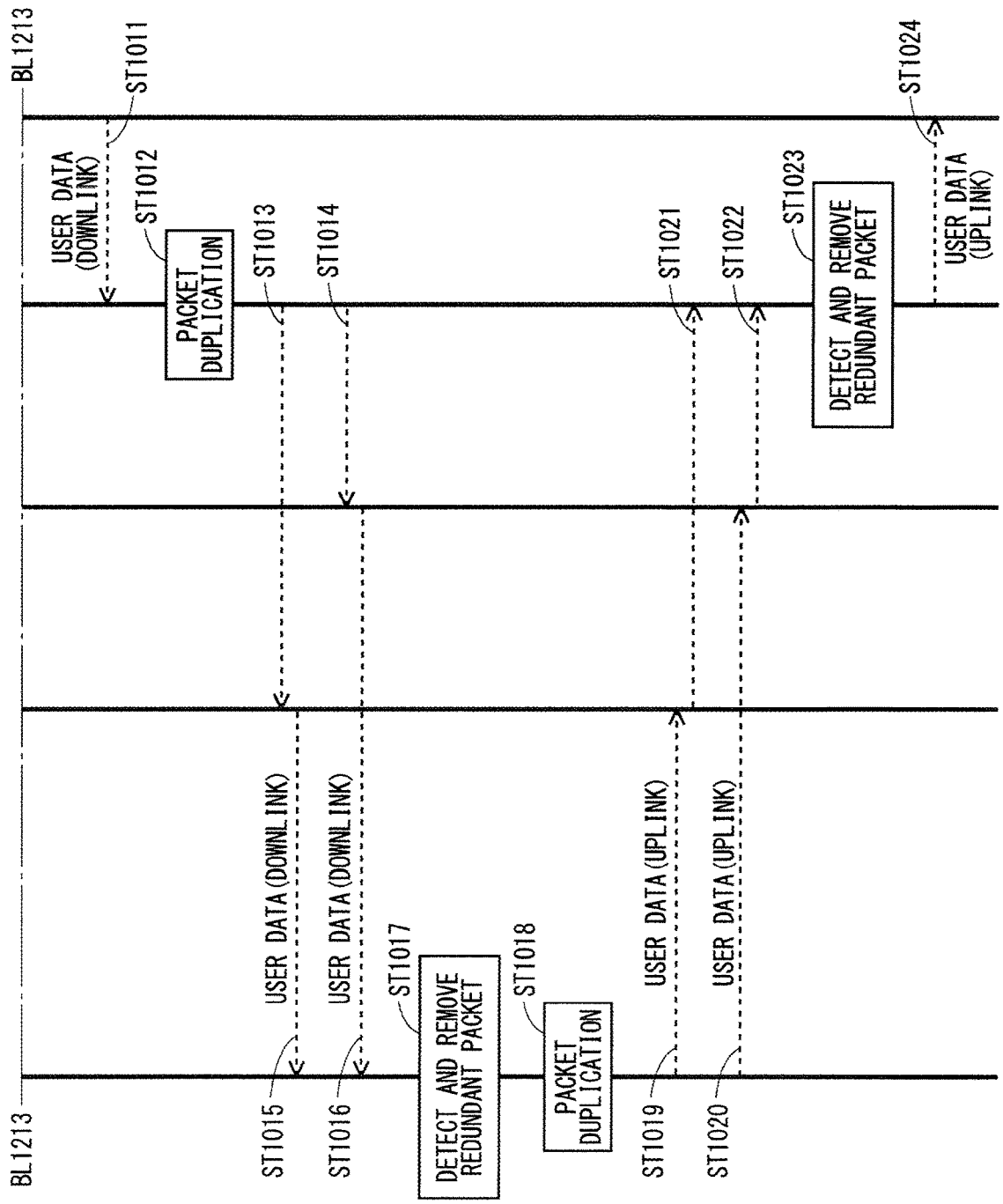
FIG. 13 illustrates another sequence for starting transmission and reception of duplicated packets in the communication between the CU and the UE according to the first embodiment.

FIGS. 12 and 13 illustrate another sequence for starting transmission and reception of duplicated packets in the communication between the CU and the UE. FIGS. 12 and 13 are connected across a location of a border BL1213. In FIGS. 12 and 13, the same step numbers are assigned to the same Steps as those in FIGS. 10 and 11, and the common description thereof is omitted.

In Step ST1101 of FIG. 12, the CU notifies the DU #1 of an instruction for changing communication. The instruction may include an instruction for changing the RRC parameter. Further, an identifier indicating no initialization of each layer should be added to the instruction. The DU #1 changes the RRC parameter for the UE, using the information received in Step ST1101.

In Step ST1102 of FIG. 12, the DU #1 notifies the CU of a response to the instruction for changing communication. The response includes information indicating the completion of the setting in the DU #1.

The application of the sequence illustrated in FIGS. 12 and 13 enables flexible setting of a communication channel according to addition of the DU.

In another sequence for starting transmission and reception of duplicated packets between the CU and the UE, the RRC connection reconfiguration from the CU to the UE may be performed after a response to the instruction for starting communication. The RRC connection reconfiguration may be performed upon receipt of an acknowledgement from the DU to be added in a response to the instruction for starting communication. Even upon failure of the processing by the DU in a response to the instruction for starting communication, re-execution of the RRC connection reconfiguration can be prevented. The time from the RRC connection reconfiguration to the random access procedure in the UE can be shortened.

Figure 14:
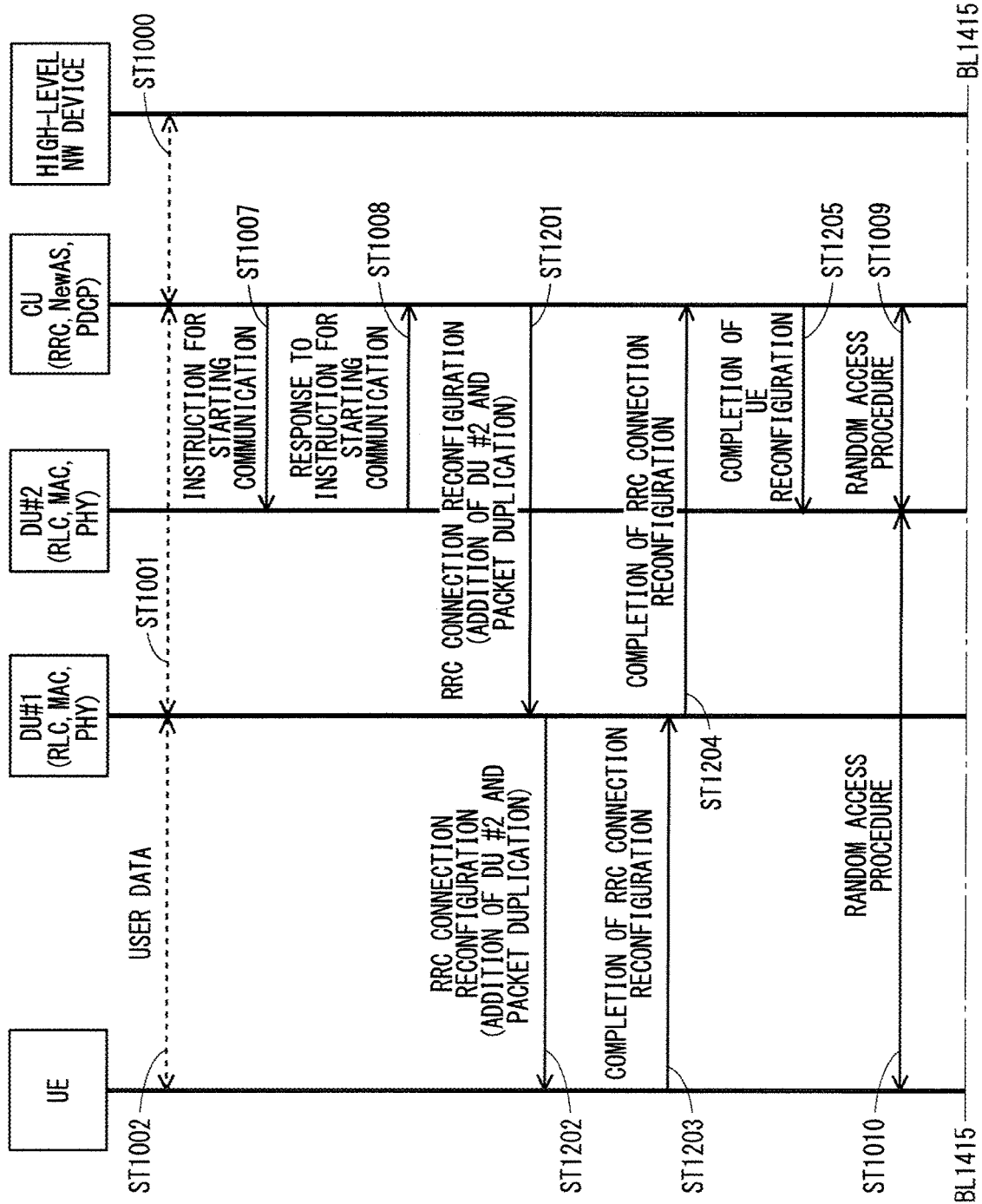
FIG. 14 is a sequence diagram when the RRC connection reconfiguration is performed after a response to an instruction for starting communication according to the first embodiment.
Figure 15:
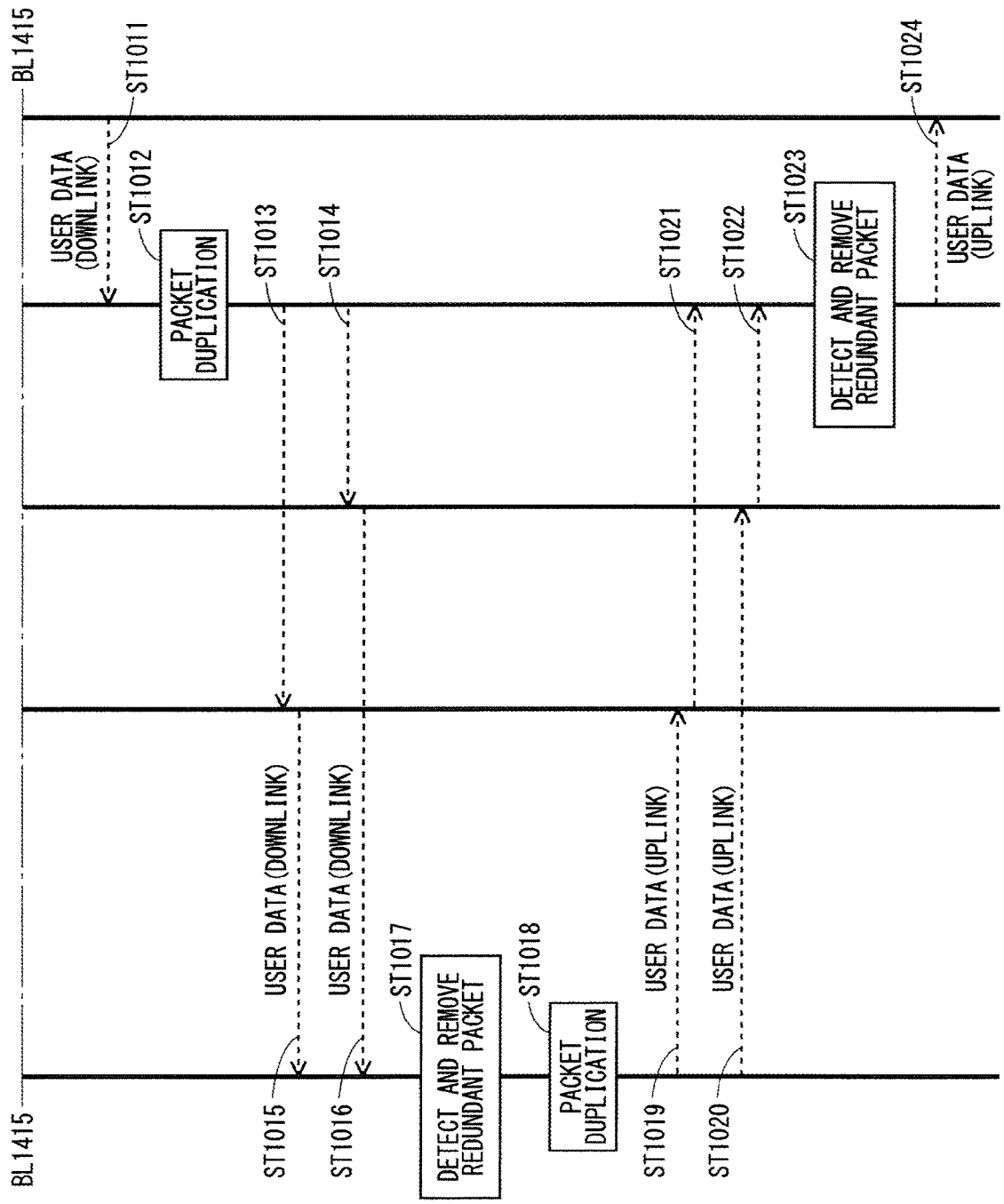
FIG. 15 is the sequence diagram when the RRC connection reconfiguration is performed after a response to an instruction for starting communication according to the first embodiment.

FIGS. 14 and 15 illustrate a sequence for starting transmission and reception of duplicated packets between the CU and the UE when the RRC connection reconfiguration is performed after a response to the instruction for starting communication. FIGS. 14 and 15 are connected across a location of a border BL1415. In FIGS. 14 and 15, the same step numbers are assigned to the same Steps as those in FIGS. 10 and 11, and the common description thereof is omitted.

In Steps ST1201 and ST1202 of FIG. 14, the CU notifies the UE of the signaling for the RRC connection reconfiguration. Steps ST1201 and ST1202 may be identical to Steps ST1003 and ST1004 in FIG. 10, respectively. The UE sets the RRC parameter for packet duplication and communication with the DU #2, using the information received in Step ST1202.

In Steps ST1203 and ST1204 of FIG. 14, the UE transmits an RRC connection reconfiguration complete notification to the CU. Steps ST1203 and ST1204 may be identical to Steps ST1005 and ST1006 in FIG. 10, respectively.

In Step ST1205 of FIG. 14, the CU notifies the DU #2 of completion of the RRC connection reconfiguration for the UE. The DU #2 starts the random access procedure with the UE using the notification.

The sequence illustrated in FIG. 14 is different from that illustrated in FIG. 10 in that Step ST1201 is performed after Step ST1008. Even upon failure of the processing by the DU in a response to the instruction for starting communication, re-execution of the RRC connection reconfiguration can be prevented. The time from the RRC connection reconfiguration to the random access procedure in the UE can be shortened.

In an alternative example sequence for starting transmission and reception of duplicated packets in the communication between the CU and the UE, the CU may instruct each DU and the UE without waiting for responses from the DU and the UE. Consequently, the processing for adding the DU can be expedited.

Figure 16:
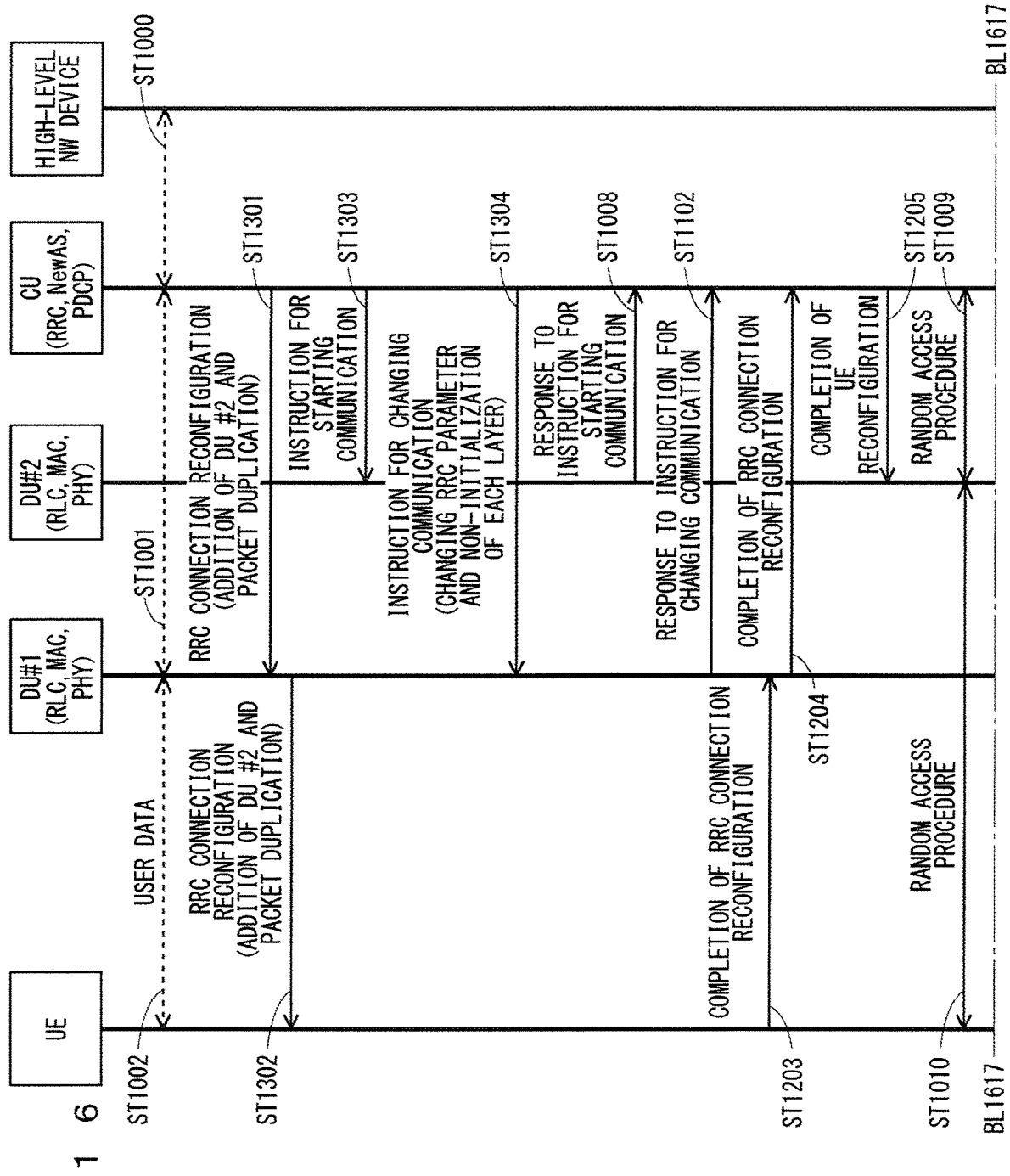
FIG. 16 illustrates a sequence when the CU instructs each of DUs and the UE without waiting for responses from the DUs and the UE according to the first embodiment.
Figure 17:
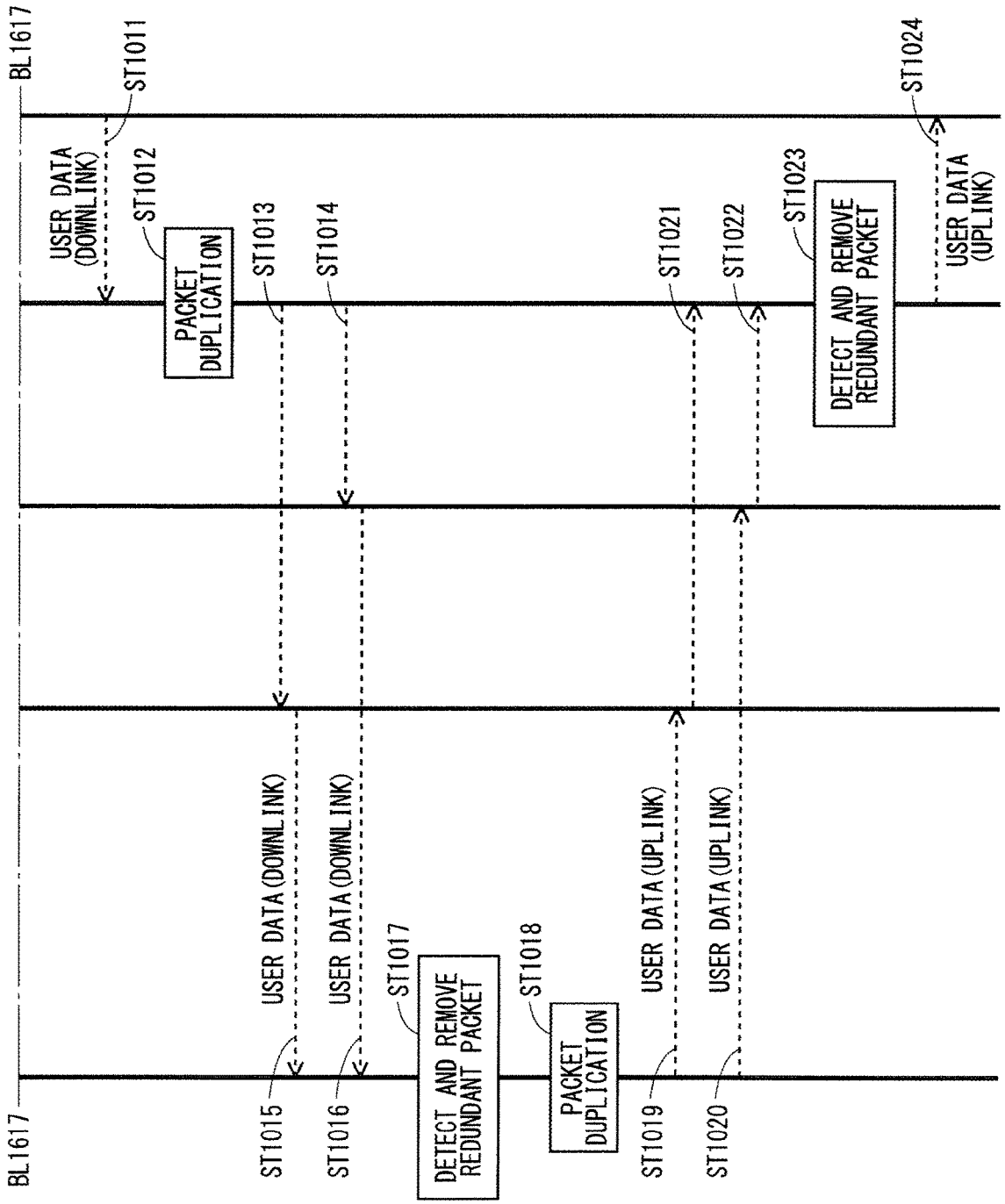
FIG. 17 illustrates the sequence when the CU instructs each of DUs and the UE without waiting for responses from the DUs and the UE according to the first embodiment.

FIGS. 16 and 17 illustrate a sequence for starting transmission and reception of duplicated packets between the CU and the UE when the CU instructs each of DUs and the UE without waiting for responses from the DUs and the UE. FIGS. 16 and 17 are connected across a location of a border BL1617. In FIGS. 16 and 17, the same step numbers are assigned to the same Steps as those in FIGS. 10 and 11, and the common description thereof is omitted.

In Steps ST1301 and ST1302 of FIG. 16, the CU notifies the UE of the signaling for the RRC connection reconfiguration. Steps ST1301 and ST1302 may be identical to Steps ST1003 and ST1004 in FIG. 10, respectively. The UE sets the RRC parameter for packet duplication and communication with the DU #2, using the information received in Step ST1302.

In Step ST1303 of FIG. 16, the CU notifies the DU #2 of an instruction for starting communication. Step ST1303 may be identical to Step ST1007 in FIG. 10. The DU #2 sets the RRC parameter for transmitting and receiving data to and from the UE, using the information received in Step ST1303.

In Step ST1304 of FIG. 16, the CU notifies the DU #1 of an instruction for changing communication. Step ST1304 may be identical to Step ST1101 in FIG. 12. The DU #1 changes the RRC parameter for the UE, using the information received in Step ST1304.

The orders of Steps ST1301, ST1303, and ST1304 in FIG. 16 may be different from one another. This can bring flexibility in the operations of the CU.

Since the CU issues the instructions without waiting for responses from each DU and the UE according to the sequence illustrated in FIGS. 16 and 17, the processing for adding the DU can be expedited.

The CU may notify the DU of an instruction for stopping communication. The instruction for stopping communication may be issued upon stop of packet duplication. The DU may notify the CU of a response to the instruction for stopping communication. This enables a smooth continuation of communication before and after the stop of packet duplication.

The CU may notify the UE of the RRC connection reconfiguration. The CU may notify the RRC connection reconfiguration upon stop of packet duplication. The RRC connection reconfiguration may include information indicating release of the DU. The UE may notify the CU of completion of the RRC connection reconfiguration. This enables a smooth continuation of communication before and after the stop of packet duplication. The RRC connection reconfiguration may include information indicating cancellation of the packet duplication. Alternatively, the RRC connection reconfiguration need not include the information indicating cancellation of the packet duplication. Consequently, the number of the use DUs can be reduced while the packet duplication is maintained.

The CU may communicate the RRC connection reconfiguration to the UE using the DU that is not released. Consequently, the CU can notify the RRC connection reconfiguration with high reliability. Alternatively, the CU may notify the RRC connection reconfiguration using the DU to be released. Consequently, the overhead in the DU that is not released can be reduced.

Figure 18:
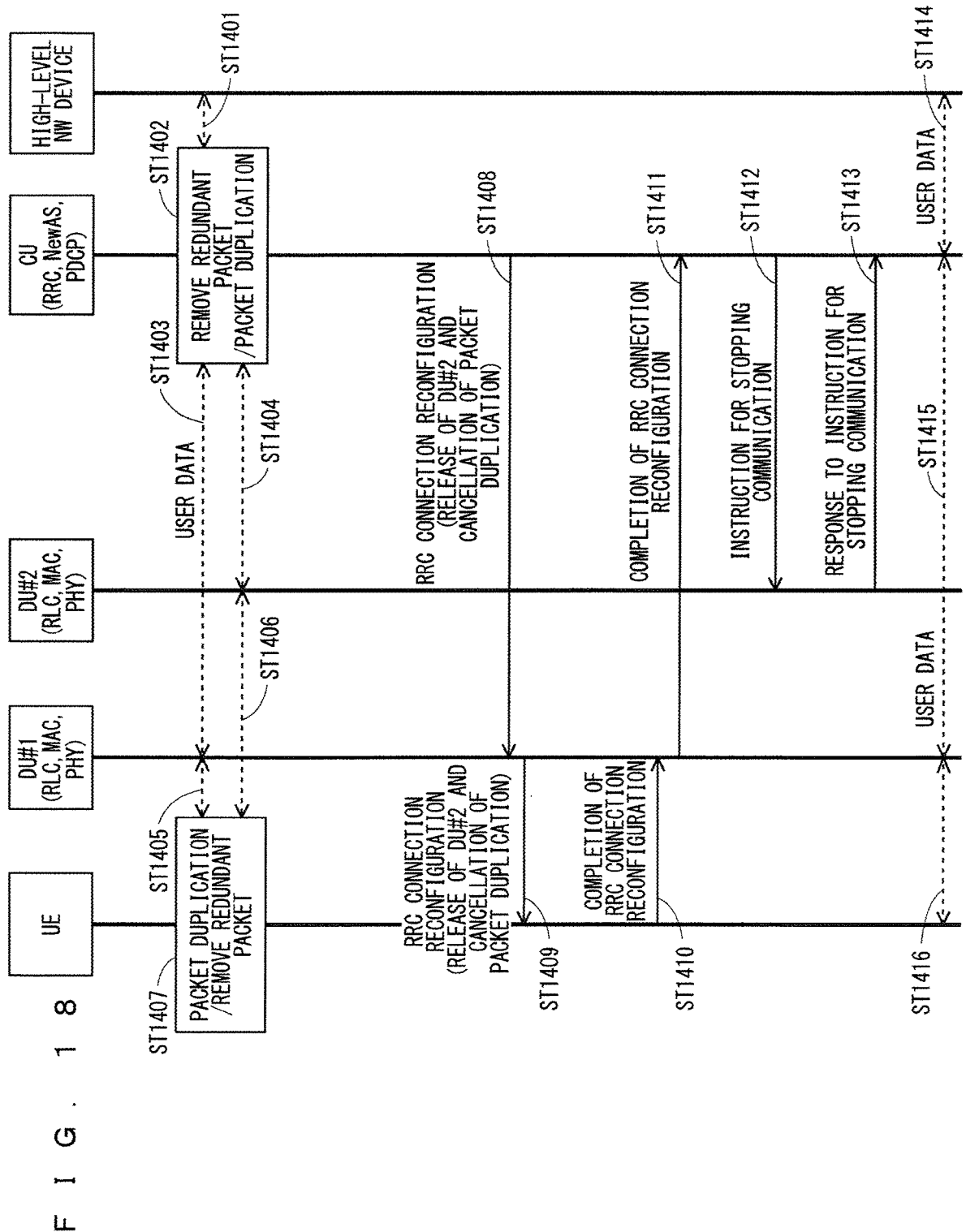
FIG. 18 illustrates a sequence for stopping transmission and reception of duplicated packets in the communication between the CU and the UE according to the first embodiment.

FIG. 18 illustrates a sequence for stopping transmission and reception of duplicated packets in the communication between the CU and the UE. FIG. 18 illustrates an example of switching from the communication with application of duplicated packets using the DU #1 and the DU #2 to the communication using the DU #1.

Steps ST1401 to ST1407 of FIG. 18 indicate user data communication using packet duplication. In Step ST1401, the high-level network device transmits and receives the user data to and from the CU. In Step ST1402, the CU duplicates a packet of the downlink user data, detects a redundant packet of the uplink user data, and removes the redundant packet. In Steps ST1403 and ST1404, the CU transmits and receives the duplicated user data to and from the DU #1 and the DU #2, respectively. In Steps ST1405 and ST1406, the UE transmits and receives the duplicated user data to and from the DU #1 and the DU #2, respectively. In Step ST1407, the UE duplicates a packet of the uplink user data, detects a redundant packet of the downlink user data, and removes the redundant packet.

Steps ST1408 to ST1413 of FIG. 18 indicate signaling for stopping the packet duplication.

In Steps ST1408 and ST1409 of FIG. 18, the CU notifies the UE of the signaling for the RRC connection reconfiguration. The CU transmits the notification to the DU #1 in Step ST1408, and the DU #1 transmits the notification to the UE in Step ST1409. The notification includes information indicating release of communication with the DU #2, and information indicating stop of packet duplication. The notification may include information on the RRC parameter for the DU #1-corresponding entity. The UE sets the RRC parameter for the stop of packet duplication and the release of communication with the DU #2, using the information received in Step ST1409.

In Steps ST1408 and ST1409 of FIG. 18, the notification from the CU to the UE may include information instructing change in the RRC parameter for communication with the DU #1. The UE may change the setting of the RRC parameter for communication with the DU #1, using the information received in Step ST1409. Consequently, the CU can flexibly set the communication with the DU #1 to correspond to the release of the communication with the DU #2.

In Steps ST1410 and ST1411 of FIG. 18, the UE transmits an RRC connection reconfiguration complete notification to the CU. The UE transmits the notification to the DU #1 in Step ST1410, and the DU #1 transmits the notification to the CU in Step ST1411.

In Step ST1412 of FIG. 18, the CU notifies the DU #2 of an instruction for stopping communication. The instruction includes information indicating termination of use of the DU #2 in the communication with the UE.

In Step ST1413 of FIG. 18, the DU #2 notifies the CU of a response to the instruction for stopping communication. The response includes information indicating completion of processing for stopping communication in the DU #2.

In Steps ST1414 to ST1416 of FIG. 18, the CU transmits and receives the user data to and from the UE through the DU #1. In Step ST1414, the high-level network device transmits and receives the user data to and from the CU. In Step ST1415, the CU transmits and receives the user data to and from the DU #1. In Step ST1416, the UE transmits and receives the user data to and from the DU #1.

The stop of the packet duplication indicated in Steps ST1414 to ST1416 of FIG. 18 may be performed before and after the response to the instruction for stopping communication in Step ST1413. The stop of the packet duplication before the response to the instruction for stopping communication enables earlier release of unnecessary communication resources and efficient communication. The stop of the packet duplication after the response to the instruction for stopping communication can enhance the reliability of the user data communication before and after the signaling for stopping the packet duplication.

The CU may use a combination of the instruction for starting communication and the instruction for stopping communication. This combination may be used for switching between the use DUs. The CU may integrate notifications of the RRC connection reconfiguration into one and give the one notification to the UE. This allows smooth switching between the use DUs and also reduction in the amount of signaling.

The CU may add or delete the use DUs one by one. In other words, the CU may notify each of the DUs of an instruction for starting communication or an instruction for stopping communication. This facilitates restoration from a failure in a sequence for adding or deleting the use DUs.

Alternatively, the CU may collectively add or delete the use DUs. The CU may integrate notifications of the RRC connection reconfiguration into one and give the one notification to the UE. Consequently, the amount of signaling can be reduced.

The CU and the UE may communicate through a plurality of DUs in communication in the C-Plane, similarly as in the U-Plane. The packet duplication may be applied to the communication through a plurality of DUs, similarly as in the U-Plane. Consequently, reliability of the signaling between the CU and the UE can be enhanced. The signaling may be the NAS signaling, the RRC signaling, or the PDCP control PDU. Consequently, reliability of the signaling in each layer can be enhanced.

Figure 19:
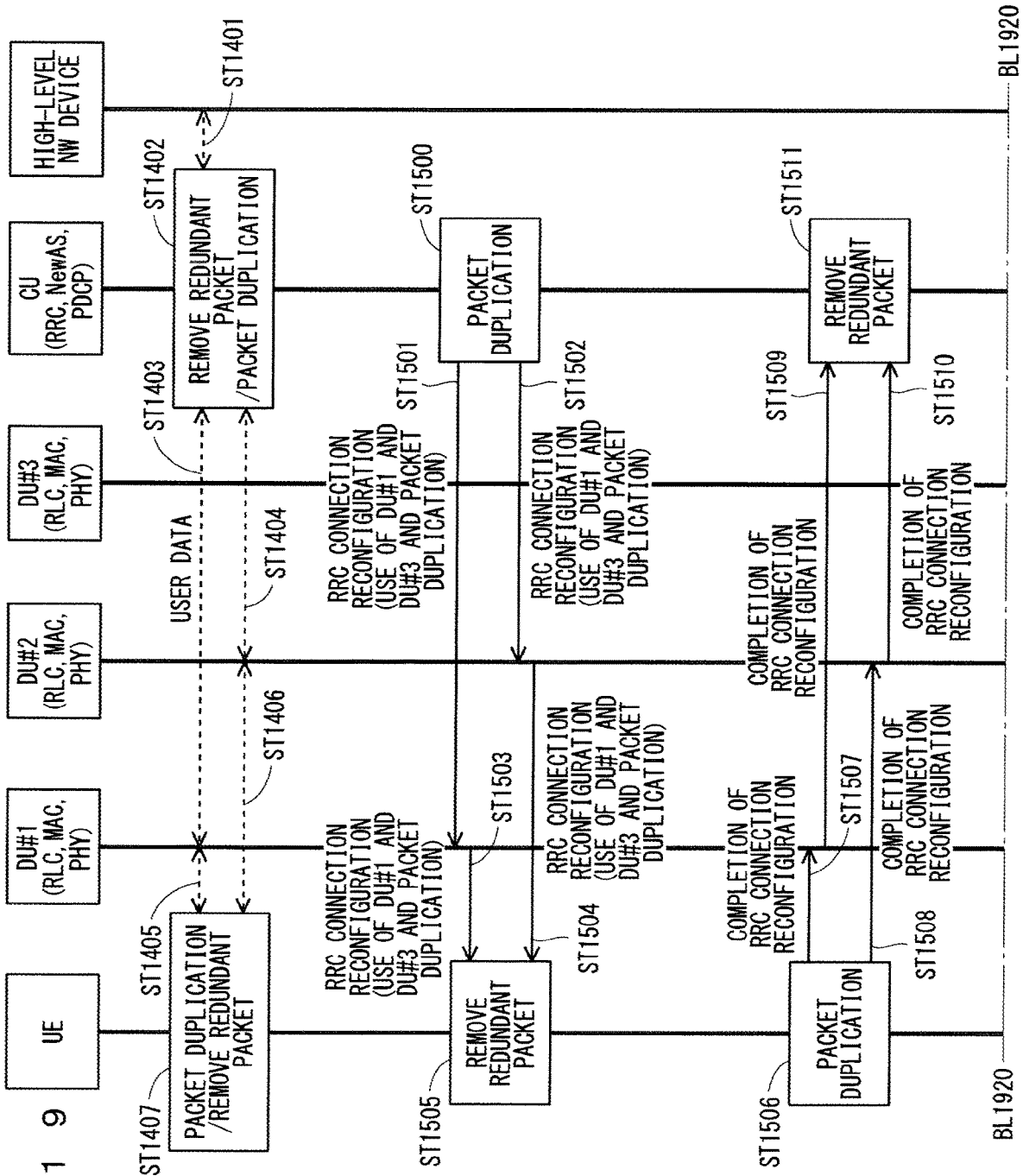
FIG. 19 is a sequence diagram illustrating switching between the use DUs and communication using a plurality of DUs in the C-Plane according to the first embodiment.
Figure 20:
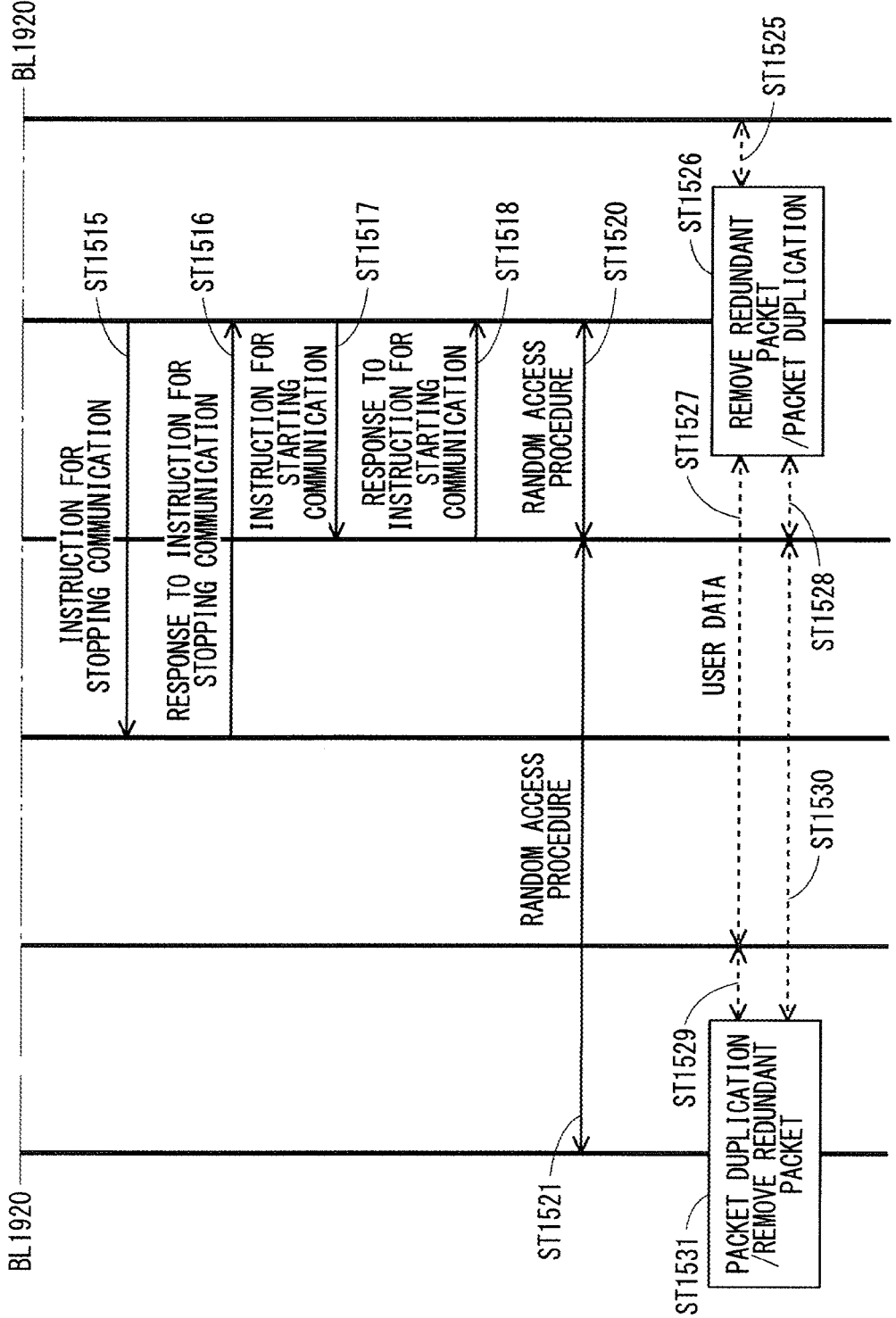
FIG. 20 is the sequence diagram illustrating switching between the use DUs and communication using a plurality of DUs in the C-Plane according to the first embodiment.

FIGS. 19 and 20 illustrate a sequence diagram of switching between the use DUs and communication using a plurality of DUs in the C-Plane. FIGS. 19 and 20 are connected across a location of a border BL1920. FIGS. 19 and 20 illustrate an example of switching the use DUs from the DU #1 and the DU #2 to the DU #1 and the DU #3. In FIGS. 19 and 20, the same step numbers are assigned to the same Steps as those in FIG. 18, and the common description thereof is omitted.

Steps ST1500 to ST1505 in FIG. 19 indicate a sequence on the signaling for the RRC connection reconfiguration to be notified from the CU to the UE, specifically, a sequence on duplication and notification of a packet for the signaling. In Step ST1500, the CU duplicates a packet for signaling the RRC connection reconfiguration which has been generated by its own CU. The CU may duplicate the packet in the PDCP layer. The signaling for the RRC connection reconfiguration may include information on change in the use DUs (switching to using the DU #1 and the DU #3 in the example of FIGS. 19 and 20) and information indicating validation of packet duplication. In Steps ST1501 and ST1502, the CU forwards the duplicated signalings to the DU #1 and the DU #2, respectively. In Steps ST1503 and ST1504, the DU #1 and the DU #2, respectively, notify the signalings to the UE. In Step ST1505, the UE detects redundancy in the received signalings. Further, the UE removes the redundant signaling. The UE may detect and remove the redundant signaling in the PDCP layer. The UE changes the RRC parameter and the use DU, using the remaining signaling.

Steps ST1506 to ST1511 in FIG. 19 indicate a sequence on the signaling for completion of the RRC connection reconfiguration to be notified from the UE to the CU, specifically, a sequence on duplication and notification of a packet for the signaling. In Step ST1506, the UE duplicates a packet for the signaling for completion of the RRC connection reconfiguration which has been generated by its own CU. The UE may duplicate the packet in the PDCP layer. In Steps ST1507 and ST1508, the UE transmits the duplicated signalings to the DU #1 and the DU #2, respectively. In Steps ST1509 and ST1510, the DU #1 and the DU #2, respectively, forward the signalings to the CU. In Step ST1511, the CU detects redundancy in the received signalings. Further, the CU removes the redundant signaling. The CU may detect and remove the redundant signaling in the PDCP layer. The CU recognizes that the UE has completed the RRC connection reconfiguration, using the remaining signaling.

In Step ST1515 of FIG. 20, the CU notifies the DU #2 of an instruction for stopping communication. The notification includes information indicating termination of use of the DU #2 in the communication with the UE.

In Step ST1516 of FIG. 20, the DU #2 notifies the CU of a response to the instruction for stopping communication. The response includes information indicating completion of processing for stopping communication in the DU #2.

In Step ST1517 of FIG. 20, the CU notifies the DU #3 of an instruction for starting communication. Step ST1517 may be identical to Step ST1007 in FIG. 10. The DU #3 sets the RRC parameter for transmitting and receiving data to and from the UE, using the information received in Step ST1517.

In Step ST1518 of FIG. 20, the DU #3 notifies the CU of a response to the instruction for starting communication. The response may include information indicating completion of the setting in the DU #3.

In Steps ST1520 and ST1521 of FIG. 20, a random access procedure is performed for communication between the UE and the CU through the DU #3. Signaling is performed between the DU #3 and the CU in Step ST1520, and a radio signal is transmitted and received between the UE and the DU #3 in ST1521. Steps ST1520 and ST1521 may be identical to Steps ST1009 and ST1010 in FIG. 10, respectively.

In Steps ST1520 and ST1521 of FIG. 20, signaling necessary for switching the use DUs from the DU #1 and the DU #2 to the DU #1 and the DU #3 is completed.

Steps ST1525 to ST1531 in FIG. 20 indicate transmission and reception of the user data through packet duplication using the DU #1 and the DU #3.

In Step ST1525 of FIG. 20, the high-level network device transmits and receives the user data to and from the CU. In Step ST1526, the CU duplicates a packet of the downlink user data, detects a redundant packet of the uplink user data, and removes the redundant packet. In Steps ST1527 and ST1528, the CU transmits and receives the duplicated user data to and from the DU #1 and the DU #3, respectively. In Steps ST1529 and ST1530, the UE transmits and receives the duplicated user data to and from the DU #1 and the DU #3, respectively. In Step ST1531, the UE duplicates a packet of the uplink user data, detects a redundant packet of the downlink user data, and removes the redundant packet.

In FIG. 20, the sequence for the instruction for starting communication with the DU #3 in Step ST1517 and the response to the instruction for starting communication in Step ST1518 may be performed before the instruction for stopping communication is issued to the DU #2 in Step ST1515. Issuance of the instruction for starting communication before the instruction for stopping communication enables the UE to expedite the random access procedure through the DU #3.

In FIG. 20, the sequence for the instruction for stopping communication with the DU #2 in Step ST1515 and the response to the instruction for stopping communication in Step ST1516 and a sequence for the instruction for starting communication with the DU #3 in Step ST1517 and the response to the instruction for starting communication in Step ST1518 may be performed before a sequence for the RRC connection reconfiguration in Steps ST1500 to ST1505. This can prevent re-execution of the RRC connection reconfiguration caused by failure of the instruction for stopping or starting communication.

The UE may notify the CU of the failure of the RRC connection reconfiguration. The notification may include a reason for the failure. The reason for the failure may be, for example, a shortage of the resources in the UE, disabled communication with the DU, or another reason. The CU may proceed with the processing using the reason for the failure. The processing may be, for example, the use of another DU. Consequently, the CU and the UE can prevent the abort of the sequence due to the failure of the RRC connection reconfiguration, and the relevant termination of operations.

The UE and the CU may continue communication using a parameter used before the notification of the RRC connection reconfiguration. The UE and the CU may continue communication when the UE notifies the CU of a failure of the RRC connection reconfiguration. The UE may maintain an RRC_CONNECTED state in the continuation of the communication. The UE need not notify the CU of a request for the RRC connection re-establishment. Consequently, the communication between the UE and the CU can be maintained.

The notification of the RRC connection reconfiguration from the CU to the UE may include an identifier specifying an operation of the UE upon failure of the RRC connection reconfiguration. The identifier may include information on whether the RRC_CONNECTED state is maintained or information indicating whether the UE needs to notify the CU of a request for the RRC connection re-establishment. Consequently, the UE can easily determine whether to continue communication upon failure of the RRC connection reconfiguration. Alternatively, the UE may determine an operation of its own UE, using an identifier indicating the presence or absence of packet duplication. This enables reduction in the number of bits for the signaling for the RRC connection reconfiguration. Moreover, the UE can easily determine whether to continue communication upon failure of the RRC connection reconfiguration.

The notification of the failure of the RRC connection reconfiguration and the RRC connection reconfiguration complete notification, which are given from the UE to the CU, may be integrated into one notification. The integrated notification may have an identifier indicating completion or failure of the RRC connection reconfiguration. Alternatively, an identifier indicating a reason for a failure of the RRC connection reconfiguration may include indication of completion of the RRC connection reconfiguration. For example, 0 that is a value indicating a reason for the failure may be allocated to the completion of the RRC connection reconfiguration. Since this reduces the types of signaling, the processing in the UE and the CU is facilitated.

Figure 22:
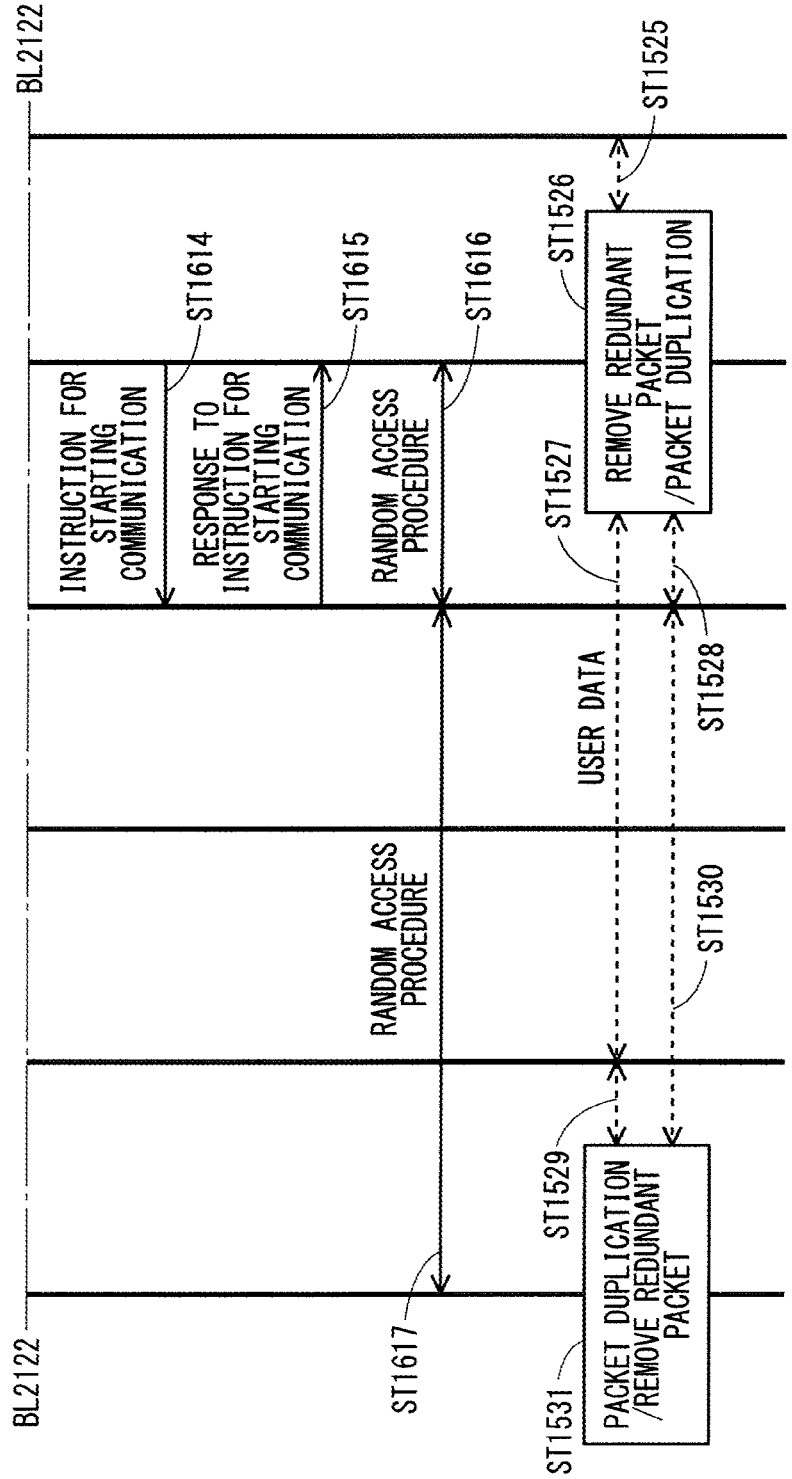
FIG. 22 is the sequence diagram illustrating operations upon failure of the RRC connection reconfiguration according to the first embodiment.

FIGS. 21 and 22 illustrate a sequence diagram of operations upon failure of the RRC connection reconfiguration. FIGS. 21 and 22 are connected across a location of a border BL2122. FIGS. 21 and 22 illustrate an example where an RRC connection reconfiguration for communication between the CU and the UE using the DU #2 fails and an RRC connection reconfiguration for communication between the CU and the UE using the DU #3 is completed. In FIGS. 21 and 22, the same step numbers are assigned to the same Steps as those in FIGS. 10 and 11 and FIGS. 19 and 20, and the common description thereof is omitted.

In Steps ST1601 and ST1602 of FIG. 21, the UE notifies the CU of the failure of the RRC connection reconfiguration. The notification may include a reason for the failure. In the example of FIG. 21, the notification includes unavailability of the DU #2 by the UE as a reason for the failure. In the example of FIG. 21, the CU may include, in an instruction for the RRC connection reconfiguration, an instruction for using a DU other than the DU #2 upon failure. Alternatively, the CU may include, in the instruction for the RRC connection reconfiguration, an instruction for reusing the DU #2 after a lapse of a certain time upon failure. Consequently, the CU can flexibly select the DU even upon failure of the RRC connection reconfiguration.

In Steps ST1610 and ST1611 of FIG. 21, the CU notifies the UE of the signaling for the RRC connection reconfiguration. The notification is the same as that in Steps ST1003 and ST1004 of FIG. 10 except for the details indicating that the use DU is the DU #3.

In Step ST1614 of FIG. 22, the CU notifies the DU #3 of an instruction for starting communication. Step ST1614 may be identical to Step ST1007 in FIG. 10. The DU #3 sets the RRC parameter for transmitting and receiving data to and from the UE, using the information received in Step ST1614.

In Step ST1615 of FIG. 22, the DU #3 notifies the CU of a response to the instruction for starting communication. Step ST1615 may be identical to Step ST1008 in FIG. 10.

In Steps ST1616 and ST1617 of FIG. 22, a random access procedure is performed for communication between the UE and the CU through the DU #3. Signaling is performed between the DU #3 and the CU in Step ST1616, and a radio signal is transmitted and received between the UE and the DU #3 in ST1617. Steps ST1616 and ST1617 may be identical to Steps ST1009 and ST1010 in FIG. 10, respectively.

In ST1617 of FIG. 22, signaling necessary for starting transmission and reception of the duplicated packets using the DU #1 and the DU #3 is completed.

The DU may transmit, to the CU, a notification of a failure in starting communication. The notification may include a reason for the failure. The reason for the failure may be, for example, a reason described in 9.2.6 of Non-Patent Document 15 (3GPP TS 36.423 v14.2.0) or another reason. Since the reason for the failure for the DU to start communication can be notified similarly as the reason for the failure in the conventional Xn interface, the complexity in designing the CU can be avoided. The CU may proceed with the processing using the reason for the failure. The processing may be, for example, the use of another DU. Consequently, the CU and the UE can prevent the abort of the sequence due to a failure of instructing the DU to start communication, and the relevant termination of operations.

A notification of a failure of an instruction for starting communication and a notification of a response to the instruction for starting communication, which are given from the DU to the CU, may be integrated into one notification. The integrated notification may have an identifier indicating completion or failure of the instruction for starting communication. Alternatively, an identifier indicating a reason for the failure of starting communication may include indication of a response to the instruction for starting communication. For example, 0 that is a value indicating the reason for the failure may be allocated to the response to the instruction for starting communication. Since this reduces the types of signaling, the processing in the DU and the CU is facilitated.

Figure 23:
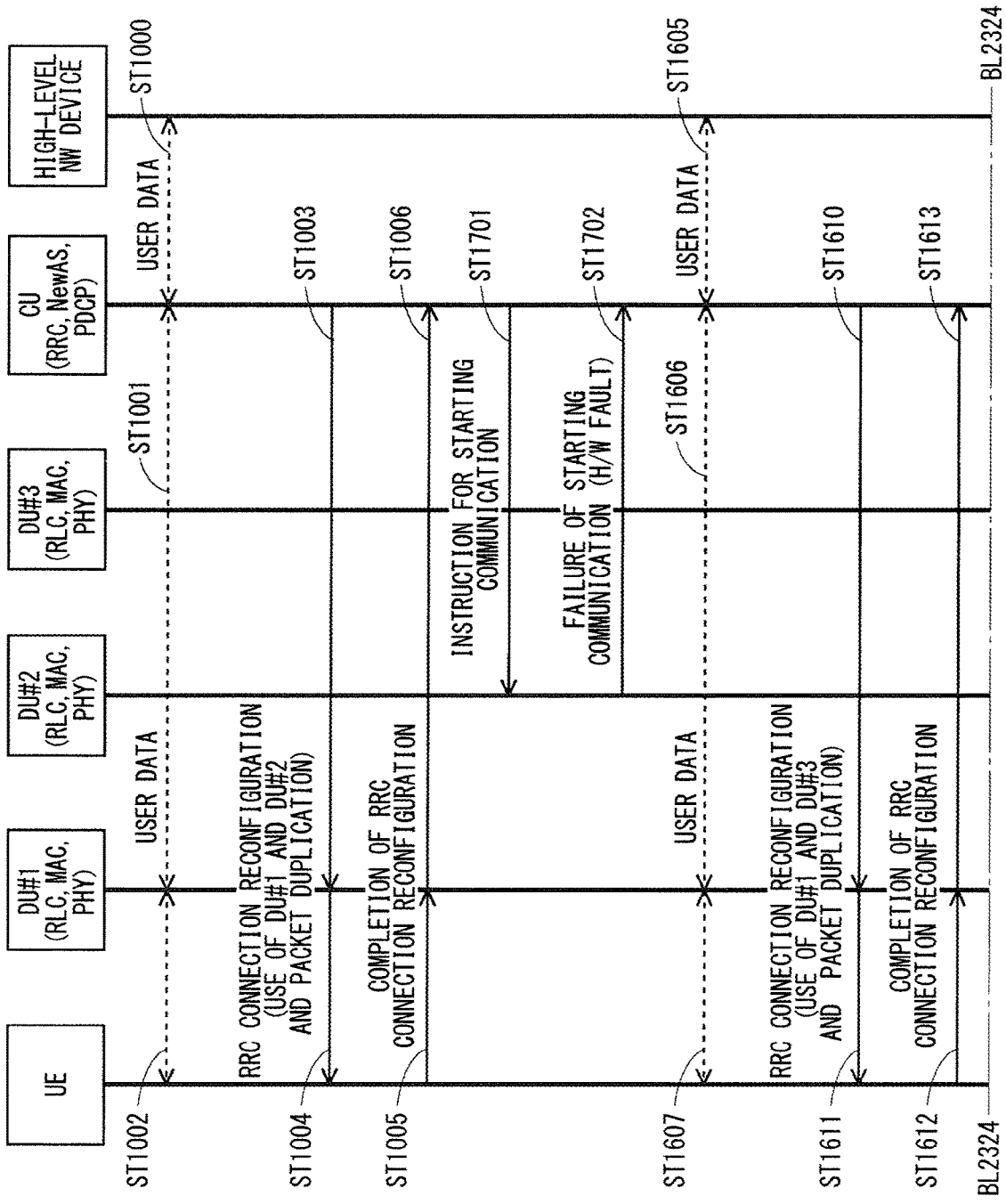
FIG. 23 is a sequence diagram illustrating operations upon failure of an instruction for starting communication according to the first embodiment.
Figure 24:
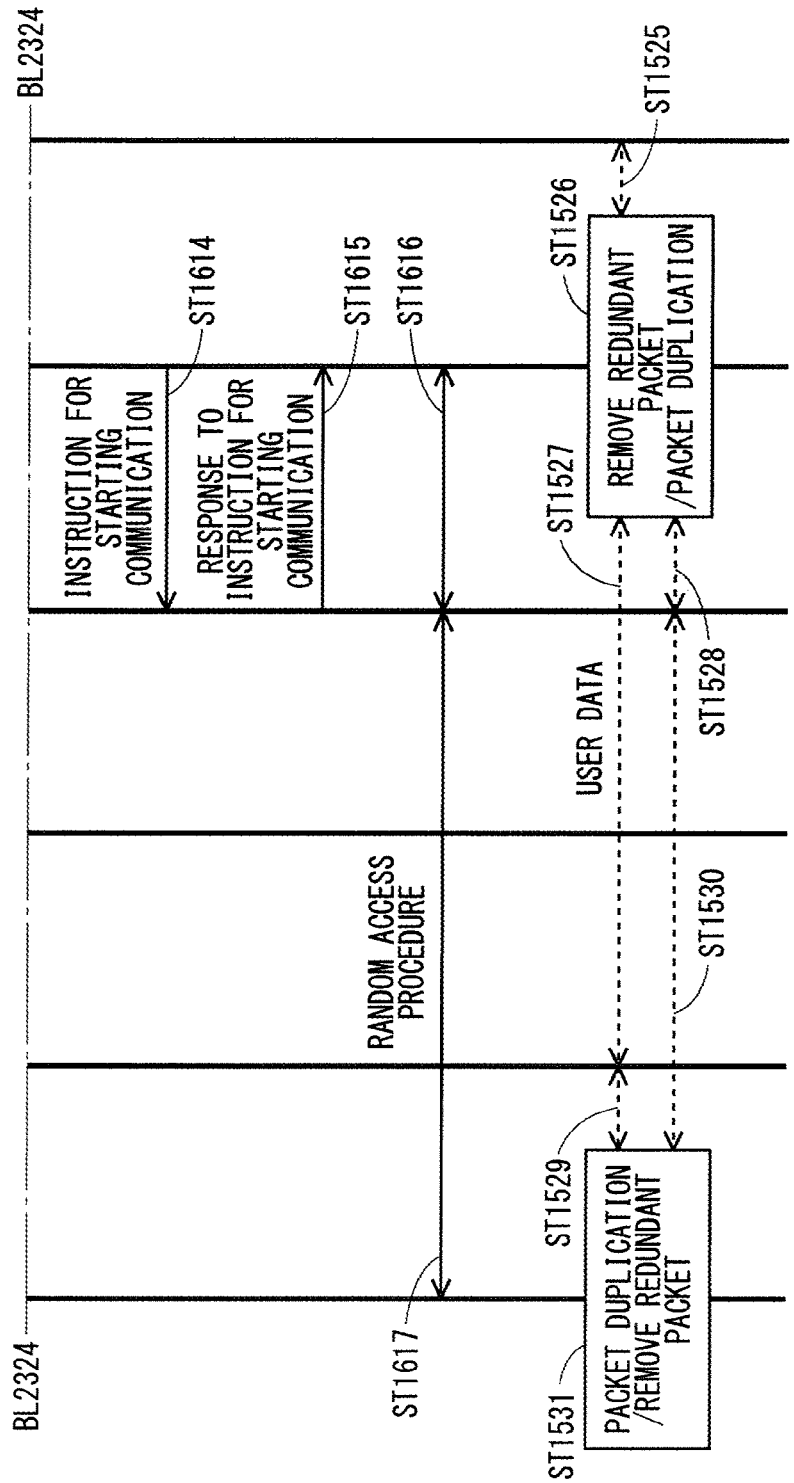
FIG. 24 is the sequence diagram illustrating operations upon failure of an instruction for starting communication according to the first embodiment.

FIGS. 23 and 24 illustrate a sequence diagram of operations upon failure of the instruction for starting communication. FIGS. 23 and 24 are connected across a location of a border BL2324. FIGS. 23 and 24 illustrate an example where an RRC connection reconfiguration for communication between the CU and the UE using the DU #2 fails and an RRC connection reconfiguration for communication between the CU and the UE using the DU #3 is completed. In FIGS. 23 and 24, the same step numbers are assigned to the same Steps as those in FIGS. 10, 11, and 19 to 22, and the common description thereof is omitted.

In Step ST1701 of FIG. 23, the CU notifies the DU #2 of an instruction for starting communication. Step ST1701 may be identical to Step ST1007 in FIG. 10. The DU #2 sets the RRC parameter for transmitting and receiving data to and from the UE, using the information received in Step ST1701.

In Step ST1702 of FIG. 23, the DU #2 notifies the CU of a failure of starting communication. The notification may include a reason for the failure. In the example of FIG. 23, the DU #2 notifies the CU of a hardware fault as a reason for the failure. The CU may select another DU as the use DU, using the information received in Step ST1702.

The CU can maintain communication with the UE by selecting another DU as the use DU, even when the CU fails to instruct the DU to start communication according to the sequence illustrated in FIGS. 23 and 24.

As an alternative example of an operation upon failure of instructing to start communication, the CU may notify the UE of an instruction for starting communication before the CU performs the RRC connection reconfiguration for the UE. In FIGS. 23 and 24, for example, Steps ST1701 and ST1614 indicating the time to start communication may be performed before Steps ST1003, ST1004, ST1610, and ST1611 indicating the RRC connection reconfiguration. Since this eliminates the need for re-execution of the RRC connection reconfiguration caused by failure of starting communication in the DU, the amount of signaling can be reduced. In the example of FIGS. 23 and 24, Steps ST1003 and ST1004 indicating the RRC connection reconfiguration and Steps ST1005 and ST1006 indicating the completion of the RRC connection reconfiguration are unnecessary.

The DU may notify the CU of a failure of stopping communication. The DU may give the notification after the CU instructs the DU to stop communication. The notification of the failure may be given in the same manner as the notification of the failure in starting communication. This can produce the same advantages as those of the notification of the failure in starting communication.

The CU may stop the user data communication with the UE through the DU. The CU may stop the user data communication with the DU that has notified the CU of a failure of stopping communication. This can prevent unnecessary continuation of communication due to the failure of stopping the communication.

The CU may continue the user data communication with the UE through the DU. The CU may continue the user data communication with the DU that has notified the CU of a failure of stopping communication. This can maintain the reliability of communication even upon failure of stopping the communication.

The DU may notify the CU of a failure of changing communication. The DU may give the notification after the CU instructs the DU to change communication. The notification of the failure may be given in the same manner as the notification of the failure in starting communication. This can produce the same advantages as those of the notification of the failure in starting communication.

The CU may continue the user data communication with the UE through the DU. The CU may continue the user data communication with the DU that has notified the CU of a failure of changing communication. The CU may continue the user data communication using a parameter to be changed by the instruction for changing communication. This can maintain the reliability of communication even upon failure of changing the communication.

The CU may determine a failure of an instruction for starting communication, due to no response from the DU that the CU has instructed to start communication for a predefined duration. The predefined duration may be defined in advance in a standard, determined by the CU, or determined by the high-level network device and notified from the high-level network device to the CU. This can prevent termination of operations of the CU due to an undelivered response to the instruction for starting communication from the DU.

As previously described, the CU may determine a failure of an instruction for stopping communication due to no response from the DU that the CU has instructed to stop communication for a predefined duration. The CU may determine a failure of an instruction for changing communication due to no response from the DU that the CU has instructed to change communication for a predefined duration. This can prevent termination of operations of the CU due to an undelivered response to the instruction for stopping or changing communication from the DU.

Figure 25:
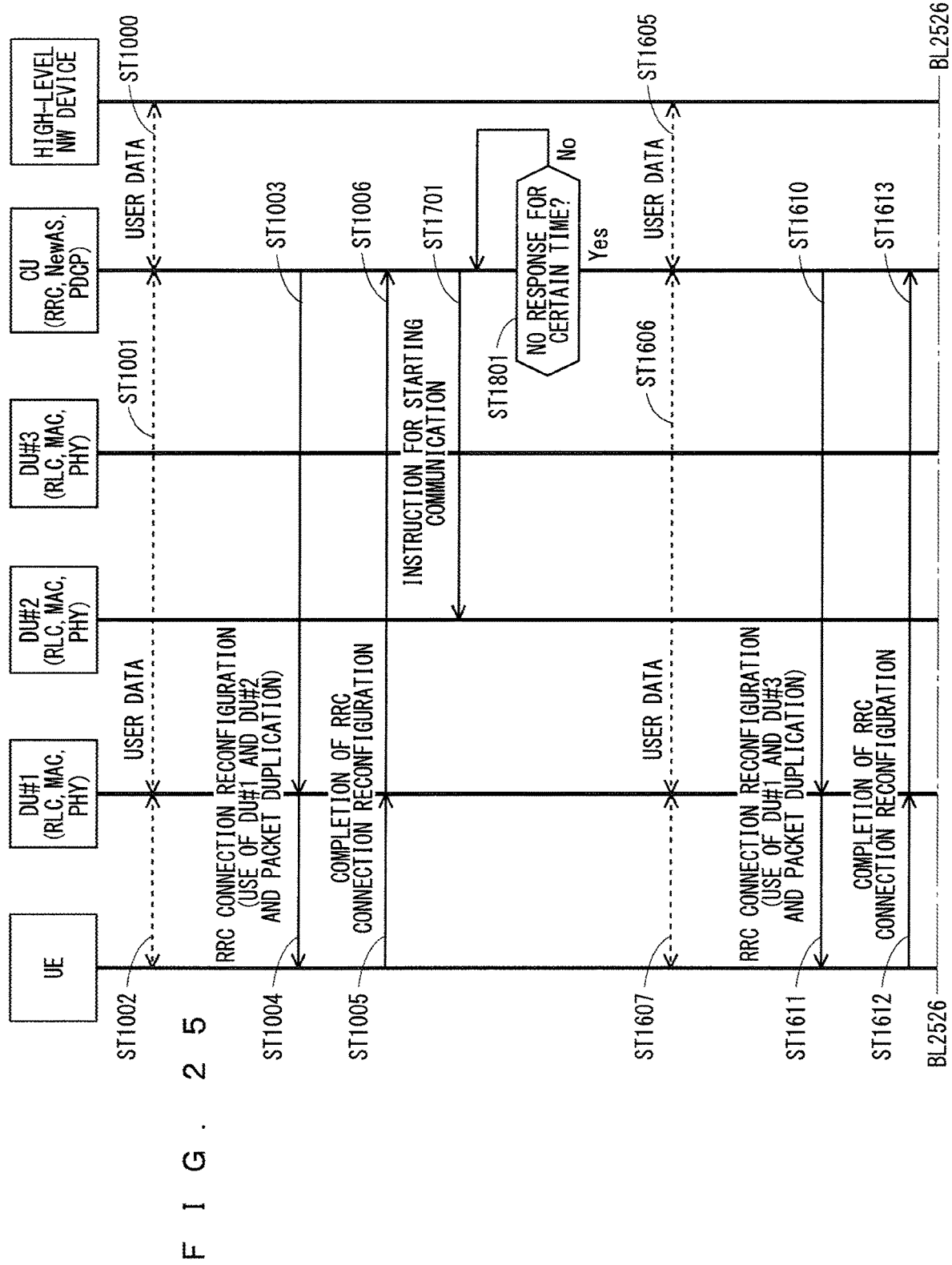
FIG. 25 is a sequence diagram illustrating operations when a response to starting communication is undelivered from the DU to the CU according to the first embodiment.
Figure 26:
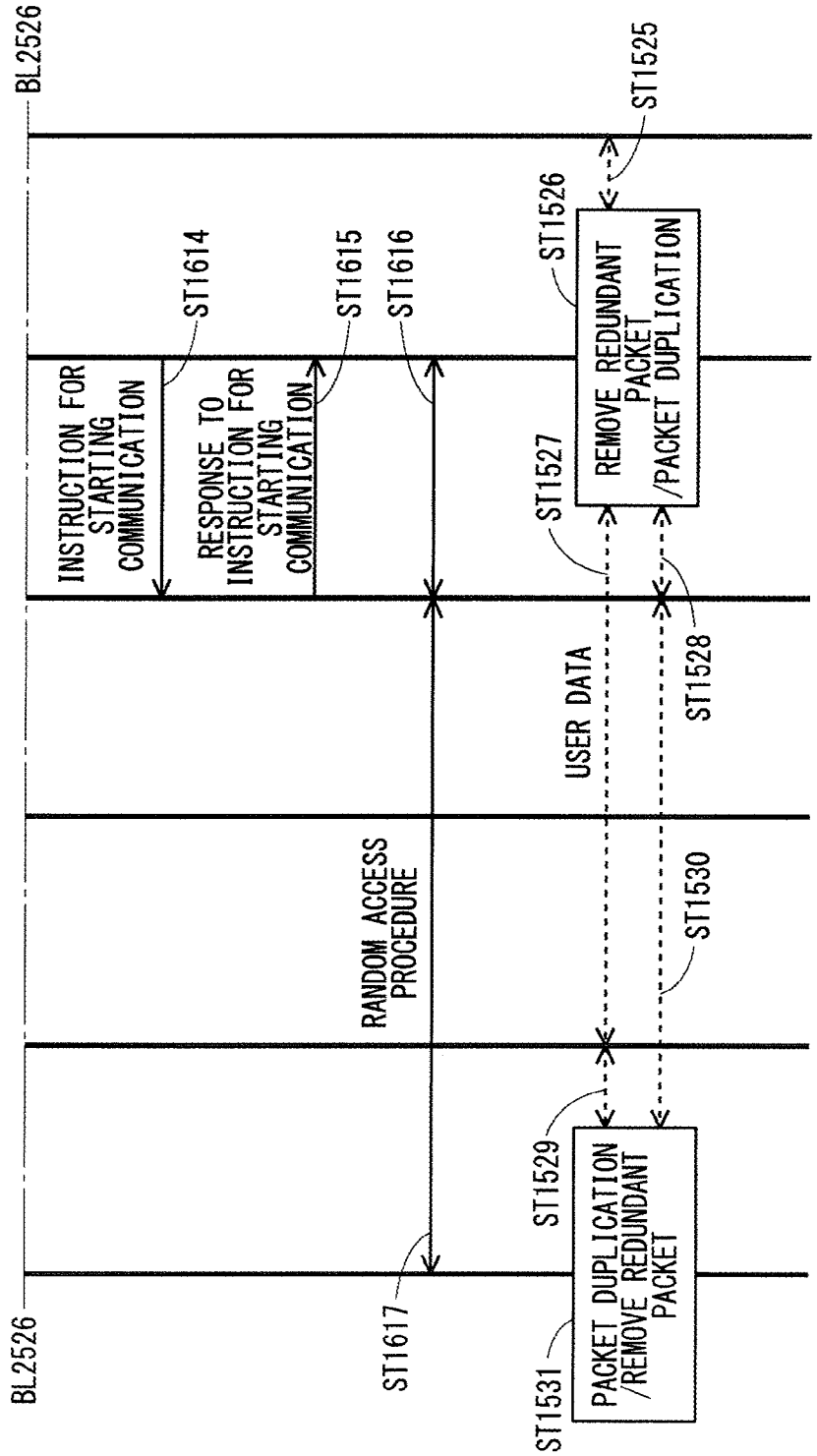
FIG. 26 is the sequence diagram illustrating operations when a response to starting communication is undelivered from the DU to the CU according to the first embodiment.

FIGS. 25 and 26 illustrate a sequence diagram of operations when a response to starting communication is undelivered from the DU to the CU. FIGS. 25 and 26 are connected across a location of a border BL2526. FIGS. 25 and 26 illustrate an example where there is no response from the DU #2 to the CU for a certain duration after the CU notifies the DU #2 of an instruction for starting communication. In FIGS. 25 and 26, the same step numbers are assigned to the same Steps as those in FIGS. 23 and 24, and the common description thereof is omitted.

In Step ST1801 of FIG. 25, the CU waits a certain duration for a response from the DU #2, after the CU notifies the DU #2 of an instruction for starting communication in Step ST1701. If there is no response from the DU #2 for a certain duration in Step ST1801, the CU determines a failure in the instruction for starting communication.

The sequence illustrated in FIGS. 25 and 26 can prevent termination of the operations of the CU due to a wait for the response from the DU #2. For example, the CU can retransmit an instruction for starting communication to another DU.

The CU may transmit and receive, to and from the DU, data for checking a normal operation of a corresponding entity. The CU may regularly transmit and receive the data to and from the DU. The CU and the DU may check a normal operation of a corresponding entity, using the data. The CU may exclude, from the use DUs, a DU that does not transmit the data for a certain duration. Alternatively, the CU may exclude, from the candidate DUs, the DU that does not transmit the data for a certain duration. For example, the CU may exclude the DU that does not transmit the data for a certain duration, from the targets to which an instruction for starting, stopping, or changing communication is notified. Consequently, the CU need not instruct the DU to start, stop, or change communication. This can prevent occurrence of a failure sequence for the DU and delete unnecessary signaling from the CU to the DU.

The data for checking a normal operation of a corresponding entity may include only identifiers of the CU and the DU. Consequently, the amount of signaling for checking a normal operation of a corresponding entity can be reduced.

The CU may notify the UE of the RRC connection reconfiguration. The RRC signaling may be used for the notification. The parameter described in 6.2.2 of 3GPP TS 36.311 v14.2.1 (Non-Patent Document 16) may be used for the notification. Consequently, the complexity in designing the CU and the UE on the notification of the RRC connection reconfiguration can be avoided.

The notification may include information of (1) to (8) below:
(1) an identifier indicating a bearer, for example, a bearer ID;
(2) information on packet duplication, for example, an identifier indicating the presence or absence of packet duplication;
(3) information on the DUs to be added;
(4) information on the DUs to be released;
(5) information on the DUs whose setting is to be changed;
(6) the number of the use DUs;
(7) an identifier indicating no re-establishment of an entity in each layer; and
(8) combinations of (1) and (7) above.

In (1), for example, a bearer ID (DRB-ID) may be used. Consequently, a packet in the U-Plane can be duplicated. Furthermore, an identifier (for example, SRB-ID) of a Signaling Radio Bearer (abbreviated as SRB) may be used. The SRB-ID may be, for example, SRB0, SRB1, or SRB2. Consequently, a packet in the C-Plane can be duplicated.

In (2), the notification may include, for example, an identifier indicating the presence or absence of packet duplication. Consequently, the UE can easily identify the presence or absence of packet duplication. The notification may include information on a ratio of transmitting duplicated packets to each DU. This enables flexible change in the ratio of duplicated packets in both the uplink communication and the downlink communication. Furthermore, the notification may include information on a priority of the PDCP-PDU received from each DU. Consequently, the amount of processing of detecting redundant PDCP-PDUs in the UE can be reduced.

In (3), the notification may include, for example, the number of the DUs to be added. Consequently, the UE can easily understand, via the RRC signaling, a setting parameter for the DUs to be added, etc. The notification may include identifiers of the DUs to be added. The identifiers of the DUs may be the DU-IDs or cell IDs. Consequently, the UE can easily identify the corresponding DUs. The notification may include the RRC parameters to correspond to the DUs. The RRC parameters may include parameters on the New AS layer, the PDCP layer, the RLC layer, the MAC layer, and the PHY layer. Consequently, the communication between the UE and the DU can be established.

In (4), the notification may include, for example, the number of the DUs to be released. Consequently, the UE can easily understand, via the RRC signaling, a parameter for the DUs to be released, etc. The notification may also include IDs of the DUs to be released. The identifiers of the DUs may be the identifiers of the DUs in (3). This can produce the same advantages as those in (3). The notification may also include an identifier indicating whether to release a split bearer between the DUs for the DUs. When the split bearer between the DUs is used in communication using a plurality of the DUs, the amount of processing of reconfiguring the DUs once released can be reduced.

In (5), the notification may include, for example, the number of the DUs to be changed. Consequently, the UE can easily understand, via the RRC signaling, a setting parameter for the DUs to be changed, etc. The notification may also include identifiers of the DUs to be changed. The identifiers of the DUs may be the identifiers of the DUs in (3). This can produce the same advantages as those in (3). The notification may also include the RRC parameters to correspond to the DUs. The RRC parameters may be the RRC parameters in (3). This can produce the same advantages as those in (3).

In (6), notifying, from the CU to the UE, the number of DUs after change enables the UE to easily understand the number of the use DUs after the RRC connection reconfiguration.

The layer to be instructed in (7) may be the New AS layer, the PDCP layer, the RLC layer, the MAC layer, or the PHY layer. Prevention of buffer clearance caused by re-establishment of an entity in the layer can lead to prevention of data loss. Moreover, prevention of retransmission from an upper layer in the UE can lead to reduction in the latency of data transmission.

In (7), the entity in each layer may be re-established. This enables reduction in the amount of processing of the UE for changing the RRC parameter.

The UE may notify the CU of completion of the RRC connection reconfiguration. The RRC signaling may be used for the notification. The RRC connection reconfiguration complete notification described in 6.2.2 of 3GPP TS 36.311 v14.2.1 (Non-Patent Document 16) may be used for the notification. Consequently, the complexity in designing the CU and the UE on the RRC connection reconfiguration complete notification can be avoided.

Alternatively, the PDCP sequence number that the UE has received may be included in the RRC connection reconfiguration complete notification. This can prevent the data loss in the RRC connection reconfiguration. The UE may notify the PDCP sequence number independently of the RRC connection reconfiguration complete notification. Consequently, the complexity of design on the RRC connection reconfiguration complete notification in the CU and the UE can be avoided.

The RRC connection reconfiguration complete notification according to the first embodiment may include a reason for a failure. The reason for the failure may be the aforementioned reason for the failure included in the notification of the failure of the RRC connection reconfiguration to be transmitted from the UE to the CU. An identifier indicating the reason for the failure may include indication of completion of the RRC connection reconfiguration. For example, 0 that is a value indicating the reason for the failure may be allocated to the completion of the RRC connection reconfiguration. Since this reduces the types of signaling, the processing in the UE and the CU is facilitated.

The CU may notify the DU of an instruction for starting communication. The instruction may be issued through the interface between the CU and the DU, for example, using signaling on the Fs interface. A parameter described in "SeNB Addition Request" in 9.1.3.1 of 3GPP TS 36.423 v14.2.0 (Non-Patent Document 15) may be used for the instruction. A parameter to be applied to SCG-ConfigInfo described in 10.2.2 of 3GPP TS 36.311 v14.2.1 (Non-Patent Document 16) may be used for the instruction. Consequently, the complexity in designing the CU and the DU on the instruction for starting communication can be avoided.

The instruction may include information of (1) to (7) below:
 (1) an identifier indicating a bearer, for example, a bearer ID;
 (2) information on packet duplication, for example, an identifier indicating the presence or absence of packet duplication;
 (3) an identifier of the DU, for example, a DU-ID;
 (4) an identifier of the UE, for example, a UE-ID;
 (5) the RRC parameters;
 (6) an identifier indicating no re-establishment of an entity in each layer; and
 (7) combinations of (1) and (6) above.

In (1), the same information as that of (1) in the notification of the RRC connection reconfiguration from the CU to the UE may be used. This produces the same advantages as those in (1) in the notification of the RRC connection reconfiguration.

With application of (2), the CU and the DU can optimize the processing for packet duplication, using the presence or absence of packet duplication.

The application of (3) can prevent a malfunction caused by the processing of another DU by wrongly receiving the instruction.

With application of (4), the DU can identify the UE to be a corresponding entity in the communication which is indicated by the instruction.

The RRC parameters in (5) may include a parameter on the RLC layer, the MAC layer, or the PHY layer. Consequently, the communication between the UE and the DU can be established.

The layer to be instructed in (6) may be the RLC layer, the MAC layer, or the PHY layer. Prevention of the buffer clearance caused by re-establishment of an entity in the layer can prevent data loss. Moreover, prevention of retransmission from the PDCP layers in the CU and the UE can lead to reduction in the latency of data transmission.

In (6), the entity in each layer may be re-established. This enables reduction in the amount of processing of the DU for changing the RRC parameter.

The DU may notify the CU of a response to an instruction for starting communication. Consequently, the CU can understand a state of the DU, for example, the presence or absence of a fault in the DU.

The response may include information of (1) to (4) below:
 (1) an identifier indicating a bearer, for example, a bearer ID;
 (2) an identifier of the DU, for example, a DU-ID;
 (3) an identifier indicating completion or failure of the processing involved in the instruction for starting communication; and
 (4) combinations of (1) and (3) above.

In (1), for example, when the CU notifies the DU of an instruction for starting to communicate with a plurality of bearers, the CU can easily identify a bearer to be set by the DU.

In (2), for example, when the CU notifies a plurality of DUs of instructions for starting communication, the CU can easily identify a DU that has transmitted the response.

In (3), an identifier indicating a reason for a failure may be included. A value indicating success in the processing involved in the instruction for starting communication may be added to the identifier. The value may be, for example, 0. This allows the integration of the response to the instruction for starting communication with the notification of the failure in starting communication, and reduction in the types of signaling.

The interface between the CU and the DU, for example, the Fs interface may be used for communication between the CU and the DU. The Fs interface may be 8-bit aligned. Consequently, the amount of padding can be reduced.

Alternatively, the Fs interface may be 64-bit aligned. This facilitates alignment of data in communication using 64b/66b.

The Fs interface may be the one to which the methods defined in the CPRI (see Non-Patent Document 17) interface are applied as the interface between the CU and the DU. This enables the interface to be shared between an option in which the CU-DU split is performed in a lower layer and an option in which the CU-DU split is performed in a higher layer (for example, Option 2).

The control information may be located in a control block, and data may be located in a data block. This can increase efficiency in the communication through the Fs interface.

The Fs interface may have a function of avoiding a collision. This can ensure the low latency and the high reliability, and aggregate lines between the CU and a plurality of DUs.

The Fs interface may be the one to which the methods defined in the S1 interface are applied as the interface between the CU and the DU. Consequently, the complexity in designing the Fs interface can be avoided.

The control information in the Fs interface may be shared with the RRC signaling. Since the CU and the DU can easily convert the RRC signaling and the control information in the Fs interface, the processing time can be reduced.

The DU may use the RRC signaling from the CU to the UE as the setting information for its own DU. Consequently, the signaling from the CU to the DU (for example, an instruction for starting communication) can be integrated with the RRC signaling from the CU to the UE (for example, a notification of the RRC connection reconfiguration). Consequently, the amount of signaling can be reduced.

The format of the control information in the Fs interface may be based on, for example, the ASN.1. This can easily convert the control information in the Fs interface into the RRC signaling and vice versa.

The technology for transmitting and receiving duplicated packets using a plurality of DUs, which is described in the first embodiment, may be applied to the mobility between the DUs. In the mobility between the DUs, the addition and the release of the use DUs may be combined. This can ensure the reliability before and after the mobility between the DUs.

When the technology for transmitting and receiving duplicated packets using a plurality of DUs is applied to the mobility between the DUs, the CU may notify the UE of information indicating transmission of the C-Plane data through a target DU. The CU may give the notification using the RRC signaling from the CU to the UE, for example, the RRC connection reconfiguration. The RRC connection may be reconfigured when the use DUs are added in the mobility between the DUs. Consequently, the UE can smoothly receive the RRC signaling when the use DUs are released in the mobility between the DUs.

Alternatively, the CU may notify the UE of information indicating the transmission through one of a target DU and a source DU, instead of the information indicating the transmission through a target DU. The CU may transmit, to the UE through one of a target DU and a source DU, the RRC signaling when the use DUs are released in the mobility between the DUs. For example, the CU may compare the target DU with the source DU, and use the DU with a superior channel state to the UE. The UE may receive the RRC signaling from both of the source DU and the target DU. For example, since the CU can use the DU with a superior channel state to the UE, the reliability in transmitting the C-Plane data can be enhanced.

Alternatively, the CU may notify the UE of information indicating the transmission through both of the target DU and the source DU, instead of the information indicating the transmission through the target DU. The CU may transmit, to the UE through both of the target DU and the source DU, the RRC signaling when the use DUs are released in the mobility between the DUs. The CU and the UE may apply, to transmission and reception of the signaling, the technology for transmitting and receiving duplicated packets in the C-Plane using a plurality of DUs. The UE may receive the RRC signaling from both of the source DU and the target DU. This can further enhance the reliability in transmitting and receiving the C-Plane data in the mobility between the DUs.

Figure 27:
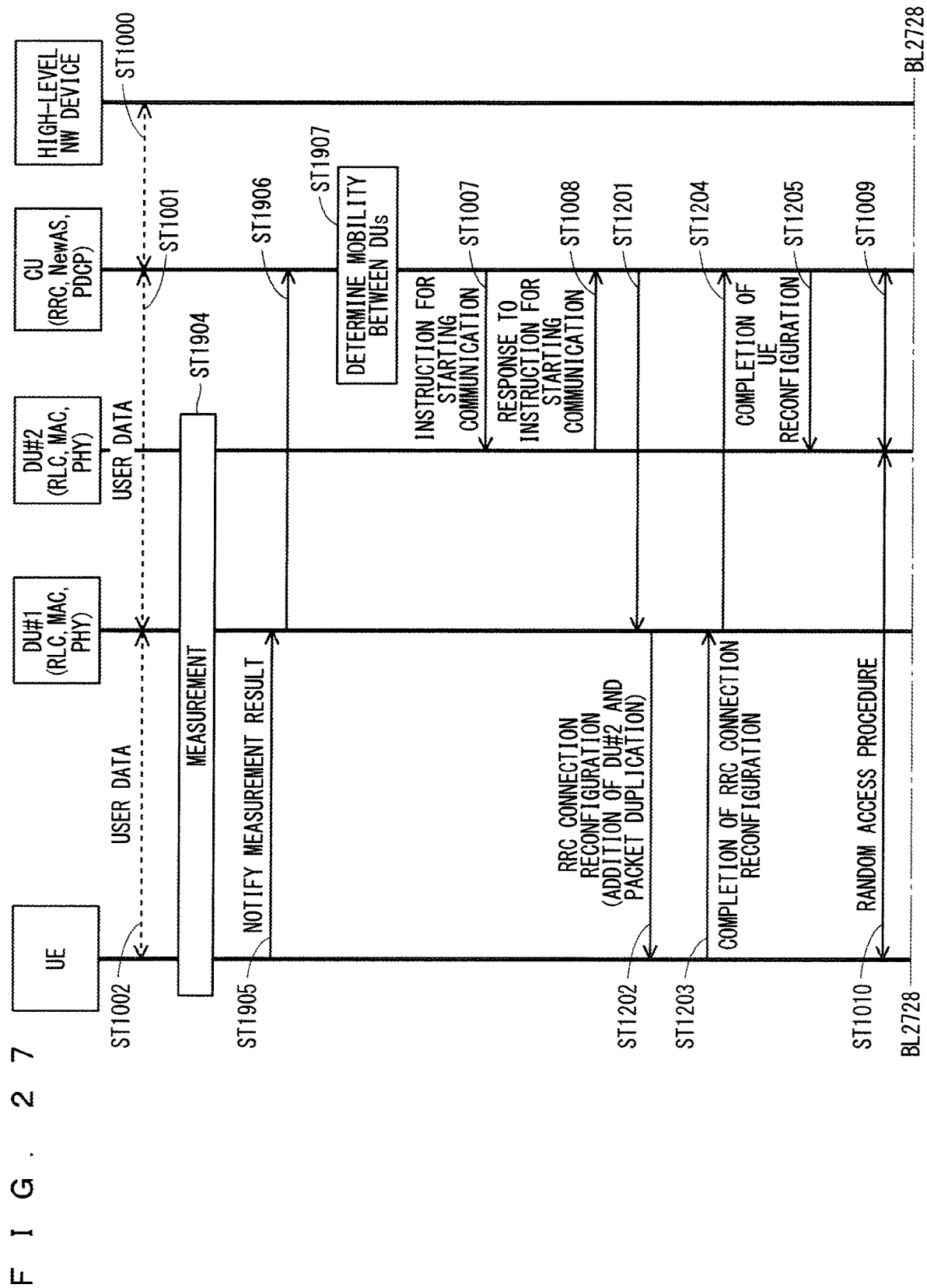
FIG. 27 illustrates a sequence for the mobility between the DUs using packet duplication according to the first embodiment.
Figure 28:
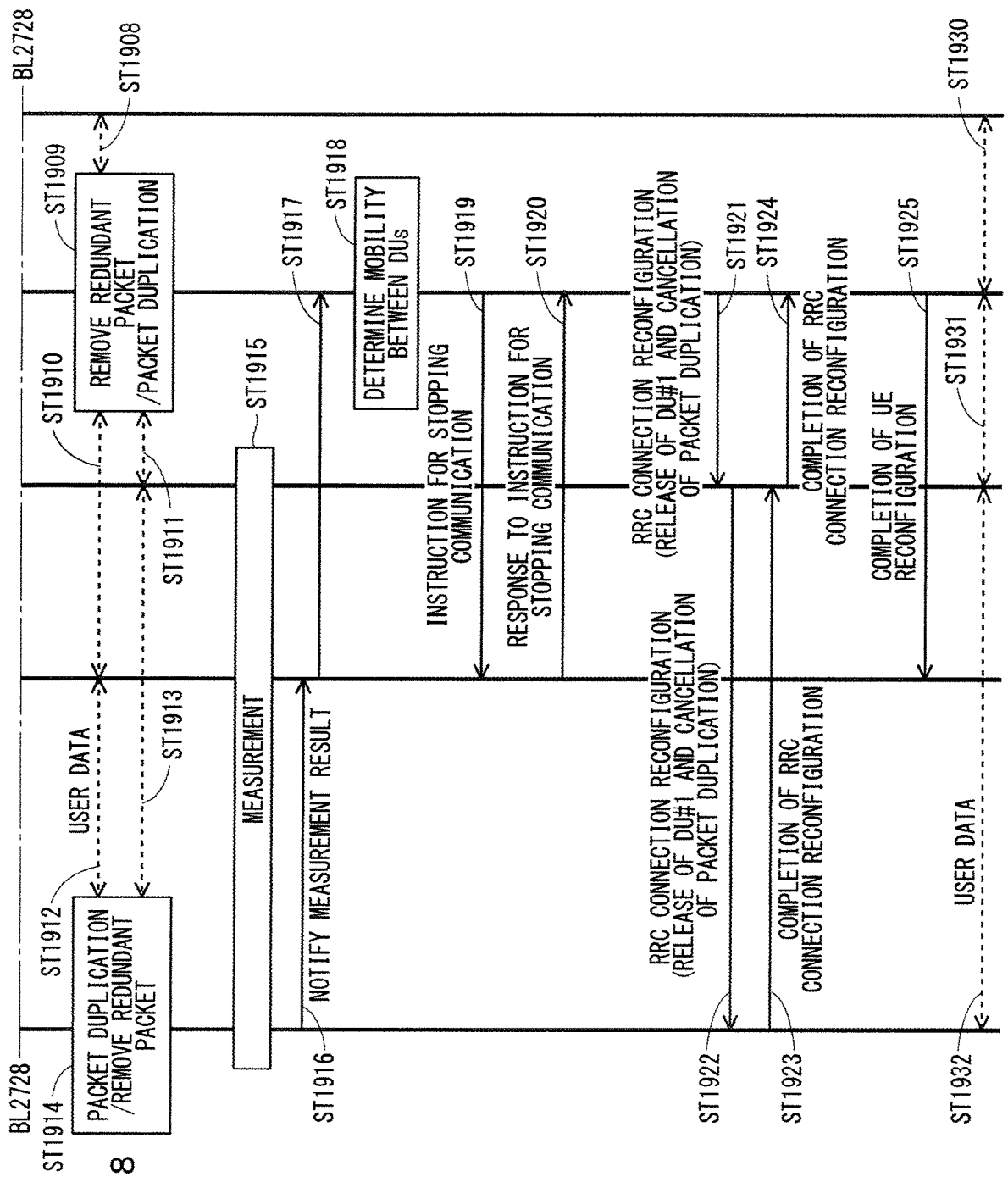
FIG. 28 illustrates the sequence for the mobility between the DUs using packet duplication according to the first embodiment.

FIGS. 27 and 28 illustrate a sequence for the mobility between the DUs using the technology for transmitting and receiving duplicated packets. FIGS. 27 and 28 are connected across a location of a border BL2728. FIGS. 27 and 28 illustrate an example of switching the communication between the CU and the UE from the communication using the DU #1 to the communication with application of duplicated packets using the DU #1 and the DU #2, and then to the communication using the DU #2. In FIGS. 27 and 28, the same step numbers are assigned to the same Steps as those in FIGS. 10 and 11 and FIGS. 14 and 15, and the common description thereof is omitted.

In Step ST1904 of FIG. 27, the UE measures signals to be transmitted from the DU #1 and the DU #2. In Steps ST1905 and ST1906, the UE notifies the CU of the measurement result. The RRC signaling may be used for the notification. The UE transmits the measurement result to the DU #1 in Step ST1905, and the DU #1 transmits the measurement result to the CU in Step ST1906. In Step ST1907, the CU determines the presence or absence of the mobility between the DUs, using the measurement result. In the example of FIG. 27, in Step ST1907, the CU determines to perform packet duplication using the DU #1 and the DU #2.

In the sequence of Steps ST1007, ST1008, ST1201 to ST1205, ST1009, and ST1010 of FIG. 27, the DU #2 is added and the setting for the packet duplication is made.

In Steps ST1908 to ST1914 in FIG. 28, the user data is communicated through packet duplication using the DU #1 and the DU #2. Steps ST1908 to ST1914 may be identical to Steps ST1401 to ST1407 in FIG. 18, respectively.

In Steps ST1915 to ST1917 in FIG. 28, the same processing as Steps ST1904 to ST1906, respectively, is performed. In Step ST1918, the CU determines the presence or absence of the mobility between the DUs, using the measurement result obtained in Step ST1917. In the example of FIG. 28, the CU determines to perform communication using only the DU #2 in Step ST1918.

In FIG. 28, the CU instructs the DU #1 to stop communication in Steps ST1919, and the DU #1 responds to the instruction for stopping communication to the CU in ST1920. Steps ST1919 and ST1920 may be identical to Steps ST1412 and ST1413 in FIG. 18, respectively.

In Steps ST1921 to ST1924 of FIG. 28, the CU sets the RRC connection reconfiguration to the UE, and the UE gives the RRC connection reconfiguration complete notification to the CU. In the example of FIG. 28, the DU #1 is released, and the setting for cancelling packet duplication is made. Step ST1921 indicates transmission of the RRC connection reconfiguration from the CU to the DU #2. Step ST1922 indicates transmission of the RRC connection reconfiguration from the DU #2 to the UE. Step ST1923 indicates transmission of the RRC connection reconfiguration complete notification from the UE to the DU #2. Step ST1924 indicates the RRC connection reconfiguration complete notification from the DU #2 to the CU.

In Step ST1925 of FIG. 28, the CU notifies the DU #1 of completion of the UE reconfiguration. The DU #1 may stop communication with the UE using the notification.

In Steps ST1930 to ST1932 of FIG. 28, the user data is communicated using the DU #2. Step ST1930 indicates transmission of the user data between the high-level network device and the CU. Step ST1931 indicates transmission and reception of the user data between the CU and the DU #2. Step ST1932 indicates transmission and reception of the user data between the DU #2 and the UE.

In FIGS. 27 and 28, the use DU in a notification of the measurement result may be a source DU. Since this eliminates the need for an instruction for changing the DU, the amount of signaling can be reduced.

The technology for transmitting and receiving duplicated packets using a plurality of DUs which is described in the first embodiment may be applied to the mobility between the CUs. In the application to the mobility between the CUs, for example, an identifier of the DU to be used in a target base station and an identifier indicating packet duplication should be included in a Handover Request ACK from the target base station to a source base station as described in Non-Patent Document 1. The same should be included in a notification of the RRC connection reconfiguration from the source base station to the UE. This can ensure the reliability before and after the mobility between the CUs.

Since the first embodiment enables the packet communication using a plurality of DUs, the high reliability and the low latency in the communication between the CU and the UE can be ensured.

The first embodiment provides, for example, the following configuration.

Provided is a communication system including a communication terminal device, and a base station device configured to perform radio communication with the communication terminal device. Specifically, the base station device includes: a plurality of distributed units (DUs) that transmit and receive radio signals; and a central unit (CU) that controls the plurality of DUs. The CU duplicates a downlink packet addressed to the communication terminal device, and forwards the duplicated downlink packet to each of at least two DUs among the plurality of DUs. Each of the at least two DUs transmits, to the communication terminal device by the radio signal, the downlink packet obtained from the CU. Upon redundant receipt of the downlink packets, the communication terminal device removes a redundant downlink packet in accordance with a predefined downlink packet removal criterion.

Here, the communication terminal device may transmits, to each of two or more of the plurality of DUs, a duplicated uplink packet of an uplink packet to be transmitted from the communication terminal device. In such a case, upon redundant receipt of the uplink packets, the base station device removes a redundant uplink packet in accordance with a predefined uplink packet removal criterion.

The configuration can be variously modified based on the disclosure and the suggestion of the Description including the first embodiment. The configuration and the modified configuration can solve the problems, and produce the advantages.

First Modification of First Embodiment

Although the first embodiment describes the packet duplication in Option 2 of the CU-DU split, the packet duplication may be applied to Option 3-1 of the CU-DU split.

The CU duplicates a packet forwarded from a high-level network device. The CU may duplicate the packet in the PDCP layer. The CU forwards the duplicated packet to an RLC-H layer corresponding to each DU. Each of the RLC-H layers transmits the packet to the corresponding DU. Each of the DUs transmits the packet to the UE. The UE detects redundant packets. The UE removes the redundant packets.

The operations of the CU, the DUs, and the UE may be performed in the downlink communication.

The UE duplicates a packet, and transmits the duplicated packet to each of the DUs through a lower-layer entity that corresponds to the DU. Each of the DUs forwards the received packet to the CU. The CU forwards the packets received from the DUs to the PDCP layer. The PDCP layer of the CU detects redundancy. The PDCP layer of the CU removes the redundant packets. The CU forwards the packet that is not removed to the high-level network device.

The operations of the CU, the DUs, and the UE may be performed in the uplink communication.

Figure 29:
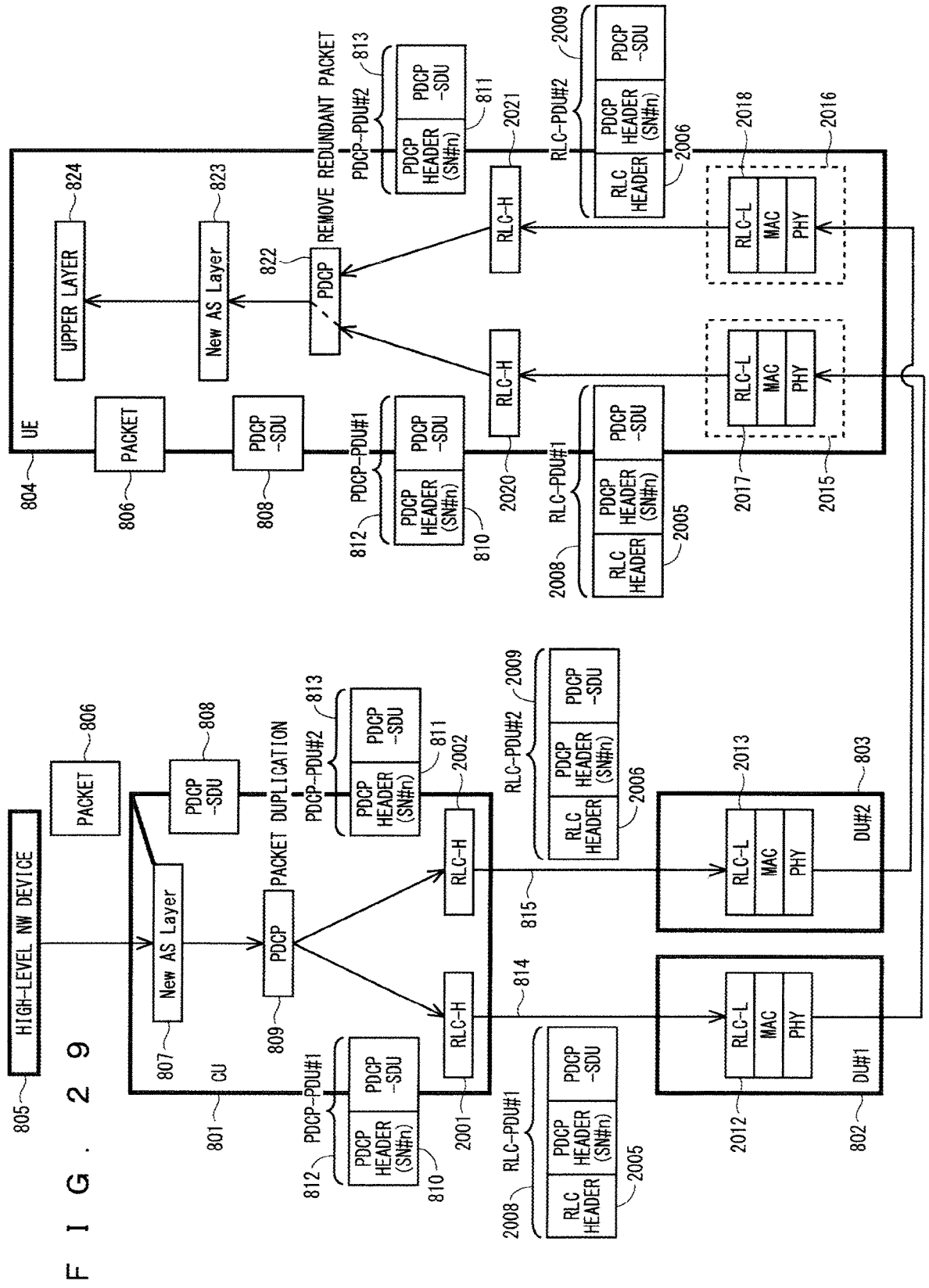
FIG. 29 illustrates a configuration for duplicating a packet in the PDCP layer using a plurality of DUs in the downlink communication, in Option 3-1 of the CU-DU split according to the first modification of the first embodiment.

FIG. 29 illustrates a configuration for duplicating a packet in the PDCP layer in the downlink communication using a plurality of DUs, in Option 3-1 of the CU-DU split. In FIG. 29, the same numbers are assigned to the same blocks as those in FIG. 8, and the common description thereof is omitted.

In FIG. 29, a PDCP layer 809 forwards a PDCP-PDU #1 (PDCP-PDU 812) to an RLC-H layer 2001. The PDCP layer 809 also forwards a PDCP-PDU #2 (PDCP-PDU 813) to an RLC-H layer 2002.

In FIG. 29, the RLC-H layer 2001 assigns an RLC header 2005 to the PDCP-PDU #1 to generate an RLC-PDU #1 (may be referred to as an RLC-PDU 2008). The RLC-H layer 2001 forwards the RLC-PDU #1 to an RLC-L layer 2012 of a DU #1 (DU 802) through the Fs interface 814. Similarly, the RLC-H layer 2002 assigns an RLC header 2006 to the PDCP-PDU #2 to generate an RLC-PDU #2 (may be referred to as an RLC-PDU 2009). The RLC-H layer 2002 forwards the RLC-PDU #2 to an RLC-L layer 2013 of a DU #2 (DU 803) through the Fs interface 815.

In FIG. 29, the DU #1 transmits the RLC-PDU #1 received in the RLC-L layer 2012 to a DU #1-corresponding entity 2015 in the UE 804. The DU #2 transmits the RLC-PDU #2 received in the RLC-L layer 2013 to a DU #2-corresponding entity 2016 in the UE 804. An RLC-L layer 2017 forwards the received RLC-PDU #1 to an RLC-H layer 2020. An RLC-L layer 2018 forwards the received RLC-PDU #2 to an RLC-H layer 2021. The RLC-H layer 2020 removes the RLC header 2005 from the RLC-PDU #1 to obtain the PDCP-PDU #1, and forwards the PDCP-PDU #1 to the PDCP layer 822. Similarly, the RLC-H layer 2021 removes the RLC header 2006 from the RLC-PDU #2 to obtain the PDCP-PDU #2, and forwards the PDCP-PDU #2 to the PDCP layer 822.

The operations of the PDCP layer 822 for detecting redundant packets and removing the redundant packets in FIG. 29 are the same as those in FIG. 8.

The other detailed operations are the same as those in the first embodiment. Thus, the description is omitted. In Option 3-1 of the CU-DU split, application of methods similar to those in the first embodiment produces the same advantages as those in the first embodiment.

The first modification of the first embodiment even with application of Option 3-1 of the CU-DU split can ensure the high reliability and the low latency in the communication through packet duplication.

Second Embodiment

In NR, a proposal is made on packet duplication in a layer lower than the PDCP layer, that is, the RLC layer or the MAC layer to promptly address changes in a channel state while ensuring the high reliability and the low latency (see Non-Patent Document 14 (3GPP R2-1701472)).

The first modification of the first embodiment discloses a method for communicating with the UE using a plurality of DUs being served by the CU through the packet duplication in the PDCP layer In Option 3-1 of the CU-DU split.

According to the first modification of the first embodiment, however, the RLC-H layers lower than the PDCP layer also exist in the CU. This causes problems of increasing the buffer usage in the RLC-H layers and increasing the amount of processing in the PDCP layer and the RLC-H layers.

The second embodiment discloses a method for solving such problems.

The CU duplicates a packet in the RLC-H layer. The RLC-H layer forwards the duplicated packet to the RLC-L layer of each DU. In the UE, the RLC-L layer corresponding to each DU receives the packet transmitted from the DU, and the RLC-H layer receives the packet from the RLC-L layer corresponding to the DU. The RLC-H layer of the UE detects redundant packets. The RLC-H layer of the UE removes the redundant packets.

The operations of the CU, the DUs, and the UE may be performed in the downlink communication.

The UE duplicates a packet in the RLC-H layer, and transmits the duplicated packet to each of the DUs through an RLC-L layer entity that corresponds to the DU. The RLC-L layer in each of the DUs forwards the received packet to the CU. The RLC-H layer of the CU detects redundant packets received from the RLC-L layers of the DUs. The RLC-H layer of the CU removes the redundant packets. The RLC-H layer of the CU forwards the packet that is not removed to the high-level network device through an upper layer.

The operations of the CU, the DUs, and the UE may be performed in the uplink communication.

The CU and/or the UE may give the duplicated packets the same RLC sequence number. Consequently, the UE and/or the CU as a receiver easily detects redundant packets.

The CU and/or the UE may give the RLC sequence number in the same manner as giving the PDCP sequence number according to the first embodiment. Consequently, the UE and/or the CU as a receiver easily detects redundant packets similarly as the first embodiment.

The second embodiment differs from the first embodiment and the first modification of the first embodiment in applying the RLC sequence number, whereas the PDCP sequence number is applied in the first embodiment and the first modification of the first embodiment. The second embodiment also differs from Non-Patent Document 14 in that the CU performs transmission and reception to and from the UE using a plurality of DUs being served thereby through packet duplication in the RLC-H layer.

Figure 30:
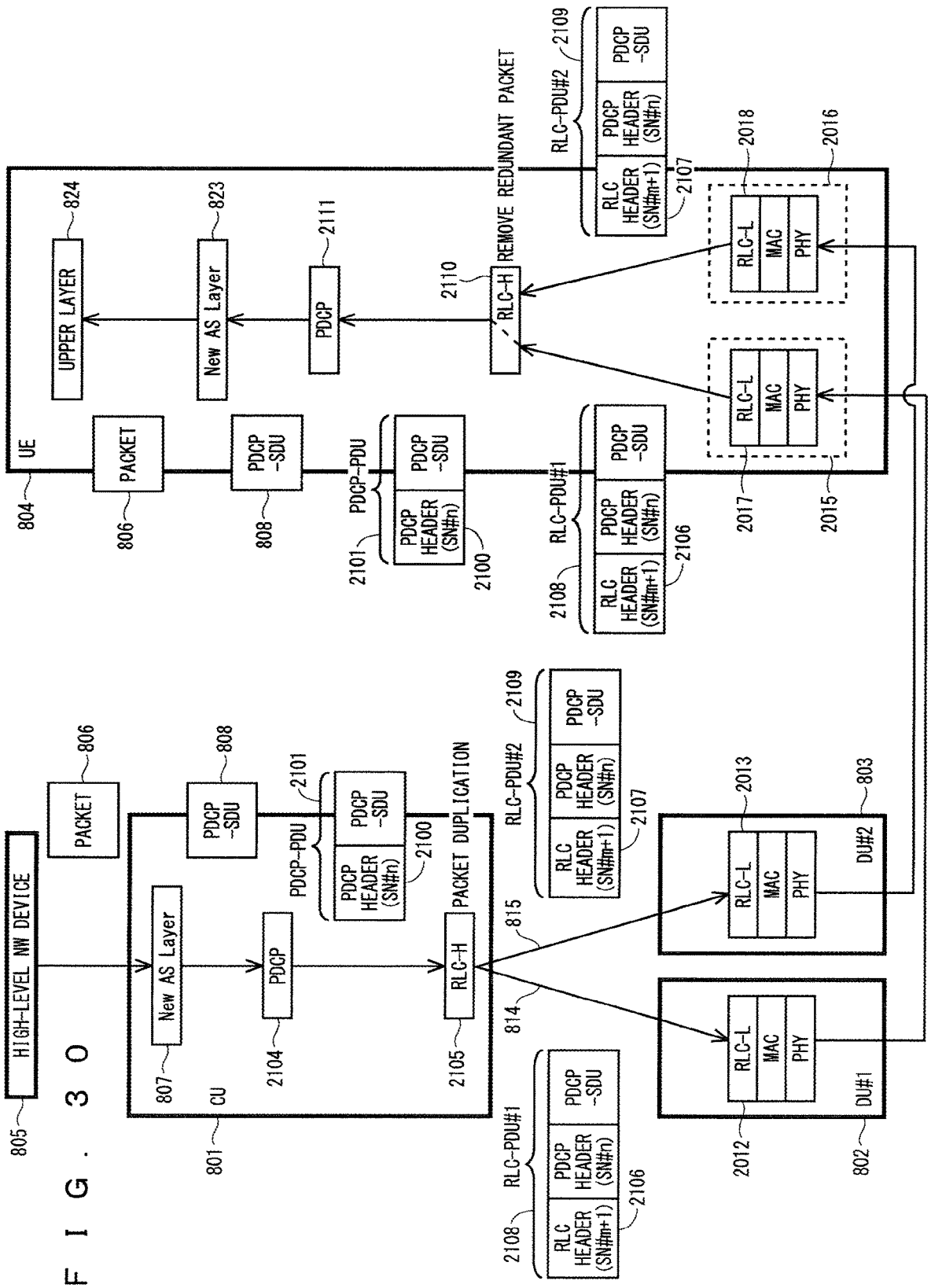
FIG. 30 illustrates a configuration for duplicating a packet in an RLC-H layer using a plurality of DUs in the downlink communication, in Option 3-1 of the CU-DU split according to the second embodiment.

FIG. 30 illustrates a configuration for duplicating a packet in the RLC-H layer in the downlink communication using a plurality of DUs, in Option 3-1 of the CU-DU split. In FIG. 30, the same numbers are assigned to the same blocks as those in FIG. 29, and the common description thereof is omitted.

In FIG. 30, the PDCP layer 2104 assigns a PDCP header 2100 to the PDCP-SDU 808 to generate a PDCP-PDU 2101. The PDCP layer 2104 forwards the PDCP-PDU 2101 to an RLC-H layer 2105.

In FIG. 30, the RLC-H layer 2105 duplicates the PDCP-PDU 2101 into two, assigns an RLC header 2106 to one of the duplicated PDUs to generate an RLC-PDU #1 (may be referred to as an RLC-PDU 2108), and assigns an RLC header 2107 to the other duplicated PDU to generate an RLC-PDU #2 (may be referred to as an RLC-PDU 2109).

Although the RLC headers 2106 and 2107 include information on the same sequence number #m in FIG. 30, they may include information on different sequence numbers. For example, assigning serial sequence numbers to the RLC headers 2106 and 2107 facilitates design of the sequence number assigner in the RLC layer.

In FIG. 30, the RLC-H layer 2105 forwards the RLC-PDU #1 to the RLC-L layer 2012 of the DU #1 through the Fs interface 814. The RLC-H layer 2015 also forwards the RLC-PDU #2 to the RLC-L layer 2013 of the DU #2 through the Fs interface 815.

The RLC-L layer 2017 of the UE 804 forwards the received RLC-PDU #1 to an RLC-H layer 2110. The RLC-L layer 2018 of the UE 804 forwards the received RLC-PDU #2 to the RLC-H layer 2110.

In FIG. 30, the RLC-H layer 2110 detects redundant packets. In the example of FIG. 30, the RLC-H layer 2110 detects that the RLC-PDU #1 and the RLC-PDU #2 are the same, and removes the RLC-PDU #2. The RLC-H layer 2110 removes the RLC header 2106 from the RLC-PDU #1 to obtain the PDCP-PDU 2101, and forwards the PDCP-PDU 2101 to the PDCP layer 2111. Although the RLC-H layer 2110 removes the RLC-PDU #2 in the example of FIG. 30, it may remove the RLC-PDU #1. In such a case, the RLC-H layer 2110 removes the RLC header 2107 from the RLC-PDU #2 to obtain the PDCP-PDU 2101, and forwards the PDCP-PDU 2101 to the PDCP layer 2111.

In FIG. 30, the PDCP layer 2111 removes the PDCP header 2100 from the PDCP-PDU 2101, and forwards the obtained PDCP-SDU 808 to the New AS layer 823.

Other detailed operations are identical to those in the first embodiment. Thus, the description is omitted. In Option 3-1 of the CU-DU split, application of the methods similar to those in the first embodiment produces the same advantages as those in the first embodiment.

The second embodiment produces the same advantages as those according to the first modification of the first embodiment. Since the buffer usage in the RLC-H layer can be reduced more than that according to the first modification of the first embodiment, the buffer capacity in the RLC-H layer can be reduced. Since the packet duplication and detection of redundant packets are performed in a layer lower than those according to the first embodiment and the first modification of the first embodiment, the packet processing in the CU and the UE is expedited.

The second embodiment provides, for example, the following configuration similarly as the first embodiment.

Provided is a communication system including a communication terminal device, and a base station device configured to perform radio communication with the communication terminal device. Specifically, the base station device includes: a plurality of distributed units (DUs) that transmit and receive radio signals; and a central unit (CU) that controls the plurality of DUs. The CU duplicates a downlink packet addressed to the communication terminal device, and forwards the duplicated downlink packet to each of at least two DUs among the plurality of DUs. Each of the at least two DUs transmits, to the communication terminal device by the radio signal, the downlink packet obtained from the CU. Upon redundant receipt of the downlink packets, the communication terminal device removes a redundant downlink packet in accordance with a predefined downlink packet removal criterion.

Here, the communication terminal device may transmit, to each of two or more of the plurality of DUs, a duplicated uplink packet of an uplink packet to be transmitted from the communication terminal device. In such a case, upon redundant receipt of the uplink packets, the base station device removes a redundant uplink packet in accordance with a predefined uplink packet removal criterion.

The configuration can be variously modified based on the disclosure and the suggestion of the Description including the second embodiment. The configuration and the modified configuration can solve the problems, and produce the advantages.

Third Embodiment

The first embodiment, the first modification of the first embodiment, and the second embodiment disclose a method for duplicating a packet and transmitting and receiving the packets using a plurality of DUs to ensure the low latency and the high reliability.

Even upon occurrence of the mobility between the DUs, application of the packet duplication can ensure the reliability in transmitting and receiving data before and after the mobility between the DUs.

The packet duplication, however, creates a problem of consuming a large amount of radio resources or buffer in the DUs being served by the CU.

The third embodiment discloses a method for solving such a problem.

The DU notifies the CU of information on the PDCP sequence number. The DU notifies the CU of the sequence number of the PDCP-PDU with HARQ acknowledgement in its own DU, as the PDCP sequence number. The CU transmits, to the DU, a PDCP-PDU that does not correspond to the PDCP sequence number.

The operation may be performed upon occurrence of the mobility between the DUs. For example, the DU that notifies the CU of information on the PDCP sequence number may be a source DU. The DU to which the CU transmits the PDCP-PDU that does not correspond to the PDCP sequence number may be a target DU. This enables the CU to retransmit, to the target DU, the PDCP-PDU having no acknowledgement from the source DU to the UE, upon occurrence of the mobility between the DUs. This can prevent the PDCP-PDU loss in the mobility between the DUs. Moreover, the PDCP-PDU can be promptly retransmitted.

The operation may be performed upon no mobility between the DUs. For example, the DU that notifies the CU of the information on the PDCP sequence number may be the same as the DU to which the CU transmits the PDCP- PDU that does not correspond to the PDCP sequence number. As an example application upon no mobility between the DUs, upon excess of the maximum HARQ retransmission times, the DU may notify the CU of the PDCP-PDU PDCP sequence number included in the transport block data subject to the excess HARQ retransmissions. This enables, for example, the CU to promptly retransmit, to the DU, the PDCP-PDU included in the transport block data subject to the excess HARQ retransmissions.

The DU may notify the PDCP sequence number through the interface between the CU and the DU, for example, the Fs interface. Similarly as the first embodiment, the notification through the Fs interface may be the one to which the methods defined in the S1 interface are applied as the interface between the CU and the DU. Consequently, the complexity in designing the Fs interface can be avoided. For example, transmission of the PDCP sequence number as the control information of the Fs interface enables a notification with a smaller overhead.

Non-Patent Document 18 (3GPP R2-1701461) proposes retransmission control in the PDCP layer as the PDCP ARQ. The third embodiment differs from Non-Patent Document 18 in eliminating the need for feedback of the PDCP sequence number from the receiver.

In the application of the third embodiment to the mobility between the DUs, conditions for the occurrence of the mobility between the DUs may be similar to the conventional conditions for the occurrence of the mobility between the base stations. For example, a difference in signal-to-noise ratio (abbreviated as SNR) between the DUs may be used with application of a condition described in Non-Patent Document 12, that is, a condition that a difference in SNR is higher than or equal to a certain threshold, or lower than or equal to the certain threshold. This can avoid the complexity in processing the mobility between the DUs.

The PDCP sequence number used in the third embodiment may be determined using HARQ-ACK from the UE. This enables the acknowledgement in the PDCP layer even when the PDCP layer or the RLC layer uses RLC-UM that does not use feedback performed by the corresponding entity for acknowledgement.

The PDCP sequence number may be a PDCP sequence number of the PDCP-PDU that has been transmitted the earliest among PDCP-PDUs having no acknowledgement in the HARQ. The CU may forward the PDCP-PDU with the PDCP sequence number to the target DU. Since this eliminates the need for the CU to perform the increment processing on the PDCP sequence number, the amount of processing in the CU can be reduced.

Alternatively, the PDCP sequence number may be the last PDCP sequence number of the consecutive PDCP-PDUs with HARQ acknowledgement in the DU. Consequently, the amount of signaling from the DU to the CU can be reduced.

Alternatively, the source DU may notify the CU of, for example, a delivery state of PDCP-PDUs in bitmap format as information indicating the PDCP sequence number. For example, when PDCP-PDUs having no acknowledgement are non-consecutive, the CU can efficiently retransmit the PDCP-PDUs having no acknowledgement to the target DU.

Alternatively, the information indicating the PDCP sequence number may be, for example, combined information of a PDCP sequence number of a PDCP-PDU that has been transmitted last among PDCP-PDUs with acknowledgement, and a PDCP sequence number of a PDCP-PDU having no acknowledgement before the PDCP sequence number of the PDCP-PDU that has been transmitted last. Consequently, the CU can efficiently retransmit PDCP-PDUs having no acknowledgement to the target DU while reducing the amount of signaling for notification from the source DU to the CU.

Alternatively, the information indicating the PDCP sequence number may be, for example, combined information of a PDCP sequence number of a PDCP-PDU that has been transmitted the earliest among PDCP-PDUs having no acknowledgement, and a PDCP sequence number of a PDCP-PDU with acknowledgement after the PDCP sequence number of the PDCP-PDU that has been transmitted the earliest. This can produce the same advantages as previously described, particularly when the number of PDCP-PDUs with acknowledgement is less.

Alternatively, the information indicating the PDCP sequence number may be of the sequence number of the PDCP-PDU including data that is yet to be scheduled in the HARQ layer of the source DU. Consequently, the CU and the DU can respond earlier due to the mobility between the DUs.

The DU may associate, with information on the PDCP-SN, information on the HARQ-ACK received from the UE. The DU should always associate them during the continued communication between the DU and the UE. This enables earlier notification of the PDCP sequence number to the CU upon occurrence of the mobility between the DUs.

An example method for associating the information on the HARQ-ACK with the information on the PDCP-SN is hereinafter disclosed.

The RLC layer of the DU obtains the PDCP sequence number from the PDCP-PDU received from the PDCP layer of the CU. The RLC layer of the DU associates the PDCP sequence number with the RLC sequence number of the RLC-PDU that its own RLC layer has transmitted to the MAC layer using the PDCP-PDU.

The MAC layer of the DU obtains the RLC sequence number from the RLC-PDU received from the RLC layer. The MAC layer of the DU associates the RLC sequence number with a HARQ process number used by its own MAC layer for transmitting the transport block data to the UE using the RLC-PDU.

The MAC layer of the DU obtains the HARQ process number with acknowledgement, using the HARQ-ACK information from the UE. The MAC layer of the DU obtains the RLC sequence number with acknowledgement using the HARQ process number and the information for associating the RLC sequence number with the HARQ process number. The MAC layer of the DU notifies the RLC layer of the DU of information on the RLC sequence number.

The RLC layer of the DU obtains the PDCP sequence number with acknowledgement, using the information on the RLC sequence number notified from the MAC layer of the DU, and information for associating the PDCP sequence number with the RLC sequence number.

The associating method eliminates the need for the feedback information on the RLC layer and the PDCP layer from the UE, in acknowledgement of the PDCP-PDU. This can expedite the acknowledgement of the PDCP-PDU.

When the DU notifies the CU of the PDCP sequence number having no acknowledgement, the RLC layer of the DU may obtain the PDCP sequence number having no acknowledgement, using the PDCP sequence number obtained by its own RLC layer from the PDCP-PDU and the PDCP sequence number with acknowledgement. The PDCP sequence number having no acknowledgement may be, for example, a PDCP sequence number obtained by excluding the PDCP sequence number with acknowledgement from the PDCP sequence number obtained from the PDCP-PDU.

This enables the DU to promptly notify the CU of information on the PDCP sequence number having no acknowledgement.

In Non-Patent Document 19 (3GPP R2-1700177), HARQ-Nack from the UE is used for acknowledgement in the RLC layer. In contrast, the third embodiment differs from Non-Patent Document 19 in acknowledgement using HARQ-ACK. The third embodiment also differs from Non-Patent Document 19 in acknowledgement in the PDCP layer by associating the RLC sequence number with the PDCP sequence number.

Upon occurrence of the mobility between the DUs, transmission of the source DU may be stopped after data stored in the buffer of the DU is transmitted to the UE. The data may be HARQ retransmission data. Alternatively, the data may include data that is not scheduled and is stored in the RLC buffer. This can enhance the reliability in transmission of the data stored in the buffer of the DU.

Alternatively, upon occurrence of the mobility between the DUs, transmission of the source DU may be stopped without transmitting, to the UE, the data stored in the buffer of the DU. This can expedite completion of the mobility between the DUs.

Figure 31:
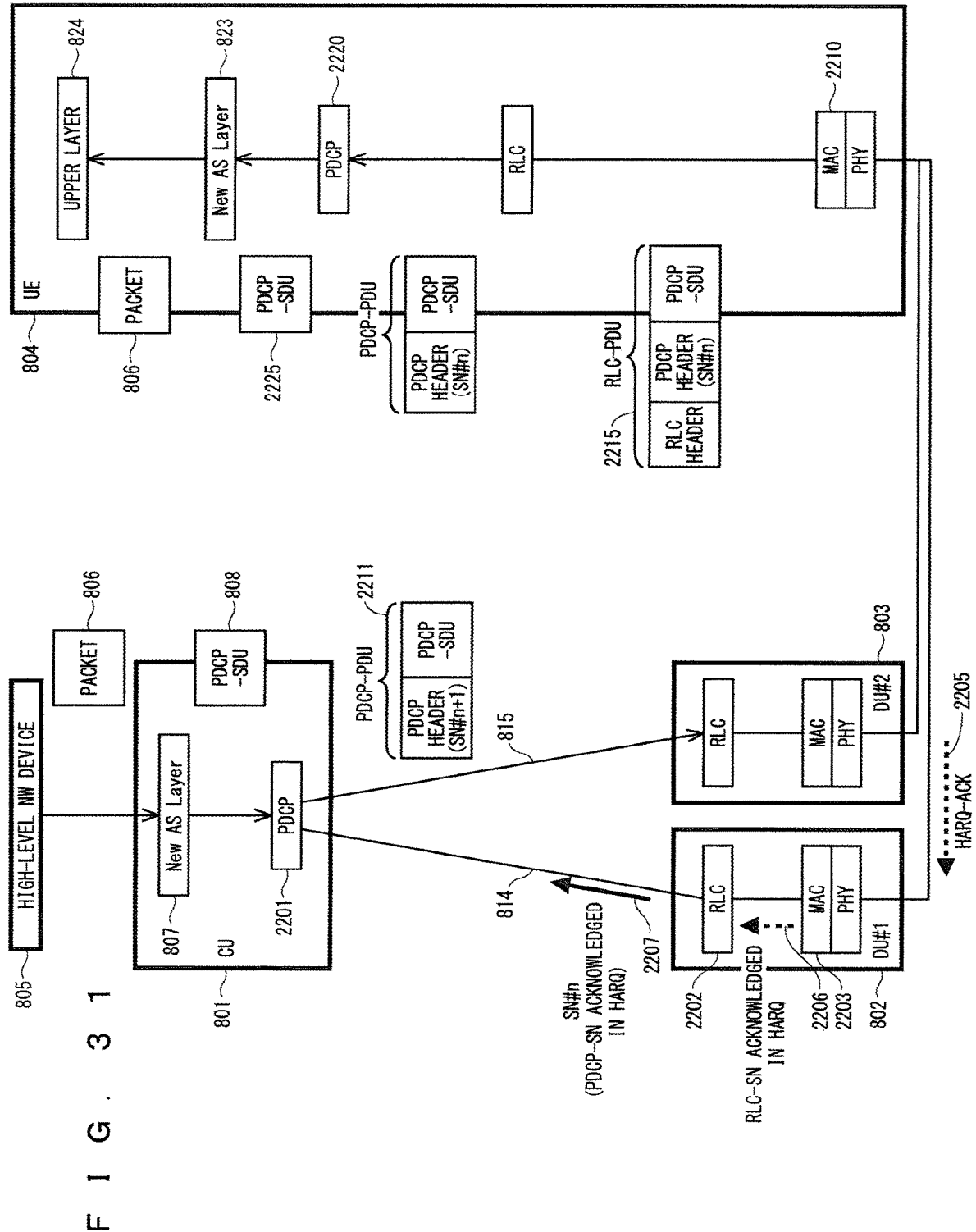
FIG. 31 illustrates a configuration for PDCP acknowledgement using HARQ-ACK according to the third embodiment.

FIG. 31 illustrates a configuration for PDCP acknowledgement using HARQ-ACK. FIG. 31 illustrates an example of switching the DU to be used by the CU and the UE from the DU #1 to the DU #2. In FIG. 31, the same numbers are assigned to the same blocks as those in FIGS. 8 and 30, and the common description thereof is omitted.

In FIG. 31, an RLC layer 2202 of the DU #1 (DU 802) obtains the PDCP sequence number from the PDCP-PDU obtained from a PDCP layer 2201 of the CU 801. The RLC layer 2202 forwards the RLC-PDU generated using the PDCP-PDU to a MAC layer 2203, and manages the RLC sequence number of the RLC-PDU and the PDCP sequence number in association with one another.

In FIG. 31, the MAC layer 2203 obtains the RLC sequence number from the RLC-PDU. The MAC layer 2203 transmits the transport block data generated using the RLC-PDU to the UE 804, and manages, in association with the RLC sequence number, the HARQ process number used for transmitting the transport block data.

In FIG. 31, assume that a MAC layer 2210 of the UE 804 accurately receives user data (the transport block generated using the RLC-PDU 2215) from the MAC layer 2203 of the DU #1. The MAC layer 2210 notifies the MAC layer 2203 of the DU #1 of HARQ-ACK information 2205.

In FIG. 31, the MAC layer 2203 of the DU #1 obtains the HARQ process number with HARQ-ACK, from the HARQ-ACK information 2205. The MAC layer 2203 finds the RLC sequence number with acknowledgement, using the HARQ process number and the association between the HARQ process number and the RLC sequence number. The MAC layer 2203 transmits the RLC sequence number to the RLC layer 2202 as an RLC sequence number notification 2206.

In FIG. 31, the RLC layer 2202 obtains the PDCP sequence number with acknowledgement, using the RLC sequence number notification 2206 and the association between the RLC sequence number and the PDCP sequence number.

In FIG. 31, the RLC layer 2202 and the MAC layer 2203 may update the RLC sequence number with acknowledgement and the PDCP sequence number with acknowledgement, using the HARQ-ACK information from the MAC layer 2210 of the UE 804 at any time. This enables the DU #1 to promptly notify the CU of the PDCP sequence number upon occurrence of the mobility between the DUs. Alternatively, the update may be performed upon occurrence of the mobility between the DUs. This can reduce the amount of processing in the RLC layer 2202 and the MAC layer 2203.

In FIG. 31, assume the occurrence of the mobility between the DUs, specifically, from the DU #1 to the DU #2 when the PDCP sequence number with acknowledgement is n. Upon occurrence of the mobility between the DUs, specifically, from the DU #1 to the DU #2, the RLC layer 2202 transmits the PDCP sequence number n with acknowledgement to the PDCP layer 2201 of the CU 801 as a PDCP sequence number notification 2207. The Fs interface 814 is used for the transmission.

In FIG. 31, the PDCP layer 2201 transmits a PDCP-PDU 2211 of a PDCP sequence number (for example, n+1) having no acknowledgement to the DU #2 (DU 803), using the PDCP sequence number notification 2207. The Fs interface 815 is used for the transmission.

The configuration illustrated in FIG. 31 enables the PDCP layer 2201 to promptly retransmit, to the UE 804 using the DU #2, the PDCP-PDU that the UE cannot accurately receive upon occurrence of the mobility from the DU #1 to the DU #2.

Figure 32:
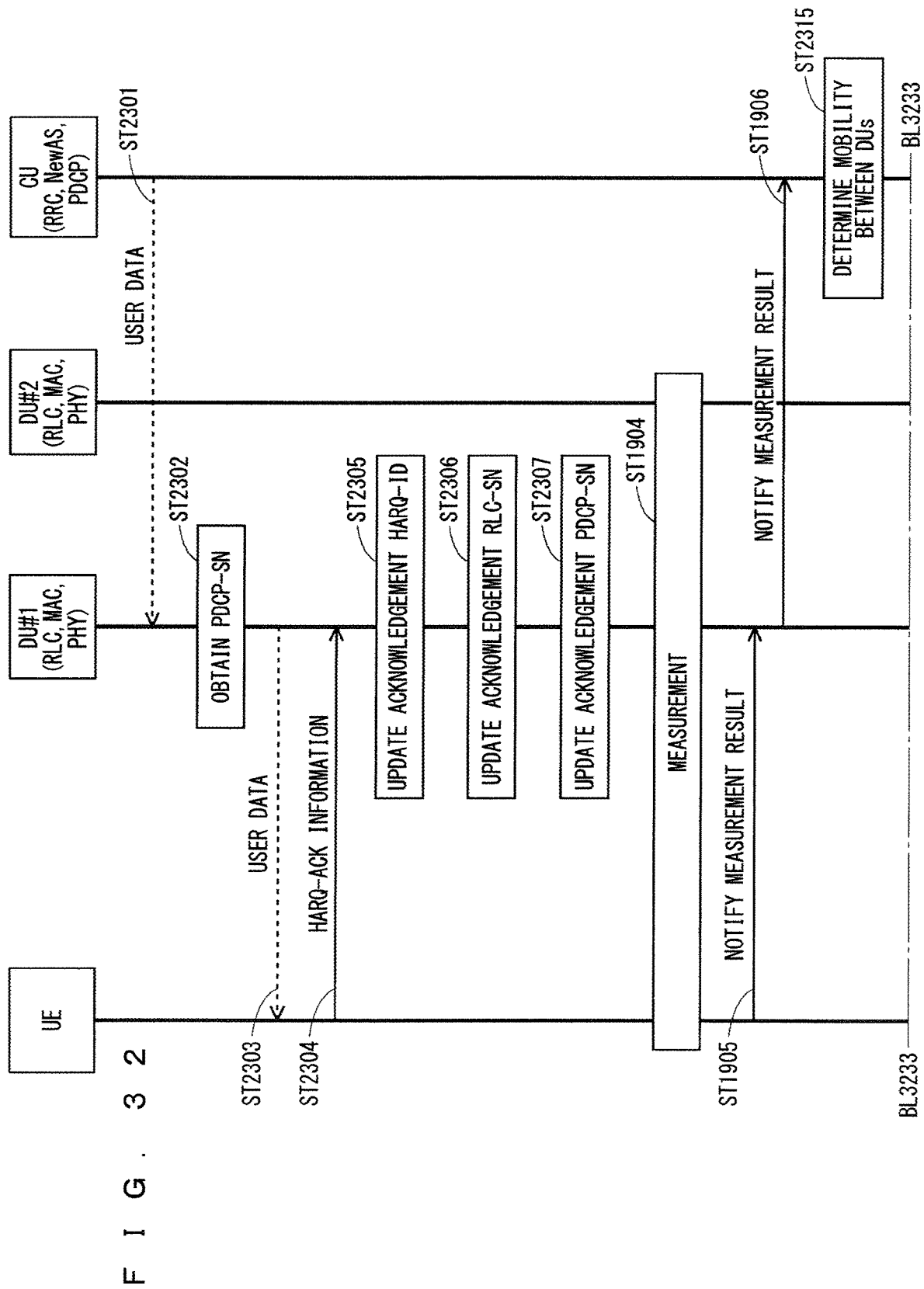
FIG. 32 illustrates a sequence on the mobility for the PDCP acknowledgement using HARQ-ACK according to the third embodiment.
Figure 33:
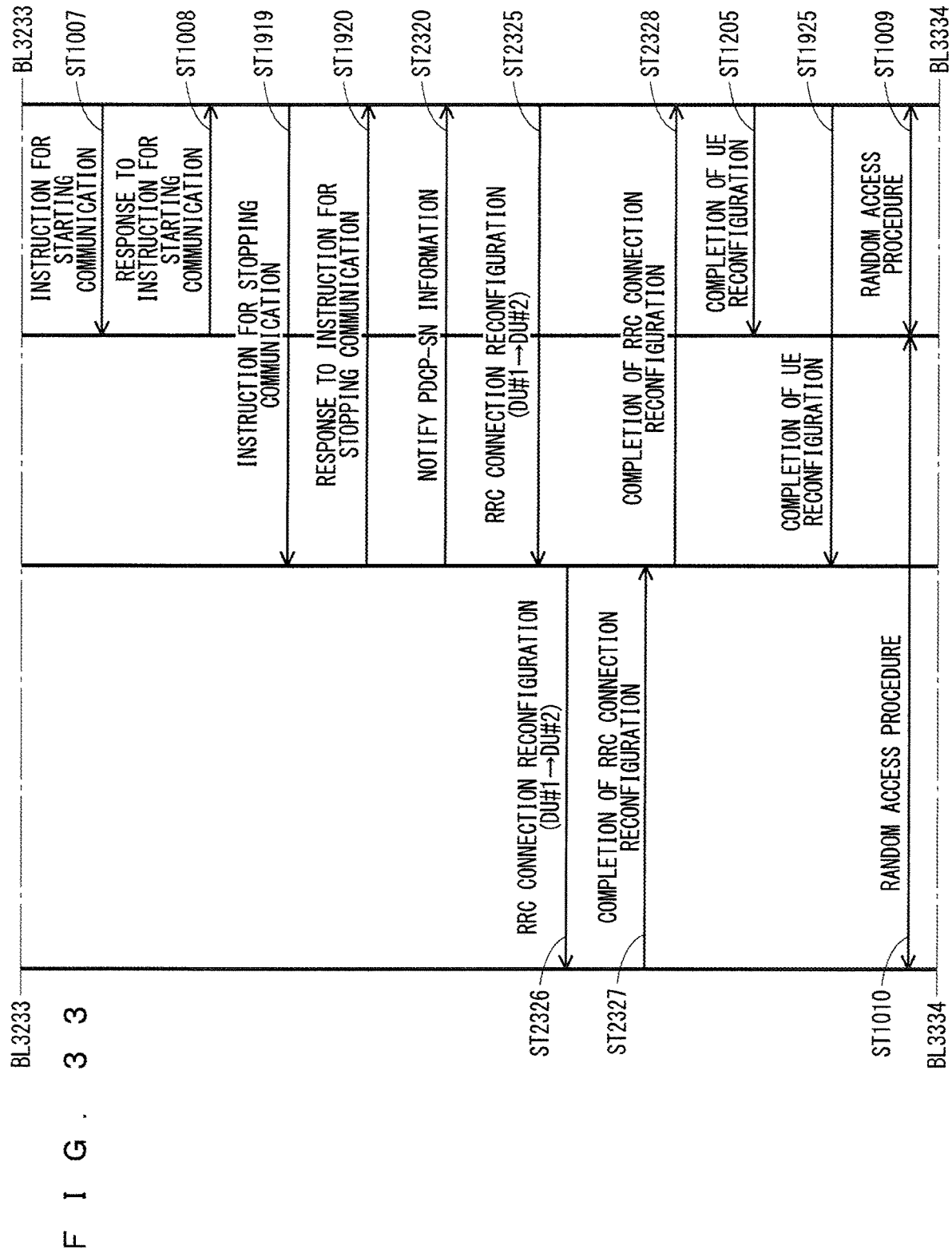
FIG. 33 illustrates the sequence on the mobility for the PDCP acknowledgement using HARQ-ACK according to the third embodiment.
Figure 34:
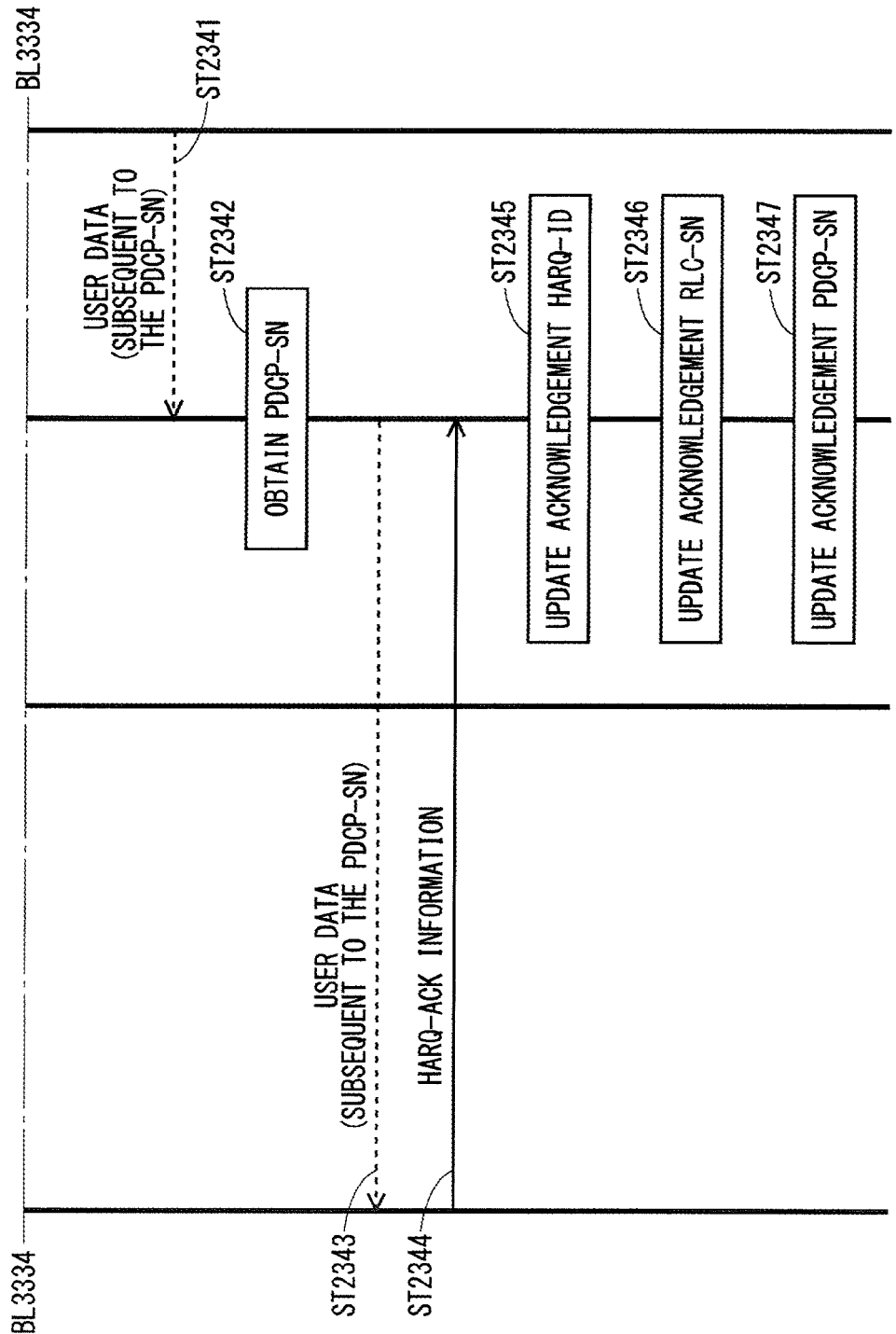
FIG. 34 illustrates the sequence on the mobility for the PDCP acknowledgement using HARQ-ACK according to the third embodiment.

FIGS. 32 to 34 illustrate a sequence on the mobility for the PDCP acknowledgement using HARQ-ACK. FIGS. 32 to 34 are connected across locations of borders BL3233 and BL3334. FIGS. 32 to 34 illustrate an example of switching the DU to be used by the CU and the UE from the DU #1 to the DU #2. In FIGS. 32 to 34, the same step numbers are assigned to the same Steps as those in FIGS. 27 and 28, and the common description thereof is omitted.

In Step ST2301 of FIG. 32, the CU transmits, to the DU #1, the PDCP-PDU of user data for the UE. In Step ST2302, the RLC layer of the DU #1 obtains the PDCP sequence number (PDCP-SN) from the PDCP-PDU of Step ST2301. In Step ST2303, the DU #1 transmits the user data of Step ST2301 to the UE.

In Step ST2304 of FIG. 32, the UE notifies the MAC layer of the DU #1 of HARQ-ACK information. In Step ST2305, the MAC layer of the DU #1 updates an acknowledgement HARQ-ID, using the HARQ-ACK information of Step ST2304. In Step ST2306, the MAC layer of the DU #1 updates an acknowledgement RLC sequence number using the HARQ-ID, and notifies the RLC layer of the DU #1 of the RLC sequence number. In Step ST2307, the RLC layer of the DU #1 updates an acknowledgement PDCP sequence number using the RLC sequence number.

In Steps ST1904 to ST1906 and ST2315 of FIG. 32, the UE performs measurements on the DU #1 and the DU #2 and notifies the CU of the measurement result, and the CU determines the mobility between the DUs. In the example of FIG. 32, the mobility from the DU #1 to the DU #2 is determined in Step ST2315.

In Step ST2320 of FIG. 33, the DU #1 notifies the CU of information on the acknowledgement PDCP sequence number updated in Step ST2307. The notification of Step ST2320 may be given together with the response to the instruction for stopping communication in Step ST1920. Consequently, the amount of signaling from the DU #1 to the CU can be reduced.

In Steps ST2325 and ST2326 of FIG. 33, the CU notifies the UE of the RRC connection reconfiguration through the DU #1. In Steps ST2325 and ST2326, the CU instructs the UE to switch from the DU #1 to the DU #2. In Steps ST2327 and ST2328, the UE notifies the CU of completion of the RRC connection reconfiguration through the DU #1.

In Steps ST1205, ST1925, ST1009, and ST1010 of FIG. 33, switching from the DU #1 to the DU #2 is completed.

In Step ST2341 of FIG. 34, the CU transmits, to the DU #2, the PDCP-PDU with the PDCP sequence number which is yet to be acknowledged, using the PDCP sequence number information notification of Step ST2320. FIG. 34 exemplifies that the PDCP-PDU with the PDCP sequence number which is yet to be acknowledged is a PDCP-PDU with a PDCP sequence number subsequent to the PDCP sequence number of Step ST2320.

In Steps ST2342 to 2347 of FIG. 34, the DU #2 performs the same processing as Steps ST2302 to 2307, respectively.

In FIGS. 32 to 34, the PDCP sequence number information notification of Step ST2320 may be given after Step ST1925, that is, after notification of the UE reconfiguration completion from the CU to the DU #1. Consequently, the DU #1 can notify the CU of the PDCP sequence number with acknowledgement immediately before the DU is switched. Thus, redundant transmission of the PDCP-PDU can be reduced.

In an alternative example sequence on the mobility for the PDCP acknowledgement using HARQ-ACK, the UE may determine the mobility. Since this eliminates the need for notification of a measurement result, the amount of signaling through a radio interface can be reduced.

In FIG. 33, the DU #1 may transmit the data stored in the buffer of its own DU to the CU after the notification of the UE reconfiguration completion in Step ST1925. The data may include the HARQ retransmission data, or the data stored in the RLC buffer, that is, data yet-to-be-HARQ scheduled. This can enhance the reliability in transmission of data upon occurrence of the mobility between the DUs.

Alternatively, in FIG. 33, the DU #1 may discard the data stored in the buffer of its own DU after the notification of the UE reconfiguration completion in Step ST1925. This can expedite the mobility between the DUs.

Figure 35:
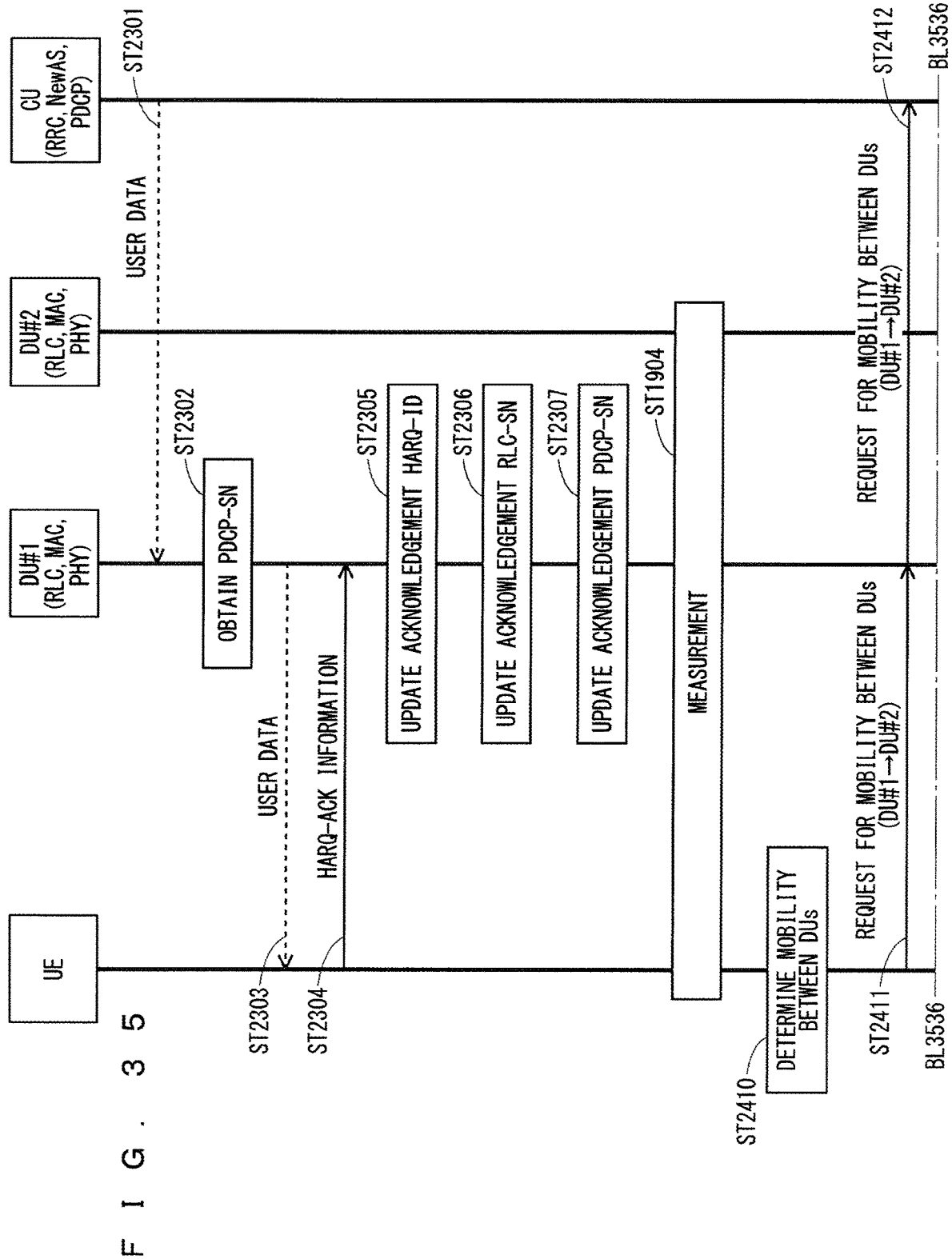
FIG. 35 illustrates another sequence on the mobility for the PDCP acknowledgement using HARQ-ACK according to the third embodiment.
Figure 36:
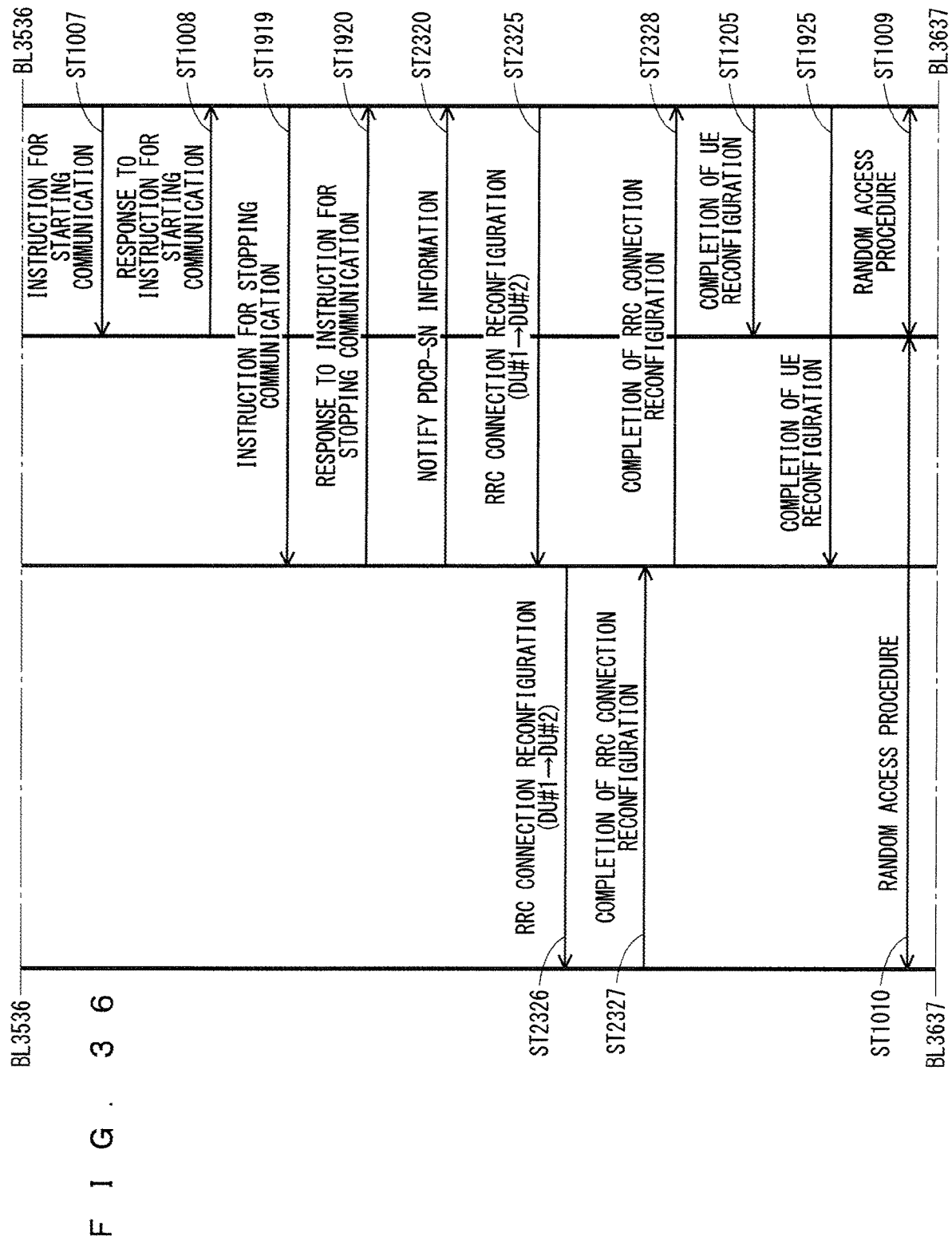
FIG. 36 illustrates another sequence on the mobility for the PDCP acknowledgement using HARQ-ACK according to the third embodiment.
Figure 37:
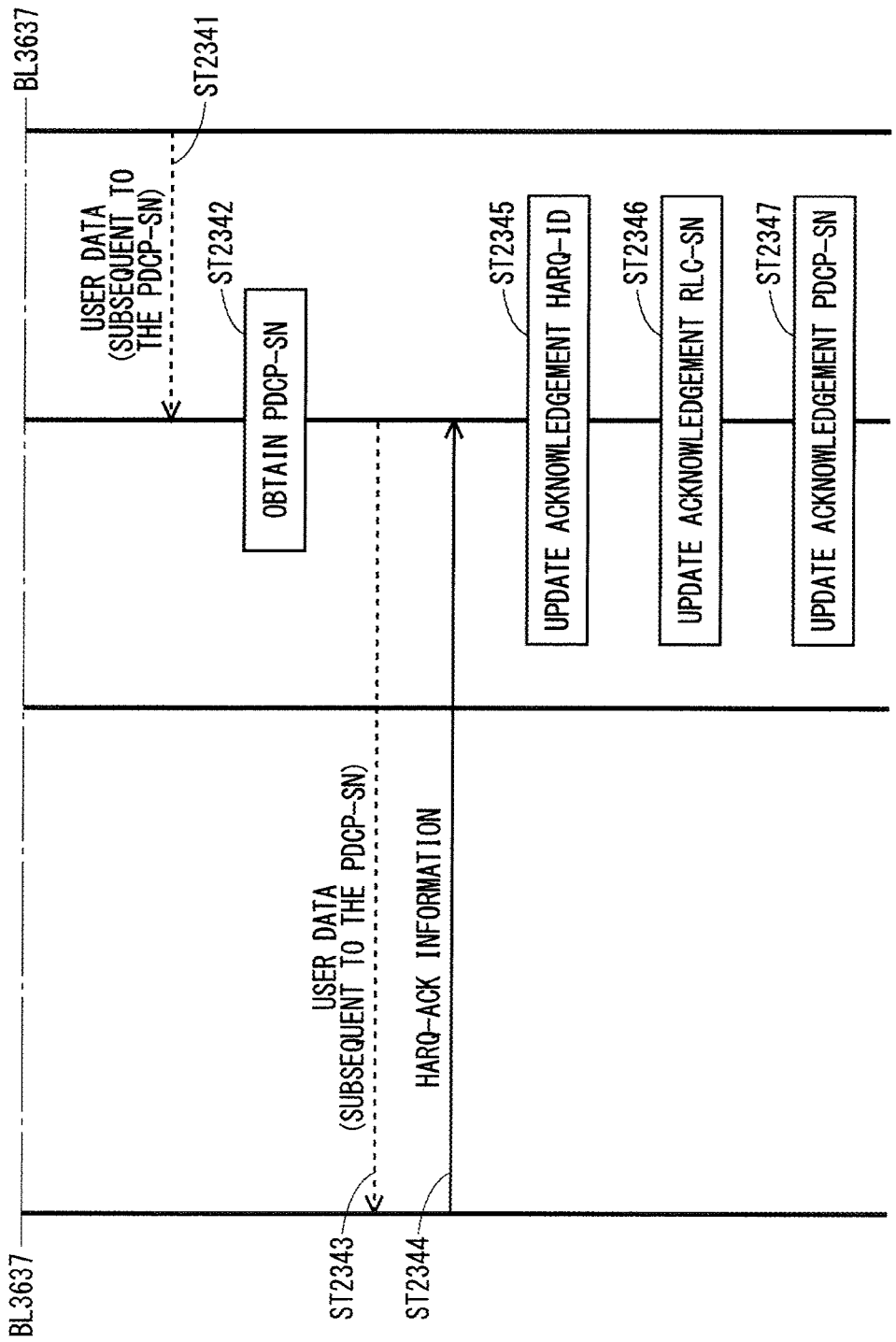
FIG. 37 illustrates another sequence on the mobility for the PDCP acknowledgement using HARQ-ACK according to the third embodiment.

FIGS. 35 to 37 illustrate another sequence on the mobility for the PDCP acknowledgement using HARQ-ACK. FIGS. 35 to 37 are connected across locations of borders BL3536 and BL3637. In the example of FIGS. 35 to 37, the UE determines the mobility. In FIGS. 35 to 37, the same step numbers are assigned to the same Steps as those in FIGS. 32 to 34, and the common description thereof is omitted.

In Step ST2410 of FIG. 35, the UE determines the mobility using the measurement result of Step ST1904. In the example of FIGS. 35 to 37, the DU #1 is switched to the DU #2. In Steps ST2411 and ST2412, the UE transmits, to the CU, a request for the mobility between the DUs. The UE transmits, to the DU #1, the request for the mobility between the DUs in Step ST2411, and the DU #1 transmits, to the CU, the request for the mobility between the DUs in Step ST2412.

The sequence illustrated in FIGS. 35 to 37 enables reduction in the amount of signaling for notifying the measurement result.

The third embodiment may be applied to the PDCP-PDU having no PDCP sequence number. In the previous description, for example, a particular number may be assigned to the PDCP sequence number, and then the particular number may be assigned to the PDCP-PDU having no PDCP sequence number. The PDCP-PDU having no PDCP sequence number may be, for example, the PDCP control PDU. This can enhance the reliability in transmission of the PDCP control PDU for the mobility between the DUs.

The methods described in the third embodiment may be applied to cases without any mobility. For example, upon excess of the maximum HARQ retransmission times, the DU may notify the CU of the PDCP sequence number of the PDCP-PDU included in a transport block in which the maximum HARQ retransmission times has been exceeded. The CU may retransmit the PDCP-PDU with the PDCP sequence number to the DU. This can prevent the packet loss due to the excess of the number of HARQ retransmissions, and expedite retransmission of the PDCP-PDU.

One example of the detailed operations is hereinafter disclosed to apply the methods described in the third embodiment to the notification of the PDCP sequence number from the DU to the CU upon excess of the maximum HARQ retransmission times.

The MAC layer of the DU may obtain the RLC sequence number including the transport block in which the maximum HARQ retransmission times has been exceeded, using the HARQ process number upon transmission of the transport block in which the maximum HARQ retransmission times has been exceeded, and information for associating the RLC sequence number with the HARQ process number.

The RLC layer of the DU obtains the PDCP sequence number of the PDCP-PDU including the transport block in which the maximum HARQ retransmission times has been exceeded, using the information on the RLC sequence number notified from the MAC layer of the DU, and information for associating the PDCP sequence number with the RLC sequence number. The RLC layer of the DU notifies the CU of the PDCP sequence number.

The methods described in the third embodiment may be applied to the mobility between secondary base stations. The mobility between secondary base stations is applicable by reading the CU, the source DU, and the target DU in the third embodiment as a master base station, a source secondary base station, and a target secondary base station, respectively. This can ensure the low latency and the high reliability in the mobility between the secondary base stations.

The methods described in the third embodiment may be applied to the mobility while the C-Plane data is forwarded. The C-Plane data may be, for example, NAS data. The forwarding of the C-Plane data differs from that in the U-Plane in that the CU and the UE do not have any New AS layer. In the example of FIG. 31, the CU 801 does not have the New AS layer 807, and the high-level network device 805 directly transmits the packet 806 to the PDCP 2201. Further, the UE 804 does not have the New AS layer 823, and the PDCP layer 2220 directly forwards the PDCP-SDU 2225 to the upper layer 824.

Application of the methods described in the third embodiment to the mobility while the C-Plane data is forwarded can, for example, enhance the reliability in transmission of NAS data upon occurrence of the mobility between the DUs.

Although the third embodiment describes the downlink communication, the third embodiment may be applied to the uplink communication. Specifically, application to the uplink communication is possible by reading the PDCP layer of the CU as the PDCP layer of the UE, reading the RLC layer and the MAC layer of the DU as the RLC layer and the MAC layer of the UE, respectively, and reading the MAC layer of the UE as the MAC layer of the DU. This can ensure the reliability in the uplink communication without packet duplication.

In the third embodiment, the source DU may forward the PDCP-PDU to the target DU. The PDCP-PDU may be the PDCP-PDU including the transport block data having no HARQ acknowledgement in the source DU. Since the source DU forwards, to the target DU, the data the CU forwards to the target DU, the amount of data to be forwarded between the CU and the DU can be reduced.

An interface between the DUs may be provided for the forwarding from the source DU to the target DU. The source DU may use the interface between the DUs to forward the PDCP-PDU to the target DU. This enables the communication between the DUs.

In the interface between the DUs, the methods defined in the X2/Xn interface may be applied as the interface between the DUs. The PDCP-PDU may be forwarded, for example, by newly providing a message indicating MOBILITY DATA TRANSFER. Consequently, the complexity in designing the interface between the DUs can be avoided. Since the same processing as that for the communication between the base stations in the DC is applicable, the amount of processing in the base stations can be reduced.

The methods described in the third embodiment may be applied to the base stations and the UEs that communicate using the RLC-AM. This can expedite the retransmission control more than that through the conventional ARQ with the RLC.

The methods described in the third embodiment can ensure the reliability and the low latency while reducing the use of resources through packet duplication.

The third embodiment provides, for example, the following configuration.

Provided is a communication system including a communication terminal device, and a base station device configured to perform radio communication with the communication terminal device. Specifically, the base station device includes: a plurality of distributed units (DUs) that transmit and receive radio signals; and a central unit (CU) that controls the plurality of DUs. The CU obtains, from a DU connected to the communication terminal device, delivery complete information on a packet that has already been delivered to the communication terminal device. The CU transmits, from the DU or another DU to the communication terminal device, a packet that is not indicated in the delivery complete information.

Here, the third embodiment discloses an example where the delivery complete information is a sequence number of a packet whose delivery completion has been notified from the communication terminal device. The delivery complete information is not limited to this example.

The configuration can be variously modified based on the disclosure and the suggestion of the Description including the third embodiment. The configuration and the modified configuration can solve the problems, and produce the advantages.

First Modification of Third Embodiment

The third embodiment describes an example of the PDCP acknowledgement using HARQ-ACK in Option 2 of the CU-DU split. The PDCP acknowledgement using HARQ-ACK may be applied to Option 3-1 of the CU-DU split.

The DU notifies the CU of information on the RLC sequence number. The DU notifies the CU of the sequence number of the RLC-PDU with HARQ acknowledgement in its own DU, as the RLC sequence number. The CU transmits, to the DU, an RLC-PDU that does not correspond to the RLC sequence number.

The first modification differs from the third embodiment in using the RLC sequence number instead of the PDCP sequence number.

Figure 38:
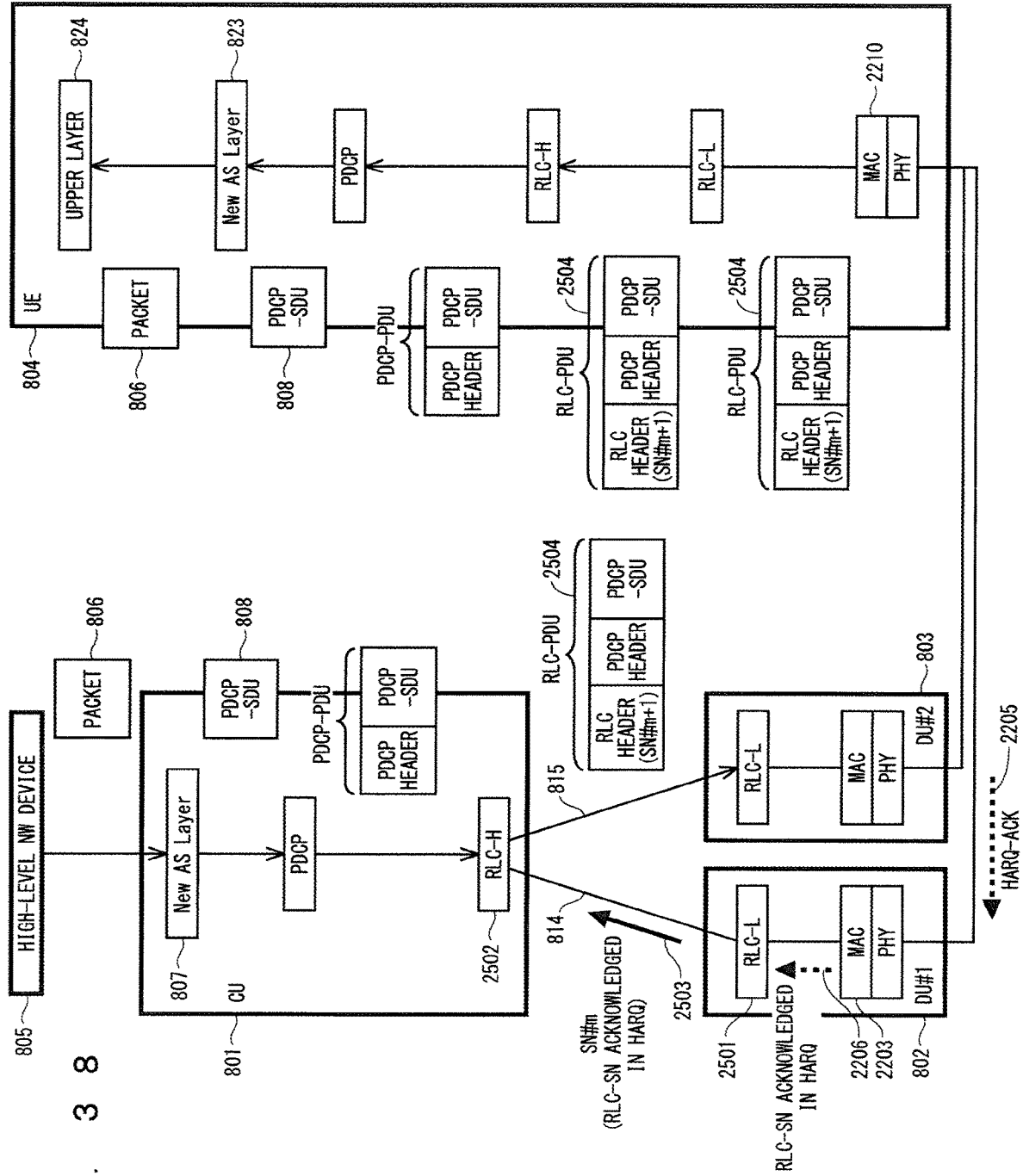
FIG. 38 illustrates a configuration for RLC acknowledgement using HARQ-ACK, in Option 3-1 of the CU-DU split according to the first modification of the third embodiment.

FIG. 38 illustrates a configuration for RLC acknowledgement using HARQ-ACK, in Option 3-1 of the CU-DU split. In FIG. 38, the same numbers are assigned to the same blocks as those in FIG. 31, and the common description thereof is omitted.

In FIG. 38, an RLC-L layer 2501 of the DU #1 (DU 802) obtains the RLC sequence number from the RLC-PDU obtained from an RLC-H layer 2502 of the CU 801. The RLC-L layer 2501 forwards the RLC-PDU to the MAC layer 2203.

In FIG. 38, the MAC layer 2203 obtains the RLC sequence number from the RLC-PDU. The MAC layer 2203 transmits the transport block data generated using the RLC-PDU to the UE 804, and manages, in association with the RLC sequence number, the HARQ process number used for transmitting the transport block data.

In FIG. 38, assume that a MAC layer 2210 of the UE 804 accurately receives the user data (the transport block generated using an RLC-PDU 2504) from the MAC layer 2203 of the DU #1. The MAC layer 2210 notifies the MAC layer 2203 of the DU #1 of HARQ-ACK information 2205.

In FIG. 38, the MAC layer 2203 of the DU #1 obtains the HARQ process number with HARQ-ACK from the HARQ-ACK information 2205. The MAC layer 2203 finds the RLC sequence number with acknowledgement, using the HARQ process number and the association between the HARQ process number and the RLC sequence number. The MAC layer 2203 transmits the RLC sequence number to the RLC-L layer 2501 as an RLC sequence number notification 2206.

In FIG. 38, the RLC-L layer 2501 and the MAC layer 2203 may update the RLC sequence number with acknowledgement, using the HARQ-ACK information from the MAC layer 2210 of the UE 804 at any time. This enables the DU #1 to promptly notify the CU of the RLC sequence number upon occurrence of the mobility between the DUs. Alternatively, the update may be performed upon occurrence of the mobility between the DUs. This can reduce the amount of processing in the RLC-L layer 2501 and the MAC layer 2203.

In FIG. 38, assume the occurrence of the mobility between the DUs, specifically, from the DU #1 to the DU #2 when the RLC sequence number with acknowledgement is m. Upon occurrence of the mobility between the DUs, specifically, from the DU #1 to the DU #2, the RLC-L layer 2501 transmits the RLC sequence number m with acknowledgement to the RLC-H layer 2502 of the CU 801 as an RLC sequence number notification 2503. The Fs interface 814 is used for the transmission.

In FIG. 38, the RLC-H layer 2502 transmits the RLC-PDU 2504 with an RLC sequence number (for example, m+1) having no acknowledgement to the DU #2 (DU 803), using the RLC sequence number notification 2503. The Fs interface 815 is used for the transmission.

The configuration illustrated in FIG. 38 enables the RLC-H layer 2502 to promptly retransmit, to the UE 804 using the DU #2, the RLC-PDU that the UE cannot accurately receive upon occurrence of the mobility from the DU #1 to the DU #2.

The other detailed operations are identical to those in the third embodiment. Thus, the description is omitted. In Option 3-1 of the CU-DU split, application of the methods similar to those in the third embodiment produces the same advantages as those in the third embodiment.

The first modification of the third embodiment even with application of Option 3-1 of the CU-DU split can ensure the reliability and the low latency while reducing the use of resources through packet duplication.

Fourth Embodiment

In a base station configuration using the DC, a source secondary base station forwards, to a master base station, a downlink PDCP-PDU with no acknowledgement in the UE upon occurrence of the mobility of the secondary base station, for example, upon change in the secondary base station. The master base station forwards the PDCP-PDU to a target secondary base station (see Non-Patent Document 1).

The aforementioned method, however, causes a problem of constricting the bandwidth of an interface between base stations due to forwarding of data from the source secondary base station to the master base station upon occurrence of the mobility.

The fourth embodiment discloses a method for solving such a problem.

Upon occurrence of the mobility of the secondary base station, the master base station forwards, to a target secondary base station, a PDCP-PDU with no acknowledgement to the UE. The target secondary base station transmits or retransmits the PDCP-PDU to the UE.

The master base station obtains information on the PDCP-PDU with acknowledgement in the UE, using a PDCP status report transmitted from the UE.

The PDCP status report may be a periodic PDCP status report described in Non-Patent Document 20 (3GPP TS36.323 v14.2.0). Consequently, the amount of signaling in the mobility can be reduced.

Upon occurrence of the mobility, the UE may transmit the PDCP status report to the master base station. The transmission may be routed through the source secondary base station. Transmission of the PDCP status report from the UE enables the master base station to obtain the latest PDCP-PDU acknowledgement status that the UE understands upon occurrence of the mobility. This can reduce unnecessary retransmission from the master base station to the UE through the target secondary base station, for example, retransmission of the PDCP-PDU with acknowledgement in the UE immediately before the mobility. This can prevent constricting the bandwidth of an interface between base stations.

Transmission of the PDCP status report from the UE in the mobility may be determined in a standard. For example, upon receipt of the RRC connection reconfiguration from the master base station, the UE may transmit the PDCP status report. Consequently, the amount of signaling necessary for transmitting the PDCP status report can be reduced.

Alternatively, the UE may transmit the PDCP status report in the mobility, using polling from the master base station to the UE as a trigger. Consequently, the complexity in designing the PDCP layer can be avoided.

FIG. 39 is a sequence diagram illustrating the mobility between secondary base stations using a PDCP status report from the UE. FIG. 39 illustrates an example of switching the secondary base station from the SgNB #1 to the SgNB #2.

In Step ST2601 of FIG. 39, the MgNB forwards user data to the SgNB #1. In Step ST2602, the SgNB #1 transmits the user data to the UE.

In Step ST2603 of FIG. 39, the MgNB notifies the SgNB #2 of an SgNB addition request. In Step ST2604, the SgNB #2 returns an acknowledgement to the MgNB in response to Step ST2603. In Step ST2605, the MgNB notifies the SgNB #1 of a request for SgNB release.

In Step ST2607 of FIG. 39, the MgNB notifies the UE of the RRC connection reconfiguration. The notification includes information indicating that the secondary base station is switched from the SgNB #1 to the SgNB #2. The notification may include the RRC parameter for the SgNB #2. In Step ST2608, the UE notifies the MgNB of completion of the RRC connection reconfiguration.

In Step ST2609 of FIG. 39, the UE transmits the PDCP status report to the MgNB. The report includes PDCP-PDU acknowledgement information in the UE. The UE may transmit the PDCP status report to the MgNB through the SgNB #1.

In Step ST2610 of FIG. 39, the MgNB notifies the SgNB #2 of completion of the SgNB reconfiguration. In Step ST2611, a random access procedure is performed between the UE and the SgNB #2, and then the UE is connected to the SgNB #2.

The MgNB forwards the user data to the SgNB #2 in Step ST2612 of FIG. 39, and the SgNB #2 transmits the user data to the UE in Step ST2613. The user data may be the PDCP-PDU having no acknowledgement in the UE and included in the PDCP status report of Step ST2609.

In Step ST2614 of FIG. 39, the MgNB notifies the SgNB #1 of the UE context release to terminate a series of sequences on the mobility.

The fourth embodiment may be applied to the mobility between the DUs. This can prevent constricting the bandwidth of the interface between the CU and the DU, for example, the Fs interface. Specifically, application to the mobility between the DUs is possible by reading the MgNB as the CU and reading the SgNB as the DU.

The fourth embodiment may be applied to transmission and reception of the C-Plane data. For example, the fourth embodiment may be applied to the C-Plane data in the mobility between the DUs. The C-Plane data may be, for example, NAS data. This can ensure the efficient transmission and the reliability in the mobility between the DUs during transmission of the C-Plane data.

Figure 40:
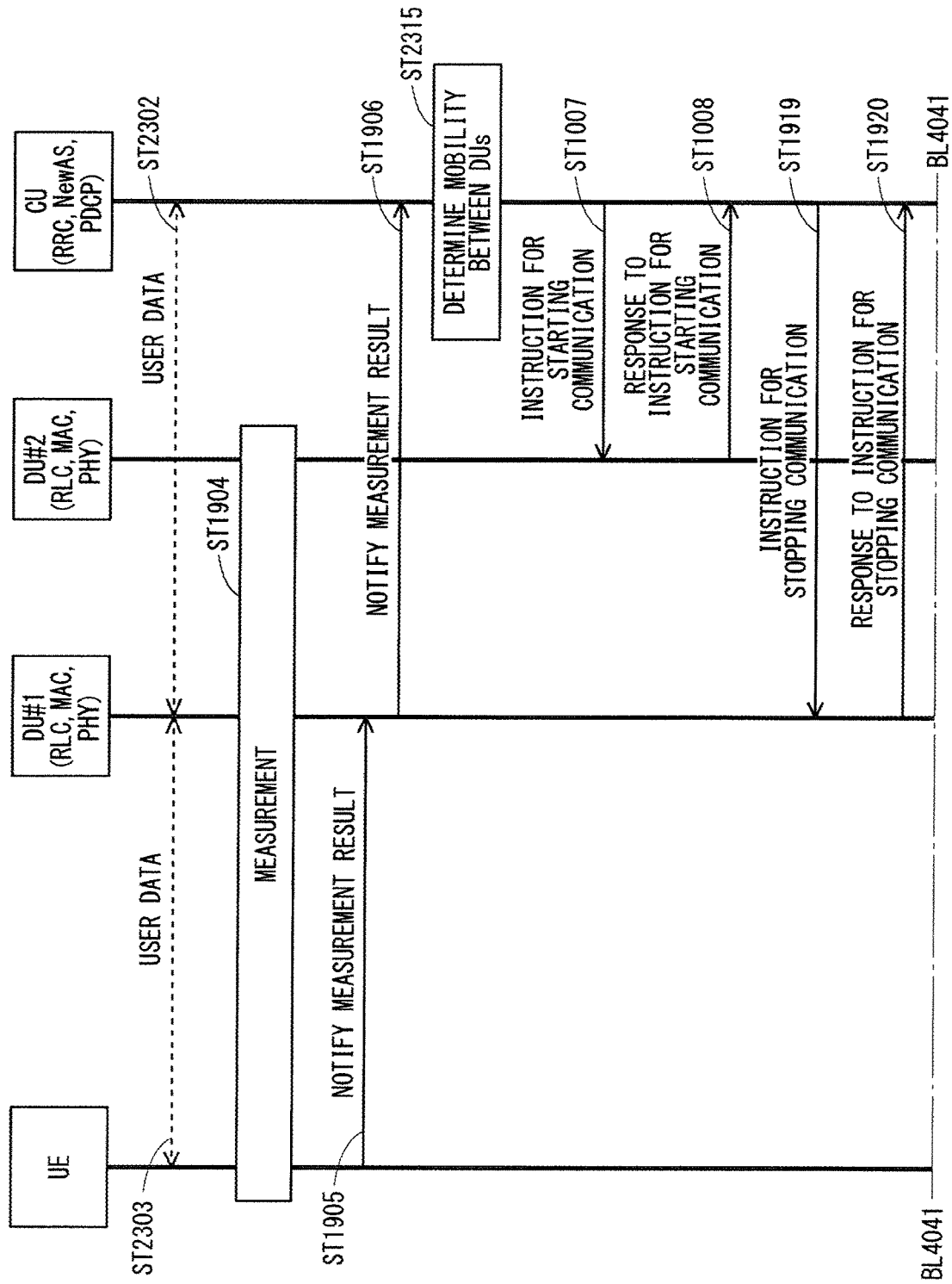
FIG. 40 is a sequence diagram illustrating the mobility between DUs using a PDCP status report from the UE according to the fourth embodiment.
Figure 41:
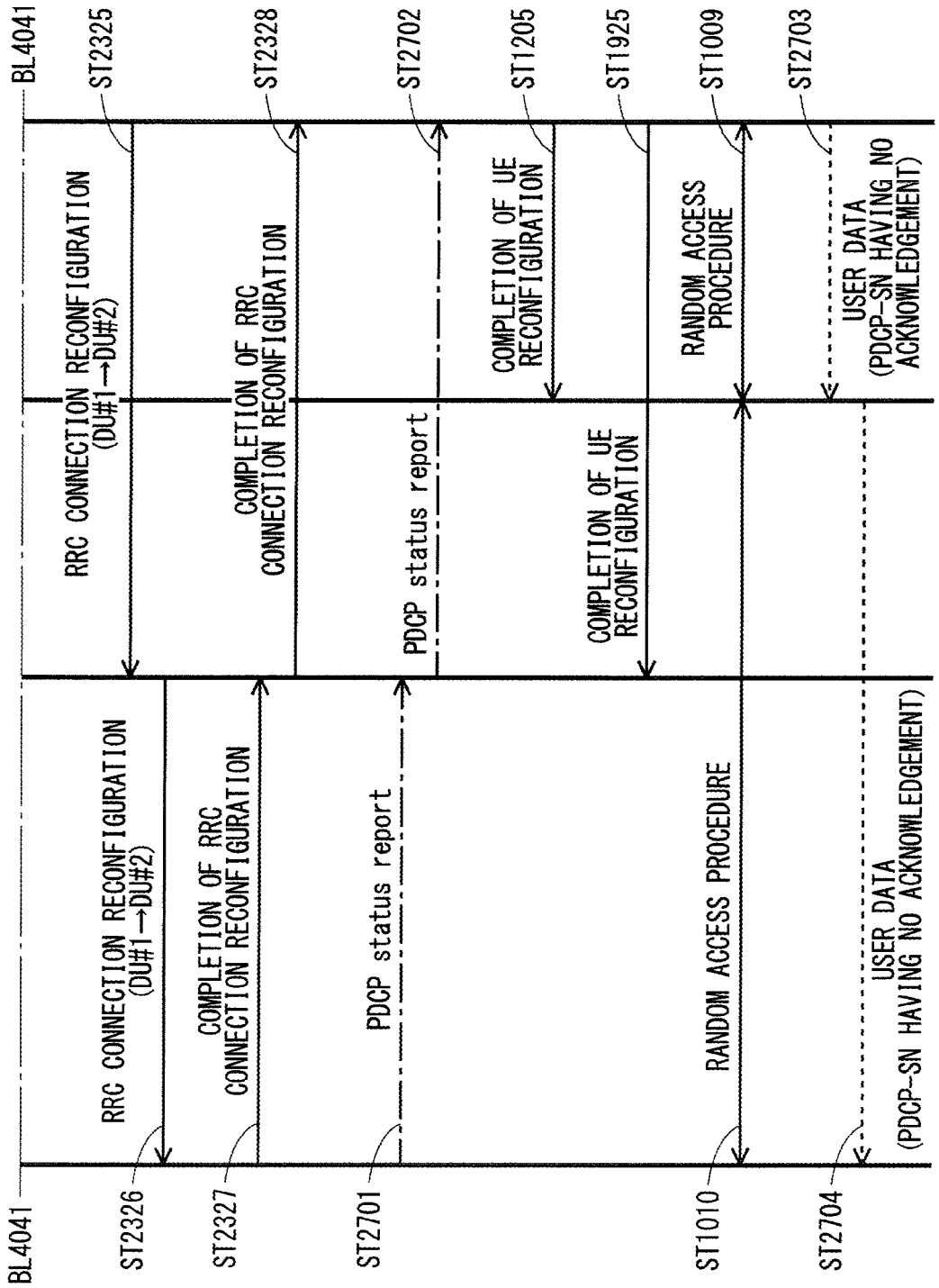
FIG. 41 is the sequence diagram illustrating the mobility between DUs using a PDCP status report from the UE according to the fourth embodiment.

FIGS. 40 and 41 illustrate a sequence diagram of the mobility between DUs using a PDCP status report from the UE. FIGS. 40 and 41 are connected across a location of a border BL4041. FIGS. 40 and 41 illustrate an example of switching from the DU #1 to the DU #2. In FIGS. 40 and 41, the same step numbers are assigned to the same Steps as those in FIGS. 32 to 34, and the common description thereof is omitted.

In Step ST2701 of FIG. 41, the UE transmits the PDCP status report to the DU #1. In Step ST2702, the DU #1 forwards the PDCP status report to the CU. The PDCP status report illustrated in Steps ST2701 and ST2702 may be identical to that of Step ST2609 in FIG. 39.

In Steps ST2703 and ST2704 of FIG. 41, the CU transmits the user data to the UE through the DU #2. Steps ST2703 and ST2704 may handle the PDCP-PDU having no acknowledgement in the UE, similarly as Steps ST2612 and ST2613 of FIG. 39.

The fourth embodiment can prevent constricting of the bandwidth of an interface between the base stations and/or the interface between the CU and the DU, upon occurrence of the mobility.

The fourth embodiment provides, for example, the following configuration.

Provided is a communication system including a communication terminal device, and a plurality of base station devices configured to perform radio communication with the communication terminal device. Specifically, the plurality of base station devices include a master base station device and a secondary base station device which configure bearers for the communication terminal device. When the secondary base station device that communicates with the communication terminal device is changed from a first secondary base station device to a second secondary base station device, the master base station device obtains, from the communication terminal device, delivery information on a packet that has already been transmitted from the first secondary base station device to the communication terminal device. The master base station device transmits, from the second secondary base station device or the master base station device to the communication terminal device, a packet that is not indicated in the delivery information.

The fourth embodiment also provides, for example, the following configuration.

Provided is a communication system including a communication terminal device, and a base station device configured to perform radio communication with the communication terminal device. Specifically, the base station device includes: a plurality of distributed units (DUs) that transmit and receive radio signals; and a central unit (CU) that controls the plurality of DUs. The CU obtains, from a DU connected to the communication terminal device, delivery complete information on a packet that has already been delivered to the communication terminal device. The CU transmits, from the DU or another DU to the communication terminal device, a packet that is not indicated in the delivery complete information.

Here, the fourth embodiment discloses an example where the CU obtains the delivery complete information based on a packet data convergence protocol (PDCP) status report notified from the communication terminal device. The delivery complete information is not limited to this example.

The configuration can be variously modified based on the disclosure and the suggestion of the Description including the fourth embodiment. The configuration and the modified configuration can solve the problems, and produce the advantages.

First Modification of Fourth Embodiment

The first modification discloses another method for solving the problems in the fourth embodiment.

A source secondary base station forwards the RLC-PDU to a master base station. The master base station forwards the RLC-PDU to a target secondary base station.

The source secondary base station may forward, to the target secondary base station through the master base station, the RLC-PDU with no acknowledgement from the UE. The downlink data may be forwarded. This can reduce the amount of forwarding between the base stations.

The source secondary base station may forward an RLC control PDU to the target secondary base station through the master base station. Since this eliminates the need for the target secondary base station to regenerate the RLC control PDU, the amount of processing in the target secondary base station can be reduced.

The source secondary base station may forward, to the target secondary base station through the master base station, an RLC control PDU in which the PDCP-PDU assembly procedure is being performed. The uplink data may be forwarded. Even when this causes the target secondary base station to miss the RLC-PDU, retransmission of the PDCP-PDU from the UE can be prevented.

The source secondary base station may forward an RLC state variable to the target secondary base station through the master base station. The RLC state variable may be a variable described in 7.1 of Non-Patent Document 21 (3GPP TS 36.322 v14.0.0). This can ensure the continuity in the RLC entity before and after the mobility. Thus, processing in the corresponding UE is facilitated.

The source secondary base station may forward, to the target secondary base station through the master base station, a value of a timer to be used in the RLC entity. The value of the timer may be a value described in 7.3 of Non-Patent Document 21 (3GPP TS 36.322 v14.0.0). This can maintain smooth operations of the RLC entity.

The first modification may be applied to the mobility between the DUs. This can prevent constricting the bandwidth of the interface between the CU and the DU, for example, the Fs interface. Specifically, application to the mobility between the DUs is possible by reading the MgNB as the CU and reading the SgNB as the DU.

The first modification may also be applied to transmission and reception of the C-Plane data. For example, the first modification may be applied to the C-Plane data in the mobility between the DUs. The C-Plane data may be, for example, NAS data. This can ensure the efficient transmission and the reliability in the mobility between the DUs during transmission of the C-Plane data.

The first modification can prevent constricting of the bandwidth of an interface between the base stations and/or the interface between the CU and the DU, upon occurrence of the mobility.

Fifth Embodiment

As disclosed in the first embodiment, the configuration for splitting the CU and the DU is being studied in NR. A plurality of DUs may be provided in the CU-DU split configuration. In such a case, which part of the gNB with the CU-DU split configuration in Option 2 performs routing to the DUs is a problem. Here, a method for performing routing to the DUs in the gNB is disclosed.

When the gNB has the CU-DU split configuration in Option 2, the CU of the gNB has routing functions between DUs. The CU of the gNB performs routing to the DUs.

The PDCP in the CU of the gNB may have the routing functions between DUs. The PDCP in the CU of the gNB may perform routing to the DUs.

The routing functions between DUs include a function of determining a routing destination DU, and a function of transmitting data to the determined routing destination DU.

The routing functions between DUs may include a flow control function. The flow control function may be included in the function of determining a routing destination DU or in the function of transmitting data to the determined routing destination DU. Examples of the flow control include the control over the data transmission timing such as start and termination of data transmission, and the control over the data transmission speed.

The routing functions between DUs may be set lower than the conventional PDCP functions or the PDCP functions in the CU which are proposed in NR (Non-Patent Document 22: R3-170266).

When the PDCP in the CU has the routing functions for the split bearer, the routing functions between DUs may be set lower than the routing functions for the split bearer.

Setting the routing functions between DUs lower than the routing functions for the split bearer initiates the routing between DUs after data is split into the respective gNBs. It is possible to route, between DUs for each gNB, the data for the gNB. The complexity of providing the routing functions between DUs can be avoided.

In the routing functions between DUs, a routing destination DU may be determined and transmitted for each PDCP PDU. The routing destination DU may be determined and transmitted for each of PDCP PDUs with a predetermined amount or a predetermined number. The routing destination DU may be determined and transmitted at predetermined time intervals. The routing destination DU may be determined and transmitted for each of PDCP PDUs with an amount meeting the demand from each DU. This can adjust the amount of PDCP PDUs to be transmitted to each DU and others.

This enables the gNB with the CU-DU split configuration in Option 2 to perform routing from the CU to the DU.

The receiver is provided with a function of routing data from each DU to a high-level function in the PDCP in the CU of the gNB. The function of routing data from each DU to the high-level function may be one of the routing functions between DUs.

The data from each DU is routed to the high-level function in order of arrival as a function of the receiver. In other words, the data from each DU is transmitted one by one to the high-level function in order of arrival.

As an alternative method, the data from each DU may be routed to the high-level function in order of PDCP sequence number (PDCP-SN). In other words, the data from each DU is routed in order of PDCP-SN and transmitted one by one to the high-level function.

This enables the routing of the data from each DU of the gNB to the high-level function.

The CU in the gNB may be provided with a buffer for DU. The buffer may be a buffer for communication on the interface between the CU and the DU. Application of a buffer for the routing between DUs or for the routing to the high-level function in the receiver enables data to be held in the buffer. This can reduce a data overflow state and data loss, for example, in the presence of delay in data communication between the UE and the DU.

The buffer may be provided for each DU. Application of the buffer for each DU can reduce a data overflow state for each DU and the data loss, according to a data communication state between the UE and the DU. Further, a data overflow state in another DU which is caused by delay in data communication in one of the DUs, and the data loss can be reduced.

The buffer for DU may be provided in the PDCP. This facilitates coordinating processing with the routing functions between DUs.

The DU of the gNB may be provided with the buffer for each DU. The buffer may be provided in the RLC. The buffer may be a buffer for communication on the interface between the CU and the DU. With application of the buffer for receiving data routed from the CU or for transmitting data to the CU in the receiver, data can be held in the buffer. This can reduce a data overflow state and data loss, for example, in the presence of delay in data communication between the UE and the DU or delay in a function in the CU or the PDCP.

The RLC of each DU may notify the CU of information requesting the downlink data. The RLC in each DU may notify the PDCP in the CU of the information. Five examples of the information are disclosed below:

(1) an identifier of its own DU;
(2) a required amount of data;
(3) a required number of PDCP-PDUs;
(4) an amount of buffer allowance in its own DU; and
(5) combinations of (1) to (4) above.

The routing functions between DUs in the CU can determine to which DU data should be transmitted in consideration of the information notified from each DU.

Each DU may notify the CU of information on successful transmission or transmission failure resulted from the retransmission control in the RLC. Each DU may notify the information in association with the identifier of its own DU. The PDCP in the CU can determine whether to perform retransmission, according to the information.

Each DU may notify the CU of information on successful transmission or transmission failure resulted from the retransmission control (HARM) in the MAC. Each DU may notify the information in association with the identifier of its own DU. The PDCP in the CU can determine whether to perform retransmission, according to the information. The methods disclosed in, for example, the third embodiment may be applied to this method.

The PDCP in the CU determines again to which DU the data determined to be retransmitted is routed using the routing functions between DUs, and transmits the data to the determined routing destination DU. The data may be transmitted not limited to the DU to which the data has been previously transmitted but to an arbitrary DU. Enabling transmission to a DU different from the DU to which the data has been previously transmitted enables determination of a routing destination DU in consideration of a communication state between the UE and the DU.

The CU of the gNB may have the functions of duplicating a packet and detecting and removing redundant packets which are disclosed in the first embodiment, together with the routing functions between DUs. These functions may be the PDCP functions in the CU. The gNB can implement the function of duplicating a packet, and route, between DUs, the packets duplicated by the gNB using the routing functions between DUs.

One of a method for determining the DU in the function of duplicating a packet disclosed in the first embodiment and the method for determining a routing destination DU in the routing functions between DUs should be applied to a function of determining the DU that transmits the duplicated packets.

When the DU itself or the UE determines the DU that communicates the duplicated packets, the function of determining the routing destination DU in the routing functions between DUs may be disabled. The function of determining the routing destination DU in the routing functions between DUs may be bypassed or transparent. In the routing functions between DUs, a function of transmitting duplicated packets may be enabled for the DU that communicates the duplicated packets determined by the DU itself or the UE.

This can configure the CU having both of the function of duplicating a packet and the routing functions between DUs.

The methods disclosed in the fifth embodiment enable the gNB to communicate with the UE using a plurality of DUs even when the plurality of DUs are connected to the CU in the CU-DU split configuration in Option 2.

The fifth embodiment provides, for example, the following configuration.

Provided is a communication system including a communication terminal device and a base station device configured to perform radio communication with the communication terminal device. Specifically, the base station device includes: a plurality of distributed units (DUs) that transmit and receive radio signals to and from the communication terminal device; and a central unit (CU) that controls the plurality of DUs. The CU has a function of routing downlink data addressed to the communication terminal device, in or lower than a packet data convergence protocol (PDCP).

The configuration can be variously modified based on the disclosure and the suggestion of the Description including the fifth embodiment. The configuration and the modified configuration can solve the problems, and produce the advantages.

The Sixth Embodiment

In 3GPP, the dual connectivity (DC) using a split bearer (SB) is being studied as a technology of NR.

A master gNB (MgNB) responsible for performing routing to an MgNB or a SgNB using the SB is being proposed (Non-Patent Document 22: R3-170266).

Application of a configuration not using the PDCP of a secondary gNB (SgNB) for the UE performing the DC is being proposed in NR similarly as the LTE (Non-Patent Document 9: TR38.804V1.0.0).

In the PDCP of the MgNB, data for the SgNB is routed to the SgNB, and transmitted to the SgNB. The data transmitted to the SgNB is entered into the RLC in the SgNB.

When the gNB with the CU-DU split configuration in Option 2 is applied as the SgNB of the SB, the following problems occur.

When the SgNB does not have the CU-DU split configuration as in the conventional LTE, the MgNB has only to transmit data to the SgNB. In NR, however, when the SgNB has the CU-DU split configuration, it is unclear to which part of the SgNB the MgNB should transmit data, the CU or the DU.

As previously described, the SgNB does not use the PDCP for the UE performing the DC (TR38.804 v1.0.0). Thus, even though the MgNB transmits data to the CU of the SgNB, the data cannot be entered into the PDCP in the CU. Due to the absence of the RLC in the CU, the processing is impossible. Thus, transmission of data from the PDCP in the CU to the RLC in the DU is impossible.

Even through the MgNB transmits data to the DU of the SgNB, it is unclear in which method and to which DU of another gNB the data should be transmitted.

This disables transmission of the data from the MgNB to the SgNB.

Similarly, transmission of data from the SgNB to the MgNB in the uplink is impossible. The description thereof is omitted because the transmission path in the uplink is reverse to that described above.

Thus, a problem of failing to establish communication between the base station side and the UE that communicates using the DUs of the SgNB occurs.

The sixth embodiment discloses a method for solving such problems.

The SgNB is provided with the routing functions between DUs. The SgNB performs routing between DUs. The CU of the SgNB is provided with the routing functions between DUs. The CU of the SgNB performs the routing between DUs. Data to be routed should be user data (U-plane data). Further, the data to be routed may be control data (C-plane data). The routing of control data is applicable when a split bearer supports the control data.

The SgNB that is a secondary gNB in the DC with the SB routes, between DUs, the PDCP-PDU transmitted from the MgNB.

As previously described, to which part of the CU of the SgNB the routing functions between DUs are provided is a problem. Here, three examples of where the routing functions between DUs are provided are disclosed.

(1) The routing functions between DUs are provided inside the PDCP in the CU of the SgNB.

(2) The routing functions between DUs are provided outside the PDCP in the CU of the SgNB.

(3) A protocol stack having the routing functions between DUs is provided outside the PDCP in the CU of the SgNB.

The details on (1) are disclosed.

The routing functions between DUs are provided inside the PDCP in the CU of the SgNB. Data forwarding between the MgNB and the SgNB is disclosed. The MgNB of the UE which is a connecting destination of the split bearer enters data into the PDCP of the SgNB. The CU of the SgNB executes only the routing functions between DUs for the PDCP. The CU may enable only the routing functions. The CU may prevent the other functions from being executed. The other functions may be bypassed or transparent. The PDCP in the CU of the SgNB outputs data to each DU.

In the receiver, a function of routing data from each DU to the MgNB is provided in the PDCP in the CU of the SgNB. The function of routing data from each DU to the MgNB may be one of the routing functions between DUs.

The data from each DU is routed to the MgNB in order of arrival as a function of the receiver. In other words, the data from each DU is transmitted one by one to the MgNB in order of arrival.

As an alternative method, the data from each DU may be routed to the MgNB in order of PDCP sequence number (PDCP-SN). In other words, the data from each DU is routed in order of PDCP-SN and transmitted one by one to the MgNB.

Figure 42:
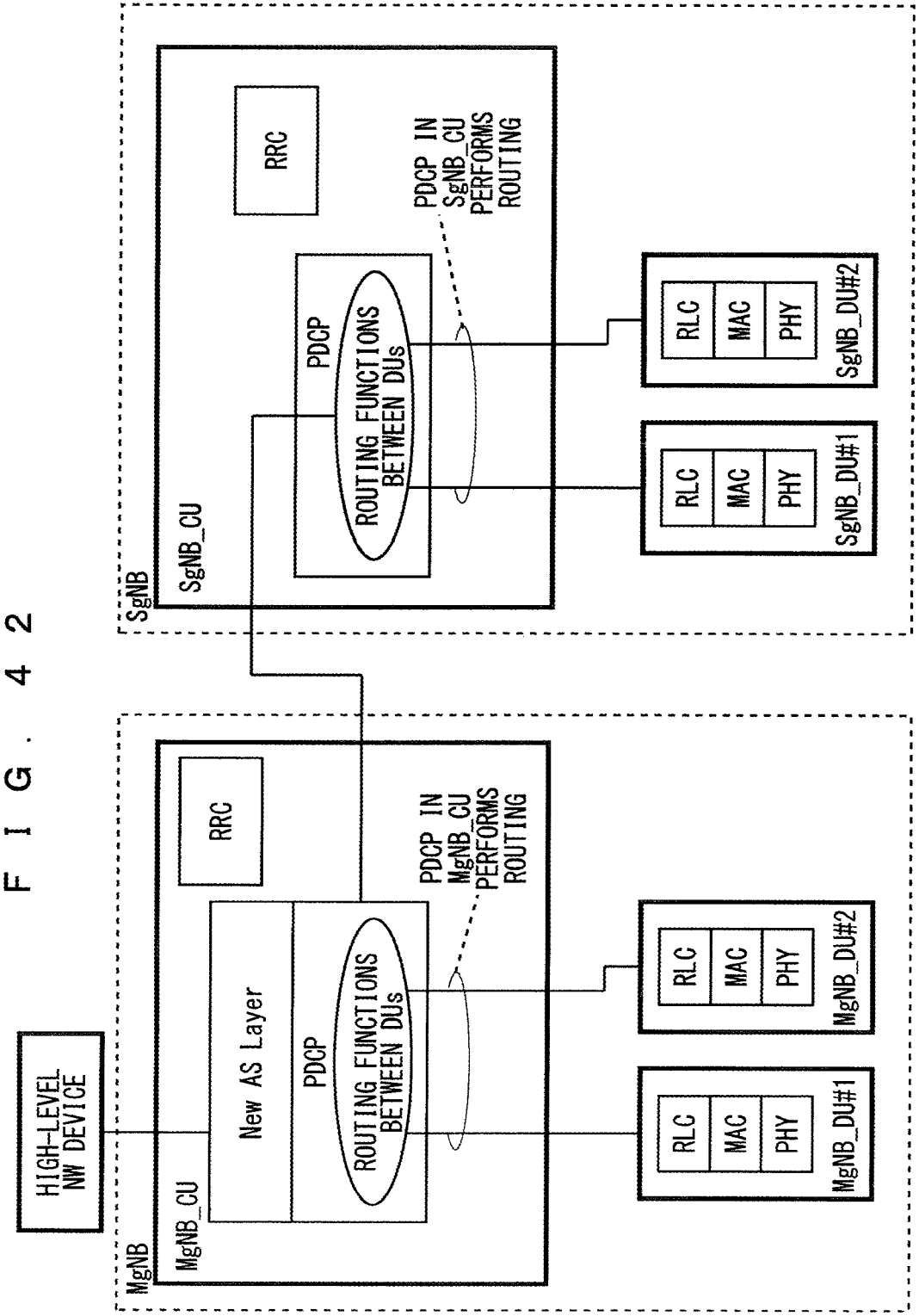
FIG. 42 illustrates an example architecture when the PDCP of the SgNB is provided with the routing functions between DUs according to the sixth embodiment.

FIG. 42 illustrates an example architecture when the PDCP of the SgNB is provided with the routing functions between DUs. FIG. 42 illustrates that both the MgNB and the SgNB have the CU-DU split configurations in Option 2.

The MgNB includes a CU and DUs. The two DUs (the DUs #1 and #2) are connected to the one CU. The CU includes the RRC, the New AS layer, and the PDCP. Each of the DUs includes the RLC, the MAC, and the PHY.

The SgNB includes a CU and DUs. The two DUs (the DUs #1 and #2) are connected to the one CU. The CU of the SgNB includes the RRC. Each of the DUs includes the RLC, the MAC, and the PHY. Since the SgNB is a secondary gNB of the UE performing the DC, the CU does not include the New AS layer and the PDCP in the conventional configuration. In the example of FIG. 42, however, the PDCP is provided in the CU.

The routing functions between DUs are provided into the PDCP in the CU in the SgNB. In the example of FIG. 42, the routing functions between DUs are also provided into the PDCP in the CU in the MgNB.

An interface should be provided between the CU of the MgNB and the CU of the SgNB for data communication between the MgNB and the SgNB. The interface may be a new interface, or Xn or Xx that is being studied in 3GPP as an interface between gNBs.

The MgNB of the UE which is a connecting destination of the split bearer enters data into the PDCP of the SgNB through the interface. The PDCP configured in the CU of the SgNB executes only the routing functions between DUs. The PDCP outputs the data from the MgNB to each DU with the routing functions between DUs.

In the receiver, the data from each DU is routed to the MgNB with the routing functions between DUs that are configured in the PDCP in the CU of the SgNB. For example, the SgNB routes and transmits the data from each DU to the MgNB in order of arrival.

Since such a method enables the SgNB to use the PDCP that is an existing protocol stack, the gNB can be easily configured. The gNB with the CU-DU split configuration in Option 2 is easily used as a secondary gNB in the DC.

The CU of the SgNB may have the functions of duplicating a packet and detecting and removing redundant packets which are disclosed in the first embodiment. The functions may be provided in the PDCP configured in the CU. Thereby, a packet can be duplicated in the SgNB.

The CU of the SgNB may have the functions together with the routing functions between DUs. These functions may be the PDCP functions in the CU. The gNB having, in the PDCP of the CU, both of the function of duplicating a packet and the routing functions between DUs as disclosed in the fifth embodiment may be used as an SgNB. When the gNB is used as an SgNB of the UE dependent on the DC, the function of duplicating a packet and the routing functions between DUs should be enabled.

This enables the SgNB to implement, using a plurality of DUs, the function of duplicating a packet and the function of detecting and removing redundant packets. The MgNB does not have to execute the function of duplicating a packet to be performed by the SgNB using a plurality of DUs. Thus, increase in the data communication volume between the MgNB and the SgNB can be prevented.

The details on (2) are disclosed.

The routing functions between DUs are provided outside the PDCP in the CU of the SgNB. The RRC of the SgNB may have the routing functions. The data forwarding between the MgNB and the SgNB is disclosed. The MgNB of the UE which is a connecting destination of the split bearer enters data into the CU of the SgNB. The CU of the SgNB executes only the routing functions between DUs. The CU may enable only the routing functions. The CU may prevent the other functions from being executed. The other functions may be bypassed or transparent. The CU of the SgNB outputs data to each DU.

In the receiver, a function of routing the data from each DU to the MgNB is provided outside the PDCP in the CU of the SgNB. The function of routing the data from each DU to the MgNB may be one of the routing functions between DUs.

The methods previously disclosed in (1) should be applied as functions of the receiver.

Figure 43:
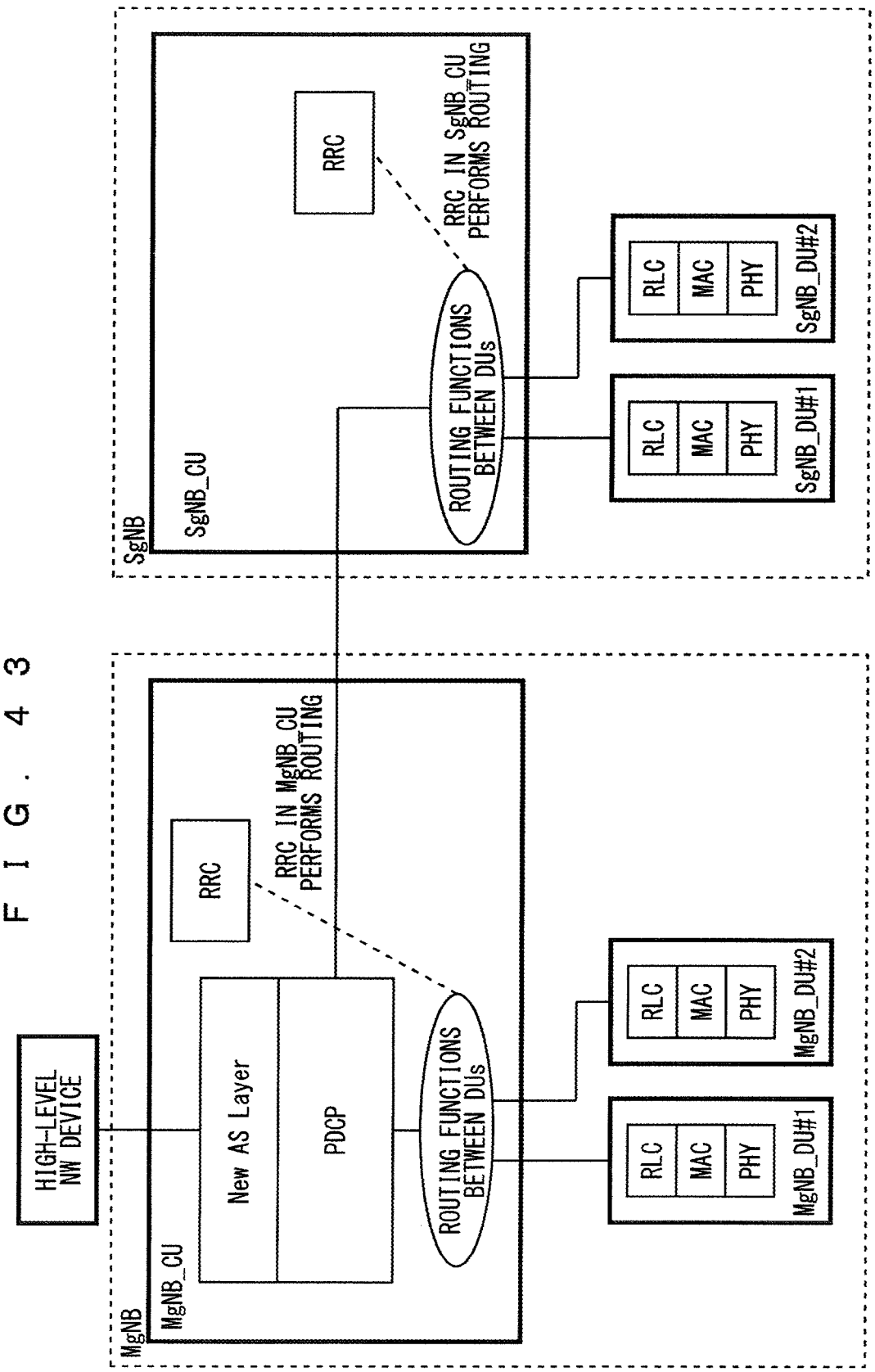
FIG. 43 illustrates an example architecture when the routing functions between DUs are provided outside the PDCP in the CU of the SgNB according to the sixth embodiment.

FIG. 43 illustrates an example architecture when the routing functions between DUs are provided outside the PDCP in the CU of the SgNB. FIG. 43 illustrates that both the MgNB and the SgNB have the CU-DU split configurations in Option 2.

The MgNB includes a CU and DUs. The two DUs (the DUs #1 and #2) are connected to the one CU. The CU includes the RRC, the New AS layer, and the PDCP. Each of the DUs includes the RLC, the MAC, and the PHY.

The SgNB includes a CU and DUs. The two DUs (the DUs #1 and #2) are connected to the one CU. The CU of the SgNB includes the RRC. Each of the DUs includes the RLC, the MAC, and the PHY. Since the SgNB is a secondary gNB of the UE performing the DC, the CU does not include the New AS layer and the PDCP.

The routing functions between DUs are provided outside the PDCP in the CU of the SgNB. In the example of FIG. 43, the routing functions between DUs are provided outside the PDCP in the CU of the MgNB.

A gNB may have the routing functions between DUs outside the PDCP of the gNB. Although the routing functions between DUs are provided into the PDCP of the MgNB in the example of FIG. 42, the routing functions between DUs may be provided outside the PDCP of the MgNB herein.

Similarly as (1), an interface should be provided between the CU of the MgNB and the CU of the SgNB for data communication between the MgNB and the SgNB.

The MgNB of the UE which is a connecting destination of the split bearer enters data into the routing functions between DUs that are provided outside the PDCP in the CU of the SgNB, through the interface. The entered data is output to each DU with the routing functions between DUs.

In the receiver, the data from each DU is routed to the MgNB with the routing functions between DUs that are provided outside the PDCP in the CU of the SgNB. For example, the SgNB routes and transmits the data from each DU to the MgNB in order of arrival.

When a split bearer is executed, application of such a method enables the SgNB to have the configuration not using the PDCP, similarly as that using the conventional split bearer. This facilitates functional extension in the SgNB.

When the RRC of the SgNB has the routing functions between DUs, the routing functions between DUs can be executed by merely adding a function to the RRC. Thus, the gNB can be easily configured. When the RRC of the SgNB has the routing functions between DUs, collective routing using a plurality of bearers is possible. Thus, the amount of processing can be reduced.

The CU of the SgNB may have the functions of duplicating a packet and detecting and removing redundant packets which are disclosed in the first embodiment. The functions may be provided outside the PDCP configured in the CU. Thereby, the packet can be duplicated in the SgNB.

The CU of the SgNB may have the functions together with the routing functions between DUs. These functions may be functions outside the PDCP in the CU. The gNB having, outside the PDCP in the CU, both of the function of duplicating a packet and the routing functions between DUs may be used as the SgNB. When the gNB is used as an SgNB of the UE dependent on the DC, the function of duplicating a packet and the routing functions between DUs should be enabled.

This enables the SgNB to implement, using a plurality of DUs, the functions of duplicating a packet and detecting and removing redundant packets. The MgNB does not have to execute the function of duplicating a packet to be performed by the SgNB using a plurality of DUs. Thus, increase in the data communication volume between the MgNB and the SgNB can be prevented.

The details on (3) are disclosed.

A protocol stack having the routing functions between DUs (may be referred to as an "RP") is provided outside the PDCP in the CU of the SgNB. The RP may be provided separately from the PDCP. The RP may be set lower than the PDCP. The RP performs the routing between DUs in the SgNB.

The data forwarding between the MgNB and the SgNB is disclosed. The MgNB of the UE which is a connecting destination of the split bearer enters data into the CU of the SgNB. The MgNB should enter the data in the RP in the CU of the SgNB. With the routing functions between DUs provided in the RP, the data is routed between DUs and output to each of the DUs.

In the receiver, a function of routing the data from each DU to the MgNB is provided in the RP in the CU of the SgNB. The function of routing the data from each DU to the MgNB may be one of the routing functions between DUs.

The methods previously disclosed in (1) should be applied as functions of the receiver.

FIG. 44 illustrates an example architecture when the protocol stack having the routing functions between DUs are provided outside the PDCP in the CU of the SgNB. FIG. 44 illustrates that both the MgNB and the SgNB have the CU-DU split configurations in Option 2.

The MgNB includes a CU and DUs. The two DUs (the DUs #1 and #2) are connected to the one CU. The CU includes the RRC, the New AS layer, and the PDCP. Each of the DUs includes the RLC, the MAC, and the PHY.

The SgNB includes a CU and DUs. The two DUs (the DUs #1 and #2) are connected to the one CU. The CU of the SgNB includes the RRC. Each of the DUs includes the RLC, the MAC, and the PHY. Since the SgNB is a secondary gNB of the UE performing the DC, the CU does not include the New AS layer and the PDCP.

The RP is provided outside the PDCP in the CU of the SgNB. The routing functions between DUs are provided in the RP. In the example of FIG. 44, the RP is provided outside the PDCP in the CU of the MgNB. The RP has the routing functions between DUs.

A gNB may have the RP outside the PDCP of the gNB, and the RP may have the routing functions between DUs. Although the routing functions between DUs are provided outside the PDCP of the MgNB in the example of FIG. 43, the RP may be provided outside the PDCP of the MgNB, and the RP may have the routing functions between DUs herein.

The RP may be a protocol stack common to gNBs which has both of the routing functions between DUs for MgNB and the routing functions between DUs for SgNB. Alternatively, the RP may be a protocol stack common to gNBs with the integrated routing functions between DUs for MgNB and SgNB. For example, the PDCP may enter data into the RP in the transmitter, and the RP may transmit the data to the PDCP in the receiver.

Data is transmitted and received between the PDCP and the RP in the MgNB. Data is transmitted and received between the PDCP in the MgNB and the RP in the SgNB.

A gNB may be an MgNB for a UE, and may be an SgNB for another UE. Thus, the RP common to gNBs enables execution of the routing between DUs even when a gNB is used as an MgNB or an SgNB.

Similarly as (1), an interface should be provided between the CU of the MgNB and the CU of the SgNB for data communication between the MgNB and the SgNB.

The MgNB of the UE which is a connecting destination of the split bearer enters data into the RP provided outside the PDCP in the CU of the SgNB, through the interface. The entered data is output to each DU with the routing functions between DUs.

In the receiver, the data from each DU is routed to the MgNB with the routing functions between DUs in the RP which are provided outside the PDCP in the CU of the SgNB. For example, the SgNB routes and transmits the data from each DU to the MgNB in order of arrival.

Application of the protocol stack having the routing functions between DCs enables a gNB to be configured without influencing the other protocol stacks in the gNB. Thus, the SgNB can be easily configured.

Since application of the RP common to gNBs eliminates the need for providing different designs, implementations, or settings for the MgNB and the SgNB, the complexity can be avoided.

The RP may have the functions of duplicating a packet and detecting and removing redundant packets which are disclosed in the first embodiment. The RP having the functions of duplicating a packet and detecting and removing redundant packets enables a gNB to be configured without influencing the other protocol stacks.

Since the functions of duplicating a packet and detecting and removing redundant packets which are provided in the RP common to gNBs eliminates the need for providing different designs, implementations, or settings for the MgNB and the SgNB, the complexity can be avoided.

The CU of the SgNB may have the functions of duplicating a packet and detecting and removing redundant packets which are disclosed in the first embodiment. The RP configured in the CU may have the functions. Thereby, the packet can be duplicated in the SgNB.

The CU of the SgNB may have the functions together with the routing functions between DUs. These functions may be functions in the RP of the CU. The gNB having, inside the RP in the CU, both of the function of duplicating a packet and the routing functions between DUs may be used as the SgNB. When the gNB is used as an SgNB of the UE dependent on the DC, the function of duplicating a packet and the routing functions between DUs should be enabled.

This enables the SgNB to implement, using a plurality of DUs, the functions of duplicating a packet and detecting and removing redundant packets. The MgNB does not have to execute the function of duplicating a packet to be performed by the SgNB using a plurality of DUs. Thus, increase in the data communication volume between the MgNB and the SgNB can be prevented.

The CU in a gNB may be provided with a buffer for DU. The DU of a gNB may be provided with a buffer for each DU. The methods disclosed in the fifth embodiment should be applied. The same advantages are produced.

Each DU may notify the CU of information requesting the downlink data, information on the RLC retransmission control, and information on the MAC retransmission control. The methods disclosed in the fifth embodiment should be applied. The same advantages are produced.

The fifth embodiment discloses that the PDCP in the CU determines again which DU the data determined to be retransmitted is routed to using the routing functions between DUs, and transmits the data to the determined routing destination DU. In the sixth embodiment, the CU or the protocol stack in the CU which is provided with the routing functions between DUs should perform these processes. The same advantages are produced.

The SgNB may notify the MgNB of information indicating the presence or absence of the CU-DU split configuration of its own SgNB.

The SgNB may also notify the MgNB of information on the routing functions between DUs of its own SgNB. Examples of the information on the routing functions between DUs include the presence or absence of the routing functions between DUs and configuration information on where the routing functions between DUs are provided.

The SgNB may notify the MgNB of these pieces of information upon setting of the DC. For example, upon SgNB addition, the SgNB may notify the MgNB of the information. The SgNB may notify the MgNB of the information by including the information in signaling for notifying a response to the request for the SgNB addition.

Alternatively, upon SgNB modification, the SgNB may notify the MgNB of the information. The SgNB may notify the MgNB of the information by including the information in signaling for notifying a response to the request for the SgNB modification.

As such, the SgNB notifies the MgNB of the information indicating the presence or absence of the CU-DU split configuration and the information on the routing functions between DUs, so that the MgNB can recognize these. The MgNB may perform the routing for the SB in consideration of these.

The information may be notified between gNBs not upon setting of the DC but, for example, upon setting up an interface between gNBs. The information may be notified to the other gNBs by including, in a set-up message, the information indicating the presence or absence of the CU-DU split configuration of its own gNB and information on the routing between DUs.

Alternatively, the information may be notified upon update of the gNB setting. The information may be notified to the other gNBs by including, in an update message for the gNB setting, the information indicating the presence or absence of the CU-DU split configuration of its own gNB and the information on the routing between DUs.

The other gNBs may be surrounding gNBs.

Such notifications of the information, for example, upon setting up the interface or upon update of the gNB setting enable consideration of the configurations of the surrounding gNBs not only in the DC but in the other services.

Information to be notified between the MgNB and the SgNB is disclosed. The information may be information to be notified between the MgNB and the SgNB when the SB is applied in the LTE. The information may be information to be notified through X2-U (Non-Patent Document 23: TS36.425).

The information to be notified from the MgNB to the SgNB includes information associated with the DL data. The information associated with the DL data is, for example, a sequence number assigned through the interface between the MgNB and the SgNB. When Xn or Xx is provided, the sequence number assigned through the interface should be the information associated with the DL data. Examples of the sequence number include Xn-U SN and Xx-U SN.

The information to be notified from the SgNB to the MgNB is information on a transmission state of the DL data. The information on a transmission state of the DL data is, for example, the highest PDCP-SN successfully transmitted to the UE. The SgNB may notify the PDCP-SN successfully transmitted to the UE for a predetermined duration as the information on a transmission state of the DL data. The SgNB may notify the PDCP-SN failing in transmission to the UE for a predetermined duration as the information on a transmission state of the DL data. The SgNB may notify the first PDCP-SN to be notified, together with the PDCP-SN successfully transmitted or having failed in transmission for a predetermined duration. The PDCP-SN successfully transmitted or having failed in transmission for a predetermined duration may be notified as bitmap information. This can reduce the number of bits required for the notification.

The information on a transmission state of the DL data may be of, for example, the highest PDCP-SN successfully transmitted from the CU to the DU or the RLC in the DU. The SgNB may notify the PDCP-SN successfully transmitted from the CU to the DU or the RLC in the DU for a predetermined duration as the information on a transmission state of the DL data. The SgNB may notify the PDCP-SN whose transmission from the CU to the DU or the RLC in the DU has failed for a predetermined duration as the information on a transmission state of the DL data. The SgNB may notify the first PDCP-SN to be notified, together with the PDCP-SN successfully transmitted or having failed in transmission for a predetermined duration. The PDCP-SN successfully transmitted or having failed in transmission for a predetermined duration may be notified as the bitmap information. This can reduce the number of bits required for the notification.

The information on a transmission state of the DL data may be of, for example, the highest PDCP-SN successfully transmitted from the DU or the RLC in the DU to the UE. The SgNB may notify the PDCP-SN successfully transmitted from the DU or the RLC in the DU to the UE for a predetermined duration as the information on a transmission state of the DL data. The SgNB may notify the PDCP-SN whose transmission from the DU or the RLC in the DU to the UE has failed for a predetermined duration as the information on a transmission state of the DL data. The SgNB may notify the first PDCP-SN to be notified, together with the PDCP-SN successfully transmitted or having failed in transmission for a predetermined duration. The PDCP-SN successfully transmitted or having failed in transmission for a predetermined duration may be notified as the bitmap information. This can reduce the number of bits required for the notification.

The DU may notify the CU of information on the highest PDCP-SN successfully transmitted from the DU or the RLC in the DU to the UE, information on the PDCP-SN successfully transmitted from the DU or the RLC in the DU to the UE for a predetermined duration, and information on the PDCP-SN whose transmission from the DU or the RLC in the DU to the UE has failed for a predetermined duration. Alternatively, the RLC in the DU may notify the PDCP in the CU of these pieces of information. The CU in the SgNB can notify the MgNB of these pieces of information.

Information to be notified from the SgNB to the MgNB includes information on a buffer size. Examples of such information include information on a desired buffer size for a bearer to be the SB and information on the minimum desired buffer size for the UE dependent on the SB.

The information to be notified from the SgNB to the MgNB includes information on data lost in the data communication between the MgNB and the SgNB. The information on lost data is, for example, the sequence number assigned to the lost data through the interface between the MgNB and the SgNB. The other examples of the information on lost data include the sequence number assigned to data lost first through the interface between the MgNB and the SgNB, and the sequence number assigned to data lost last through the interface between the MgNB and the SgNB. The SgNB may notify the number of series of the lost data sets.

This enables appropriate and efficient data transmission even when the MgNB transmits data to the PDCP in the CU of the SgNB.

Figure 46:
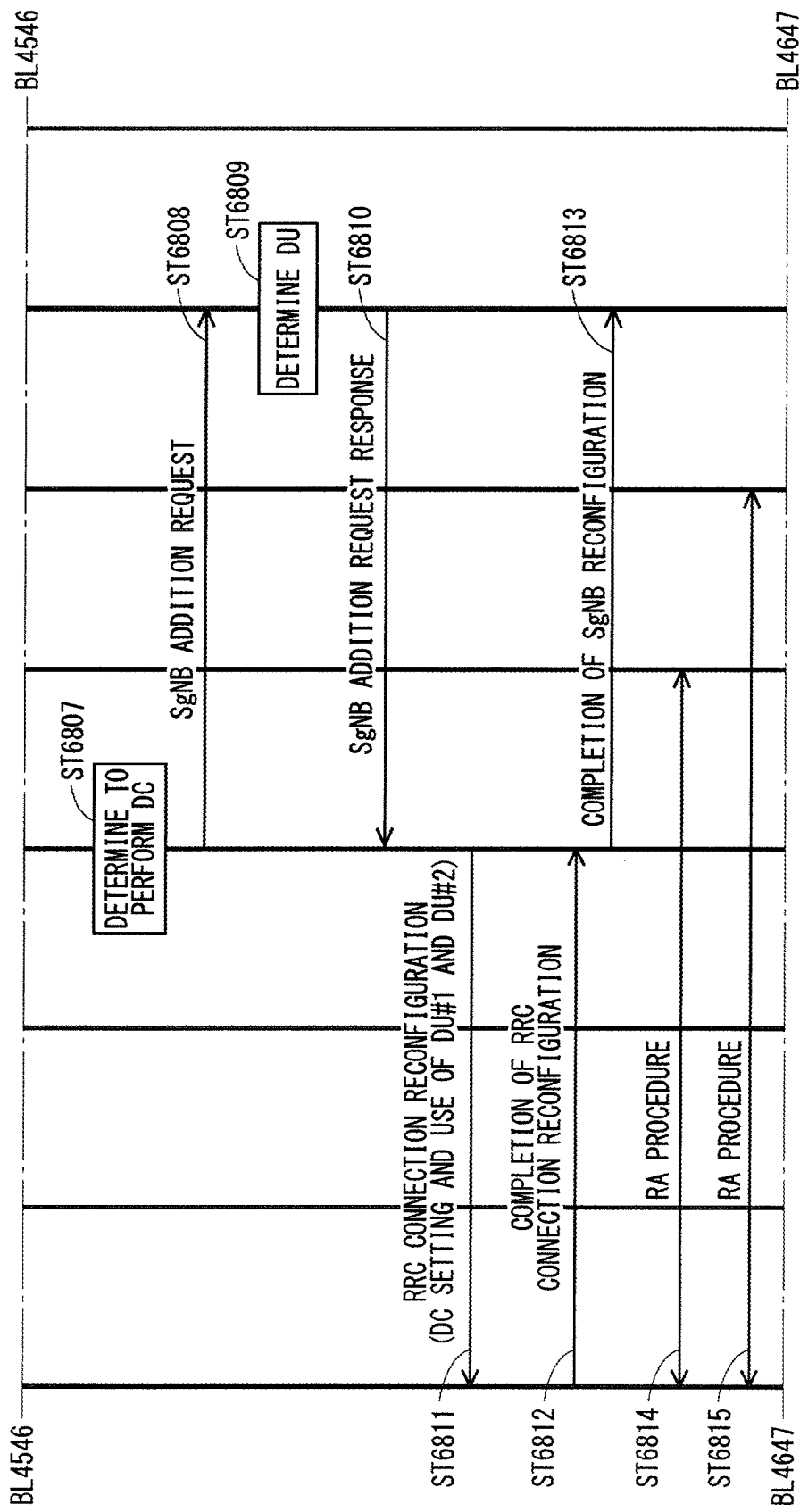
FIG. 46 illustrates the example sequence on the DC with the SB using the SgNB with the CU-DU split configuration according to the sixth embodiment.
Figure 47:
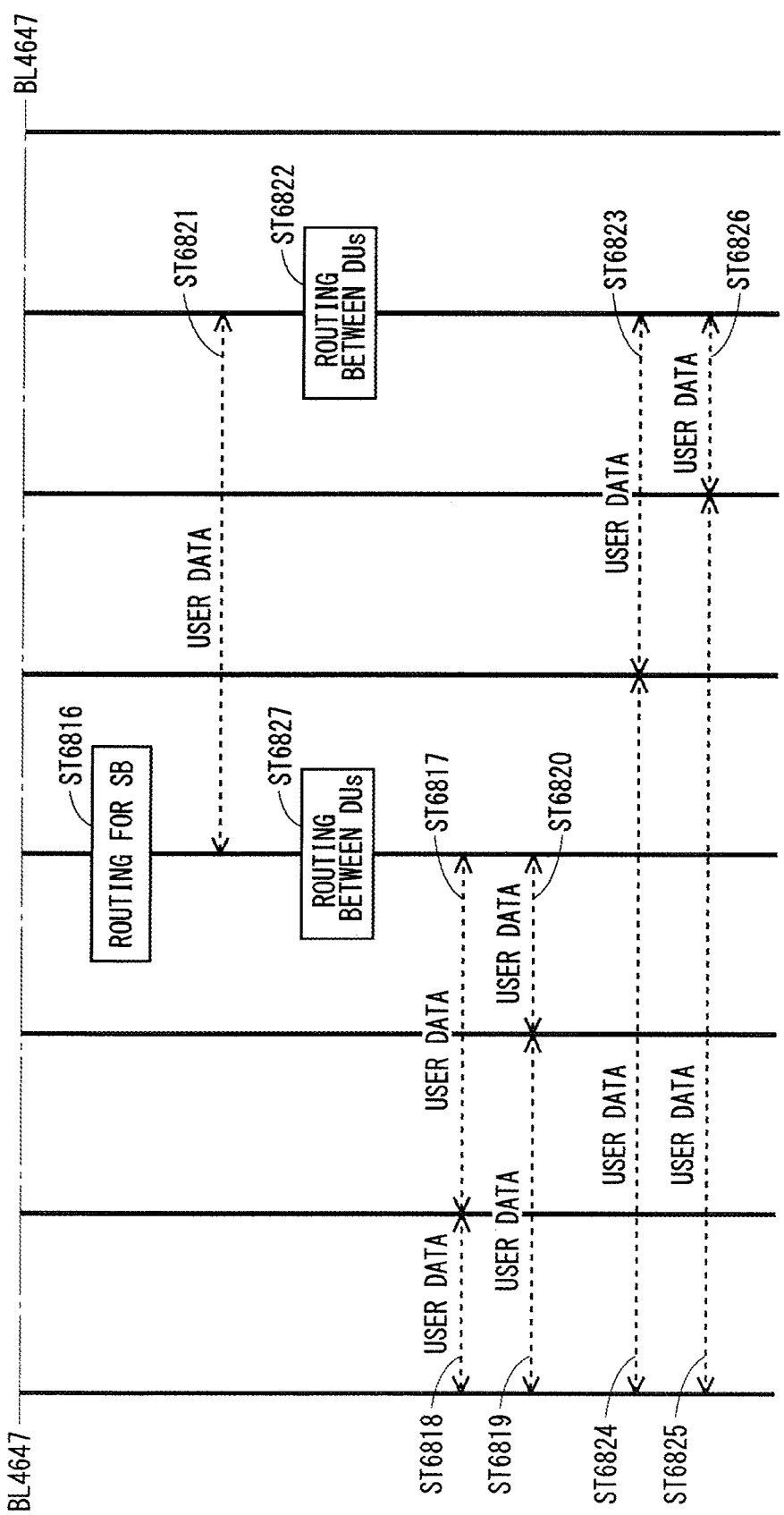
FIG. 47 illustrates the example sequence on the DC with the SB using the SgNB with the CU-DU split configuration according to the sixth embodiment.

FIGS. 45 to 47 illustrate an example sequence on the DC with the SB using the SgNB with the CU-DU split configuration. FIGS. 45 to 47 are connected across locations of borders BL4546 and BL4647.

The SgNB has the CU-DU split configuration in Option 2, and two DUs (the DUs #1 and #2) are connected to one CU. The MgNB also has the CU-DU split configuration in Option 2, and two DUs (the DUs #1 and #2) are connected to one CU.

In Step ST6801, data is transmitted and received between the high-level NW device and the MgNB CU.

In Step ST6802, the MgNB CU performs the routing between DUs. For example, when the PDCP has the routing functions between DUs, the PDCP performs the routing between DUs. In the routing between DUs, a routing destination DU is determined, and data is transmitted to the determined routing destination DU.

In Step ST6803, the MgNB CU transmits, to the MgNB DU #1, data determined to be routed to the MgNB DU #1.

In Step ST6804, the MgNB DU #1 performs RLC, MAC, and PHY processes on the data received from the MgNB CU and transmits the processed data to the UE.

In Step ST6806, the MgNB CU transmits, to the MgNB DU #2, data determined to be routed to the MgNB DU #2.

In Step ST6805, the MgNB DU #2 performs the RLC, MAC, and PHY processes on the data received from the MgNB CU and transmits the processed data to the UE.

When the UE performs transmission, operations reverse to these are performed. In Step ST6804, the UE transmits data to the MgNB DU #1. In Step ST6803, the data received by the MgNB DU #1 is processed by the PHY, the MAC, and the RLC, and transmitted to the MgNB CU. Similarly, in Step ST6805 and ST6806, the UE transmits data to the MgNB CU through the MgNB DU #2. In Step ST6802, the MgNB CU performs the routing between DUs in the receiver. For example, the MgNB CU transmits, to a high-level function, the data from the MgNB DU #1 and the data from the MgNB DU #2 in order of arrival. The data from the UE is processed by the PDCP in the MgNB CU, processed by the New AS layer, and transmitted to the high-level NW device in Step ST6801.

Even when the MgNB includes a plurality of DUs, these enable communication between the UE and the high-level NW device.

Next, execution of the DC with the SB is described. In Step ST6807, the MgNB determines to execute the DC for the UE.

In Step ST6808, the MgNB CU notifies the SgNB CU of an SgNB addition request message. Upon receipt of the message, the SgNB CU permits its own gNB to be used as the SgNB.

Here in Step ST6809, the SgNB CU may determine the DU to be applied in the DC.

In Step ST6810, the SgNB CU notifies the MgNB CU of an SgNB addition request response message. The SgNB CU includes, in this message, the DU to be applied in the DC that has been determined in Step ST6809, and gives the notification.

Upon receipt of the SgNB addition request response message, the MgNB CU notifies the UE that performs the DC of the setting of the DC in Step ST6811. Here, the MgNB CU should notify information on the DUs of the SgNB to be applied in the DC. Examples of the information include the identifiers of the DUs #1 and #2, the resource to be used in the initial access (for example, random access), and the sequence information.

The message for the RRC connection reconfiguration should be used in this notification. Consequently, the UE can identify which DU of the SgNB the DC is performed with, and access the DU performing the DC.

In Step ST6812, the UE notifies the MgNB CU of completion of the DC setting. The message for completion of the RRC connection reconfiguration should be used in this notification.

In Step ST6813, the MgNB CU notifies the SgNB CU of completion of the SgNB reconfiguration.

The DC setting with the SB is made in such a manner.

In Steps ST6814 and ST6815, the UE performs random access (RA) procedure with the DUs #1 and #2 of the SgNB performing the DC. This enables access between the UE and the DUs #1 and #2 of the SgNB performing the DC.

In Step ST6816, the MgNB CU routes data to be transmitted from the high-level NW device, to the MgNB and the SgNB for the SB. In Step ST6821, the MgNB CU transmits, to the SgNB, the data routed to the SgNB. Specifically, the MgNB CU transmits the data to the CU of the SgNB.

In Step ST6827, the MgNB CU routes, between the DUs, the data routed to the MgNB. With the routing between DUs in Step ST6827, the MgNB CU transmits, to the MgNB DU #1 in Step ST6817, the data that the MgNB CU determines to route to the MgNB DU #1. In Step ST6818, the MgNB DU #1 processes the received data and transmits the processed data to the UE.

With the routing between DUs in Step ST6827, the MgNB CU transmits, to the MgNB DU #2 in Step ST6820, the data that the MgNB CU determines to route to the MgNB DU #2. In Step ST6819, the MgNB DU #2 processes the received data and transmits the processed data to the UE.

In Step ST6822, the data transmitted to the SgNB CU is routed between the DUs. Even when the routing functions between DUs are provided in the PDCP of the SgNB, only the routing functions between DUs are enabled.

With the routing between DUs in Step ST6822, the SgNB CU transmits, to the SgNB DU #1 in Step ST6823, the data that the SgNB CU determines to route to the SgNB DU #1. In Step ST6824, the SgNB DU #1 processes the received data and transmits the processed data to the UE.

With the routing between DUs in Step ST6822, the SgNB CU transmits, to the SgNB DU #2 in Step ST6826, the data which the SgNB CU determines to route to the SgNB DU #2. In Step ST6825, the SgNB DU #2 processes the received data and transmits the processed data to the UE.

When the UE performs transmission, operations reverse to these are performed. Since the same methods as disclosed in Steps ST6802 to Step ST6806 are applied to the MgNB side, the description thereof is omitted.

The SgNB is disclosed.

In Step ST6824, the UE transmits data to the SgNB DU #1. The data received by the SgNB DU #1 is processed by the PHY, the MAC, and the RLC, and transmitted to the SgNB CU in Step ST6823. Similarly, in Steps ST6825 and ST6826, the UE transmits data to the SgNB CU through the SgNB DU #2.

In Step ST6822, the SgNB CU performs the routing between DUs in the receiver. For example, the SgNB CU transmits, to the MgNB, the data from the SgNB DU #1 and the data from the MgNB DU #2 in order of arrival. In Step ST6821, the SgNB CU transmits the data from the UE to the MgNB CU. The data received by the MgNB CU is processed by the PDCP, processed by the New AS layer, and transmitted to the high-level NW device.

The aforementioned information to be notified between the MgNB and the SgNB may be notified in the communication between the MgNB CU and the SgNB CU in Step ST6821.

Consequently, the gNB with the CU-DU split configuration in Option 2 can be used as the secondary gNB to perform the DC with the SB.

The methods disclosed in the sixth embodiment enable the MgNB to forward data to the SgNB when the gNB with the CU-DU split configuration in Option 2 is applied as the SgNB for the DC with the SB. The methods also enable the CU of the SgNB to perform the routing between DUs.

Thus, communication using the gNB with the CU-DU split configuration in Option 2 as the SgNB for the DC with the SB is possible.

Further, application of the methods disclosed in the sixth embodiment to the MgNB enables the routing between DUs in the MgNB.

Thus, communication using the gNB with the CU-DU split configuration in Option 2 as the MgNB for the DC with the SB is possible.

In the examples previously disclosed, the method for configuring the routing functions between DUs is consistent between the MgNB and the SgNB. This can facilitate the configuration of the gNB because the routing functions between DUs common to the gNBs can be provided.

As an alternative method, the methods for configuring the routing functions between DUs may differ between the MgNB and the SgNB. The configurations of the routing functions between DUs may differ according to the other configurations of the gNBs.

When the gNB has a plurality of configurations of the routing functions between DUs, the configuration of the routing functions between DUs may be changed semi-statically or dynamically. The gNB should notify another gNB or the gNB establishing the DC of the configuration information of its own gNB on the routing functions between DUs as information on the routing functions between DUs.

Consequently, the routing functions between DUs can be changed according to the configuration of each gNB, a load state of the gNB, or the others. The processing load of the routing between DUs in the gNB can be appropriately reduced.

The sixth embodiment provides, for example, the following configuration.

Provided is a communication system including a communication terminal device, and a plurality of base station devices configured to perform radio communication with the communication terminal device. The plurality of base station devices include a master base station device and a secondary base station device which configure bearers for the communication terminal device. Each of the master base station device and the secondary base station device includes: a plurality of distributed units (DUs) which transmit and receive radio signals to and from the communication terminal device; and a central unit (CU) which controls the plurality of DUs. The master base station device receives, from a network device higher than the master base station device, downlink data addressed to the communication terminal device. The master base station routes the downlink data to the master base station device and the secondary base station device.

Here, the CU of the master base station device has: a function of determining a routing destination DU of the master base station device; and a function of forwarding, to the determined routing destination DU, the downlink data routed to the master base station device. Here, the CU of the secondary base station device has: a function of determining a routing destination DU of the secondary base station device; and a function of forwarding, to the determined routing destination DU, the downlink data routed to the secondary base station device.

Alternatively, the CU of the master base station device may have: a function of determining a routing destination DU of the master base station device; a function of forwarding, to the determined routing destination DU, the downlink data routed to the master base station device; and a function of determining a routing destination DU of the secondary base station device. In this case, the CU of the secondary base station device has a function of forwarding the downlink data routed to the secondary base station device, to the routing destination DU of the secondary base station device that has been determined by the master base station device.

Alternatively, the CU of the master base station device may have: a function of determining a routing destination DU of the master base station device; a function of forwarding, to the determined routing destination DU, the downlink data routed to the master base station device; a function of determining a routing destination DU of the secondary base station device; and a function of forwarding, to the routing destination DU of the secondary base station device, the downlink data routed to the secondary base station device.

The configuration can be variously modified based on the disclosure and the suggestion of the Description including the sixth embodiment. The configuration and the modified configuration can solve the problems and produce the advantages.

The First Modification of the Sixth Embodiment

The first modification discloses the other methods for solving the problems described in the sixth embodiment, specifically, the problems when the gNB with the CU-DU split configuration in Option 2 is applied as the SgNB for the SB.

The MgNB is provided with a function of determining a routing destination DU of the SgNB. The SgNB is provided with a function of transmitting data to the routing destination DU. The CU of the SgNB is provided with a function of transmitting data to the routing destination DU.

The function of determining a routing destination DU of the SgNB may be set lower than the conventional PDCP functions or the PDCP functions which are proposed in NR (Non-Patent Document 22: R3-170266).

The function of determining a routing destination DU of the SgNB is set lower than the routing functions for the SB. The function of determining a routing destination DU of the SgNB may be provided after the routing to the SgNB.

Three examples of a method for configuring, in the MgNB, the function of determining a routing destination DU of the SgNB are hereinafter disclosed:

(1) the function of determining a routing destination DU is provided inside the PDCP;

(2) the function of determining a routing destination DU is provided outside the PDCP; and (3) a protocol stack having the function of determining a routing destination DU is provided outside the PDCP.

Three examples of a method for configuring, in the CU of the SgNB, a function of transmitting data from the MgNB to a routing destination DU are hereinafter disclosed:

(1) the function of transmitting the data to a routing destination DU is provided in the PDCP in the CU in the SgNB;

(2) the function of transmitting the data to a routing destination DU is provided outside the PDCP in the CU in the SgNB; and (3) a protocol stack having the function of transmitting the data to a routing destination DU is provided outside the PDCP in the CU in the SgNB.

The gNB may be provided with the routing functions between DUs.

When the gNB is the MgNB, the routing functions between DUs are configured for the SgNB. Among the routing functions between DUs of the SgNB, the function of determining a routing destination DU is enabled, whereas the function of transmitting data to the routing destination DU is disabled. As an alternative example when the gNB is the MgNB, among the routing functions between DUs of the SgNB, the functions other than the function of determining a routing destination DU may be bypassed or transparent. Consequently, when the gNB is the MgNB, the MgNB can implement the function of determining a routing destination DU of the SgNB.

When the MgNB has the CU-DU split configuration in Option 2, the routing functions between DUs may be configured for the MgNB. The MgNB can implement the routing functions between DUs of its own gNB.

When the gNB is the SgNB, among the routing functions between DUs, the function of determining a routing destination DU is disabled, whereas the function of transmitting data to the routing destination DU is enabled. As an alternative example when the gNB is the SgNB, among the routing functions between DUs, the functions other than the function of transmitting data to a routing destination DU may be bypassed or transparent. Consequently, when the gNB is the SgNB, the SgNB can implement the function of transmitting data to a routing destination DU.

The MgNB determines a routing destination DU of the SgNB and transmits transmission data to the SgNB by implementing the function of determining the routing destination DU of the SgNB for the transmission data to the SgNB. The SgNB can transmit data to each DU by implementing the function of transmitting, to a routing destination DU, data transmitted from the MgNB.

In the receiver, the SgNB is provided with a function of routing the data from each DU to the MgNB. The function of routing the data from each DU to the MgNB may be one of the routing functions between DUs. Alternatively, the function of routing the data from each DU to the MgNB may be one of the functions of transmitting data to the routing destination DU. The data from each DU is routed to the MgNB in order of arrival as a function of the receiver. In other words, the data from each DU is transmitted one by one to the MgNB in order of arrival.

As an alternative method, the data from each DU may be routed to the MgNB in order of PDCP sequence number (PDCP-SN). In other words, the data from each DU is routed in order of PDCP-SN and transmitted one by one to the MgNB.

The MgNB may be provided with a function of transmitting, to a high-level function, data transmitted from the SgNB. Here, the MgNB may remove information that is unnecessary for a high-level function, and transmit the data after removal to the high-level function. The function of transmitting, to a high-level function, data transmitted from the SgNB may be one of the routing functions between DUs. Alternatively, the function of transmitting, to a high-level function, data transmitted from the SgNB may be one of the functions of determining a routing destination DU.

Consequently, the receiver can transmit data from each DU of the SgNB to the MgNB.

The methods for configuring the routing functions between DUs that are disclosed in the sixth embodiment should be appropriately applied to the methods (1) to (3) for configuring the function of determining a routing destination DU and the methods (1) to (3) for configuring the function of transmitting data to the routing destination DU.

FIG. 48 illustrates an example architecture when the MgNB is provided with the function of determining a routing destination DU of the SgNB and the PDCP in the CU of the SgNB is provided with the routing functions between DUs. FIG. 48 illustrates that both the MgNB and the SgNB have the CU-DU split configurations in Option 2.

The MgNB includes a CU and DUs. The two DUs (the DUs #1 and #2) are connected to the one CU. The CU includes the RRC, the New AS layer, and the PDCP. Each of the DUs includes the RLC, the MAC, and the PHY.

The SgNB includes a CU and DUs. The two DUs (the DUs #1 and #2) are connected to the one CU. The CU of the SgNB includes the RRC. Each of the DUs includes the RLC, the MAC, and the PHY. Since the SgNB is a secondary gNB of the UE performing the DC, the CU does not include the New AS layer and the PDCP in the conventional configuration. In the first modification of the sixth embodiment, however, the CU includes the PDCP.

The function of determining a routing destination DU of its own gNB and the function of transmitting data to the determined routing destination DU are provided in the PDCP in the CU of the MgNB. The routing functions between DUs may be provided instead of the function of determining a routing destination DU and the function of transmitting data to the determined routing destination DU.

The function of determining a routing destination DU of the SgNB is provided in the PDCP in the CU of the MgNB. The function of transmitting data to a routing destination DU is provided in the PDCP in the CU of the SgNB.

The MgNB notifies the SgNB of information indicating the routing destination DU determined by the MgNB, in association with the data to be transmitted to the SgNB. Upon receipt of the information, the SgNB can recognize which DU the SgNB should transmit the data transmitted from the MgNB to.

Consequently, the SgNB can transmit, to the routing destination DU determined by the MgNB, the data transmitted from the MgNB.

The interface disclosed in the sixth embodiment should be applied to an interface for data communication between the MgNB and the SgNB.

In the receiver, data from each DU is routed to the MgNB with the function of routing the data from each DU to the MgNB which is a function provided in the PDCP configured in the CU of the SgNB. For example, the SgNB routes and transmits the data from each DU to the MgNB in order of arrival.

The MgNB transmits data from the SgNB to a high-level function with the function of transmitting, to the high-level function, data transmitted from the SgNB which is a function configured in the MgNB.

Since such a method enables the use of the PDCP that is an existing protocol stack in the SgNB, the gNB can be easily configured. The gNB with the CU-DU split configuration in Option 2 is easily used as a secondary gNB in the DC.

Information indicating the presence or absence of the CU-DU split configuration of its own gNB may be notified between the gNBs.

Information on the DUs of its own gNB may be notified between the gNBs.

Information on the DUs to be connected to the CU of its own gNB may be notified as the information on the DUs. The information on the DUs may be notified in association with the information on each DU and the CU to be connected to the DU.

The methods disclosed in the first modification differ from those disclosed in the sixth embodiment by the MgNB having the function of determining a routing destination DU of the SgNB. Thus, a master gNB can recognize information indicating the presence or absence of the CU-DU split configuration of a secondary gNB or information on the DUs. The MgNB can determine a routing destination DU of the SgNB in consideration of these pieces of information.

The information on the DUs should be DU identifiers.

The DU identifiers may be associated with identifiers of the gNBs or the cells. The information on the DUs may be addresses of the DUs.

For example, a DU identifier includes a gNB identifier and a DU identifier in the gNB. Alternatively, the DU identifier includes a cell identifier and a DU identifier in the cell. Consequently, the association of the DU identifier with an identifier of a gNB or a cell enables recognizing by which gNB the DU is configured.

The information on the DUs to be notified between the gNBs may be limited to information on the DUs available for transmitting and receiving data to and from the other gNBs. For example, the information on the DUs to be notified between the gNBs may be limited to information on the DUs that can be used in the DC. Consequently, the amount of information to be notified between the gNBs can be reduced.

The information on the CU to be connected to the DU should be a CU identifier. The same methods on the DU identifier should be applied thereto.

The information indicating the presence or absence of the CU-DU split configuration or the information on the DUs may be notified between the gNBs upon setting up of an interface between the gNBs. The information may be notified to the other gNBs by including, in a set-up message, the information indicating the presence or absence of the CU-DU split configuration of its own gNB or the information on the DUs.

Alternatively, the information may be notified upon update of the gNB setting. The information may be notified to the other gNBs by including, in an update message for the gNB setting, the information indicating the presence or absence of the CU-DU split configuration of its own gNB or the information on the DUs.

The other gNBs may be surrounding gNBs.

Such notifications of the information upon setting up the interface or upon update of the gNB setting enable the MgNB to recognize the configuration of the DU of a gNB to be used as a secondary gNB upon setting of the DC. Thus, the MgNB can determine the routing destination DU of the SgNB.

The information indicating the presence or absence of the CU-DU split configuration of its own gNB and the information on the DUs of its own gNB may be notified upon setting of the DC. The method for notifying, from the SgNB to the MgNB, information indicating the presence or absence of the CU-DU split configuration of its own SgNB upon setting of the DC, which is disclosed in the sixth embodiment, should be applied thereto.

The MgNB may notify the SgNB of information requesting the use of the DUs of the SgNB for the DC upon setting of the DC. The information may include the number of DUs to be preferably used in the DC.

For example, upon SgNB addition, the MgNB may notify the SgNB of the request. The request may be included in the signaling for the SgNB addition to be requested from the MgNB to the SgNB.

Alternatively, upon SgNB modification, the MgNB may notify the SgNB of the request. The request may be included in the signaling for the SgNB modification to be requested from the MgNB to the SgNB.

Consequently, the SgNB can recognize the number of DUs required by the MgNB in the DC. The SgNB can prevent the extra number of DUs from being set in the DC. The SgNB can also prevent the insufficient number of DUs from being set in the DC.

Upon setting of the DC, the SgNB may notify the MgNB of information on the DUs available for the DC in the SgNB. Examples of the information on the DUs include identifiers of the DUs and the number of available DUs.

For example, upon SgNB addition, the SgNB may notify the MgNB of the information. The information may be included in the signaling for notifying a response to the request for the SgNB addition.

Alternatively, upon SgNB modification, the SgNB may notify the MgNB of the information. The information may be included in the signaling for notifying a response to the request for the SgNB modification.

Consequently, the SgNB can notify the MgNB of the number of available DUs in the DC according to the resources in its own gNB or a load state. Since the MgNB can recognize the number of available DUs of the SgNB in the DC, it can appropriately perform the routing to each gNB for the SB.

The buffer configuration of the SgNB and information to be notified between the MgNB and the SgNB are disclosed.

One buffer for routing is provided in the CU of the SgNB. The buffer may be provided inside or outside the PDCP in the CU of the SgNB. The buffer should be provided between the function of determining a routing destination DU which is configured in the MgNB and the function of transmitting data to the routing destination DU which is configured in the CU of the SgNB. The buffer may be set higher than the function of transmitting data to the routing destination DU which is configured in the CU of the SgNB.

Figure 49:
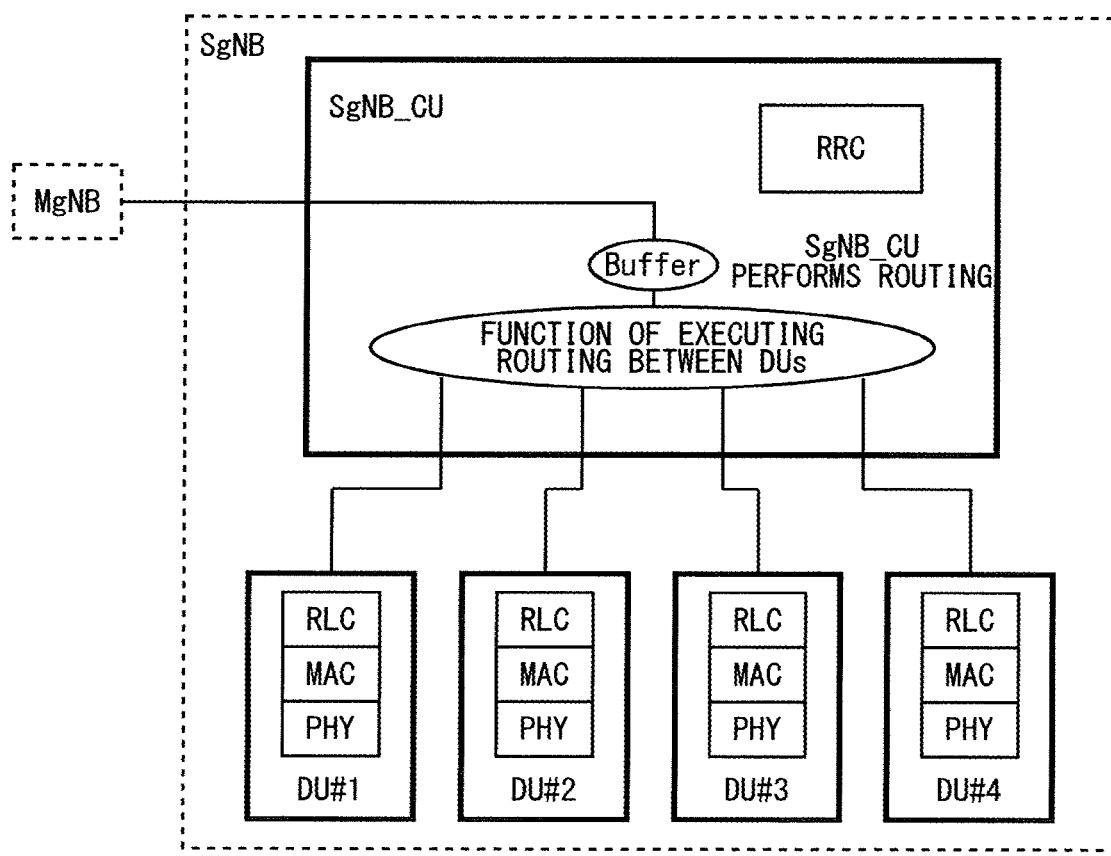
FIG. 49 illustrates an example architecture when one buffer for routing is provided in the CU of the SgNB according to the first modification of the sixth embodiment.

FIG. 49 illustrates an example architecture when one buffer for routing is provided in the CU of the SgNB. FIG. 49 illustrates the example of providing the buffer outside the PDCP in the CU of the SgNB. The buffer is set higher than the function of transmitting data to the routing destination DU which is configured in the CU of the SgNB.

When the DC with the SB is performed on the target UE, temporary storage of the data transmitted from the MgNB in the buffer provided in the CU of the SgNB can reduce the data loss caused by delay in the following function of transmitting data to the routing destination DU.

The same buffer may be provided in the receiver. Temporary storage of the data received from each DU in its transmission to the MgNB can reduce the data loss in the interface for transmitting data from the SgNB to the MgNB.

The information to be notified from the MgNB to the SgNB includes information associated with the DL data. The information associated with the DL data is, for example, a sequence number assigned through the interface between the MgNB and the SgNB. When Xn or Xx is provided, the sequence number assigned through the interface should be the information associated with the DL data. Examples of the sequence number include Xn-U SN and Xx-U SN.

Information indicating a routing destination DU of the SgNB may be notified as the other information to be notified from the MgNB to the SgNB. The information indicating a routing destination DU of the SgNB may be included in the information associated with the DL data to be notified. The MgNB can route, to the routing destination DU determined by the MgNB, the data transmitted to the SgNB.

The sequence number assigned through the interface between the MgNB and the SgNB may be assigned for each routing destination DU. The SgNB can determine, for each DU, data lost through the interface between the MgNB and the SgNB.

Information indicating a transmission target gNB may be notified as the other information to be notified from the MgNB to the SgNB. Information indicating a transmission source gNB may be notified as the other information. With application of a plurality of SgNBs, the SgNB can verify whether received data is data transmitted to its own gNB or from which MgNB the received data has been transmitted. Thus, the malfunctions in the DC with the SB with application of a plurality of SgNBs can be reduced.

When the DC with the SB is performed with application of a plurality of SgNBs, the routing functions for the SB in the MgNB should determine which SgNB the MgNB routes transmission data to.

The information disclosed in the sixth embodiment, specifically, the information on a transmission state of the DL data to be notified from the SgNB to the MgNB should be applied to the information to be notified from the SgNB to the MgNB. The same advantages are produced.

In the information to be notified from the SgNB to the MgNB that is disclosed in the sixth embodiment, the PDCP-SN successfully transmitted or having failed in transmission need not be notified to the UE. This can reduce the information to be notified from the SgNB to the MgNB. The MgNB determines the PDCP-SN successfully transmitted or having failed in transmission from the SgNB to the UE.

For example, the PDCP of the MgNB assigns the PDCP-SN to data before the routing for the SB, and manages which gNB the data has been routed to after the routing for the SB. The UE transmits a status report of the PDCP to the MgNB. The UE may transmit the status report through the SgNB or directly to the MgNB. Since this enables the use of the gNB or the DU with superior communication quality, the reliability of the communication is increased.

Consequently, the MgNB can determine the PDCP-SN successfully transmitted or having failed in transmission from the SgNB to the UE.

Since the SgNB need not determine the PDCP-SN successfully transmitted or having failed in transmission to the UE, the functions of the SgNB can be reduced, and the SgNB can be easily configured.

In the information to be notified from the SgNB to the MgNB that is disclosed in the sixth embodiment, the information on a buffer size need not be notified. This can reduce the information to be notified from the SgNB to the MgNB. For example, the MgNB makes the bearer setting for the SgNB, and measures the amount of PDCP-PDU transmitted to the SgNB.

Consequently, the MgNB can determine, for example, the information on a desired buffer size for a bearer to be the SB in the SgNB and the information on the minimum desired buffer size for the UE dependent on the SB.

Since the SgNB need not determine, for example, the desired buffer size for the bearer to be the SB in the SgNB and the minimum desired buffer size for the UE dependent on the SB, the functions of the SgNB can be reduced, and the SgNB can be easily configured.

The information to be notified from the SgNB to the MgNB may be an amount indicating buffer allowance in the SgNB. The SgNB determines the free capacity of the buffer in the SgNB, and notifies it to the MgNB. Consequently, the MgNB can route the PDCP-PDU for the SB in consideration of the amount of buffer allowance in the SgNB.

The amount of buffer allowance in the SgNB may be an amount indicating buffer allowance for a bearer to be the SB. Alternatively, the amount indicating buffer allowance in the SgNB may be an amount indicating buffer allowance for the UE dependent on the The other examples of the buffer configuration of the SgNB and the information to be notified between the MgNB and the SgNB are disclosed.

A buffer for routing is provided in the CU of the SgNB for each DU. The buffer may be provided inside or outside the PDCP in the CU of the SgNB or in the RP outside the PDCP in the CU. The buffer should be set between each DU and the function of transmitting data to the routing destination DU which is configured in the CU of the SgNB. The buffer may be set lower than the function of transmitting data to the routing destination DU which is configured in the CU of the SgNB.

FIG. 50 illustrates an example architecture when the buffer for routing is provided in the CU of the SgNB for each DU. FIG. 50 illustrates the example of providing the buffer outside the PDCP in the CU of the SgNB. The buffer is set, for each DU, lower than the function of transmitting data to routing destination DUs which is configured in the CU of the SgNB.

When the DC with the SB is performed on the target UE, data transmitted from the MgNB is distributed and transmitted to the routing destination DUs determined by the MgNB with the function of transmitting data to the routing destination DUs. Temporary storage of the data transmitted to each DU in the buffer can reduce the data loss caused by, for example, delay in the interface for transmitting the data to the DU.

The same buffers may be provided in the receiver. Temporarily storing, for each DU, the data received from the DU enables the data received from the DUs to be easily sorted in order. For example, upon receipt of data from two DUs with the same timing, buffering the data enables the received data to be sorted in order without any loss. Thus, the SgNB can reduce the data loss in transmission of data to the MgNB.

The information to be notified from the MgNB to the SgNB is, for example, information identical to the information disclosed on the configuration for providing one buffer. This produces the same advantages.

The information to be notified from the SgNB to the MgNB is, for example, information identical to the information disclosed on the configuration for providing one buffer. This produces the same advantages.

The information to be notified from the SgNB to the MgNB may be information for each DU.

The information for each DU may be, for example, information indicating which DU requests data. The RLC in the DU may request data from the PDCP in the MgNB. In such a case, the RLC in the DU should request data for each DU. The RLC for each DU should request data from the PDCP in the MgNB. Further, the information for each DU may be information on the DU that has requested data from the RLC in the DU to the PDCP. The information requesting the downlink data from the RLC of each DU which is disclosed in the fifth embodiment may be applied as an example of the information.

The information to be notified from the SgNB to the MgNB may be information on a transmission state of the DL data for each DU.

The information to be notified from the SgNB to the MgNB may be information on the buffer size for each DU. Examples of the information include information on a buffer size for each DU that is desired for a bearer to be the SB and information on the minimum buffer size for each DU that is desired for the UE dependent on the SB.

The information to be notified from the SgNB to the MgNB may be an amount indicating buffer allowance for each DU. The amount indicating buffer allowance for each DU may be an amount indicating buffer allowance for each DU for a bearer to be the SB. Alternatively, the amount indicating buffer allowance for each DU may be an amount indicating buffer allowance for each DU for the UE dependent on the SB.

Defining the information to be notified from the SgNB to the MgNB as the information for each DU enables the MgNB to be notified of a communication state or a buffer state for each DU of the SgNB. This enables consideration of the information for each DU in the function of determining routing destination DUs of the MgNB. Thus, the routing destination DUs can be precisely determined according to a state for each DU of the SgNB.

Figure 52:
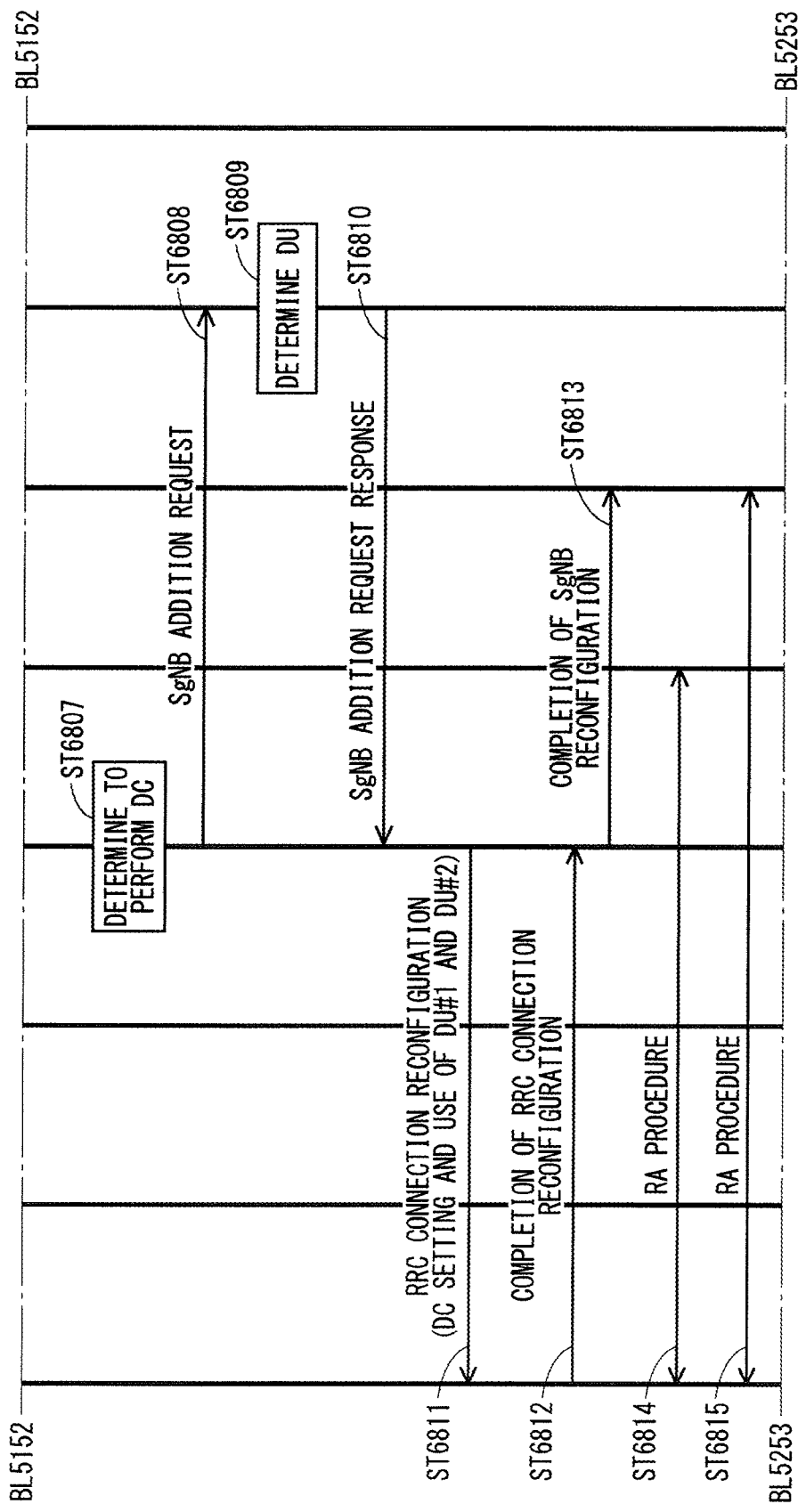
FIG. 52 illustrates the example sequence on the DC with the SB using the SgNB with the CU-DU split configuration according to the first modification of the sixth embodiment.
Figure 53:
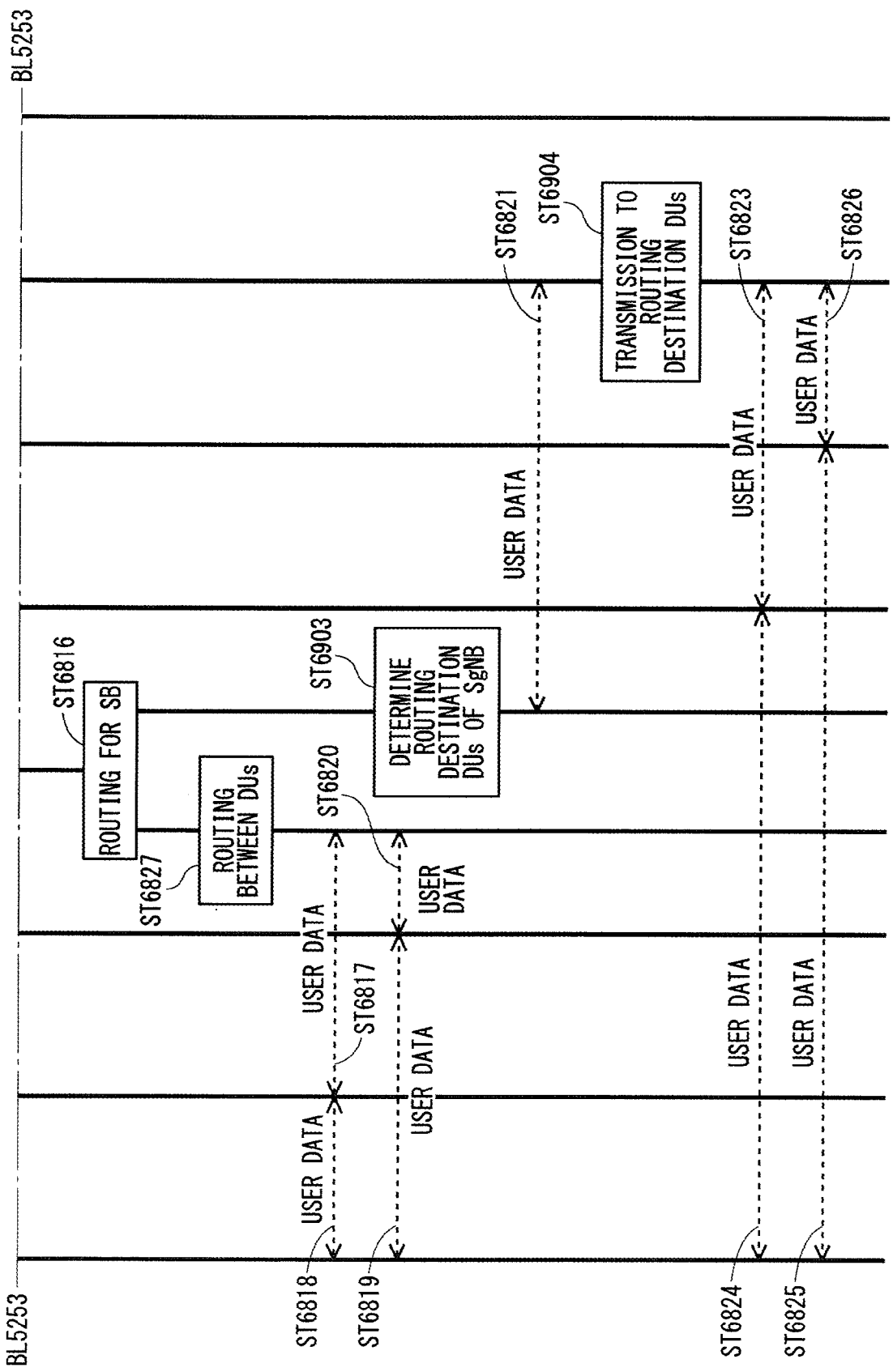
FIG. 53 illustrates the example sequence on the DC with the SB using the SgNB with the CU-DU split configuration according to the first modification of the sixth embodiment.

FIGS. 51 to 53 illustrate an example sequence on the DC with the SB, using the SgNB with the CU-DU split configuration which is disclosed in the second modification. FIGS. 51 to 53 are connected across locations of borders BL5152 and BL5253. Since the sequence illustrated in FIGS. 51 to 53 includes the same steps as those of the sequence illustrated in FIGS. 45 to 47, the same step numbers are assigned to the same Steps and the common description thereof is omitted.

The SgNB has the CU-DU split configuration in Option 2, and two DUs (the DUs #1 and #2) are connected to one CU. The MgNB has also the CU-DU split configuration in Option 2, and two DUs (the DUs #1 and #2) are connected to one CU.

In Step ST6901, the MgNB CU notifies the SgNB CU of a setup request message between gNBs. This message may include the information indicating the presence or absence of the CU-DU split configuration of its own gNB and the information on the DUs of its own gNB that are previously described.

In Step ST6902, the SgNB CU notifies the MgNB CU of a setup response message between gNBs. This message may include the information indicating the presence or absence of the CU-DU split configuration of its own gNB and the information on the DUs of its own gNB that are previously described.

In Step ST6808, the MgNB CU notifies the SgNB CU of an SgNB addition request message. This message may include the aforementioned information requesting the use of the DUs of the SgNB for the DC.

In Step ST6810, the SgNB CU notifies the MgNB CU of an SgNB addition request response message. This message may include the aforementioned information on the DUs available for the DC in the SgNB.

In Step ST6816, the MgNB CU routes data to be transmitted from the high-level NW device, to the MgNB and the SgNB for the SB.

In Step ST6827, the MgNB CU routes, between the DUs, the data routed to the MgNB. Since this is the same as Step ST6827 in FIG. 47, the description thereof is omitted.

In Step ST6903, the MgNB CU determines routing destination DUs of the SgNB for the data routed to the SgNB.

In Step ST6821, the MgNB CU transmits, to the SgNB CU, the data routed to the SgNB. Here, the MgNB CU transmits information on the routing destination DUs determined in Step ST6903 in association with the data.

Upon receipt of the information on the determined routing destination DUs and the data, the SgNB CU transmits the data to the routing destination DUs in Step ST6904.

With execution of the function of transmitting data to the routing destination DUs in Step ST6904, the SgNB CU transmits the data to the DU #1 in Step ST6823. In Step ST6824, the SgNB DU #1 processes the received data and transmits the processed data to the UE.

With execution of the function of transmitting data to the routing destination DUs in Step ST6904, the SgNB CU transmits the data to the DU #2 in Step ST6826. In Step ST6825, the SgNB DU #2 processes the received data and transmits the processed data to the UE.

When the UE performs transmission, operations reverse to these are performed. Thus, the description thereof is omitted.

The aforementioned information to be notified between the MgNB and the SgNB may be notified in the communication between the MgNB CU and the SgNB CU in Step ST6821.

Consequently, the gNB with the CU-DU split configuration in Option 2 can be used as the secondary gNB to perform the DC with the SB.

Since the methods disclosed in the first modification eliminate the need for the SgNB CU to determine the routing, the amount of processing in the SgNB CU can be reduced.

Although the buffer function is provided outside the PDCP in the CU of the SgNB, it may be provided inside the PDCP in the CU of the SgNB. Since an existing protocol is provided with a function, the CU of a gNB can be easily configured.

Alternatively, a new protocol stack having a buffer function may be provided in the CU of the SgNB. Configuring such a new protocol stack separately from the existing protocol stacks such as the PDCP enables a gNB to be configured without influencing the existing protocol stacks. The malfunctions on the buffer function can be reduced.

The new protocol stack may be, for example, the RP disclosed in the sixth embodiment. The function may be configured in the RP. Integrating the functions on the routing between DUs into one protocol stack can facilitate the control and reduce the malfunctions.

The buffer function may be provided in the same portion as the portion provided with the function of transmitting data to the routing destination DUs. The processing coordinated with the function of transmitting data to the routing destination DUs can be easily performed with low latency.

The Second Modification of the Sixth Embodiment

The second modification discloses the other methods for solving the problems described in the sixth embodiment, specifically, the problems when the gNB with the CU-DU split configuration in Option 2 is applied as the SgNB for the SB.

The MgNB is provided with the routing functions between DUs of the SgNB. The MgNB performs the routing between DUs of the SgNB. The routing functions between DUs of the SgNB include a function of determining a routing destination DU of the SgNB, and a function of transmitting data to the routing destination DU.

The routing functions between DUs of the SgNB may be set lower than the conventional PDCP functions or the PDCP functions in the CU which are proposed in NR (Non-Patent Document 22: R3-170266).

When the PDCP has the routing functions for the split bearer, the routing functions between DUs of the SgNB may be set lower than the routing functions for the split bearer. The function of determining a routing destination DU of the SgNB may be provided after the routing to the SgNB.

Three examples of a method for configuring, in the MgNB, the routing functions between DUs of the SgNB are hereinafter disclosed:

(1) the routing functions between DUs of the SgNB are provided inside the PDCP;

(2) the routing functions between DUs of the SgNB are provided outside the PDCP; and (3) a protocol stack having the routing functions between DUs of the SgNB is provided outside the PDCP.

When the MgNB has the CU-DU split configuration in Option 2, the CU of the MgNB is provided with the routing functions between DUs of the SgNB. The CU of the MgNB performs the routing between DUs of the SgNB.

With execution of the function of determining a routing destination DU of the SgNB and the function of transmitting data to the routing destination DU, the MgNB can transmit, to the routing destination DU of the SgNB, the transmission data addressed to the SgNB.

In the receiver, the CU of the MgNB is provided with a function of routing data from each DU of the SgNB to a high-level function. The function of routing data from each DU to the high-level function may be one of the routing functions between DUs.

The CU of the MgNB routes the data from each DU of the SgNB to the high-level function in order of arrival as a function of the receiver. In other words, the CU of the MgNB transmits the data from each DU of the SgNB one by one to the high-level function in order of arrival.

As an alternative method, the CU of the MgNB may route the data from each DU of the SgNB to the high-level function in order of PDCP sequence number (PDCP-SN). In other words, the CU of the MgNB routes the data from each DU of the SgNB in order of PDCP-SN and transmits the data one by one to the high-level function.

Consequently, the MgNB can transmit the data from each DU of the SgNB to the high-level function also in the receiver.

The methods for configuring the routing functions between DUs which are disclosed in the sixth embodiment should be appropriately applied to the methods (1) to (3) for configuring the routing functions between DUs of the SgNB.

Figure 54:
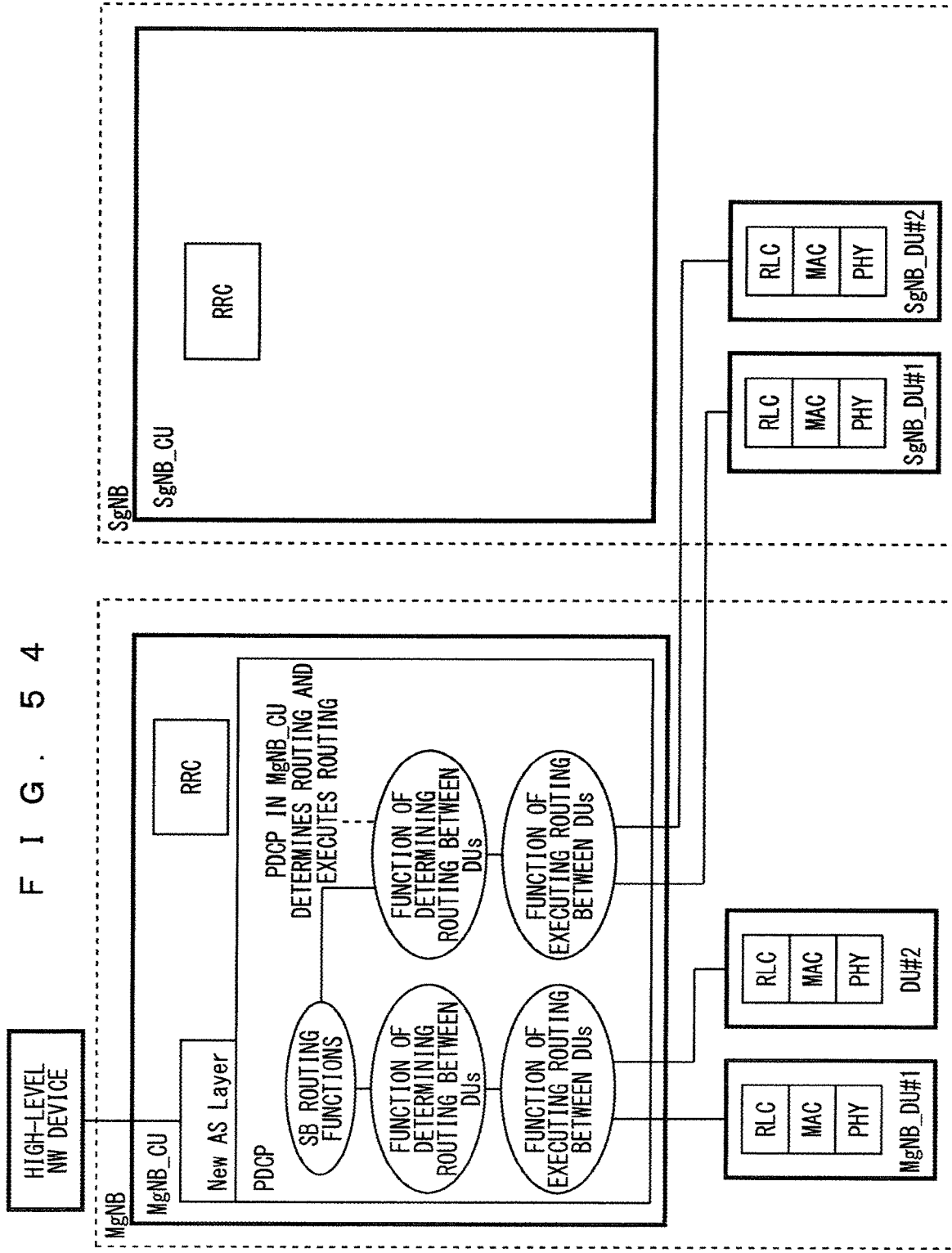
FIG. 54 illustrates an example architecture when the MgNB is provided with the routing functions between DUs of the SgNB according to the second modification of the sixth embodiment.

FIG. 54 illustrates an example architecture when the MgNB is provided with the routing functions between DUs of the SgNB. FIG. 54 illustrates that both the MgNB and the SgNB have the CU-DU split configurations in Option 2.

The MgNB includes a CU and DUs. The two DUs (the DUs #1 and #2) are connected to the one CU. The CU includes the RRC, the New AS layer, and the PDCP. Each of the DUs includes the RLC, the MAC, and the PHY.

The SgNB includes a CU and DUs. The two DUs (the DUs #1 and #2) are connected to the one CU. The CU of the SgNB includes the RRC. Each of the DUs includes the RLC, the MAC, and the PHY. Since the SgNB is a secondary gNB of the UE performing the DC, the CU does not include the New AS layer and the PDCP.

The PDCP in the CU of the MgNB is provided with the functions of determining a routing destination DU of its own gNB and the functions of transmitting data to the determined routing destination DU. The routing functions between DUs may be provided instead of the functions of determining a routing destination DU and the functions of transmitting data to the determined routing destination DU.

The PDCP in the CU of the MgNB is provided with the routing functions between DUs including the functions of determining a routing destination DU of the SgNB and the functions of transmitting data to the routing destination DU. The routing functions between DUs of the SgNB are set lower than the routing functions for the split bearer in the PDCP.

With the routing functions for the SB in the PDCP, transmission data addressed to the UE performing the DC with the SB is routed to the MgNB and the SgNB. After the routing to the SgNB, a routing destination DU is determined with the function of determining the routing destination DU of the SgNB, and the transmission data addressed to the SgNB is transmitted to the routing destination DU of the SgNB with the function of transmitting data to the routing destination DU of the SgNB.

The MgNB notifies the function of transmitting data to the routing destination DU of the SgNB of information indicating the routing destination DU of the SgNB determined by the function of determining the routing destination DU of the SgNB, in association with the data to be transmitted to the SgNB.

In such a manner, the function of transmitting data to the routing destination DU of the SgNB can control to judge which DU of the SgNB the transmission data should be transmitted to. The MgNB can route and transmit data to the DU of the SgNB.

An interface directly connected between the MgNB and the DU of the SgNB should be provided for data communication between the MgNB and the DU of the SgNB. When the MgNB has the CU-DU split configuration in Option 2, an interface directly connected between the CU of the MgNB and the DU of the SgNB should be provided. The interface may be a new interface or the interface between the CU and the DU in the gNB which is disclosed in the first embodiment. Alternatively, the interface may be the Fs interface between the CU and the DU in the gNB which is being studied in 3GPP.

In the receiver, the MgNB transmits, to a high-level function, data transmitted from each DU of the SgNB with the function of routing data from each DU of the SgNB to the high-level function. For example, the MgNB routes and transmits the data from each DU of the SgNB to the high-level function in order of arrival.

When a split bearer is executed, application of such a method enables the SgNB to have the configuration not using the PDCP, similarly as that with application of the conventional split bearer. This facilitates functional extension in the SgNB. The gNB with the CU-DU split configuration in Option 2 is easily used as a secondary gNB in the DC.

When a split bearer is executed, transmission of data from the MgNB to the DU of the SgNB saves transmission of the data to the CU of the SgNB. This can reduce the functions of the CU of the SgNB and facilitate the configuration.

A method for setting up an interface between the MgNB and the DU of the SgNB is disclosed.

First, information on the DUs being served by a gNB is notified between the gNBs. The information on the DUs being served by a gNB is, for example, the information indicating the presence or absence of the CU-DU split configuration of its own gNB or the information on the DUs of its own gNB, which are to be notified between the gNBs and disclosed in the first modification of the sixth embodiment. The methods for notifying the information that are disclosed in the first modification of the sixth embodiment should be applied to a method for notifying the information on the DUs being served by a gNB.

A gNB performs actual setup with all or a part of the DUs notified from the other gNBs. The gNB may determine which gNB the setup is performed with or which DU of the other gNBs the setup is performed with.

The gNB sets up an interface with the DU of a gNB to be connected. When the gNB has the CU-DU split configuration in Option 2, the gNB sets up an interface between the CU of the gNB and the DU of the gNB to be connected.

The gNB notifies a setup request to the DU of the gNB to be connected. Eleven examples of information to be notified at the setup request are hereinafter disclosed:
  (1) an identifier of its own gNB;
  (2) an identifier of a serving cell of its own gNB;
  (3) an identifier of another cell configured by its own gNB;
  (4) an identifier of its own CU of its own gNB;
  (5) an identifier of another CU of its own gNB;
  (6) an identifier of a DU configured by its own gNB;
  (7) an identifier of an adjacent gNB;
  (8) an identifier of a cell configured by the adjacent gNB;
  (9) an identifier of a CU configured by the adjacent gNB;
  (10) an identifier of a DU configured by the adjacent gNB; and
  (11) combinations of (1) to (10) above.

Upon receipt of the setup request from the gNB, the DU of the gNB notifies a setup response to the gNB that has transmitted the setup request. Eleven examples of information to be notified in the setup response which correspond to the information examples to be notified at the setup request are hereinafter disclosed:

(1) an identifier of its own gNB;
(2) an identifier of a serving cell of its own gNB;
(3) an identifier of another cell configured by its own gNB;
(4) an identifier of a CU of its own gNB to be connected to its own DU of its own gNB;
(5) an identifier of another CU of its own gNB;
(6) an identifier of another DU configured by its own gNB;
(7) an identifier of an adjacent gNB;
(8) an identifier of a cell configured by the adjacent gNB;
(9) an identifier of a CU configured by the adjacent gNB;
(10) an identifier of a DU configured by the adjacent gNB; and
(11) combinations of (1) to (10) above.

The information to be notified in the setup response may include information indicating a portion that cannot be recognized and a portion that is lost in the information. This completes the setup between the gNB and the DU of another gNB to be connected.

When the DU of the gNB does not permit a setup upon receipt of the setup request, the DU may notify a setup failure to the gNB that has transmitted the setup request. Examples of the information to be notified in a setup failure include cause information indicating the cause. The information may include information indicating a portion that cannot be recognized and a portion that is lost in the information.

Notification of the setup failure can prevent the gNB from using the DU of the gNB that has notified the setup failure, for example, in the DC. Consequently, a DU of an accessible gNB can be set as a DU of a secondary gNB for a UE dependent on the DC. This enables lean processing.

The gNB may perform actual setup with all or a part of the DUs notified from the gNB performing the DC. The gNB may determine which DU of the gNB the setup is performed with.

The information and the notification methods that are previously described should be applied to information to be notified in the setup and the notification method.

Although disclosed is a method for the gNB to set up the DU of another gNB, the DU of the gNB may set up another gNB. Here, the CU of the gNB may notify the DU of information indicating a request for setting up the other gNB. Upon receipt of the information from the CU, the DU may start a setup request to the other gNB.

The aforementioned examples of the information to be notified in the setup response from the DU of the gNB to the other gNBs should be applied to the information to be notified at the setup request from the DU of the gNB to the other gNBs.

The aforementioned examples of the information to be notified at the setup request from the gNB to the DU of another gNB should be applied to information to be notified in the setup response from the gNB to the DU of the other gNB.

Consequently, the gNB with the CU-DU split configuration in Option 2 can perform the setup.

The gNB should, prior to the DC setting, set up an interface with the DU of a gNB to be connected. Since the setup is already completed upon setting of the DC, latency for DC setting processing can be reduced.

Upon setting of the DC, the gNB may set up an interface with the DU of a gNB to be connected. Here, the interface may be set up after the process of adding or modifying the SgNB. Performing the setup when actually required can eliminate the wasteful setup processing.

When the DC for another UE is set to a DU that has already been set up, the setup may be omitted. When the DC is set so that a plurality of UEs use a DU, the setup of the DU may be canceled after all the UEs release the DC setting. Appropriate cancellation of the setup with the DU enables release of the resources required for the setup in the DU and the gNB.

The information indicating the presence or absence of the CU-DU split configuration of its own gNB and the information on the DUs of its own gNB may be notified upon setting of the DC. Upon setting of the DC, the MgNB may notify the SgNB of information requesting the use of the DUs of the SgNB for the DC. Upon setting of the DC, the SgNB may notify the MgNB of information on the number of DUs available for the DC in the SgNB. These pieces of information should be notified in the methods disclosed in the first modification of the sixth embodiment. They produce the same advantages.

As previously described, the MgNB may set up an interface with the DU of the SgNB to be used for the DC, after notification of these pieces of information.

The information to be notified between the MgNB and the SgNB is disclosed.

The information to be notified from the MgNB to the SgNB includes the information associated with the DL data. The information associated with the DL data is, for example, a sequence number assigned through the interface between the MgNB and the SgNB DU. When the Fs interface is provided, a sequence number assigned through the Fs interface should be used. The example sequence number is Fs-U SN.

Information indicating a routing destination DU of the SgNB may be notified as another information to be notified from the MgNB to the SgNB. The information indicating a routing destination DU of the SgNB may be included in the information associated with the DL data to be notified. The SgNB DU can verify the data addressed to its own DU.

A sequence number may be assigned through the interface between the MgNB and the SgNB DU for each routing destination DU. The SgNB DU can determine, for each DU, data lost through the interface between the MgNB and the SgNB DU.

The SgNB DU may notify the SgNB CU of the data lost through the interface.

The SgNB CU may notify the MgNB of information on the data lost through the interface between the MgNB and the SgNB DU. When the MgNB has the CU-DU split configuration in Option 2, the SgNB CU may notify the MgNB CU of information on the data lost through the interface between the MgNB CU and the SgNB DU.

The information on the data lost through the interface may be a sequence number assigned through the interface.

When a sequence number is assigned through the interface between the MgNB and the SgNB DU for each routing destination DU, the SgNB DU may notify, for each DU, the SgNB CU of the data lost through the interface.

The SgNB_DU may notify, for each DU, the SgNB CU of an identifier of its own DU in association with the data lost through the interface. The identifier is not limited to the identifier of its own DU but may be any as long as the identifier enables the MgNB to identify which SgNB DU the data has been lost through the interface with.

The SgNB CU can determine the data lost through the interface for each DU.

The SgNB CU may notify the MgNB of information on the data lost through the interface between the MgNB and the SgNB DU as information for each DU. The SgNB CU may notify the information in association with an identifier of each DU. When the MgNB has the CU-DU split configuration in Option 2, the SgNB CU may notify the MgNB CU of information on the data lost through the interface between the MgNB CU and the SgNB DU as information for each DU.

The SgNB CU may collect information for each DU and notify it to the MgNB. The SgNB CU may collect all pieces of information on the DUs to be connected to the CU and notify them to the MgNB. The SgNB CU may notify the collected information for each DU, in association with an identifier of the DU. This can reduce the amount of signaling.

The information on the data lost through the interface may be a sequence number assigned to each DU through the interface.

Information indicating a transmission target gNB may be notified as the other information to be notified from the MgNB to the SgNB. Information indicating a transmission source gNB may be notified as the other information. The SgNB DU may notify the SgNB CU of the information indicating a transmission target gNB and/or the information indicating a transmission source gNB.

With application of a plurality of SgNBs, the SgNB can verify whether received data is data transmitted to its own gNB and which MgNB the received data has been transmitted from. Thus, the malfunctions in the DC with the SB with application of a plurality of SgNBs can be reduced.

When the DC with the SB is performed with application of a plurality of SgNBs, the routing functions for the SB in the MgNB should determine which SgNB the MgNB routes transmission data to.

The information to be notified from the SgNB to the MgNB is disclosed.

The information to be notified from the SgNB to the MgNB includes information on the data lost in the data communication between the MgNB and the SgNB DU.

The information on lost data is, for example, a sequence number assigned to the lost data through the interface between the MgNB and the SgNB DU. The other examples of the information on lost data include a sequence number assigned to data lost first through the interface between the MgNB and the SgNB DU, and a sequence number assigned to data lost last through the interface between the MgNB and the SgNB DU. The SgNB may notify the number of series of the lost data sets.

When a sequence number is assigned through the interface between the MgNB and the SgNB DU for each routing destination DU, the SgNB may notify, for each DU, the MgNB of the data lost through the interface.

When the MgNB has the CU-DU split configuration in Option 2, the SgNB notifies the MgNB CU of these pieces of information.

The SgNB DU may directly transmit these pieces of information to the MgNB. The interface between the MgNB and the SgNB DU should be used.

As an alternative method, the SgNB DU may notify the MgNB of these pieces of information through the SgNB CU. The transmission methods disclosed on the data lost through the interface between the MgNB and the SgNB DU should be applied to a method for transmitting the information to the MgNB through the SgNB CU.

The MgNB should be provided with a buffer for each SgNB DU. When the MgNB has the CU-DU split configuration in Option 2, the CU of the MgNB should be provided with a buffer for each SgNB DU. The buffer may be set lower than the function of transmitting data to a routing destination DU of the MgNB.

This enables the flow control for each SgNB DU, according to a state of an interface for each DU between the MgNB and the SgNB DU.

Thus, the MgNB can appropriately and efficiently transmit data to the SgNB DU.

In the second modification, the MgNB transmits data to the DU of the SgNB. The DU has the RLC, MAC, and PHY functions and does not have the PDCP functions. Thus, the SgNB DU cannot determine the successful PDCP SN. The SgNB DU cannot determine a desired buffer size that meets requirements of a bearer to be set to the SgNB as the SB.

In the information to be notified from the SgNB to the MgNB which is disclosed in the sixth embodiment, notification of the PDCP-SN successfully transmitted or having failed in transmission to the UE should be avoided. The MgNB should determine the PDCP-SN successfully transmitted or having failed in transmission from the SgNB to the UE.

For example, the PDCP of the MgNB assigns the PDCP-SN to data before the routing for the SB, and manages which gNB the data has been routed to after the routing for the SB. The UE transmits a status report of the PDCP to the MgNB.

Consequently, the MgNB can determine the PDCP-SN successfully transmitted or having failed in transmission from the SgNB to the UE.

Since the SgNB need not determine the PDCP-SN successfully transmitted or having failed in transmission to the UE, the functions of the SgNB can be reduced, and the SgNB can be easily configured.

In the information to be notified from the SgNB to the MgNB which is disclosed in the sixth embodiment, notification of the information on a buffer size should be avoided. The MgNB makes the bearer setting for the SgNB, and measures the amount of PDCP-PDU transmitted to the SgNB.

Consequently, the MgNB can determine, for example, the information on a desired buffer size for a bearer to be the SB in the SgNB and the information on the minimum desired buffer size for the UE dependent on the SB.

Since the SgNB need not determine, for example, the desired buffer size for the bearer to be the SB in the SgNB and the minimum desired buffer size for the UE dependent on the SB, the functions of the SgNB can be reduced, and the SgNB can be easily configured.

The SgNB DU may be provided with a buffer for each DU. The buffer may be set higher than the RLC in the SgNB DU. The buffer should be a buffer for data transmission between the MgNB and the SgNB DU.

The information to be notified from the SgNB to the MgNB may be an amount indicating buffer allowance in the SgNB DU. The SgNB determines the free capacity of the buffer in the SgNB DU, and notifies it to the MgNB. Consequently, the MgNB can route the PDCP-PDU for the SB in consideration of the amount of buffer allowance in the SgNB DU.

The amount indicating buffer allowance in the SgNB DU may be an amount indicating buffer allowance for a bearer to be the SB. Alternatively, the amount indicating buffer allowance in the SgNB DU may be an amount indicating buffer allowance for the UE dependent on the SB.

When the MgNB has the CU-DU split configuration in Option 2, the SgNB notifies the MgNB CU of these pieces of information.

The SgNB DU may directly transmit these pieces of information to the MgNB. The interface between the MgNB and the SgNB DU should be used.

As an alternative method, the SgNB DU may notify the MgNB of these pieces of information through the SgNB CU. The transmission methods disclosed on the data lost through the interface between the MgNB and the SgNB DU should be applied to a method for transmitting the information to the MgNB through the SgNB CU.

Figure 55:
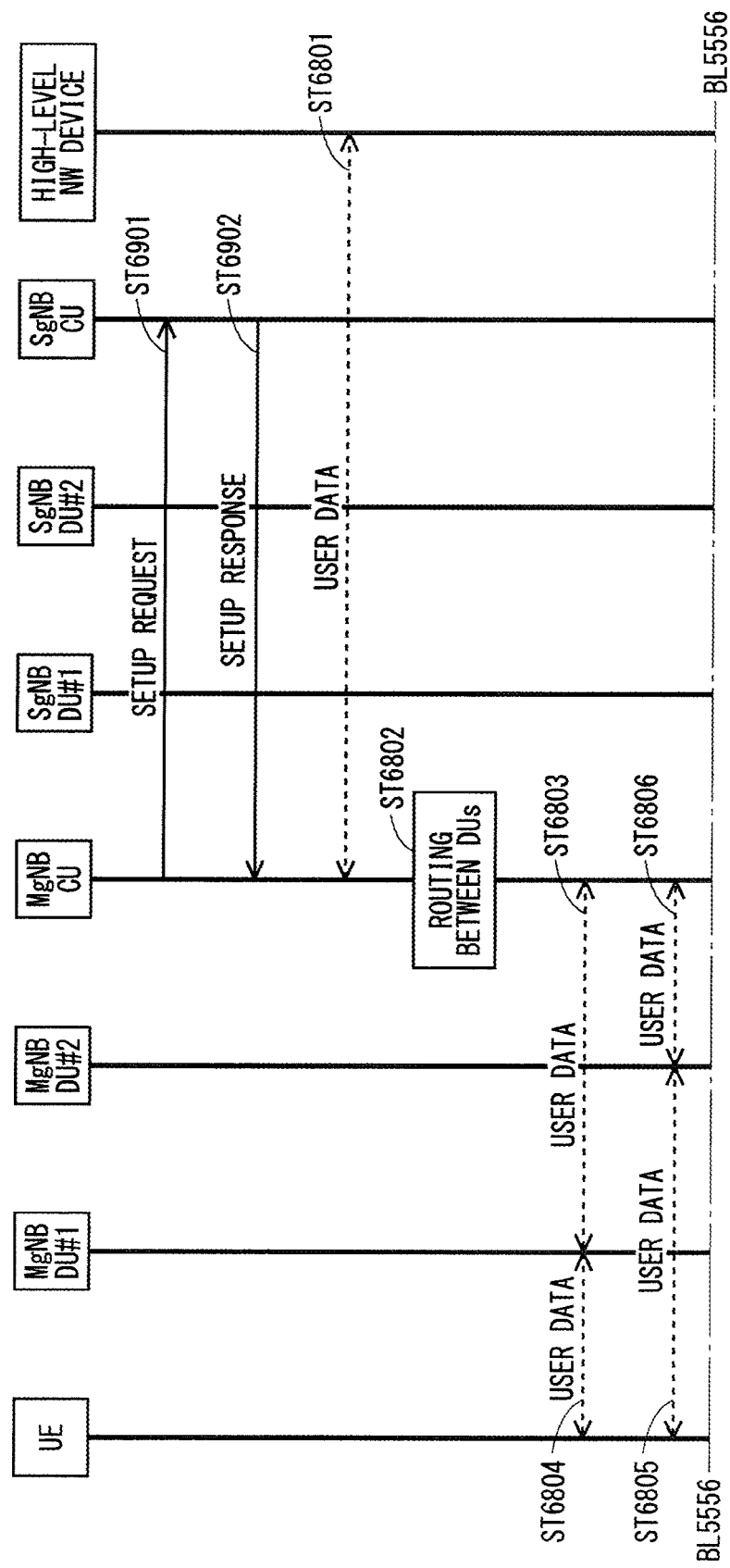
FIG. 55 illustrates an example sequence on the DC with the SB using the SgNB with the CU-DU split configuration according to the second modification of the sixth embodiment.
Figure 56:
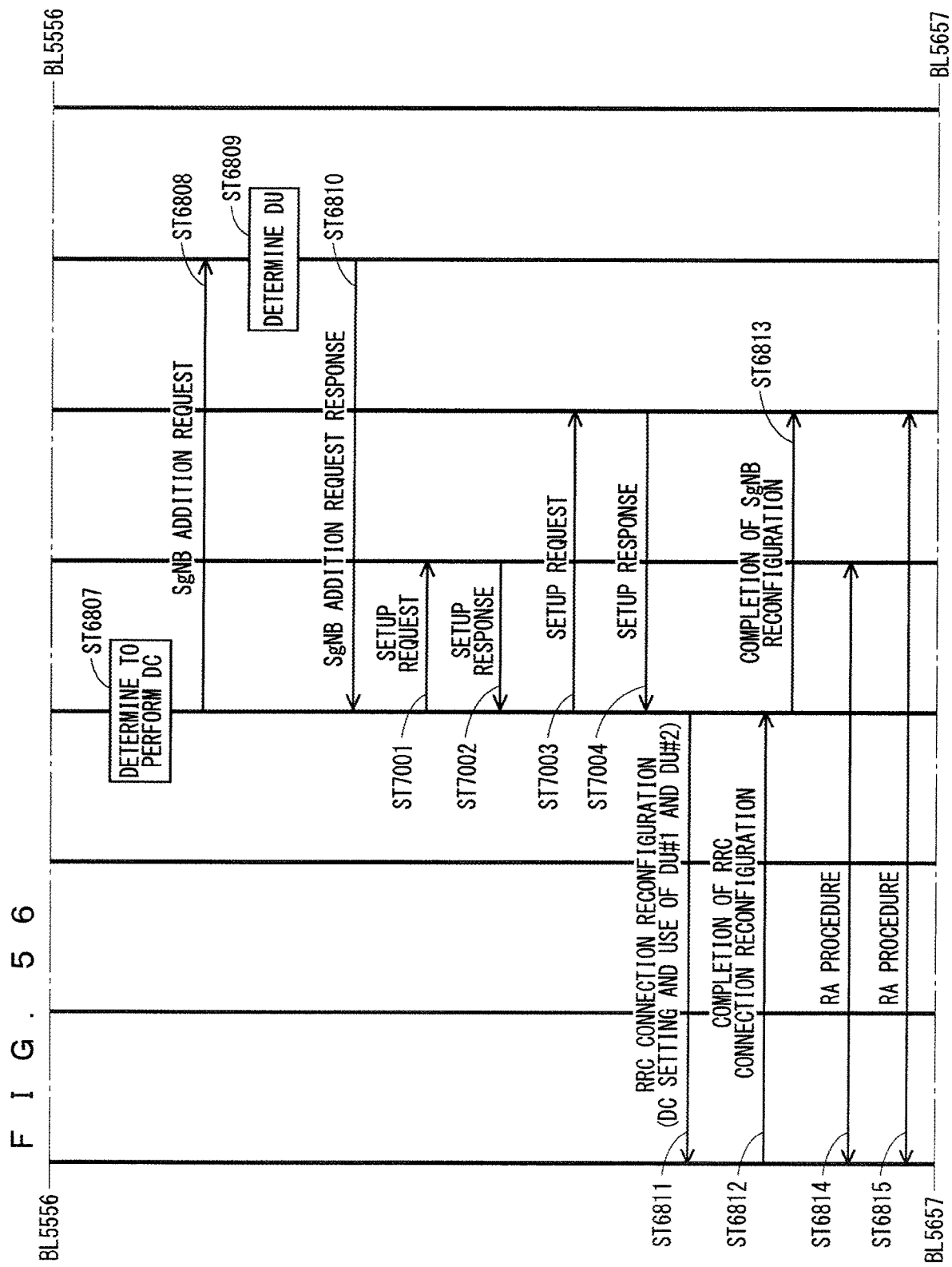
FIG. 56 illustrates the example sequence on the DC with the SB using the SgNB with the CU-DU split configuration according to the second modification of the sixth embodiment.

FIGS. 55 to 57 illustrate an example sequence on the DC with the SB using the SgNB with the CU-DU split configuration which is disclosed in the second modification. FIGS. 55 to 57 are connected across locations of borders BL5556 and BL5657. Since the sequence illustrated in FIGS. 55 to 57 includes the same steps as those of the sequence illustrated in FIGS. 51 to 53, the same step numbers are assigned to the same Steps and the common description thereof is omitted.

The SgNB has the CU-DU split configuration in Option 2, and two DUs (the DUs #1 and #2) are connected to one CU. The MgNB has also the CU-DU split configuration in Option 2, and two DUs (the DUs #1 and #2) are connected to one CU.

In Step ST6901, the MgNB CU notifies the SgNB CU of a setup request message between gNBs. This message may include information on the DUs being served by its own gNB.

In Step ST6902, the SgNB CU notifies the MgNB CU of a setup response message between gNBs. This message may include information on the DUs being served by its own gNB.

In Step ST6810, the SgNB CU notifies the MgNB CU of an SgNB addition request response message with the DC setting. The SgNB CU notifies, via this message, information on the SgNB DUs available in the DC.

In Step ST7001, the MgNB CU requests the available SgNB DU #1 to set up an interface between the MgNB and the SgNB DU #1.

In Step ST7002, the SgNB DU #1 notifies a setup response to the MgNB CU.

Similarly, in Step ST7003, the MgNB CU requests the available SgNB DU #2 to set up an interface between the MgNB and the SgNB DU #2.

In Step ST7004, the SgNB DU #2 notifies a setup response to the MgNB CU.

This completes the setup of the interface provided between the MgNB CU and each of the SgNB DUs. Thus, the communication between the MgNB CU and each of the SgNB DUs is possible.

In Step ST6816, the MgNB CU routes data to be transmitted from the high-level NW device, to the MgNB and the SgNB for the SB.

In Step ST6827, the MgNB CU routes, between the DUs, the data routed to the MgNB. Since this is the same as Step ST6827 in FIG. 52, the description thereof is omitted.

In Step ST6903, the MgNB CU determines a routing destination DU of the SgNB for the data routed to the SgNB.

Further in Step ST7005, the MgNB CU transmits the data to the routing destination DU of the SgNB.

With execution of the function of transmitting data to the routing destination DUs of the SgNB in Step ST7005, the MgNB CU transmits the data to the SgNB DU #1 in Step ST7006. In Step ST7007, the SgNB DU #1 processes the received data and transmits the processed data to the UE.

With execution of the function of transmitting data to the routing destination DUs of the SgNB in Step ST7005, the MgNB CU transmits the data to the SgNB DU #2 in Step ST7008. In Step ST7009, the SgNB DU #2 processes the received data and transmits the processed data to the UE.

When the UE performs transmission, operations reverse to these are performed. Thus, the description thereof is omitted.

The aforementioned information to be notified between the MgNB and the SgNB may be notified in the communication between the MgNB CU and the SgNB CU in Steps ST7006 and ST7008. Although not described herein, the aforementioned information to be notified between the MgNB and the SgNB may be notified in the communication between the SgNB DU and the MgNB CU through the SgNB CU.

Consequently, the gNB with the CU-DU split configuration in Option 2 can be used as the secondary gNB to perform the DC with the SB.

The methods disclosed in the second modification enable transmission and reception of data directly between the MgNB and the SgNB DU. The CU of the SgNB need not have the routing functions between DUs. Thus, the amount of processing in the SgNB CU can be reduced.

The Third Modification of the Sixth Embodiment

In the first and second modifications of the sixth embodiment, the MgNB determines the DU of the SgNB to which data transmission is routed. This sometimes causes a contention between resource use for the UE to which the DC with the SB is set and resource use for the other UEs. The SgNB has difficulties in adjusting the resource use for the UE to which the DC with the SB is set, and the resource use for the other UEs.

Thus, the SgNB has problems of failing to obtain a desired data rate for the UE to which the DC is set and a desired data rate for the other UEs.

The third modification discloses a method for solving such problems.

The MgNB dedicates all or a part of the DUs of the SgNB. The MgNB may dedicate all or a part of the resources of each DU. The MgNB of one UE or a plurality of UEs to which the DC is set using the same MgNB and the same SgNB may dedicate the resources for the same DU or for each DU.

A method for dedicating the DU of the SgNB or the resources for the DU to the MgNB is disclosed. The SgNB notifies the MgNB of information on the DU of the SgNB or the resources for the DU to be dedicated to the MgNB. Alternatively, the SgNB notifies the MgNB of information on the DU of the SgNB or the resources for the DU that the MgNB is permitted to dedicate.

Four examples of the information to be notified are disclosed below:

(1) a DU identifier;
(2) resources in the DU;
(3) dedicated time; and
(4) combinations of (1) to (3) above.

On the DU identifier in (1), the SgNB may notify the MgNB of the identifier of the DU disclosed in the sixth embodiment.

The resources in the DU in (2) include radio resources on the frequency axis, radio resources on the time axis, codes, and sequences. These may be combined. The radio resources on the frequency axis may be used per sub-carrier. The radio resources on the time axis may be used per OFDM symbol. Alternatively, the resources in the DU may be used per slot or per subframe. Examples of the combinations of the resources on the frequency axis and the time axis include resource blocks.

Orthogonal codes or quasi-orthogonal codes may be used as the codes. Examples of the resources on the codes and the sequences include the code numbers and the sequence numbers. The code numbers or the sequence numbers may be any as long as the codes or the sequences are derivable.

Examples of the dedicated time in (3) include information on the time during which the DU of the SgNB or the resources for the DU are dedicated to the MgNB. Information on, for example, the start time and the stop time should be used. The unit of time may be a unit representing the resources on the time axis.

For example, a system frame number, a radio frame number, or a subframe number is specified as the start time. Similarly, a system frame number, a radio frame number, or a subframe number is specified as the stop time. The MgNB dedicates the DU of the SgNB or the resources for the DU from the start time to the stop time.

The dedicated time may be a duration. The duration should be indicated by, for example, the number of system frames, the number of radio frames, or the number of subframes. For example, a start time and a duration are set, and the setting information is notified from the SgNB to the MgNB. The MgNB dedicates the DU of the SgNB or the resources for the DU for the duration from the start time.

This enables flexible time settings. The resources of the SgNB can be dedicated to the MgNB according to a load state in the SgNB.

A method for notifying the information from the SgNB to the MgNB is disclosed.

The information may be notified between gNBs upon setting up of an interface between the gNBs. The interface between the gNBs is not limited to that between the gNBs, but may be an interface between gNB CUs or between the gNB and the gNB CU. The information on the DU of its own gNB or the resources for the DU that the other gNBs can dedicate is included in a set-up message to be notified.

Alternatively, the information may be notified upon update of the gNB setting. The information on the DU of its own gNB or the resources for the DU that the other gNBs can dedicate may be included in an update message for the gNB setting to be notified.

The notification upon setting up the interface or upon update of the gNB setting is not a notification from the SgNB to the MgNB but a notification from the gNB to the other gNBs. In other words, the information is notified before the DC is set. In such a case, the gNB can set the DC based on the information notified from the other gNBs, and determine a routing destination DU of the transmission data for the SgNB DU.

Another method for notifying the information from the SgNB to the MgNB is disclosed.

The information may be notified upon setting of the DC. The method for notifying, from the SgNB to the MgNB, information indicating the presence or absence of the CU-DU split configuration of its own SgNB upon setting of the DC, which is disclosed in the sixth embodiment, should be applied. The information on the DU of its own SgNB or the resources for the DU to be dedicated to the MgNB or that can be dedicated to the MgNB should be notified instead of the information indicating the presence or absence of the CU-DU split configuration of its own SgNB.

The MgNB can recognize the information on the DU of its own SgNB or the resources for the DU to be dedicated to the MgNB or that can be dedicated to the MgNB, through notification from the SgNB to the MgNB. The MgNB may perform the routing for the SB in consideration of these.

The MgNB may notify the SgNB of information requesting dedicated use of the DU of its own SgNB or the resources for the DU for the DC upon setting of the DC. Eight examples of the requesting information are disclosed below:

(1) an identifier of the UE dependent on the DC;
(2) an identifier of its own gNB;
(3) the number of DUs to be preferably dedicated in the DC;
(4) the amount or number of resources of the DU to be preferably dedicated in the DC;
(5) the time or a duration to be preferably dedicated in the DC;
(6) the carrier frequency to be preferably dedicated in the DC;
(7) the frequency bandwidth to be preferably dedicated in the DC; and
(8) combinations of (1) to (7) above.

The methods for notifying, from the MgNB to the SgNB, the information requesting the use of the DUs of the SgNB for the DC upon setting of the DC which is disclosed in the first modification of the sixth embodiment should be applied to a method for notifying, from the MgNB to the SgNB, information requesting the dedicated use of the DU of the SgNB or the resources for the DU upon setting of the DC. The information requesting the dedicated use of the DU of the SgNB or the resources for the DU should be notified instead of the information requesting the use of the DUs of the SgNB.

Consequently, the SgNB can recognize information on the DU or the resources for the DU that the MgNB needs to dedicate in the DC. The SgNB can prevent the MgNB from dedicating the extra number of DUs in the DC. The SgNB can also prevent the MgNB from dedicating the insufficient number of DUs in the DC. The SgNB can dedicate appropriate resources to the MgNB, and communicate with the UE using the appropriate resources.

The methods disclosed in the third modification enable the DU of the SgNB or the resources for the DU to be dedicated to the MgNB in the DC. Consequently, the DU of the SgNB or the resources for the DU can be used according to a bearer set to the SgNB in the DC. Thus, it is possible to reduce, in the SgNB, the problems of failing to obtain a desired data rate for the set UE and a desired data rate for the other UEs.

The sixth embodiment to the third modification of the sixth embodiment disclose application of a base station in NR (gNB) as a master base station in the DC. The methods disclosed in the sixth embodiment to the third modification of the sixth embodiment may be applied to cases where a base station in the LTE (eNB) is used as a master base station in the DC.

The eNB is not provided with the New AS layer set higher than the PDCP in the gNB. Further, the CU-DU split configuration is not available in the eNB.

Thus, the New AS layer of the gNB should be eliminated, and the eNB should be substituted for the gNB having no CU-DU split configuration.

This produces the same advantages as those described in the sixth embodiment to the third modification of the sixth embodiment.

The DC with the SB can be implemented using the eNB as a master base station and using the gNB with the CU-DU split configuration in Option 2 as a secondary base station.

Since the DC can be performed using existing base stations in the LTE, the system is easily built at low cost.

The sixth embodiment to the third modification of the sixth embodiment disclose the implementation of the DC with the MCG split bearer. The methods disclosed in the sixth embodiment to the third modification of the sixth embodiment may be applied to the DC with the SCG split bearer.

With the SCG split bearer, a bearer is split from a secondary base station into a master base station and the secondary base station. Data transmitted from a high-level NW device enters the secondary base station, and is routed from the secondary base station to the master base station and the secondary base station.

Thus, when the master base station is the gNB with the CU-DU split configuration in Option 2, the same problems as those disclosed in the sixth embodiment occur. To solve such problems, the methods disclosed in the sixth embodiment to the third modification of the sixth embodiment should be applied to the DC with the SCG split bearer.

The methods disclosed on the master gNB should be applied to a secondary gNB, and the methods disclosed on the secondary gNB should be applied to a master gNB.

This produces the same advantages as those described in the sixth embodiment to the third modification of the sixth embodiment.

The DC with the SCG split bearer can be implemented using the gNB with the CU-DU split configuration in Option 2 as a master base station. As choices of the DC in NR increase, operations of the DC appropriate for the radio propagation environment, and the high-speed communication between a base station and the UE are possible.

The methods disclosed in the sixth embodiment to the third modification of the sixth embodiment may be applied to the multi-connectivity (MC). The gNB with the CU-DU split configuration in Option 2 can be an SgNB for the MC with the SB. Further, the gNB with the CU-DU split configuration in Option 2 may be an MgNB for the MC with the SB. The same advantages as those in the DC are produced.

The embodiments and the modifications are merely illustrations of the present invention, and can be freely combined within the scope of the present invention. Any constituent elements of the embodiments and the modifications can be appropriately modified or omitted.

For example, the subframe in the embodiments and the modifications is an example time unit of communication in the fifth generation base station communication system. The subframe may be set per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

DESCRIPTION OF REFERENCES

200 communication system, 202, 804 communication terminal device, 203 base station device, 801 central unit (CU), 802, 803 distributed unit (DU).

The invention claimed is:

1. A communication system comprising:
a user apparatus; and
a base station including:
a plurality of distributed units (DUs) capable of wirelessly communicating with the user apparatus; and
a central unit (CU) connected to the plurality of the DUs, wherein
a processing circuitry of the user apparatus is configured to report, to the CU, a measurement result regarding a downlink reference signal, and
a processing circuitry of the CU is configured to determine a DU to be used for wireless communication with the user apparatus based on the measurement result, and
a processing circuitry of at least one DU of the DUs is configured, in response to request information from the CU, to transmit, to the CU, status information that indicates a number of user apparatuses connected to the at least one DU.

2. The communication system according to claim 1, wherein the processing circuitry of at least one DU of the DUs is further configured to transmit, to the CU, status information that indicates a DU load.

3. The communication system according to claim 2, wherein the processing circuitry of the CU is further configured to exchange with the DU information through an interface between the CU and the DU.

4. The communication system according to claim 1, wherein a DU to be used for wireless communication with the user apparatus is determined from among candidate DUs determined by the CU.

5. The communication system according to claim 1, wherein
the processing circuitry of the CU is further configured to determine candidate DUs, and
the processing circuitry of the user apparatus is further configured to determine a DU to be used for wireless communication with the user apparatus from among the candidate DUs.

6. The communication system according to claim 1, wherein the plurality of the DUs include a primary DU and a secondary DU.

7. The communication system according to claim 6, wherein a processing circuitry of the primary DU is further configured to perform communication in a C-plane.

8. The communication system according to claim 1, wherein, in a case in which the processing circuitry of the user apparatus is configured to communicate with a first DU and a second DU under the CU, the processing circuitry of the user apparatus is further configured to duplicate a packet into three packets and transmits one packet of the three packets to the first DU and two packets of the three packets to the second DU.

9. The communication system according to claim 8, wherein a same sequence number is given to the three packets being duplicated.

10. The communication system according to claim 1, wherein the processing circuitry of the CU is further configured to obtain information related to a packet delay from at least one of the DUs.

11. The communication system according to claim 1, wherein identifiers unique among the plurality of the DUs under the CU are respectively given to the plurality of the DUs.

12. The communication system according to claim 1, wherein a split bearer is established for the DUs.

13. The communication system according to claim 1, wherein the processing circuitry of the CU is further configured to perform RRC reconfiguration related to the user apparatus after receiving a response related to an instruction for starting communication.

14. The communication system according to claim 1, wherein the processing circuitry of the CU is further configured to transmit, to the DU, an indication to terminate packet duplication.

15. The communication system according to claim 1, wherein, in mobility between the DUs, DU addition and DU release are combinedly performed.

16. The communication system according to claim 1, wherein, in mobility between the DUs, a single DU notifies the CU of information related to a PDCP sequence number.

17. The communication system according to claim 16, wherein the single DU is a source DU, and the information related to the PDCP sequence number indicates a sequence number corresponding to the last PDCP-PDU among PDCP-PDUs with acknowledgements in the single DU.

18. A user apparatus in a communication system including the user apparatus, and a base station, the base station including a plurality of distributed units (DUs) capable of wirelessly communicating with the user apparatus, and a central unit (CU) connected to the plurality of the DUs, the user apparatus comprising:

a processing circuitry configured to:

report, to the CU, a measurement result regarding a downlink reference signal, wherein the measurement result is used by the CU to determine a DU to be used for wireless communication with the user apparatus, and status information is transmitted from at least one DU of the DUs to the CU, in response to request information from the CU, status information indicates a number of user apparatuses connected to the at least one DU.

19. The central unit (CU) in a communication system including a user apparatus, and a base station, the base station including a plurality of distributed units (DUs) capable of wirelessly communicating with the user apparatus, and the CU connected to the plurality of DUs, the CU comprising:

a processing circuitry configured to:

determine a DU to be used for wireless communication with the user apparatus based on a measurement result reported from the user apparatus regarding a downlink reference signal;

transmit to request information to at least one DU of the DUs; and receive status information that indicates a number of user apparatuses connected to the at least one DU.

* * * * *